(12) United States Patent
Jin

(10) Patent No.: US 10,886,584 B2
(45) Date of Patent: Jan. 5, 2021

(54) AIR METAL FUEL CELL

(71) Applicants: LANZHOU JINFULE BIOTECHNOLOGY CO. LTD., Gansu (CN); KIN STAR INTERNATIONAL LIMITED, Road Town (VG); SPRING POWER LIMITED, Road Town (VG); JIN JIN PACIFIQUE COMPAGNIE, Antony (FR)

(72) Inventor: Jifan Jin, Gansu (CN)

(73) Assignees: LANZHOU JINFULE BIOTECHNOLOGY CO. LTD., Gansu (CN); KIN STAR INTERNATIONAL LIMITED, Road Town (VG); SPRING POWER LIMITED, Road Town (VG); JIN JIN PACIFIQUE COMPAGNIE, Antony (FR)

(*) Notice: Subject to any disclaimer, the term of this patent is extended or adjusted under 35 U.S.C. 154(b) by 137 days.

(21) Appl. No.: 15/533,350

(22) PCT Filed: Dec. 7, 2015

(86) PCT No.: PCT/CN2015/096576
§ 371 (c)(1),
(2) Date: Jun. 5, 2017

(87) PCT Pub. No.: WO2016/086903
PCT Pub. Date: Jun. 9, 2016

(65) Prior Publication Data
US 2017/0352936 A1 Dec. 7, 2017

(30) Foreign Application Priority Data

Dec. 5, 2014 (CN) .......................... 2014 1 0730210

(51) Int. Cl.
*H01M 12/06* (2006.01)
*H01M 12/08* (2006.01)

(52) U.S. Cl.
CPC .......... *H01M 12/06* (2013.01); *H01M 12/065* (2013.01); *H01M 12/08* (2013.01); *Y02E 60/10* (2013.01)

(58) Field of Classification Search
None
See application file for complete search history.

(56) References Cited

U.S. PATENT DOCUMENTS 3,539,396 A * 11/1970 Wagner .................. H01M 2/14
429/247
5,356,729 A * 10/1994 Pedicini ................. H01M 6/50
429/407

(Continued)

FOREIGN PATENT DOCUMENTS

| CN | 103107305 | 5/2013 |
| CN | 103597654 | 2/2014 |

OTHER PUBLICATIONS

International Search Report dated Feb. 22, 2016 in International Application No. PCT/CN2015/096576, filed Dec. 7, 2015.

*Primary Examiner* — Jonathan Crepeau
(74) *Attorney, Agent, or Firm* — Knobbe Martens Olson & Bear, LLP

(57) ABSTRACT

This invention is related to a type of Air Metal Fuel Cell. The Air Metal Fuel Cell in this invention is made of a positive air electrode, metal negative electrode, membrane/membrane bag, siphon material, electrolyte, mandrel, shockproof buffer layer, cathode electrolyte, positive electrolyte, battery shell and supporting fixing device. There is a hydrophobic structure layer between the positive and negative electrodes. The advantages of the invented cell include high energy (Continued)

density, low production costs, and superior safety and reliability.

56 Claims, 65 Drawing Sheets

(56) References Cited

U.S. PATENT DOCUMENTS

| | | | | |
|---|---|---|---|---|
| 5,563,004 | A | * | 10/1996 | Buzzelli .............. H01M 2/1264 |
| | | | | 429/405 |
| 5,849,427 | A | * | 12/1998 | Siu ........................ H01M 12/06 |
| | | | | 429/404 |
| 2001/0014416 | A1 | * | 8/2001 | Faris ....................... H01M 4/42 |
| | | | | 429/404 |
| 2011/0045385 | A1 | | 2/2011 | Makita |
| 2014/0120430 | A1 | | 5/2014 | Nagayama et al. |
| 2014/0234731 | A1 | * | 8/2014 | Lohmann ................ H01M 4/94 |
| | | | | 429/405 |
| 2017/0047626 | A1 | * | 2/2017 | Englert ............... H01M 4/0485 |

\* cited by examiner

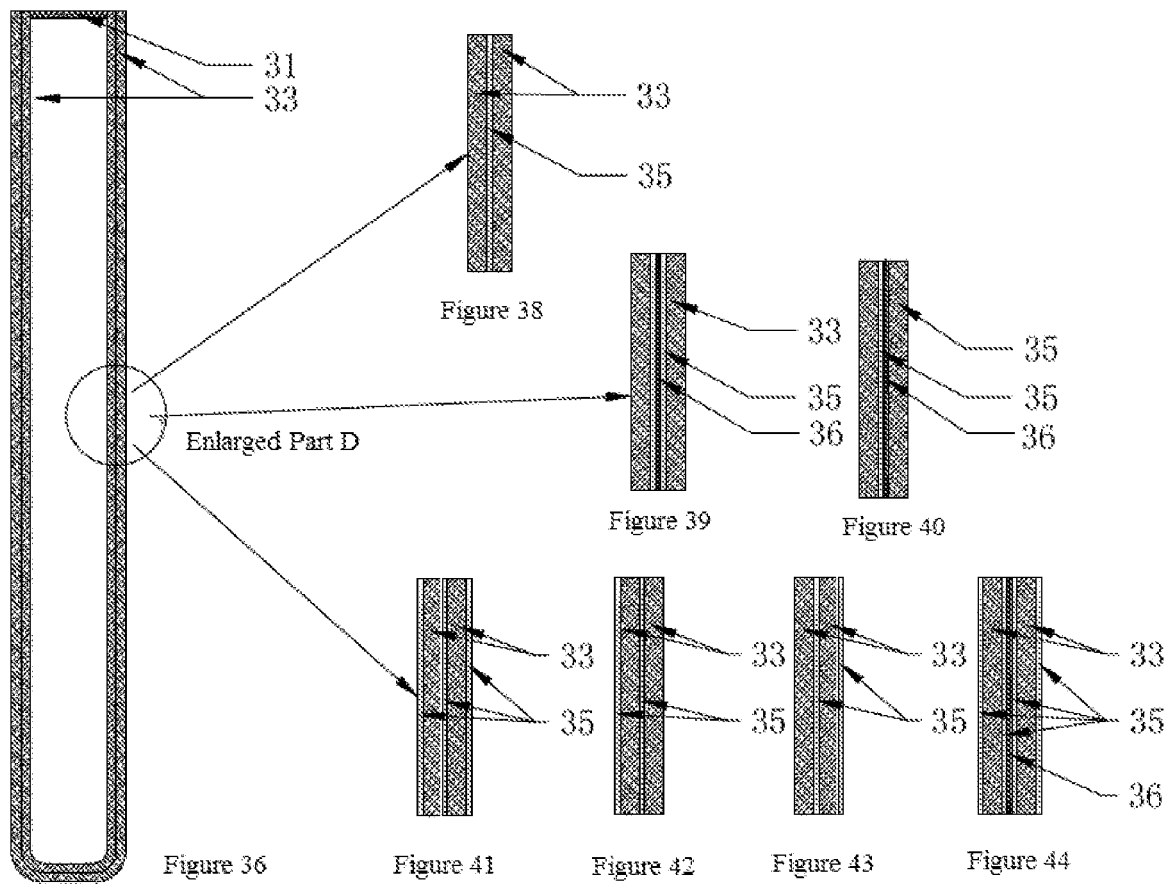

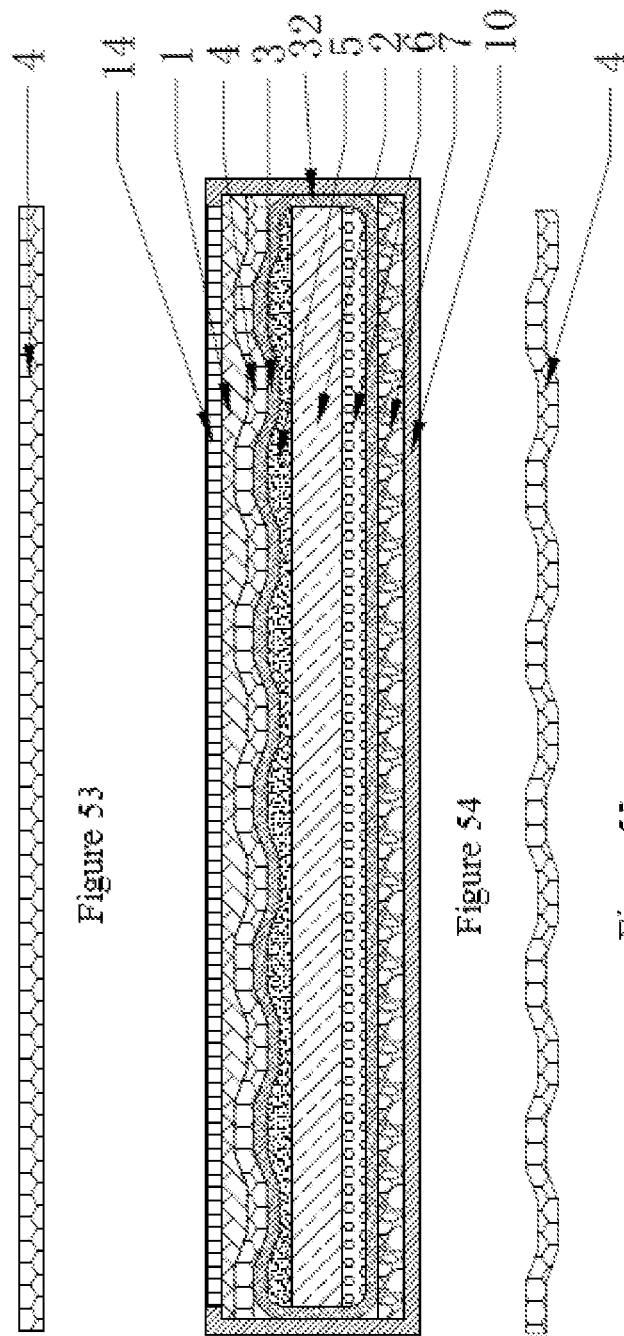

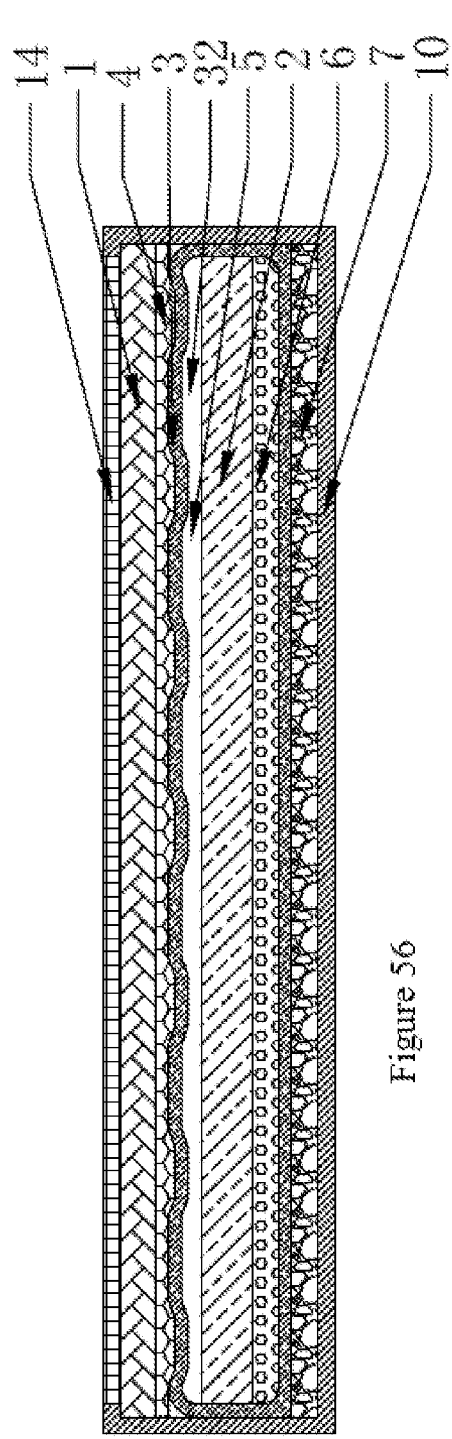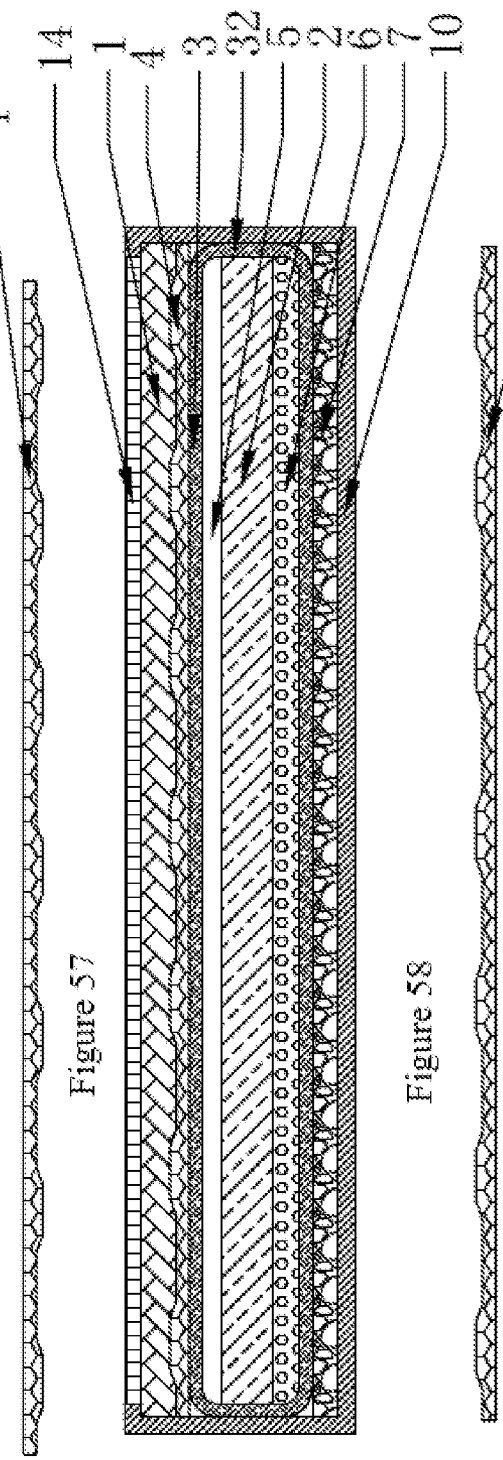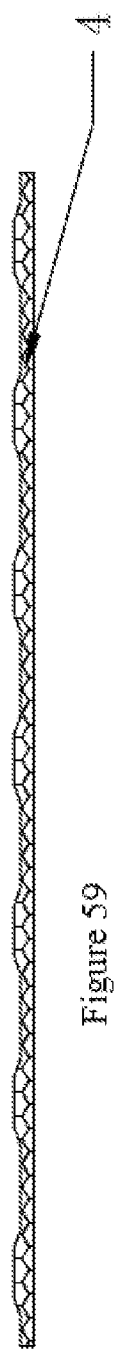
Figure 56　Figure 57　Figure 58　Figure 59

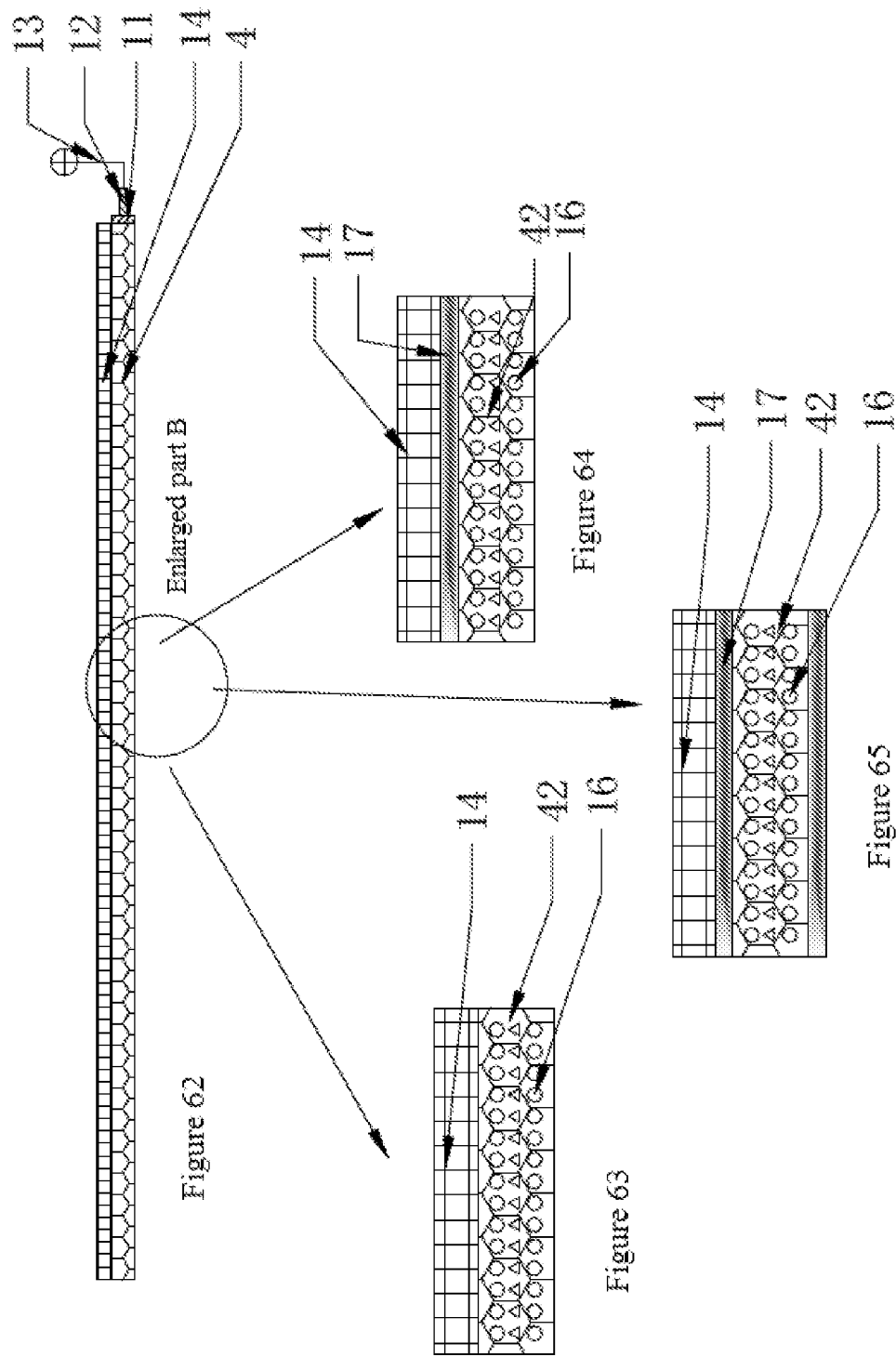

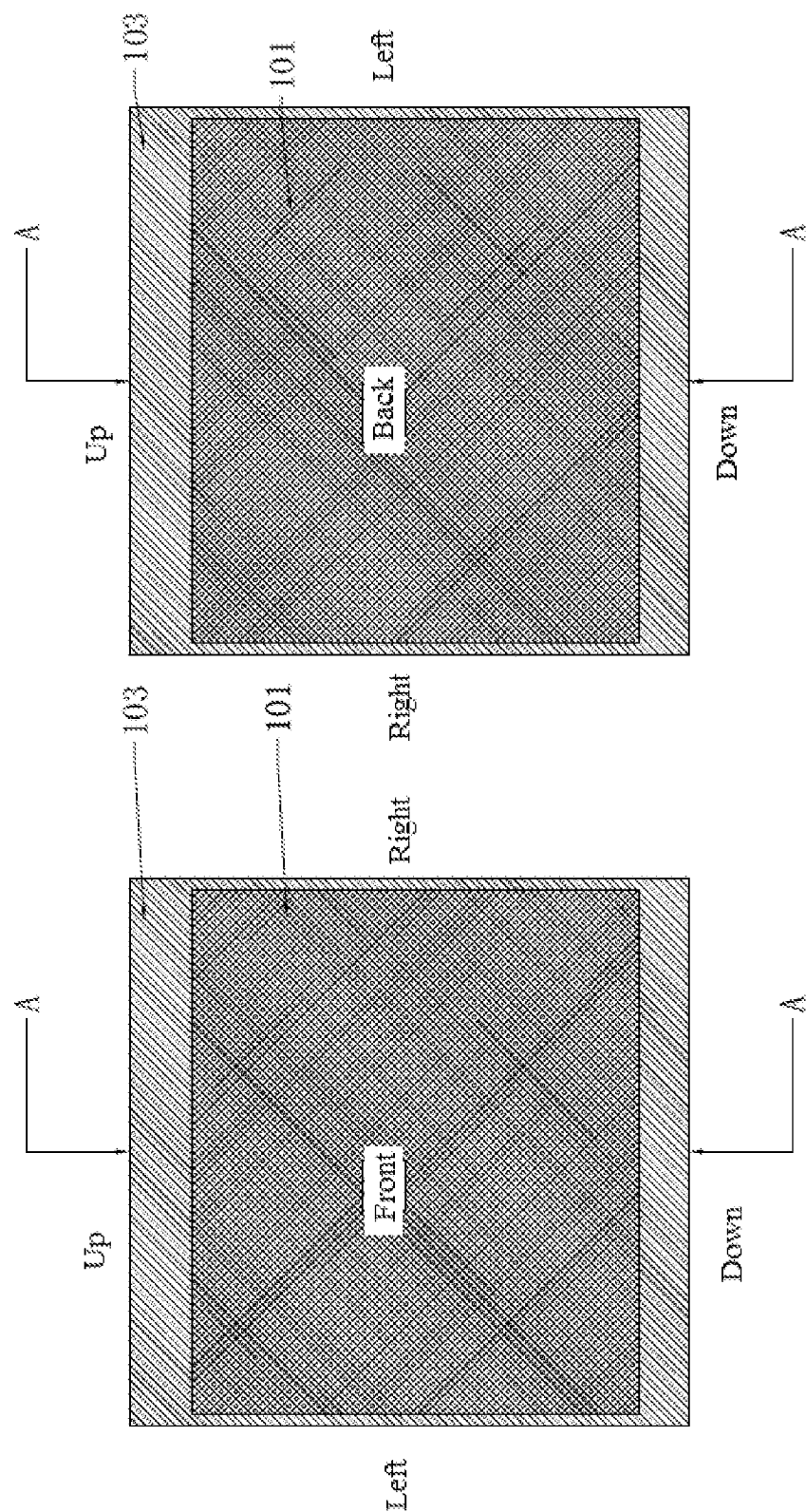

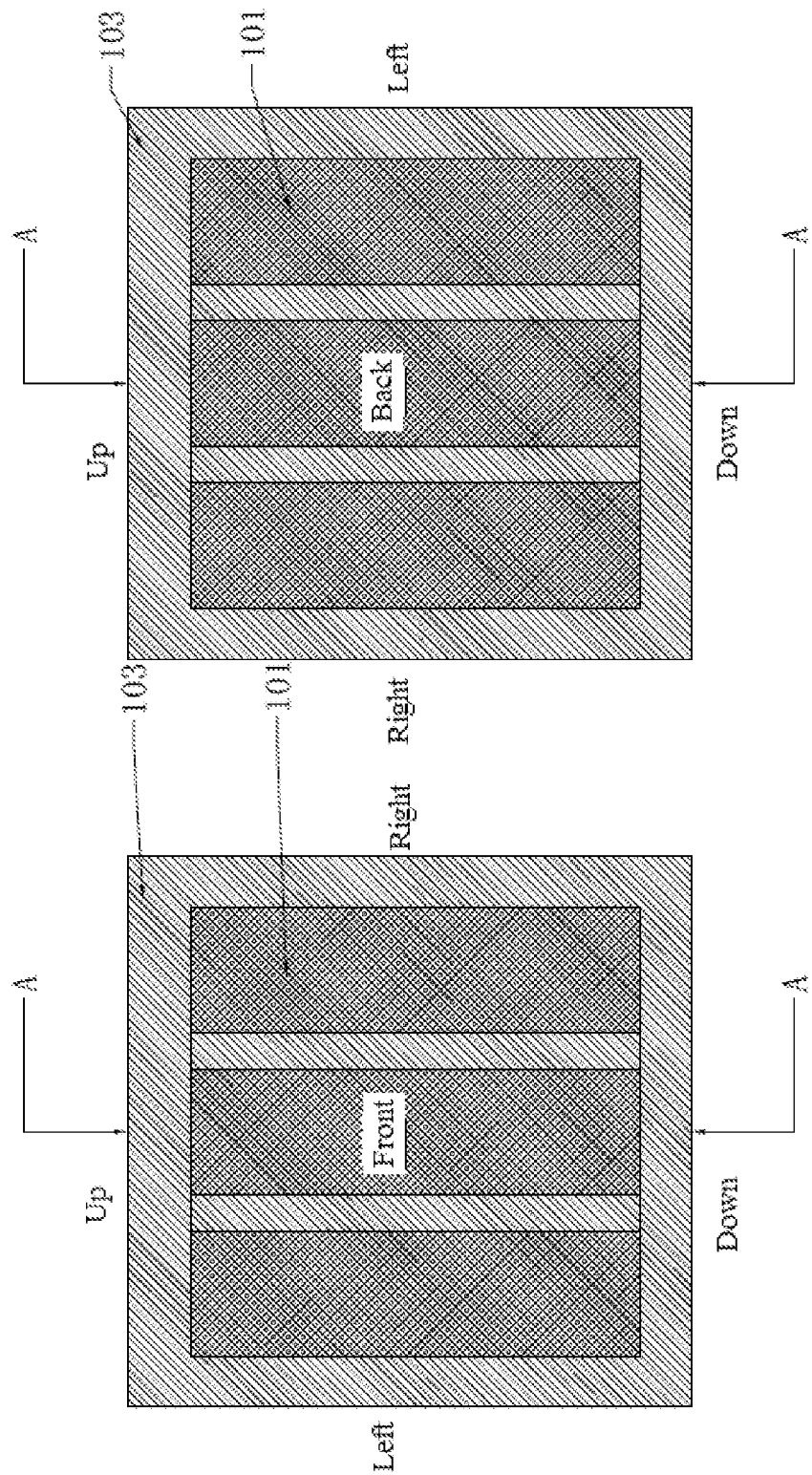

AIR METAL FUEL CELL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention is related to the field of fuel cells, more specifically, to cells in which a metal is a negative electrode fuel.

Description of the Related Art

There are many advantages of an Air Metal Fuel Cell: high energy density, long life cycle, structural diversity, sufficient resources, convenient material drawing, green environmental protection (non-toxic, no harmful gas emission, environmentally-friendly). It stores and generates electrical power at the same time. Especially as electric power storage, the metal could be re-cycled as superior renewable energy resources after the pyrolysis and reduction of energy suppliers such as hydroenergy, wind energy, solar energy etc.

Because of those advantages mentioned above, leading economy and technology countries have been making massive effort and investment for decades to develop the cell. However, as there is a protective film on the metal surface, which causes electrode potential lower than theory, as well as significant voltage behavior lag. On top of it, there are many more worldwide challenges remain unresolved and haven't reached ideal solutions especially those problems when the metal is under state of activated, such as decline of anti-corrosion, self discharge, voltage behavior lag, low discharge power, gas-forming, heat generating, expansion, self-ignition, explosion etc. In addition, the huge costs caused by poor research & development, further impedes commercializing the cell.

Patented documentation CN102244310A has released for a type of metal fuel cell, including the electrolyzer, as well as the metal positive, air electrode and electrolyte. The method, the cell combines and separates the metal positives, air electrode and electrolyte by controlling the amount of electrolyte in electrolyzer, does avoid the metal's corrosion, but doesn't apply to the use of regular cell. What's more, the cell can't be turned on any time.

Thus, the air metal fuel cells technology are still not mature yet, and issues such as metal corrosion, easy usability need solutions as soon as possible.

SUMMARY OF THE INVENTION

This invention provides a type of air metal fuel cell addressing the drawbacks in current technologies.

An air metal fuel cell includes at least one positive unit and at least one negative unit. The positive unit includes air positive electrode, positive electrolyte, siphon material. The air positive electrode includes the air electrode carrier with catalysts which can catalyze oxygen to produce anion. The negative unit includes metal negative and negative electrolyte. The metal negative electrode includes metal fuel providing cations for the discharging of the cell. The siphon material transports the positive electrolyte to the air positive carrier for their contacting. The metal negative electrode contacts with negative electrolyte. Between the air positive electrode and the metal negative lies the ion path. Between the air positive electrode as well as the positive electrolyte and the metal negative as well as the negative electrolyte exists the hydrophobic structure layer for ion passing, and with hydrophobicity.

The negative unit including the metal negative and negative electrolyte is preferred.

Next, the cell also includes the first positive electrolyte storage chamber. Part of the siphon material inserts into the first positive electrolyte storage chamber, and the other part contacts with the air positive carrier.

Next, the cell also includes the second positive electrolyte storage chamber. One end of the siphon material inserts into the first storage chamber and the other into the second storage chamber. The middle part contacts with the positive carrier.

Next, the first positive electrolyte storage chamber is linked to the second via a pipe. There is a positive electrolyte pump on the pipe driven to achieving the cycle of the positive electrolyte between the first and second storage chamber. There is a positive electrolyte isolator at the entrance of the inserting place where the siphon inserts into both the first and second positive electrolyte storage chambers. The isolator seals the junction of the siphon material and the two storage chambers.

The preferred siphon material fights both extreme heat and frost.

Next, besides negative electrolyte, the negative unit includes a mandrel with absorbability to absorb and storage negative electrolyte. The mandrel contacts with the preferred metal fuel placed between the mandrel and electrolyte and attached to the two each.

Next, the cell also includes a springy shockproof butter. With the help the spring, the subassembly of the cell can achieve tight junction.

Next, the cell includes a supporting device to fix the subassemblies.

The air positive electrode also consists of an air electrode positive current collector and air electrode positive lug. The air electrode positive lug, air electrode positive current collector and air electrode carrier are linked one by one.

Next, the air positive electrode also consists of a positive output circuit linked to the air electrode positive lug.

Next, the air positive electrode current collector, the air electrode positive lug and/or the positive output circuit form a unit.

Next, the positive unit includes an air electrode positive air inlet device allowing oxygen to pass it and enter the positive unit before contacting with the catalyst in the air electrode carrier.

Next, the air electrode positive air inlet device is armed with a layer made of breathable material. The layer includes a waterproof breathable layer and/or a carbon dioxide membrane. The air electrode positive air inlet device can be an intake hood.

Next, the catalyst is distributed in or on the surface of the air electrode carrier. Moreover, a catalyst coating on the surface of the carrier, is preferred.

Next, the catalyst coating is made from catalyst, porous adsorbent, conductive agent and binder.

Next, the catalyst consists of one or more of catalysts, including silver based catalyst, perovskite catalyst, platinum catalyst, pd-based catalyst, manganese-based catalyst, metal composite oxide catalyst, metal oxide catalyst, organic metal catalyst, and metallic chelate catalyst.

Next, the air electrode carrier includes: 1) membrane structure, chain structure, fabrics structure, granule structure, powder structure, and nanomaterial, all of which are completely or partly made from carbon materials; 2) net structure, foaming structure, membrane structure, fabrics structure, granule structure and powder structure, which are made from carbon nanomaterial; Or, net structure, foaming structure, membrane structure, fabrics structure, granule structure and powder structure, which are made from metal and metal nanomaterial.

The air electrode carrier also includes but isn't limited within the following one or more substances: 1) carbon cloth, carbon paper, and carbon fiber sheet; 2) carbon nano cloth, and carbon nano paper; or, 3) copper foam fiber and silver foam fiber.

Besides, the positive siphon material also functions as an air electrode carrier. Part of the siphon material inserts into the positive electrolyte storage chamber, the other part functions as the air electrode carrier to be linked to the air electrode lug.

The metal negative electrode consists of a metal negative current collector, a metal negative lug and metal fuel, three of which are linked one by one.

Next, the metal negative lug, metal negative current collector and/or the metal fuel form a unit.

Next, metals including Li, Zn, Mg, Al, Fe, Pb, Na, K and Ca are selected to produce the metal fuel, which is made from one or more of the metals, of the alloys, or of the alloys of metals and nonmetal. Al is the preferred.

Besides, the metal fuel can be semi-solid. Meanwhile, a metal fuel storage chamber and a fuel-recovery cell are designed. The metal fuel enters fuel-recovery cell from the metal fuel storage chamber after discharging in the negative discharging zone. The metal fuel is pumped into the cell negative discharging zone by the metal fuel pump, then, pumped into fuel-recovery cell after the discharging is ended.

Next, the semi-solid metal fuel can be selected from one or more of the liquid semi-solid mixture of powder or particle, conductive agent and thickening agent. The mixture is made from one or more of the metals including Li, Zn, Mg, Al, Fe, Pb, Na, K, and Ca, of the alloys, or of the alloys of metal and nonmetal.

Besides, the cell includes a rotatable rotator linked to the metal fuel to drive the fuel to rotate. The rotator consists of a dynamo and the linking subassembly between the dynamo and metal fuel. For instance, a spindle linked to the metal fuel can help achieve the evenly discharging by rotating the metal fuel after contacting with the dynamo.

Next, the negative unit includes a mono-layer or multi-layer membrane.

At least one layer is equipped with a hydrophobic coating to form the hydrophobic structure.

Next, the material of the hydrophobic coating is selected from the following: polymer class such as PTEF, polyethylene, etc, senior straight-chain alkanes class such as microcrystalline wax, liquid paraffin, polyethylene wax, etc, lipid such as animal oil & vegetable oil, including cream, butter, mutton oil, lard oil, fish oil, poultry oil, soya-bean oil, sun-flower oil, castor oil, peanut oil, etc, and one or more synthetic aliphatic compounds.

Next, the optional materials of the membrane can be polyethylene membrane, polypropylene membrane, glass fibre, PVC, bioactive membrane, biological selectivity membrane, bacteria microbial biofilm or organic spraying membrane.

The negative unit including the electrolyte contacted to the membrane, is preferred.

Next, the membrane can function individually as a pockety membrane bag or to be an assistant. The negative unit including the metal negative electrode, negative electrolyte, electrolyte etc, mainly lies in the membrane bag.

Next, the membrane bag is equipped with a membrane bag sealing device on the mouth of the bag for sealing.

Next, the membrane bag consists of membrane and septum to form the pockety device.

Next, the material of the septum can be PTEF, polyethylene, polypropylene, PVC, polyvinyl chloride or ABS.

Besides, on the septum, there are metallic elements, which refer to the elements added into alloy, and nonmetallic elements added to produce alloy. For example, in a kind of aluminum alloy (based on aluminum substrate, add other elements contain In, Mg, Sn, and Pb), In, Mg, Sn, and Pb are the added elements, metal alloy elements, which means the elements of In, Mg, Sn, and Pb, are added on the septum. However, in the membrane bag, exits ordinary elemental aluminum, rather than aluminum alloy.

For another example, in a kind of aluminum alloy, (based on aluminum substrate, add other elements containing Si, Se, I and S), Si, Se, I and S are the added elements, metal alloy elements, which means the elements of In, Mg, Sn, and Pb are added on the septum. However, in membrane bag, it is still ordinary elemental aluminum, rather than aluminum alloy.

The metallic elements added to produce alloy are at least one of the metal elements in the periodic table, and the nonmetal elements added to produce alloy are at least one of the nonmetal elements in the periodic table.

Next, the negative unit includes siphon material. Part of the negative siphon material joints to the metal fuel, and the negative electrolyte can be translated to the metal fuel through the negative siphon material. On the one side of the negative siphon material facing to the positive unit, the hydrophobic coating forms the hydrophobic structure. In this case, the membrane or the membrane bag needn't be put into use.

Next, the cell includes a first and a second negative electrolyte storage chamber. One end of siphon material inserts in the first storage chamber, while the other end in the second, and the middle part contacts with metal fuel. A pipe equipped with a negative electrolyte pump links the two storage chambers, and the negative electrolyte circulation between the first and second storage chamber is achieved, with the power of the negative electrolyte pump.

In the invention, the three sources of oxygen are the air, pure oxygen and material producing oxygen.

The electrolyte provides the ion paths for the positive and negative electrodes, and the electrolyte for the negative electrode ion running is solid and semi-solid.

Next, the electrolyte can be: solid electrolyte($\beta$-$Al_2O_3$, zirconium dioxide or ceramic materials), polymer electrolyte(polyethylene oxide, PVdF, polymethyl methacrylate, poly acrylic polymer electrolyte) or semi-solid electrolyte: at least one substances from oligosaccharide and polysaccharide, starch, dextrin, and ethyl cellulose, at least one from lipids, senior straight-chain alkanes and esters, and at least one from carbon materials, magnetic materials, and glass fiber, then, mixing up with at least one from sodium hydroxide, potassium hydroxide, and lithium hydroxide. The reaction is in an anhydrous environment. The alkaline organic solution refers to the more than one from sodium hydroxide, potassium hydroxide, and lithium hydroxide dissolve in more than one from ethanol, methanol, acetonitrile, acetone, tetrahydrofuran, isopropyl alcohol, dimethyl sulfoxide, and carbonic acid, to produce a kind of alkaline organic solution.

The negative electrolyte provides ion paths for the positive and negative electrodes.

And the materials of negative electrolyte can be following: 1) alkaline electrolyte: sodium hydroxide, potassium hydroxide, lithium hydroxide, sodium bicarbonate, calcium hydroxide, aluminum hydroxide, zinc oxide, hydrogen sodium methoxide, and potassium methoxide. More than one dissolves in more than one from the following organic solvent: ethanol, methanol, acetonitrile, dimethyl sulfoxide or carbonate, to produce negative electrolyte. 2) acidic electrolyte: organic and inorganic acid mix with more than one from the following organic solvent: ethanol, methanol, acetonitrile, dimethyl sulfoxide or carbonate, to produce negative electrolyte. 3) neutral electrolyte: the salt from at least one of the following: sodium chloride, sodium fluoride and sodium iodide, potassium chloride, potassium fluoride, and potassium iodide, reacts with more than one from the following organic solvent: ethanol, methanol, acetonitrile, dimethyl sulfoxide or carbonate, to produce negative electrolyte. Also, the metal halide and quaternary ammonium salt mix with each other to produce a certain concentration of the negative electrolyte. The metal halide mixes with one of quaternary ammonium salt, phosphate salt or other salts, to produce a metal halide acid ionic liquid electrolyte (halogen acid metal, such as aluminum chloride acid, zinc chloride acid), the solvent includes more than one from ethanol, methanol, acetonitrile, acetone, tetrahydrofuran, isopropyl alcohol, dimethyl sulfoxide, or carbonate. The metal halide includes aluminum chloride, ferric chloride, zinc chloride, sodium chloride, sodium fluoride and sodium iodide, potassium chloride, potassium iodide, etc.

The positive electrolyte provides ion paths for the positive and negative electrodes.

And the materials of negative electrolyte can be following: 1) alkaline electrolyte: sodium hydroxide, potassium hydroxide, lithium hydroxide, sodium bicarbonate, calcium hydroxide, aluminum hydroxide, zinc oxide, hydrogen sodium methoxide, and potassium methoxide. More than one dissolves in more than one from the following organic solvent: ethanol, methanol, acetonitrile, dimethyl sulfoxide, carbonate or water, to produce positive electrolyte. 2) acidic electrolyte: organic and inorganic acid mix with more than one from the following organic solvent: ethanol, methanol, acetonitrile, dimethyl sulfoxide or carbonate, to produce positive electrolyte. 3) neutral electrolyte: the salt from at least one of the following: sodium chloride, sodium fluoride and sodium iodide, potassium chloride, potassium fluoride, and potassium iodide, reacts with more than one from the following organic solvent: ethanol, methanol, acetonitrile, dimethyl sulfoxide, carbonate or water to produce positive electrolyte.

Next, the cell includes the positive output circuit and negative output circuit, connected to the air positive electrode and metal negative electrode, to form a battery pack, to supply power or more.

The invented cell includes two and more positive units as well as negative units. For instance, one negative unit between two positive units, or several positive and negative units arranged alternatively. Then, the positive and negative electrolyte storage chambers each functions as one part.

Besides, the separation of positive and negative electrodes is available. The ion channels between the positive and negative electrodes can be formed through the positive electrolyte and siphon material. For instance, the siphon material can be the peripheral outside the membrane or membrane bag in the negative unit, and attached. One end of the siphon material inserts into the negative electrolyte storage chamber while the siphon in the positive unit also inserts into it, to form ion channels. The negative electrolyte storage chamber can be the same one or the separate ones. If electrolyte storage chambers are separate ones, the channel is the same one.

The preferred structure of the positive and negative units is flat structure. The air electrode carrier, intake hood (air electrode positive air inlet device), siphon material, membrane, electrolyte, metal fuel, mandrel, membrane bags of septum, anti-collision buffer structure are all flat, and tightly contacted one by one.

Another preferred structure of the invented cell is column. For instance, the negative unit is surrounded by the positive unit as the center. Then the mandrel, metal fuel, electrolyte, membrane or membrane bag, siphon material carrier, air electrode carrier and intake hood are set one by one from the center to the edge.

Generally, the negative electrolyte fills in the negative unit and stores in the mandrel partly or mainly.

The electrolyte storage chamber is usually placed at the bottom of the cell. If there are two, at the top and bottom each.

The shell and supporting fixtures of the invented cell ensure each assembly fixed and contacted tightly. The shell consists of the fixtures and other assemblies such as storage chamber and intake hood. Or the shell consists of the fixtures only. Or there is a single shell to keep each assembly hermetic, except the air intake place.

The cell can form a single cell, battery pack or cell pile, etc, based on various purposes.

Next, the single cell, the battery pack or the cell pile can be equipped with a shell. Generally, some space is kept between them. The shell can appear in the forms of factory building, container, battery pack and cell bin etc.

Next, oxygen supply device contacted to the shell is equipped.

Next, oxygen concentration sensor inside the shell is equipped to adjust the oxygen concentration.

Next, oxygen selective membrane is equipped outside shell to allow oxygen to pass through. Also, carbon dioxide isolation membrane is equipped.

Next, on the shell is fixed an air filter device which can be installed outside the oxygen selective membrane and/or carbon dioxide isolation membrane to filter the particles in the air. Also, the oxygen selective membrane and/or carbon dioxide isolation membrane can be set in the air filter device.

The cell can depart the air positive electrode from the metal negative electrode, which can avoid their direct contact, to maintain the stability of the electrolyte surrounding the metal negative, and avoid moisture as well as other molecules in the positive unit entering into the negative unit and contacting with the metal fuel, but meanwhile, the ion can get through freely. The departure makes sure to avoid the corruption, self-ignition and the speeding of self-discharge, and power failure.

The invention transports the electrolyte through the siphon material to provide stable electrolyte, to control the cell temperature to be normal rather than be extremely high or low. When collision happens, the positive and negative electrodes contacting is avoided, and the electrolyte is mainly stored in the storage chambers, so acute discharge and explosion due to short-circuit won't happen.

The invention stores and absorbs the negative electrolyte for the negative electrode through the mandrel, which enables the tight contact between the negative electrode and electrolyte, and provides ion paths for the cell, achieving many goals such as the stability and durability of current and voltage.

The invention makes sure the tight contact of all the subassemblies through the shockproof buffer to avoid the sudden power failure and current change while collision happens.

BRIEF DESCRIPTION OF THE DRAWINGS

FIG. 33 shows a partial enlarged view of the membrane bag along FIG. 31 Part C.

FIG. 34 shows another partial enlarged view of the membrane bag along FIG. 31 Part C.

FIG. 35 shows a partial enlarged view of the membrane bag along FIG. 31 Part C.

FIG. 36 shows a structure diagram of the double-layer membrane bag.

FIG. 38 shows a partial enlarged view of the membrane bag along FIG. 36 Part D.

FIG. 39 shows another partial enlarged view of the membrane bag along FIG. 36 Part D.

FIG. 40 shows another partial enlarged view of the membrane bag along FIG. 36 Part D.

FIG. 41 shows another partial enlarged view of the membrane bag along FIG. 36 Part D.

FIG. 42 shows another partial enlarged view of the membrane bag along FIG. 36 Part D.

FIG. 43 shows another partial enlarged view of the membrane bag along FIG. 36 Part D.

FIG. 44 shows another partial enlarged view of the membrane bag along FIG. 36 Part D.

FIG. 53 shows a structure diagram of the siphon material.

FIG. 54 shows a sectional view of the air metal fuel cell along direction of FIG. 1A-A, in which the siphon material is wavy.

FIG. 55 shows a structure diagram of the siphon material shown in FIG. 54.

FIG. 56 shows another sectional view of the air metal fuel cell along direction of FIG. 1A-A, in which the siphon material is half-wavy.

FIG. 57 shows a structure diagram of the siphon material shown in FIG. 56.

FIG. 58 shows another sectional view of air metal fuel cell along direction of FIG. 1A-A, in which the siphon material is half-wavy.

FIG. 59 shows a structure diagram of the siphon material shown in FIG. 58.

FIG. 62 shows a structure diagram of the air positive electrode, in which the siphon material functions as the air electrode carrier.

FIG. 63 shows a partial enlarged view of the air positive electrode along direction of FIG. 62 Part B.

FIG. 64 shows another partial enlarged view of the air positive electrode along direction of FIG. 62 Part B.

FIG. 65 shows another partial enlarged view of the air positive electrode along direction of FIG. 62 Part B.

FIG. 84 shows a front view of the battery pack.

FIG. 85 shows a back view of the battery pack.

FIG. 87 shows another front view of the battery pack.

FIG. 88 shows another back view of the battery pack.

Figure 1:
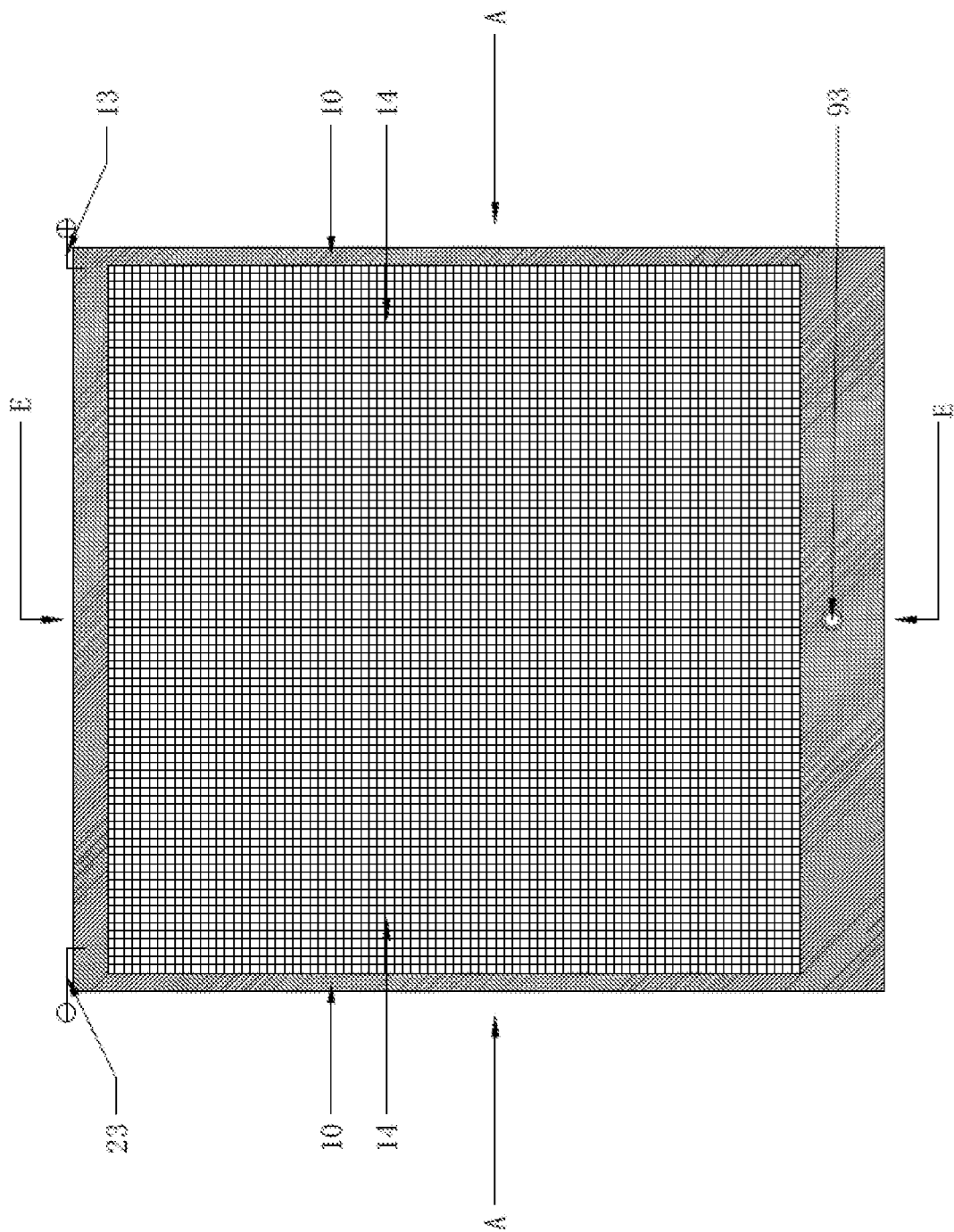
FIG. 1 shows the front view of the air metal fuel cell.

In the figures: 1, Air positive electrode. 11, Air electrode positive current collector. 12, Air electrode positive lug. 13, Air electrode positive output circuit. 14, Air electrode positive air inlet device. 15, Air electrode carrier. 16, Catalyst. 17, Air electrode catalyst coating. 18 Positive electrode pump. 181 Liquid inlet device of positive electrolyte pump. 182, Liquid outlet device of positive electrolyte pump. 2, Metal negative electrode. 21, Metal negative current collector. 22, Metal negative lug. 23, Metal negative output circuit. 24, Metal fuels. 25, Negative electrolyte pump. 251, Liquid inlet device of negative electrolyte pump. 252, Liquid discharging device of negative electrolyte pump. 26, Semi-solid metal fuels. 261, Metal fuel chamber. 262, Metal fuel recycle chamber. 263, Metal fuel discharge area. 27, Metal fuel pump. 271, Metal fuel pump feeding device. 272, Metal fuel pump discharging device. 28, Metal fuel recycle pump. 281, Metal fuel recycle pump feeding device. 282, Metal fuel recycle pump discharging device. 29, Negative rotating motor. 291, Negative rotation axis. 292, Rotating seal. 3, Membrane, membrane bag, bioactive membrane bag, bioactive membrane. 31, Membrane bag sealing device. 32, Membrane bag edge bonding part. 33, Membrane, 34, Septum. 35, Daub coating. 36, Daub coating b. 37, Metal alloy elements. 38, Nonmetal alloy elements. 4, High temperature anti-freezing material for siphon film. 41, Siphon end of siphon film. 42, Ion terminal of siphon film. 43, High temperature anti-freezing material for negative electrode electrolyte membrane. 5, Electrolyte. 6, Mandrel. 7, Shock-proof buffer layer. 8, Negative electrolyte. 81, Negative electrolyte storage chamber. 82, Negative electrolyte isolation device. 83, Negative electrolyte storage chamber access channel. 811, Negative electrolyte second storage chamber. 821, Negative electrolyte second isolation device. 831, Negative electrolyte second storage chamber access channel. 9, Positive electrolyte. 91, Positive electrolyte storage chamber. 92, Positive electrolyte isolation device. 93, Positive electrolyte storage chamber access channel. 911, Positive electrolyte second storage chamber. 921, Positive electrolyte second isolation device. 931, Positive electrolyte second storage chamber access channel. 10, Battery shell and supporting fixing device. 101, Air inlet and outlet device. 102, Monocell. 103, Shell. 105, Plant. 106, Pure oxygen storage tank. 1061, Pure oxygen. 1062, Aerator. 1063, Oxygen supply device. 107, Voltage regulating switch device. 1011, Filter device. 1012, Switching device. 1013, Switch control device. 1014, Carbon dioxide membrane.

1016, Pure oxygen supply device. 1017, Pure oxygen inlet device. 1018, Oxygen condition tester. 1019, Oxygen selective membrane.

DETAILED DESCRIPTION OF THE PREFERRED EMBODIMENT

Further descriptions of the invention are provided below with reference to the appended figures, which should not be construed as limiting the invention but are to be considered as within the scope of the present invention given that they are not deviated from the spirit and substance of the invention.

Those components above are all instantiations in below description for the invention, thus the supporting fixing device mentioned above is also sometimes called battery shell and supporting fixing device. Siphon material is also sometimes called high temperature anti-freezing material for siphon film. Membrane, membrane bag, bioactive membrane bag, bioactive membrane mainly means membrane. The membrane mainly means the material of the membrane itself. Shockproof buffer structure is also sometimes called shockproof buffer layer. Hydrophobic coating material is also sometimes called daub coating.

The typical structure of the invented air metal fuel cell consists of the following: Air positive electrode 1, Metal negative electrode 2, Membrane, membrane bag, bioactive membrane bag, bioactive membrane 3, High temperature anti-freezing material for siphon film 4, Electrolyte 5, Mandrel 6, Shockproof buffer layer 7, Negative electrolyte 8, Positive electrolyte 9, Battery shell and supporting fixing device 10, and some other relevant auxiliary material or other adjacent structures.

In some cases, some of the components are optional. Specific descriptions are as follow.

Part 1 Functions of the Components & Structures of the Metal Fuel Cell

Component 1 Air positive electrode 1: as the positive electrode to provide anion for the cell First, adsorb oxygen from the air to Air positive electrode 1, and then allow oxygen to contact with the catalyst on it to turn into ions, such as oxygen ions and oxygen ions and hydroxyl ions etc, to take part in the process of discharge.

Second, adsorb pure oxygen, liquid oxygen and solid oxygen, compressed gas oxygen to Air positive electrode 1, and then allow oxygen to contact with the catalyst on it to turn into ions, such as oxygen ions, super oxygen and hydroxyl ions etc, to take part in the process of discharge, which can be applied effectively both under the natural state and in the place of thin air, lacking air or of no oxygen, such as outside the atmosphere or atmosphere, deep sea or underwater and the subspace.

Third, translate oxygen molecules in oxygen-rich substances and materials into usable ions after their contact with the catalyst, such as oxygen ions, super oxygen ions and hydroxyl ions etc, to take part in the process of discharge. For instance, lithium, sodium, calcium peroxide, peroxide of hydrogen peroxide.

Fourth, offer oxygen ions in the oxidizing agent to the cell, to take part in the process of discharge.

Fifth, others.

Component 2 Metal negative electrode 2: as the negative electrode, to offer positive ions for the discharge of the cell, and to be part of the storage capacity Component 3 Membrane, membrane bag, bioactive membrane bag, bioactive membrane 3: as the membrane to depart Air positive electrode 1 and Metal negative electrode 2, without direct contact, to maintain the stable electrolyte environment surrounding Metal negative electrode 2, not to let moisture as well as other molecular materials enter into Membrane, membrane bag, bioactive membrane bag, bioactive membrane 3, meanwhile, to let ions pass freely for avoiding corruption, self-ignition and speeding of self-discharge, and power failure Component 4 High temperature anti-freezing material for siphon film 4: to provide ion paths for the cell and to provide ion running electrolyte for the positive electrode of the cell, to adjust the temperature to be normal and stable without being extremely high or low Component 5 Electrolyte 5: to provide ion paths for the cell, and to provide ion running electrolyte for the negative electrode of the cell Component 6 Mandrel 6: to store and adsorb negative electrolyte, to enable the tight contact between the negative electrode and electrolyte, to provide the ion paths for the cell, to maintain the stability & durability of current and voltage and more Component 7 Shockproof buffer layer 7: to avoid the sudden power failure and current change while collision happens Component 8 Negative electrolyte 8: to provide ion paths for the cell and provide ion running electrolyte for the negative electrode of the cell Component 9 Positive electrolyte 9: to provide ion paths for the cell and provide ion running electrolyte for the positive electrode of the cell Component 10 Battery shell and supporting fixing device 10: to make sure the tight contact of all the components, ensure each component a stable working environment, and guarantee the stability & validity Part 2 Instructions of the Components and Structures of the Metal Fuel Cell Component 1 Air positive electrode 1

(A) Structure: Air electrode positive current collector 11, Air electrode positive lug 12, Air electrode positive output circuit 13, Air electrode positive air inlet device 14, Air electrode carrier 15, Catalyst 16, Air electrode catalyst coating 17

FIGS. 4-8 for specific information

Figures 5, 6:
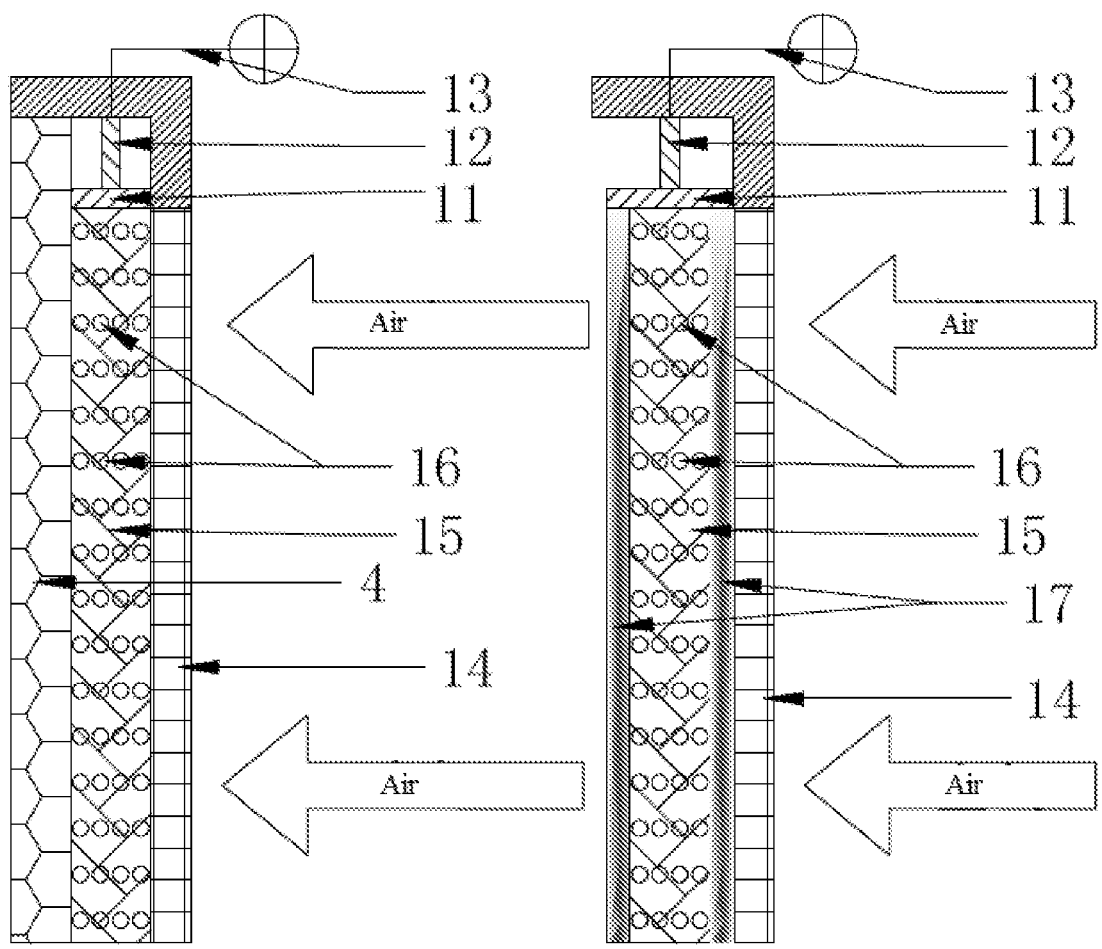
FIG. 5 shows a sketch of the positive unit (Partially enlarged view of the marked part in FIG. 4).
FIG. 6 shows another sketch of the positive unit (Partially enlarged view of the marked part in FIG. 4).

In FIG. 5, in the structure of Air positive electrode 1, there is no Air electrode catalyst coating 17. Air positive electrode 1 consists of the following six components: Air electrode positive current collector 11, Air electrode positive lug 12, Air electrode positive output circuit 13, Air electrode positive air inlet device 14, Air electrode carrier 15, and Catalyst 16.

In FIG. 6, in the structure of Air positive electrode 1, there are Air electrode catalyst coatings 17 on the both sides of Air electrode carrier 15. Air positive electrode 1 consists of the following seven components: Air electrode positive current collector 11, Air electrode positive lug 12, Air electrode positive output circuit 13, Air electrode positive air inlet device 14, Air electrode carrier 15, catalyst 16, and Air electrode catalyst coating 17.

Figures 7, 8:
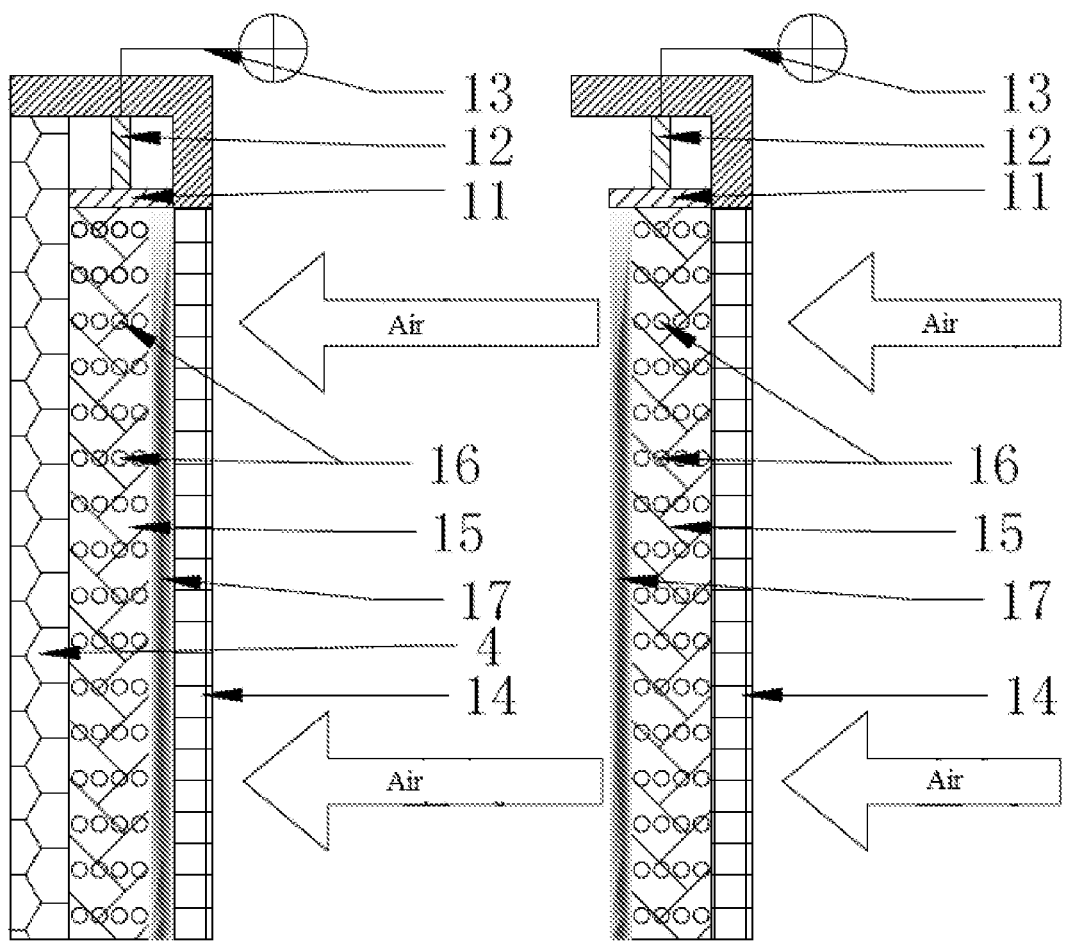
FIG. 7 shows another sketch of the positive unit (Partially enlarged view of the marked part in FIG. 4).
FIG. 8 shows another sketch of the positive unit (Partially enlarged view of the marked part in FIG. 4).

In FIG. 7, in the structure of Air positive electrode 1, Air electrode catalyst coating 17 lies between Air electrode positive air inlet device 14 and Air electrode carrier 15. Air positive electrode 1 consists of the following seven components: Air electrode positive current collector 11, Air electrode positive lug 12, Air electrode positive output circuit 13, Air electrode positive air inlet device 14, Air electrode carrier 15, catalyst 16, and Air electrode catalyst coating 17.

In FIG. 7, in the structure of Air positive electrode 1, Air electrode catalyst coating 17 lies between High temperature anti-freezing material for siphon film 4 and Air electrode carrier 15. Air positive electrode 1 consists of the following seven components: Air electrode positive current collector 11, Air electrode positive lug 12, Air electrode positive output circuit 13, Air electrode positive air inlet device 14, Air electrode carrier 15, catalyst 16, and Air electrode catalyst coating 17.

(B) Running characteristics: The air spreads into Air electrode positive air inlet device 14 to be filtered, and then spreads further, and enters into Air electrode carrier 15 and Air electrode catalyst coating 17. Then oxygen in the air turns into the form of oxygen ions, taking in part in the reaction of discharge of the cell with the aid of Air electrode carrier 15 and catalyst 16 in Air electrode catalyst coating 17.

(C) Technology characteristics:

(C-1) Air electrode positive current collector 11

This is a piece on Air positive electrode 1, whose one side is linked with Air electrode positive lug 12, to conduct the collected current through Air electrode positive lug 12, while the other side links to Air electrode carrier 15 and Air electrode catalyst coating 17.

The optional materials of Air electrode positive current collector 11 includes: high conductivity of metal, such as copper, nickel, silver, lead, etc, and high conductive binary alloy as well as multi-alloy, and carbon products such as carbon fiber, carbon nanotube, carbon fabric and felt, carbon rope, graphite, carbon paper, graphite plate, etc. The optional shapes can be soil shape, flake, filiform, fibrous, mesh, coating, plating, etc, such as metal foil, sheet metal, metal wire, metal fiber, metal mesh, metal coating, metal plating, gold foil, alloy plate, wire, metal fiber, metal mesh, alloy coating, alloy plating coating, etc. The thickness can be anyone among 0.001 nm-1 nm, 1 nm-1000 nm, 1 µm-1000 µm, 1 mm-1000 mm, and more than 1 m, or among 1 µm-100 µm. The length, the width, the diameter and the limitation can be anyone among 0.001 nm-1 nm, 1 nm-1000 nm, 1 µm-1000 µm, 1 mm-1000 mm, and more than 1 m.

FIGS. 9, 10, 11 and 12 show the linking structure of Air electrode positive current collector 11 and Air electrode carrier 15.

Figure 9:
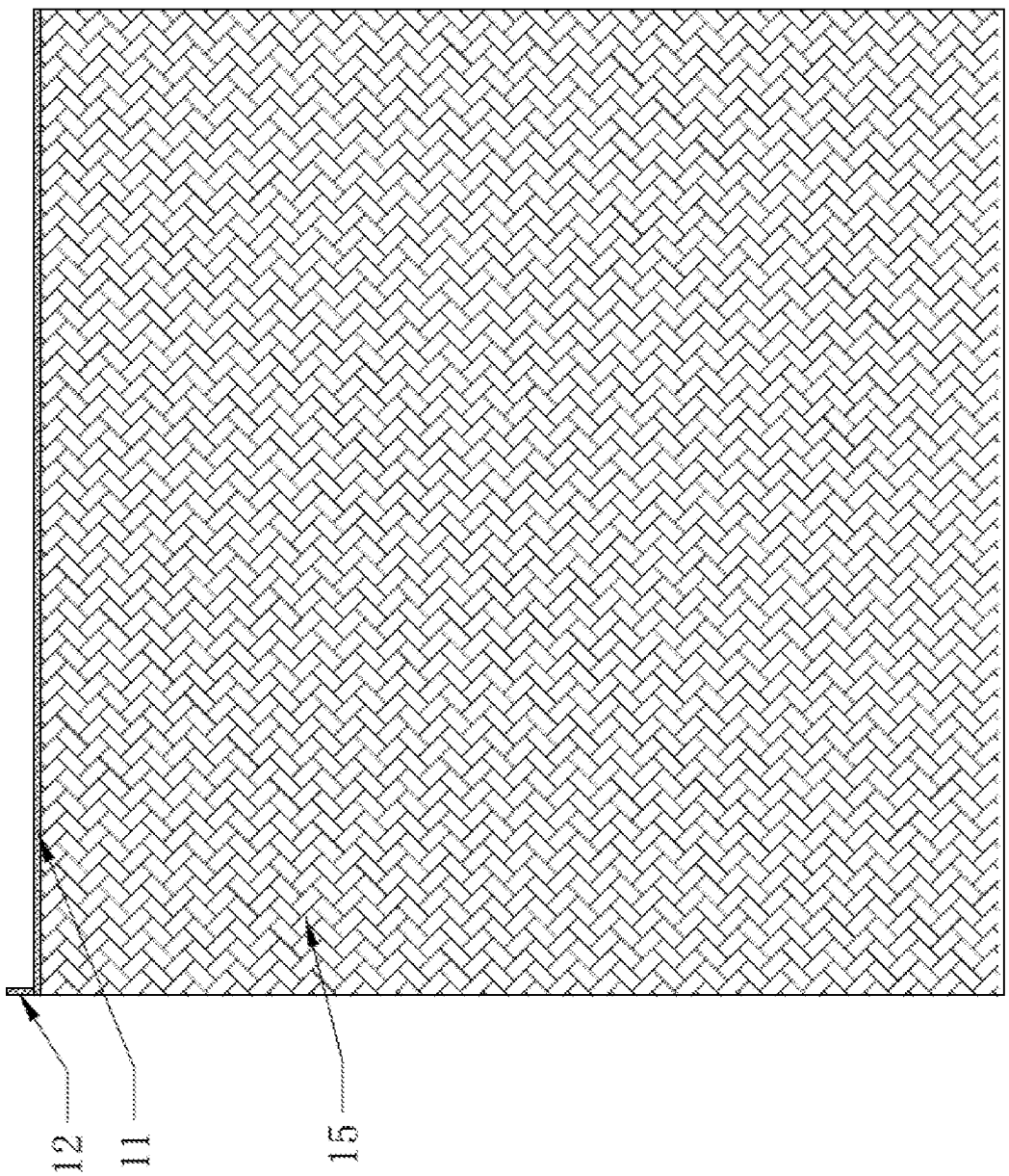
FIG. 9 shows a connection structure diagram of the air positive current collector and air electrode carrier.

In FIG. 9, Air electrode positive current collector 11 contacts tightly to one side of Air electrode carrier 15 to form a unit. Forms of Air electrode positive current collector 11 outside one side of Air electrode carrier 15 include the following: 1) metal, alloy and carbon products of foil and sheep. 2) metal, alloy and carbon products of filiform, fibrous, and mesh. 3) metal, alloy and carbon products of coating and plating. Moreover, Air electrode positive current collector 11 can be tightly attached to Air electrode carrier 15 through stamping, mosaic, welding, printing, clamp, casting, coating, high temperature coating, plating, etc.

Figure 10:
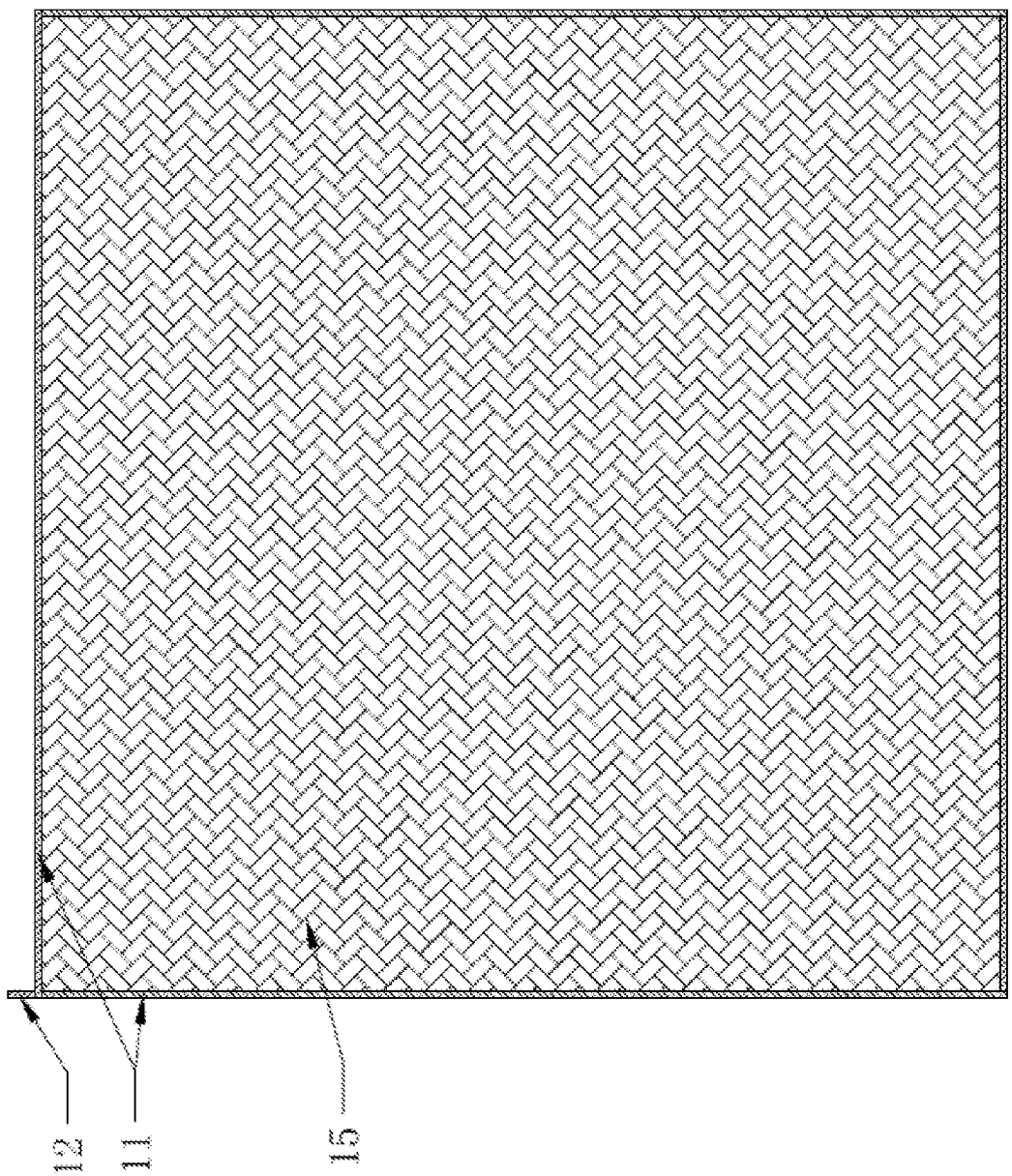
FIG. 10 shows another connection structure diagram of the air positive current collector and air electrode carrier.

In FIG. 10, Air electrode positive current collector 11 contacts tightly to four sides of Air electrode carrier 15 to be a unit. Forms of Air electrode positive current collector 11 outside four sides of Air electrode carrier 15 include the following: 1) Metal, alloy and carbon products of foil and sheep. 2) Metal, alloy and carbon products of filiform, fibrous, and mesh. 3) Metal, alloy and carbon products of coating and plating. Moreover, Air electrode positive current collector 11 can be tightly attached to Air electrode carrier 15 through stamping, mosaic, welding, printing, clamp, casting, coating, high temperature coating, plating etc.

Figure 11:
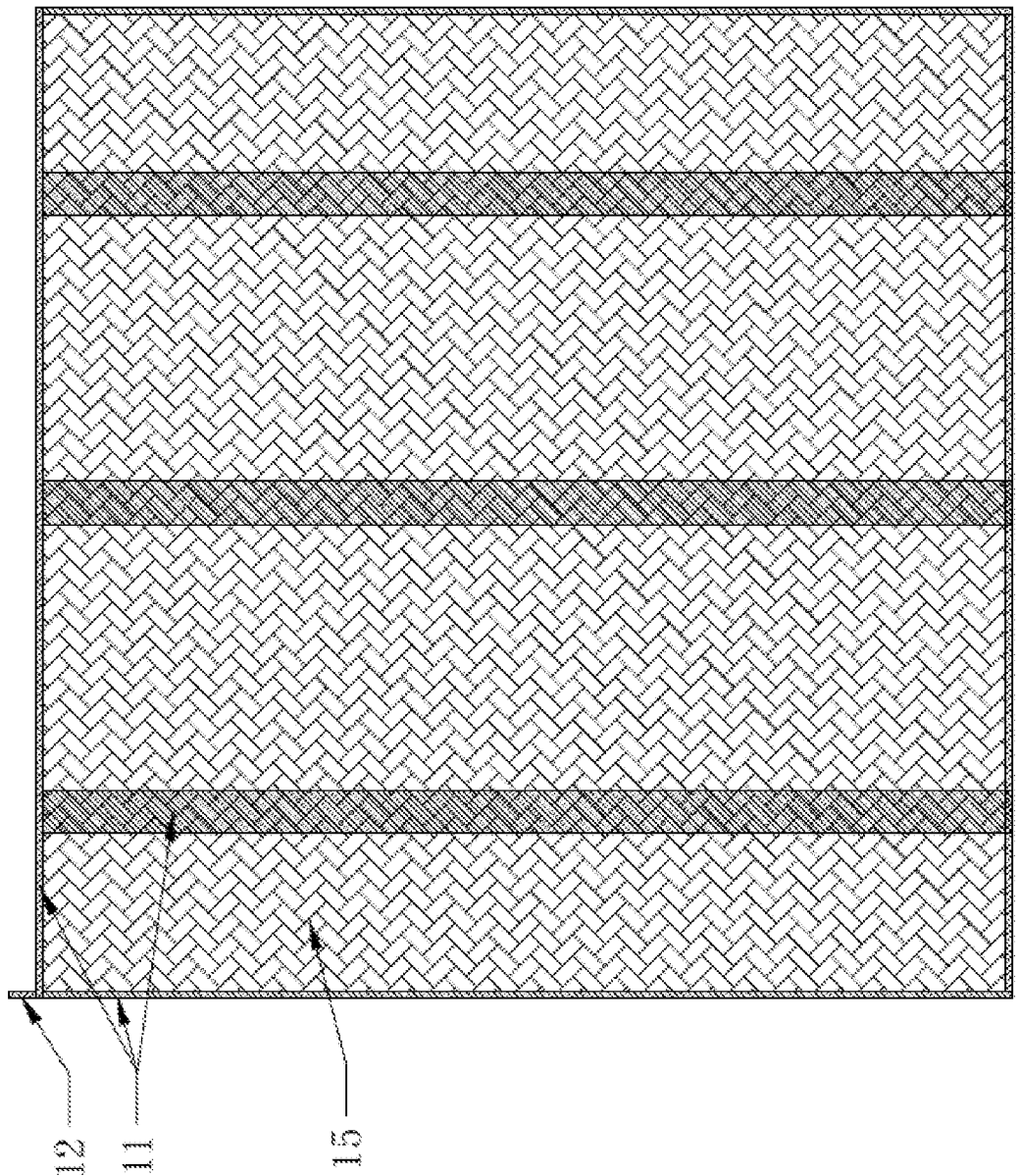
FIG. 11 shows another connection structure diagram of the air positive current collector and air electrode carrier.

In FIG. 11, Air electrode positive current collector 11 contacts tightly to one surface of Air electrode carrier 15 to be a unit. Forms of Air electrode positive current collector 11 to one surface of Air electrode carrier 15 include metal, alloy and carbon products of foil and sheep. Air electrode positive current collector 11 contacts tightly with Air electrode carrier 15 to both two surfaces. Forms of Air electrode positive current collector 11 to two surfaces of Air electrode carrier 15 include metal, alloy and carbon products of foil and sheep. Moreover, Air electrode positive current collector 11 can be tightly attached to Air electrode carrier 15 through stamping, mosaic, welding, printing, clamp, casting, coating, high temperature coating, plating, etc.

Figure 12:
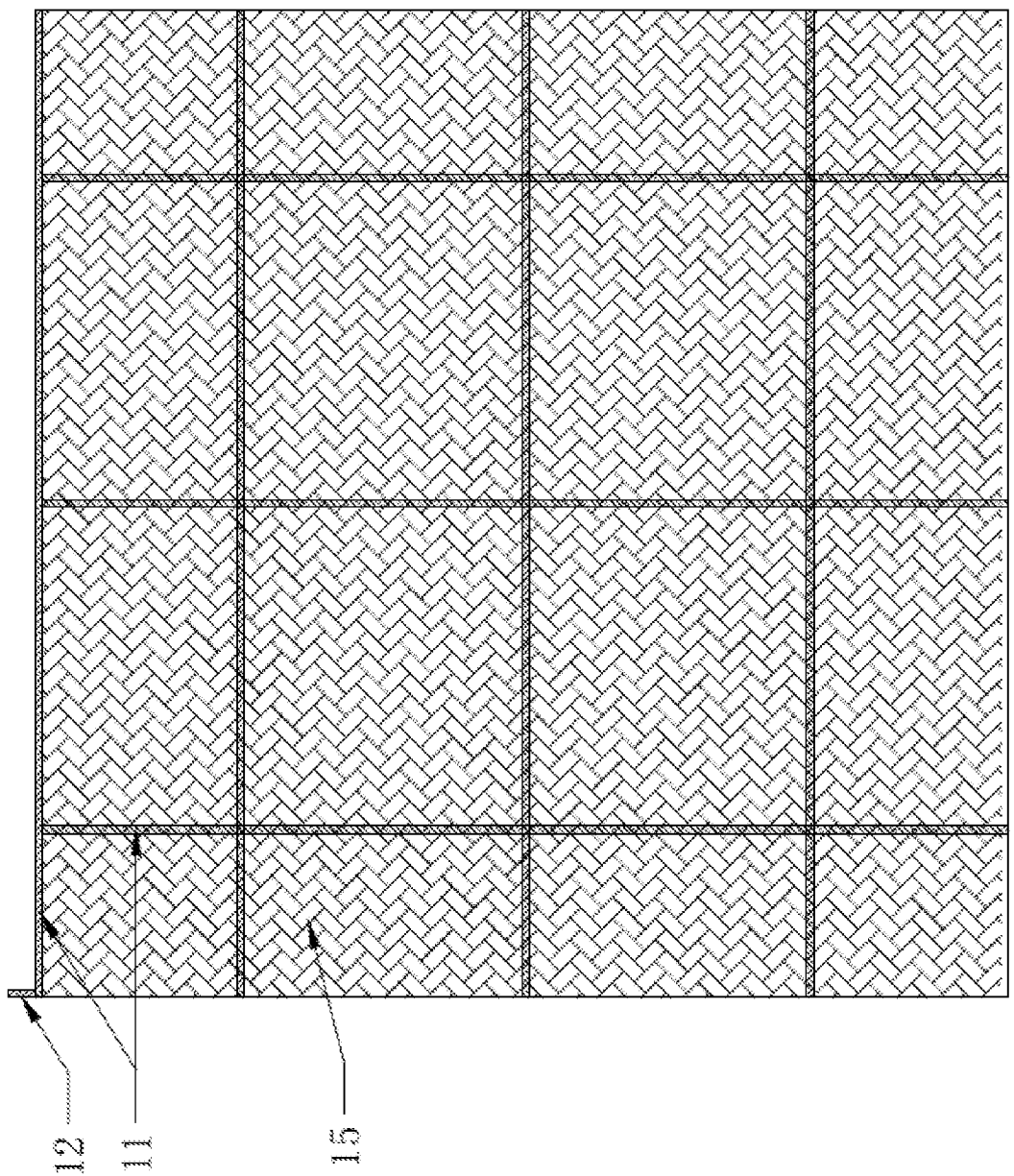
FIG. 12 shows another connection structure diagram of the air positive current collector and air electrode carrier.

In FIG. 12, Air electrode positive current collector 11 contacts tightly to one surface of Air electrode carrier 15 to be a unit. Forms of Air electrode positive current collector 11 to one surface of Air electrode carrier 15 include netty metal, alloy and carbon products. Air electrode positive current collector 11 contacts tightly with Air electrode carrier 15 to both two surfaces. Forms of Air electrode positive current collector 11 to two surfaces of Air electrode carrier 15 include netty metal, alloy and carbon products. Moreover, Air electrode positive current collector 11 can be tightly attached to Air electrode carrier 15 through stamping, mosaic, welding, printing, clamp, casting, coating, high temperature coating, plating, etc.

In FIGS. 9-12, the structures of Air electrode positive collector 11 and Air electrode carrier 15 do not mean the structures of Air electrode positive current collector 11 and Air electrode carrier 15 in the invented air metal fuel cell are just the limited four, that is, if Air electrode positive collector 11 is linked to Air electrode carrier 15 based on a certain structure, it is all involved in the invention.

Air electrode positive current collector 11, Air electrode positive lug 12, and Air electrode positive output circuit 13, can also be a unit based on the above technology and special techniques.

(C-2) Air electrode positive lug 12: one end of it is linked to Air electrode positive current collector 11 to conduct the current from the cell, while the other end linked to Air electrode positive output circuit 13. The link can be achieved through stamping, mosaic, welding, printing, clamp, casting, coating, high temperature coating, plating, etc, to conduct the current form Air electrode carrier 15 and Air electrode catalyst coating 17.

Meanwhile, the link helps the inner substances be blocked inside Battery shell and supporting fixing device 10, to ensure the leakproofness. The materials of Air electrode positive lug 12 can be similar to those of Air electrode positive current collector 11. The materials can also be from high conductive metal, including copper, nickel, silver and lead, from high conductive binary alloy and multi-alloy, and from carbon products including carbon fiber, carbon nano-material, carbon fabric, carbon paper, carbon rope, graphite, graphite plate etc. And high conductive metal and high conductive binary alloy are preferred. The shapes can be strip, sheet, columnar, linear etc, while strip and columnar preferred. The thickness can be any of the value among 0.001 nm-1 nm, 1 nm-1000 nm, 1 µm-1000 µm, 1 mm-1000 mm, and more than 1 m, or among 1 µm-100 µm. The length, the width, the diameter and the limitation can be anyone among 0.001 nm-1 nm, 1 nm-1000 nm, 1 µm-1000 µm, 1 mm-1000 mm, and more than 1 m.

Air electrode positive current collector 11, Air electrode positive lug 12, and Air electrode positive output circuit 13, can also be a unit based on the above technology and special technology.

(C-3) Air electrode positive output circuit 13: one end of it is linked to Air electrode positive lug 12, while the other end linked to the external load to transport the current to the external load so as to finish the discharge of the cell when discharge happens. The other case is that one end of it is linked to Air electrode positive lug 12, while the other end prepares to link to the external load, which means the following two points: one is that the cell hasn't been put into use and is still in the state of goods, storage state after its production: the second is that the connection is cut off after discharging for a period. Air electrode positive output circuit 13 can be connected with Air electrode positive lug 12 through welding, clip, clamp, screw and other ways such as stamping, printing, spraying, high temperature high pressure spraying, and plating, etc.

The optional materials of Air electrode positive output circuit 13 can be the following: 1) types of metallic conductors including single strands of copper wire, single strands of aluminum conductor, double strands of copper conductor and double aluminum conductor, strands of copper wire, aluminum conductor etc. 2) high conductive metal including copper, nickel, silver and lead, high conductive binary alloy and multi-alloy. 3) carbon products including carbon fiber, carbon products including carbon fiber, carbon nanomaterial, carbon fabric, carbon paper, carbon rope, graphite, graphite plate etc. The shapes can be strip, sheet, columnar, linear etc, while strip and columnar preferred. The thickness can be any of the value among 0.001 nm-1 nm, 1 nm-1000 nm, 1 µm-1000 µm, 1 mm-1000 mm, and more than 1 m, or among 1 µm-100 µm. The length, the width, the diameter and the limitation can be anyone among 0.001 nm-1 nm, 1 nm-1000 nm, 1 µm-1000 µm, 1 mm-1000 mm, and more than 1 m.

Air electrode positive current collector 11, Air electrode positive lug 12, and Air electrode positive output circuit 13, can also be a unit based on the above technology and special techniques.

(C-4) Air electrode positive air inlet device 14:

The shapes of it include rectangle, circle, and polygon.

The thickness can be any of the value among 0.001 nm-1 nm, 1 nm-1000 nm, 1 µm-1000 µm, 1 mm-1000 mm, and more than 1 m, or among 1 µm-100 µm. The length, the width, the diameter and the limitation can be anyone among 0.001 nm-1 nm, 1 nm-1000 nm, 1 µm-1000 µm, 1 mm-1000 mm, and more than 1 m.

Further descriptions shown in FIG. 1 and FIGS. 4-8 show the spatial positions of Air electrode positive air inlet device 14:

FIG. 1 shows the connection part called the "Surrounding", "All around" and "Four edges", between Air electrode positive air inlet device 14 and Battery shell and supporting fixing device 10.

FIGS. 5 & 8 show the connection part called the "Inside" between Air electrode positive air inlet device 14 and Air electrode carrier 15.

FIGS. 6 & 7 show the connection part called the "Face" between Air electrode positive air inlet device 14 and Air electrode catalyst coating 17.

FIGS. 4-8 show the connection part called the "Outside" between Air electrode positive air inlet device 14 and outside environment.

The edges of Air electrode positive air inlet device 14 are fixed on Battery shell and supporting fixing device 10. The connection between them is sealed to avoid the inside substances leaking out or the substances outside permeating inside.

"Inside" of Air electrode positive air inlet device 14 is tightly connected with Air electrode carrier 15 by a roller press or other ways. Also, "Inside" of Air electrode positive air inlet device 14 is tightly connected with Air electrode carrier 15 through getting Air electrode catalyst coating 17 pressed by a roller press or through other ways.

The connection between "outside" of Air electrode positive air inlet device 14 and the outside can also be achieved in the same ways as the above.

The meanings of "outside":

First, it refers to the air and the filtered air, when the cell is used in the air and the filtered air.

Second, it means pure oxygen, liquid oxygen and gaseous oxygen, compressed gaseous oxygen, when the cell is used in pure oxygen, liquid oxygen, gaseous oxygen, and compressed gaseous oxygen.

Third, it means hydrogen peroxide and oxygen-rich materials, when the cell is used in the condition of hydrogen peroxide and oxygen-rich materials.

Fourth, it means oxidizing agent, when the cell is used in the condition of oxidizing agent.

The materials of Air electrode positive air inlet device 14 can be selected from hydrophobic materials such as teflon, polyethylene and paraffin to be made into tiny-pore membrane. Oxygen in the air enters into Air electrode carrier 15 and Air electrode catalyst coating 17 through the pores. There is no permission of evaporation, seepage and leakage and outflow of Positive electrolyte 9 in Air electrode carrier 15 and Air electrode catalyst coating 17, through Air electrode positive air inlet device 14.

The alternative material is PTFE, such as PTFE waterproof membrane, and waterproof breathable membrane. The choice of the materials determines the stability and no liquidity of the air outside Air electrode positive air inlet device 14, which means there is no evaporation of the electrolyte in Air electrode positive air inlet device 14, Air electrode carrier 15 and Air electrode catalyst coating 17. Therefore, the materials include aluminum hydroxide, alumina, perovskite, activated carbon, absorbent cotton, flax, glass fiber, carbon nanomaterial, wheat powder, defatted corn germ powder, corn cob fragments, coarse bran powder, soybean powder, silicon dioxide, vermiculite, calcium silicate, silica, zeolite, clay etc.

When Positive electrolyte 9 in Air electrode carrier 15 and Air electrode catalyst coating 17 belongs to alkaline electrolyte, carbon dioxide among the outside gases of Air electrode positive air inlet device 14 needs to be separated, and a carbon dioxide isolation membrane needs to equipped to block carbon dioxide entering into Air electrode carrier 15 and Air electrode catalyst coating 17.

Another alternative material of Air electrode positive air inlet device 14 is an oxygen selective membrane, to prevent other gases and substances entering into Air electrode carrier 5 and Air electrode catalyst coating 17 except the oxygen outside Air electrode positive air inlet device 14.

Then, an oxygen selective membrane is equipped on Air electrode positive air inlet device 14 to prevent other gases except oxygen entering into Air electrode carrier 15 and Air electrode catalyst coating 17 through Air electrode positive air inlet device 14.

Instructions needed: due to the limit of technology, equipment and process, these membranes can't isolate carbon dioxide completely, so a little amount of carbon dioxide and other gases can enter as well. It is the same with selective membrane.

The air outside Air electrode positive air inlet device 14 can be filtered in advance via a certain accessory device of the air metal fuel cell. Based on the filter of carbon dioxide in advance, the carbon dioxide in the air can be filter and absorbed to meet the need of external condition, which means carbon dioxide membrane on Air electrode positive air inlet device 14 is not a necessity any more.

When the relevant Positive electrolyte 9 in Air electrode carrier 15 and Air electrode catalyst coating 17 is neutral and acid, a carbon dioxide membrane is not a necessity. Neither is the filter and absorption of air outside Air electrode positive air inlet device 14.

When the external condition is pure oxygen, liquid oxygen, gaseous oxygen, pressed gaseous oxygen, hydrogen peroxide and other oxygen-rich materials, and oxidizing agent environment outside Air electrode positive air inlet device 14, no matter whether Positive electrolyte 9 in Air electrode carrier 15 and Air electrode catalyst coating 17 is alkaline, acidic or neutral, a carbon dioxide membrane on Air electrode positive air inlet device 14 is not a necessity, Neither is the filter and absorption of carbon dioxide in advance.

(C-5) Air electrode carrier 15

The structure of Air electrode carrier 15 is porous piece. And the shape can be rectangle, circle, polygon and other shapes The thickness can be any of the value among 0.001 nm-1 nm, 1 nm-1000 nm, 1 μm-1000 μm, 1 mm-1000 mm, and more than 1 m, or among 1 μm-100 μm. The length, the width, the diameter and the limitation can be anyone among 0.001 nm-1 nm, 1 nm-1000 nm, 1 μm-1000 μm, 1 mm-1000 mm, and more than 1 m.

Further descriptions shown in FIG. 10 and FIGS. 5-8 show the spatial positions of Air electrode carrier 15. FIG. 10 shows the connection part called the 'Surrounding', 'All around' and "Four edges", between Air electrode carrier 15 and Air electrode positive current collector 11

FIG. 5 shows the connection part between Air electrode positive air inlet device 14 and Air electrode carrier 15, called "Face" of Air electrode carrier 15, and the other "Face" of Air electrode carrier 15 between High temperature anti-freezing material for siphon film 4 and Air electrode carrier 15.

FIG. 6 shows the connection part between Air electrode catalyst coating 17 and Air electrode carrier 15, called the "Face" of Air electrode carrier 15.

FIG. 7 shows the connection part between Air electrode catalyst coating 17 and Air electrode carrier 15, called the "Face" of Air electrode carrier 15, and the other "Face" of Air electrode carrier 15 between Air electrode positive air inlet device 14 and Air electrode carrier 15.

Air electrode carrier 15 is connected differently to Air electrode positive current collector 11 to form different structures (More specific information can be found in the instructions of Air electrode positive current collector 11). When Air electrode carrier 15 is connected tightly to Air electrode positive current collector 11, it is connected tightly to Air electrode catalyst coating 17, Air electrode positive air inlet device 14 and High temperature anti-freezing material for siphon film 4.

Attention: the connection between Air electrode carrier 15 and Air electrode positive current collector 11 does not affect the connection between Air electrode carrier 15 and Air electrode catalyst coating 17, Air electrode positive air inlet device 14 and High temperature anti-freezing material for siphon film 4.

The "Inside" of Air electrode carrier 15 is tightly connected Air electrode positive air inlet device 14 via roller press or other ways.

The "Inside" of electrode positive air inlet device 14 is tightly connected to Air electrode carrier 15 via Air electrode catalyst coating 17, and then via roller press or other ways.

Air electrode carrier 15, an electronic conductor and multihole material larger than the surface area, is the carrier of Catalyst 16. Catalyst 16 is put on the multihole surface of Air electrode carrier 15 evenly, through various techniques and methods such as the following: chemical deposition method, gas phase deposition, ion plating method, electrolytic plating, spraying method, hydrothermal method, normalization method, microwave method, normalization & microwave method, acetylene black reducing potassium permanganate method, manganese nitrate & cobalt nitrate decomposition method, vacuum ion plating method, high temperature vacuum ion plating method, high temperature and high pressure from the coating method, high temperature and high pressure spraying ion plating method, biological bacteria, biological fermentation, biological bonding etc. In this condition, oxygen molecules access to electronics in the most effective and shortest distance, while turning into cations under the effect of Catalyst 16.

The optional forms of Air electrode carrier 15 include more than the following: 1) membrane structure, network structure, fabric structure, the particle structure, powder structure, nanometer materials etc, which are made or mainly made from carbon materials. 2) mesh structure, foam structure, membrane structure, fabric structure, particle structure, powder structure etc, which are made of carbon nanomaterials. 3) mesh structure, membrane structure, fabric structure, particle structure, powder structure etc, such as copper foam fiber, silver particles etc, which are made from metallic foams. 4) mesh structure, foam structure, membrane structure, fabric structure, grain structure, particle structure, powder structure etc, such as copper fiber, copper fiber cloth, fiber cloth, silver particles of silver etc, which are made from metal nanometer materials.

(C-6) Catalyst 16

Catalyst 16 is put on the multihole surface of Air electrode carrier 15 evenly, through various techniques and methods including chemical vapor deposition, vapor deposition, ion plating, electrolytic plating, spraying etc., and precipitation method, electrolytic method, hydrothermal method, normalization method, microwave method, normalization-microwave method, acetylene black reducing potassium permanganate method, manganese nitrate and cobalt nitrate decomposition method, ion plating method, vacuum ion plating method, high temperature vacuum ion plating method, high temperature and high pressure ion plating method, high temperature, high pressure spraying ion plating method, high temperature and high pressure spraying method, biological bacteria, biological fermentation, biological art bonding etc.

Catalyst 16 made through the above techniques and methods turns into at least nanoscale particles, but in the actual production process, there might appear micron-scale particles, whose diameters are among 0.001-1000 m and 1 μm-1000 μm, while nanoscale preferred.

The optional materials of Catalyst 16 can be chosen including silver catalyst, perovskite catalyst, platinum, and palladium catalytic agent, catalyst, manganese catalysts, metal composite oxide catalysts, metal oxide catalysts, metal catalysts, metal chelate organic matter catalysts etc.

Catalyst 16 is an important component of Air electrode catalyst coating 17 and made through various techniques and methods as the following: chemical deposition method, gas phase deposition, ion plating method, electrolytic plating, spraying method, hydrothermal method, normalization method, microwave method, normalization & microwave method, acetylene black restoring potassium permanganate method, manganese nitrate & cobalt nitrate decomposition method, vacuum ion plating method, high temperature vacuum ion plating method, high temperature and high pressure ion plating method, high temperature and high pressure spraying ion plating method, raw material, biological fermentation, biological bacteria binding method etc.

Catalyst 16 mixes with conductive agent porous adsorbent after its smash to form Air electrode catalyst coating 17.

Various techniques and methods of achieving Catalyst 16 on the multihole surface of Air electrode carrier 15:

1. Pretreatment of Air electrode carrier 15

(1-1) Alcohol washing

Put the certain size of Air electrode carrier 15 into proper 95% ethanol, mix thoroughly for 2 h, pour out the liquid, then pour into a large amount of deionized water to clean 3 times, finally, put the clean Air electrode carrier 15 into the 40° C. oven to dry for 12 h, for standby application.

(1-2) Acid pickling

Put the certain size of Air electrode carrier 15 into 10% HCl solution, mix thoroughly for 3 h, pour out the liquid, then pour into a large amount of deionized water to clean until it's nearly neutral, finally, pure out the deionized water, and put the clean Air electrode carrier 15 into the 40° C. oven to dry for 12 h, for standby application.

(1-3) Alkaline washing

Put the certain size of Air electrode carrier 15 into 10% NaOH solution, mix thoroughly for 3 h, pour out the liquid, then pour into a large amount of deionized water to clean until it's nearly neutral, finally, pure out the deionized water, and put the clean Air electrode carrier 15 into the 40° C. in the oven to dry for 12 h, for standby application.

(1-4) No pretreatment

2. Achieving manganese-based catalyst on Air electrode carrier 15, as an example.

(2-1) Method of precipitation to make manganese-based catalyst on air electrode carrier 15

After pretreatment, in the 60° C. temperature, while electromagnetic stirring and swinging, put the certain size of Air electrode carrier 15 into 100 ml 0.22 mol/L $KMnO_4$ solution, then, 100 mol/L $KMnO_4$ solution, slowly drop 100 ml 0.3 mol/L $Mn(NO_3)_2$ solution, during the adding process, blend with 0.8 mol/L KOH solution till the pH value at about 8. After the adding, stop all the stirring and shocking, then let the treated carrier sit for 2 h in 60° C. water bath, and wash till neutral with distilled water of the same temperature. Finally, give it a 110° C.-drying and a 4 h 400° C. roasting for 4 h.

(2-2) Method of electrolysis to make manganese-based catalysts on Air electrode carrier 15

The temperature of electrolyte is 95±2° C., component is the mixture of 130 g/L $H_2SO_4$ and 130 g/L $MnSO_4$. Put the certain size of Air electrode carrier 15 in, blend constantly and electrolyte, wash Air electrode carrier 15 at the bottom of the sink with distilled water till neutral, blast to 80° C., and dry for 24 h.

(2-3) Hydrothermal method to make manganese-based catalysts on Air electrode carrier 15

Melt 33.8 g $MnSO_4.H_2O$ and 0.25 mol/L $(NH_4)2SO_4$ in water, put the certain size of Air electrode carrier 15 in, blend for 30 min, ultrasonically shock for 15 min, then water bath to 90° C.; heat another 500 ml water to 90° C., add 45.66 g $(NH4)_2S_2O_8$, blend till thoroughly melt, mix the two quickly. After 12-hour's reaction, cool naturally to normal temperature, wash Air electrode carrier 15 with distilled water till the pH=5-6, blast to 80° C. and dry for 24 h.

(2-4) Normalization method to make manganese-based catalyst on Air electrode carrier 15

Melt 21.4 g $KMnO_4$ into 700 ml distilled water, put the certain size of Air electrode carrier 15 in, melt another 33.8 g $MnSO_4.H_2O$ in 300 ml distilled water, melt them thoroughly, then blend violently for 30 min, drop $MnSO_4$ mixture liquor into $KMnO_4$ for 60 min, react for another 120 min, wash Air electrode carrier 15 with distilled water till the pH=6-7, blast to 80° C., and dry for 24 h.

(2-5) Microwave method to make manganese-based catalyst on Air electrode carrier 15

Melt 33.8 g $MnSO_4$—$H_2O$ and 0.25 mol/L $(NH_4)_2SO_4$ into 500 ml water, put the certain size of Air electrode carrier 15 in, blend for 30 min, ultrasonically shock for 15 min, then water bath to 90° C., heat another 500 ml water to 90° C., add 45.66 g $(NH_4)$ $(NH_4)_2S_2O_8$ blend till thoroughly melt, mix the two quickly, violently shock for 1 min, put it into a micro-oven (1500 w), take it out after 15 min, then cool naturally to normal temperature, wash Air electrode carrier 15 with distilled water till the pH=5-6, blast to 80° C., and dry for 24 h.

(2-6) Normalization microwave method to make Manganese-based catalyst on Air electrode carrier 15

Melt 21.4 g $KMn04$ in distilled water, put the certain size of Air electrode carrier 15 in, melt another 33.8 g $MnSO_4.H_2O$ in 300 ml distilled water, melt them thoroughly, then blend violently for 30 min, drop $MnO_4$ mixture liquor into $KMnO_4$ for 60 min, put it into a micro-oven (microwave power 1500 w), take it out after 15 min, then cool naturally to normal temperature, filter, wash Air electrode carrier 15 with distilled water till the pH=6-7, blast to 80° C., and dry for 24 h.

(2-7) Acetylene black restoring potassium permanganate method to make manganese-based catalyst on Air electrode carrier 15

Melt 0.354 g acetylene black into 200 ml 0.1 mol/L $KMnO_4$ solution, blend for 20 min, put the certain size of Air electrode carrier 15 in, 90° C. constant temperature water bath for 24 h till react thoroughly, wash it three times with distilled water, blast to 80° C., and dry for 24 h.

(2-8) Manganese nitrate decomposition method to make manganese-based catalyst on Air electrode carrier 15

Put the certain size of Air electrode carrier 15 such as carbon paper, carbon cloth, carbon felt, carbon fiber, and glass fiber membrane in 500 ml 50% $Mn(NO_3)_2$ solution, soak for 10 min, heat the $Mn(NO_3)_2$ solution with Air electrode carrier 15 in it, heat Air electrode carrier 15 such as carbon paper, carbon cloth, carbon felt, carbon fiber, and glass fiber membrane to 280° C.-700° C. (the speed of heating is less than 2° C. per minute), turn Air electrode carrier 15 till its dry during the process, then naturally cool to chamber temperature after one-hour constant temperature.

Most proper temperature: for example, heat $Mn(NO_3)_2$ with Air electrode carrier 15 such as carbon paper, carbon cloth, carbon felt, carbon fiber, and glass fiber membrane to 300° C.-350° C. (the speed of heating is less than 2° C. per minute), during the process, turn Air electrode carrier 15 till its dry, and keep an one-hour constant temperature.

3. Achieving silver-based catalyst on Air electrode carrier 15, as an example.

(3-1) Deposition method to make silver-based catalyst being on Air electrode carrier 15

Weigh 34 g PVP and 17 g silver nitrate to mix to produce 10 L transparent mixture aqueous solution (silver nitrate concentration is 0.01 mol/L) at the mass ratio of 2:1. Put the certain size of Air electrode carrier 15 in, blend thoroughly for 30 min, then drop in 10 L 0.1 mol $NaBH_4$ solution, keep stirring and shocking for 2 h till full reaction, wash, and dry in vacuum for 12 h.

4. Achieving the composite catalyst of silver-based catalyst and manganese-based catalyst on Air electrode carrier 15, as an example.

(4-1) First, make silver-based catalyst on Air electrode carrier 15 through the methods mentioned in Parts (2-1) (2-2) (2-3) (2-4) (2-5) (2-6) (2-7) and (2-8). Next make manganese-based catalyst on Air electrode carrier 15 through the methods mentioned in Part (3-1).

(4-2) First, make manganese-based catalyst on Air electrode carrier 15 through the methods mentioned in Part (3-1). Next, make silver-based catalyst on Air electrode carrier 15 through the methods mentioned in Parts (2-1) (2-2) (2-3) (2-4) (2-5) (2-6) (2-7) and (2-8).

5. Achieving cobalt-based catalyst on Air electrode carrier 15, as an example.

(5-1) Cobalt nitrate decomposition method to make cobalt-based catalyst on Air electrode carrier 15

Get 500 ml 20% $Co(NO_3)_2$ solution, put in the certain size of Air electrode carrier 15 such as carbon paper, carbon cloth, carbon felt, carbon fiber, and glass fiber membrane, sock for 10 min, heat the $Co(NO_3)_2$ solution with Air electrode carrier 15 in it, heat the certain place on Air electrode carrier 15 such as carbon paper, carbon cloth, carbon felt, carbon fiber, and glass fiber membrane to 500° C.–800° C. (the speed of heating is less than 2° C. per minute) till dry, keep an one-hour constant temperature of 500° C.–800° C. of the certain place on Air electrode carrier 15 such as carbon paper, carbon cloth, carbon felt, carbon fiber, and glass fiber membrane to 500° C.–800° C., and cool naturally to chamber temperature 6. Achieving the composite catalyst of cobalt-based catalyst and manganese-based catalyst being on Air electrode carrier 15, as an example.

(6-1) First, make cobalt-based catalyst on Air electrode carrier 15 through the methods mentioned in Part (3-1). Next make manganese-based catalyst on Air electrode carrier 15 through the methods mentioned in Part (2-1) (2-2) (2-3) (2-4) (2-5) (2-6) (2-7) (2-8).

Other methods to achieve the different catalysts on Air electrode carrier 15 besides the methods mentioned in Parts 1-6: ion plating method, vacuum ion plating method, high temperature vacuum ion plating method, high temperature and high pressure ion plating method, high temperature and high pressure spraying ion plating method, high temperature and high pressure spraying ion plating method, and manual spray.

In the process of catalysts production, harmful substances and other products such as Nitric oxide, nitrogen dioxide, sulphur dioxide etc, need recycling and reusing. For instance, nitric oxide and nitrogen dioxide can be made into nitric acid and sulfate.

The techniques and methods mentioned above attach Catalyst 16 to Air electrode carrier 15, to form the inseparable and unified oxygen auxiliary structure and auxiliary material on Air electrode positive 1.

Catalyst 16 includes more than the following: silver catalyst, perovskite catalyst, platinum catalyst, palladium catalyst, manganese catalyst, metal composite oxide catalyst, metal oxide catalyst, composite metal oxide catalyst, cobalt catalysts, metal chelate catalyst, silver catalyst etc.

Air electrode carrier 15 includes more than the following: 1) membrane structure, network structure, fabric structure, particle structure, powder structure, nanometer materials etc, which are made or mainly made from carbon materials; 2) mesh structure, foam structure, membrane structure, fabric structure, particle structure, powder structure etc, which are made of carbon nanomaterials; 3) mesh structure, membrane structure, fabric structure, particle structure, powder structure etc, such as copper foam fiber, silver particles etc, which are made from metallic foams; 4) mesh structure, foam structure, membrane structure, fabric structure, grain structure, particle structure, powder structure etc, such as copper fiber, copper fiber cloth, fiber cloth, silver particles of silver etc, which are made from metal nanometer materials.

What matters most is that the techniques and methods mentioned above attach Catalyst 16 to Air electrode carrier 15, to form the inseparable and unified oxygen auxiliary structure and auxiliary material on Air electrode positive 1.

(C-7) Air electrode catalyst coating 17

Paste and slimy Air electrode catalyst coating 17 is painted between Air electrode carrier 15 and Air electrode positive air inlet device 14, between Air electrode carrier 15 and High temperature anti-freezing material for siphon film 4. Meanwhile, it is painted on Air electrode carrier 15 and Air electrode positive air inlet device 14, between Air electrode carrier 15 and High temperature anti-freezing material for siphon film 4.

Air electrode catalyst coating 17 is painted between Air electrode carrier 15 and Air electrode positive air inlet device 14, between Air electrode carrier 15 and High temperature anti-freezing material for siphon film 4. The thickness can be any of the value among 0.001 nm-1 nm, 1 nm-1000 nm, 1 μm-1000 μm, 1 mm-1000 mm, and more than 1 m, or among 1 nm-100 nm.

Air electrode catalyst coating 17 promotes the catalytic activity of Air electrode positive 1, the tightness between Air electrode carrier 15 and Air electrode positive air inlet device 14, and the tightness between Air electrode carrier 15 and High temperature anti-freezing material for siphon film 4.

Air electrode catalyst coating 17 can be made paste and slimy in the following ways: 1) mix up crushed Catalyst 16 with conductive agent and porous sorbent by adding water; 2) mix up crushed Catalyst 16 with conductive agent and porous sorbent by Positive electrolyte 9; 3) mix up crushed Catalyst 16 with conductive agent and porous sorbent by the solvent of Positive electrolyte 9.

The optional materials of the conductive agent of Air electrode catalyst coating 17 include graphite (ks-6), carbon black (KB), acetylene black (AB), metal fiber, metal powder, vapor grown carbon fiber (VGCF), carbon nanotubes CNTs, etc.

The optional materials of the porous sorbent of Air electrode catalyst coating 17 include aluminum hydroxide, perovskite, activated carbon, absorbent cotton, flax, glass fiber, carbon nanomaterials, etc.

The mass ratio of the three of Catalyst 16, conductive agent and porous adsorbent is X:Y:Z (greater than zero positive each).

Such as the following table:

| X Catalyst 16 | Y Conductive agent | Z Porous adsorbent |
|---|---|---|
| 1 | 2 | 5 |
| 1 | 4 | 7 |
| 1 | 2 | 6 |
| 1 | 1 | 15 |
| 1 | 2 | 8 |
| 1 | 1 | 8 |

The ways of produce paste and slimy Air electrode catalyst coating 17 also include the following: 1) mix up crushed Catalyst 16 with conductive agent, porous sorbent and binder by adding water; 2) mix up crushed Catalyst 16 with conductive agent and porous sorbent by Positive electrolyte 9; 3) mix up crushed Catalyst 16 with conductive agent and porous sorbent by the solvent of Positive electrolyte 9.

The optional materials of the conductive agent of Air electrode catalyst coating 17: graphite (ks-6), carbon black (KB), acetylene black (AB), metal fiber, metal powder, vapor grown carbon fiber (VGCF), carbon nanotubes CNTs etc.

The optional materials of the porous sorbent of Air electrode catalyst coating 17: aluminum hydroxide, perovskite, activated carbon, absorbent cotton, flax, glass fiber, carbon nanomaterials, wheat germ powder, defatted corn germ meal, corn cob fragments, coarse bran, soybean powder, silica, vermiculite, calcium silicate, silica gel, zeolite, clay etc.

The optional materials of the binder of Air electrode catalyst coating 17: PVA, PTFE, hydroxymethyl cellulose sodium (CMC), polyolefins (PP, PE and other copolymer), PVDF/NMP, good bonding modified SBR rubber, fluorine rubber, polyurethane etc.

The mass ratio of the four of Catalyst 16, conductive agent, porous adsorbent and binder: X:Y:Z:W (greater than zero positive each).

Such as the following table:

| X Catalyst 16 | Y Conductive agent | Z Porous adsorbent | W Binder |
| --- | --- | --- | --- |
| 1 | 2 | 5 | 1 |
| 1 | 4 | 7 | 4 |
| 1 | 2 | 5 | 7 |
| 1 | 4 | 9 | 2 |
| 1 | 1 | 15 | 2 |
| 2 | 2 | 16 | 1 |
| 1 | 1 | 8 | 3 |

Other optional methods of producing paste and slimy Air electrode catalyst coating 17: 1) embed Catalyst 16 in porous adsorbent, then mix with conductive agent and binder; 2) embed Catalyst 16 in porous adsorbent: the various methods and techniques of making Catalyst 16 on Air electrode carrier 15, such as chemical deposition method, gas phase deposition, ion plating method, electrolytic plating, spraying method, hydrothermal method, normalization method, microwave method, normalization & microwave method, acetylene black reducing potassium permanganate method, manganese nitrate & cobalt nitrate decomposition method, decomposition method, vacuum ion plating method, high temperature vacuum ion plating method, high temperature and high pressure ion plating method, high temperature, high pressure spraying ion plating method etc.

Production process of air electrode:
A. Scatter catalyst on air electrode carrier
1. Select a certain sized air electrode carrier.
2. Make catalyst on air electrode carrier
B. Make catalyst on Air electrode current collector and lug
C. Produce catalyst coating
D. Make catalyst coating on air electrode
E. Equip air electrode positive air inlet device on air electrode
A. Scatter catalyst on air electrode carrier
1. Select a material produce a certain sized air electrode carrier, soak the tailored air electrode carrier in strong acid and strong alkali, or soak in certain concentration strong acid first and then in strong alkali. Next, seal, and soak for 1-100 h, 12-24 h preferred.

2. Unseal when the soak is over, fish it out of strong acid and strong alkali, wash it with distilled water or water till the PH=6.5-7.5, spin-dry the distilled water with a dryer, then stove it into a vacuum drying oven.

3. Soak the stoved air electrode carrier in catalyst precursor solution or suspension, seal and soak for 1-100 h, 12-24 h preferred. Then add some chemicals to increase the porous structures and catalytic activity. The optional chemicals include at least more than the following: sodium chloride and sucrose, fructose, ammonium oxalate, sodium thiosulfate etc.

4. Unseal when the soak is over, fish the air electrode carrier out of the catalyst precursor solution or suspension, and evenly spread it in a flat-bottomed enamel dish or glass plate.

5. Keep the air electrode carrier adsorbing enough amount of catalyst precursor solution or suspension.

6. Carry out sectional heated or reaction.

7. Heat to the first temperature point and keep constant temperature for a certain period, then heat to the second and keep for a certain period, and then do the same steps till come to the fifth point. After that, heat slowly to the sixth point, keep the pace which means increasing some certain temperature in a certain period, and then come to the seventh point. At last, stop heating and naturally cool the high temp****erature stove to indoor temperature, or stop the reaction.

Finish the scatter of catalyst on air electrode carrier, prepared for using.

B. Equip air electrode positive current collector and air electrode positive lug on air electrode carrier 1. Get the prepared air electrode carrier scattered with catalysts, and trim it with scissors or a trimmer to keep it four edges smooth. Then electroplate the trimmed air electrode carrier in an electroplating apparatus for electroplating a circle of copper or nickel or other metal plating whose width is 5-10 mm and thickness is 0.03 mm-0.05 mm. Then the 5-10 mm-wide copper or nickel surrounding air electrode carrier is the air electrode positive current collector.

2. Weld one or more bars of copper or nickel to the 5-10 mm-wide copper or nickel circle surrounding the air electrode carrier, whose width is 5-10 mm and thickness is 0.05-0.1 mm. These welded copper or nickel bars on the air electrode positive current collector are the air electrode positive lugs. The optional methods of welding including resistance welding, ultrasonic welding, laser welding etc.

C. Produce catalyst coating
Select active carbon as the adsorbent, and select grapheme and acetylene black as the conductive agent.

Catalyst coating consists of catalyst, porous adsorbent, conductive agent, dispersant and binder.

The optional methods of producing catalyst coating include the following:

The catalyst is selected from one or more from silver catalyst, perovskite catalyst, platinum, palladium catalyst, manganese catalyst agent, metal composite oxide catalysts, metal oxide catalyst, metal organic catalyst, and metal chelate catalyst.

The adsorbent is selected from activated carbon, activated alumina, molecular sieve and silica gel.

The conductive agent is selected from one or more from acetylene black, graphene, graphite powder, carbon black and super carbon black, polyaniline, acetylene, polypyrrole, polythiophene, and metal powder.

The binder is selected from one or more from PTFE emulsion, fatty acid metal salt (fatty acid sodium, fatty acid potassium, etc), vinyl acetate, polyvinyl alcohol, polyoxyethylene, polyvinylpyrrolidone, polyvinylether, poly (methyl methacrylate), polyvinylidence fluoride, polyvinyl chloride, polyacryonitrile, polyvinyl pyridine, polystyrene, or one or more from the derivatives and copolymer of the above chemicals.

Dispersant is selected from one or more from ethanol, methanol, ethyl cellulose, water, and fatty acid The Steps of the Production:

1. Make catalyst first, then mix the prepared catalyst with porous adsorbent, conductive agent, dispersant and binder directly.

2. Mix and spread catalyst precursor with porous adsorbent, conductive agent, and dispersant to produce solution or suspension. Then distribute catalyst onto adsorbent and conductive agent with the size of the nanoscale to combine the three with each other (the dispersant is released in the form of a gas or vapor, or decomposed gas). And then mix adsorbent, conductive agent as well as the catalyst on them with binder and dispersant directly to produce catalyst coating.

3. Mix and spread catalyst precursor with porous adsorbent and conductive agent to produce solution or suspension, then distribute catalyst to adsorbent directly with the size of the nanoscale to combine the two. Next, mix and spread catalyst precursor with conductive agent and dispersant to produce solution or suspension, distribute catalyst to conductive agent directly with the size of the nanoscale in the same way of making catalyst to combine the two (the conductive agent is released in the form of a gas or vapor, or decomposed gas). After that, mix the above two adsorbents each distributed catalyst with adsorbent by using binder and dispersant to produce catalyst coating.

4. Add some chemicals to increase the porous structures and catalytic activity base on Steps 2&3. The optional chemicals include one or more of the following: sodium chloride and sucrose, fructose, ammonium oxalate and sodium thiosulfate.

(4-1) Mix and spread catalyst precursor with porous adsorbent, conductive agent, dispersant, and one or more of the above chemicals to produce solution or suspension, then distribute catalyst to adsorbent and conductive agent directly with the same method of producing catalyst. And then mix adsorbent, conductive agent as well as the catalyst on them with dispersant directly to produce catalyst coating.

D. Cover catalyst coating on air electrode carrier

Methods as the following:

1. Paint catalyst coating on one or two sides of the air electrode carrier with a coating machine. And the thickness is 0.05-0.1 mm.

2. Paint catalyst coating on one or two sides of the air electrode carrier with a coating machine, then compress with an axial compressor. The thickness of the painting is 0.05-0.1 mm, and after compression, it is 0.03-0.05 mm.

3. Spray with a spraying machine.

4. Fire (4-1) Select a material produce a certain sized air electrode carrier, soak the tailored air electrode carrier in strong acid and strong alkali, or soak in certain concentration strong acid first and then in strong alkali. Next, seal, and soak for 1-100 h, 12-24 h preferred.

(4-2) Unseal when the soak is over, fish it out of strong acid and strong alkali, wash it with distilled water or water till the PH=6.5-7.5, spin-dry the distilled water with a dryer, then stove it into vacuum drying oven.

(4-3) Soak the dried air electrode carrier in catalyst precursor solution or suspension, seal and soak for 1-100 h, 12-24 h preferred.

(4-4) Unseal when the soak is over, fish the air electrode carrier out of the catalyst precursor solution or suspension, and evenly spread it in a flat-bottomed enamel dish or glass plate.

(4-5) Produce catalyst coating.

(4-5-1) Mix and spread catalyst precursor with porous adsorbent, conductive agent, and dispersant to produce solution or suspension.

(4-5-2) Mix and spread catalyst precursor with porous adsorbent and conductive agent to produce solution or suspension.

(4-5-3) Mix and spread catalyst precursor with conductive agent and dispersant to produce solution or suspension (4-6) Paint at least one of the catalyst paintings made in Step (4-5) onto the prepared air electrode carrier made in Step (4-4).

(4-7) Put the air electrode carrier with the catalyst coating made in Step (4-5) into a high temperature stove together with the flat-bottomed enamel dish or glass plate, shut the enclosure door, undertake the sectional heating.

(4-8) Heat to the first temperature point and keep constant temperature for a certain period, then heat to the second and keep for a certain period, and then do the same steps till come to the fifth point. After that, heat slowly to the sixth point, keep the pace which means increasing some certain temperature in a certain period, and then come to the seventh point. At last, stop heating and naturally cool the high temperature stove to indoor temperature, or stop the reaction.

Finish the process of firing, and the catalyst coating achieves the attachment to air electrode carrier.

1. Repeat firing.

Re-soak the fired air electrode carrier which has been fired onto the air electrode carrier, in catalyst precursor solution or suspension, seal and soak for 1-100 h, 12-24 h preferred. Then repeat the process from Step (4-4) to Step (4-8), achieves the attachment of the fired catalyst coating to air electrode carrier to finish the second firing. Or, more than two repetitions are optional.

Example of distributing catalyst onto air electrode carrier

Select 3K carbon cloth material as air electrode carrier, manganese dioxide as catalyst, and manganese nitrate solution (50%) as catalyst precursor, and distribute manganese dioxide on the air electrode carrier.

1. Trim 12 cm*12 cm 3K carbon cloth material, soak the trimmed carbon cloth material into concentrated sulfuric acid (98.3%), seal and soak for 12 h.

2. Unseal when the soak is over, fish it out of concentrated sulfuric acid (98.3%), wash it with distilled water or water till neutral (PH=6.5-7.5), spin-dry the distilled water with a dryer, then stove it into a vacuum drying oven.

3. Soak the dried carbon cloth in manganese nitrate solution (50%), seal and soak for 24 h.

4. Unseal when the soak is over, fish the carbon cloth out of the manganese nitrate solution (50%), and evenly spread it in a flat-bottomed enamel dish or glass plate.

5. Absorb 10 ml manganese nitrate solution (50%) through an infusion apparatus, and drop the solution onto the flat carbon cloth for absorption.

6. Put the carbon cloth produced in Step 5 into a high temperature stove together with the flat-bottomed enamel dish or glass plate, shut the enclosure door, undertake the sectional heating.

7. Heat to 100° C. and keep constant temperature for 15 min, then heat to 150° C. and keep for 60 min, and then do the same step to 180° C. for keep for 90 min. and to 200° C. for 30 min, then slowly to 300° C. with a speed of 2° C. every 3-4 min, and keep constant temperature for 60 min. At last, stop heating and naturally cool the high temperature stove to indoor temperature.

8. Open the enclosure door of the high temperature stove till the temperature comes to indoor temperature, and take the carbon cloth out.

The catalyst has been distributed onto air electrode carrier, prepared for using.

Example:

Select manganese nitrate solution (50%) as catalyst precursor to produce manganese dioxide catalyst.

Steps:

1. Weigh 600 g manganese nitrate solution (50%), divide it into four parts evenly, 150 g each, and add each into a 500 ml beaker.

2. Put the four beakers into a high temperature stove, shut the enclosure door and undertake the sectional heating.

3. Heat to 100° C. and keep constant temperature for 15 min, then heat to 150° C. and keep for 60 min, and then do the same step to 180° C. for keep for 90 min, and to 200° C. for 30 min, then slowly to 300° C. with a speed of 2° C. every 3-4 min, and keep constant temperature for 60 min. At last, stop heating and naturally cool the high temperature stove to indoor temperature.

4. Open the enclosure door of the high temperature stove till the temperature comes to indoor temperature, and take the beakers out as well as the prepared manganese nitrate catalysts, then put them into a ball mill for milling into powder.

Finish the production of manganese nitrate catalyst.

Example:

Select manganese nitrate solution (50%), lithium carbonate and cobalt nitrate as catalyst precursor to produce manganese-cobalt-lithium catalyst.

Steps:

1. Weigh 2000 g manganese nitrate solution (50%), 43 g lithium carbonate and 104 g cobalt nitrate, add the cobalt nitrate into the 2000 g manganese nitrate solution, mixing and blending. Then add lithium carbonate, mixing and blending as well. Later, add a certain amount of sulfuric acid to aid the dissolve of lithium carbonate.

2. Divide the above mixture solution into eight parts evenly, and add each into a 1000 ml beaker.

3. Put the eight beakers into a high temperature stove, shut the enclosure door and undertake the sectional heating.

4. Heat to 100° C. and keep constant temperature for 15 min, then heat to 150° C. and keep for 60 min, and then do the same step to 180° C. for keep for 90 min, and to 200° C. for 30 min, then slowly to 300° C. with a speed of 2° C. every 3-4 min, and keep constant temperature for 60 min. At last, stop heating and naturally cool the high temperature stove to indoor temperature.

5. Open the enclosure door of the high temperature stove till the temperature comes to indoor temperature, take the beakers out as well as the products, then, put them into a ball mill for milling into powder.

6. Divide the powder into four parts evenly, and pour each into a 100 ml crucible.

7. Put the four crucibles with powder into a muffle furnace for further heating.

8. Heat to 800° C. and keep that for 12 h, then naturally cool.

9. Take the product out of the muffle furnace, and put it into a ball mill for milling into powder. Then repeat Steps 6-9, and heat to 800° C., keep for 12 h. Finally, mill twice into powder.

Finish the production of manganese-cobalt-lithium catalyst.

Component 2 Metal negative electrode 2

(A) Structures: consist of Metal negative collector 21, Metal negative lug 22, Metal negative output circuit 23 and Metal fuel 24.

(B) Running features: Cations produced in Air positive electrode 1 pass through siphon membrane with Positive electrolyte 4, then go through Membrane, membrane bag, bioactive membrane bag, bioactive membrane 3 and Electrolyte 5, get to Metal fuel 24. Meanwhile, metal atoms lose an electron to form metal ions. Then, the electron get through Metal negative current collector 21, Metal negative lug 22, Metal negative output circuit 23 and the external circuit of the cell to enter into Air positive electrode 1. Finally, oxygen atoms combine with metal ions to produce metallic oxide, discharge reaction beginning.

(C) Technical features of each component:

(C-1) Metal negative current collector 21

Collect the current of Metal negative electrode 2, while one side connected to Metal negative lug 22 through the lug in the methods of welding, stamping, printing, spraying, high temperature high pressure spraying, coating etc, to conduct the collected current, and the other side tightly connected to Metal fuels 24 through the methods of stamping, Mosaic, welding, printing, clips, casting, coating, high temperature high pressure spraying, coating etc.

The materials of Metal negative current collector 21 include the following: 1) high conductive metals: copper, nickel, silver, lead etc; 2) high conductive binary alloy and multicomponent alloy material; 3) carbon products: Carbon fiber, carbon nanotube, carbon fabric and felt, carbon rope, graphite, carbon paper, graphite plat etc.

The optional shapes of Metal negative current collector 21 include: foil, sheet, filiform, fibrous, mesh, coating, plating, etc, such as metal foil, sheet metal, metal wire, metal fiber, metal mesh, metal coating, metal plating, alloy foil, alloy plate, alloy wire, alloy fiber, alloy, alloy net, alloy coating, alloy plating, etc.

The thickness of Metal negative current collector 21 includes any of the value among 0.001 nm-1 nm, 1 nm-1000 nm, 1 μm-1000 μm, 1 mm-1000 mm, and more than 1 m, or among 1 μm-100 μm. The length, the width, the diameter and the limitation of Metal negative current collector 21 include any of the value among 0.001 nm-1 nm, 1 nm-1000 nm, 1 μm-1000 μm, 1 mm-1000 mm, and more than 1 m.

The connection structure between Metal negative current collector 21 and Metal fuel 24 is shown in FIGS. 14-21.

Figure 14:
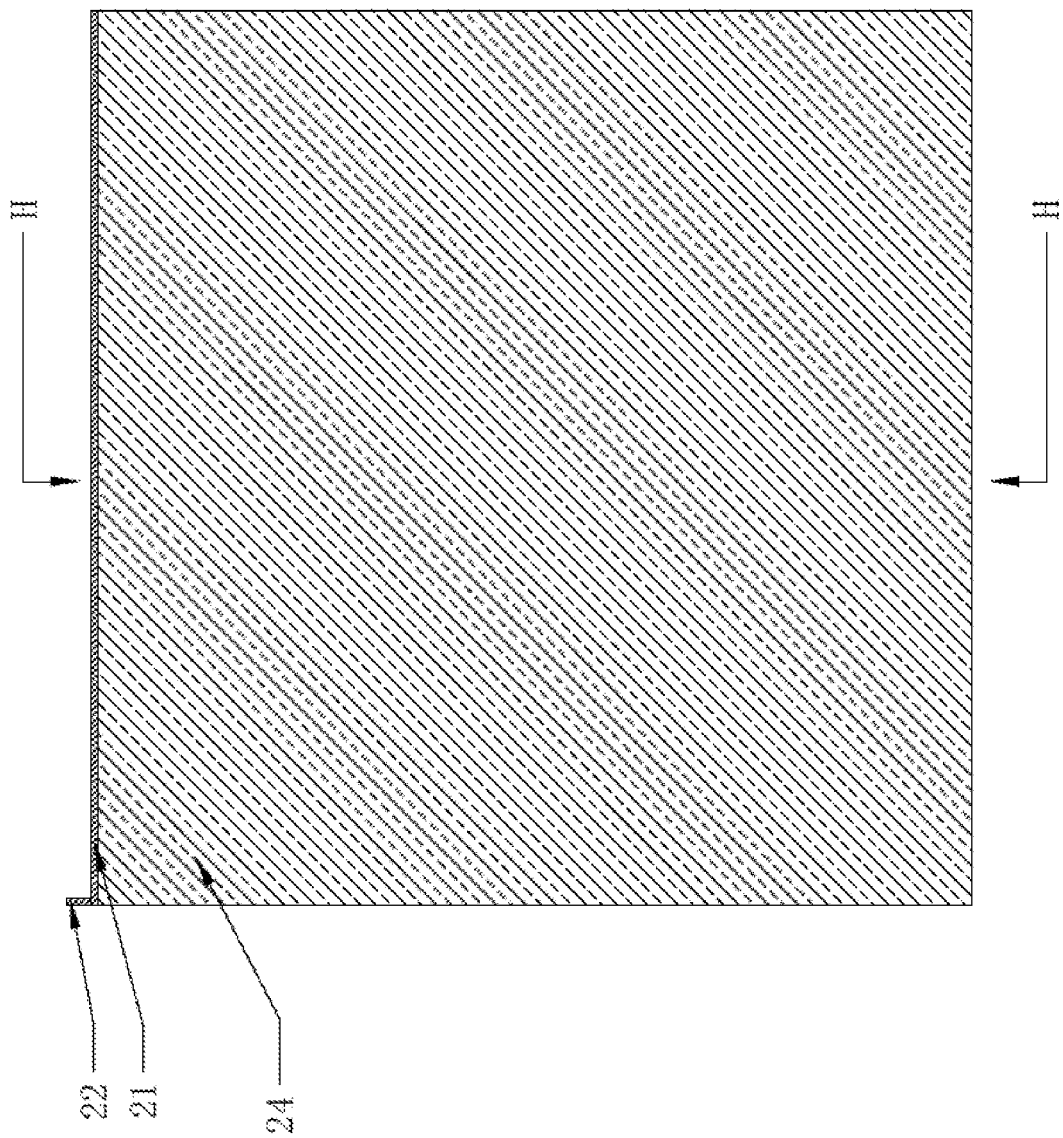
FIG. 14 shows a connection structure diagram of the metal negative current collector and metal fuel.

In FIG. 14, Metal negative current collector 21 tightly connects to one side of Metal fuel 24.

The ways of the tight connection include the following:

1) Metal negative current collector 21 in the form of foil and sheet metal, alloy, carbon products and so on, covers outside one side of Metal fuel 24.

2) Metal negative current collector 21 in the form of filaments, fibrous, mesh metal, alloy, carbon products and so on, embeds in one side of Metal fuel 24.

3) Metal negative current collector 21 in the form of coating and plating to coat and plate metal, alloy and carbon products is painted outside one side of Metal fuel 24.

4) Metal negative current collector 21 in the form of stamping, Mosaic, welding, printing, clips, casting, coating, high temperature high pressure spraying, and coating are attached to Metal fuel 24.

Figure 15:
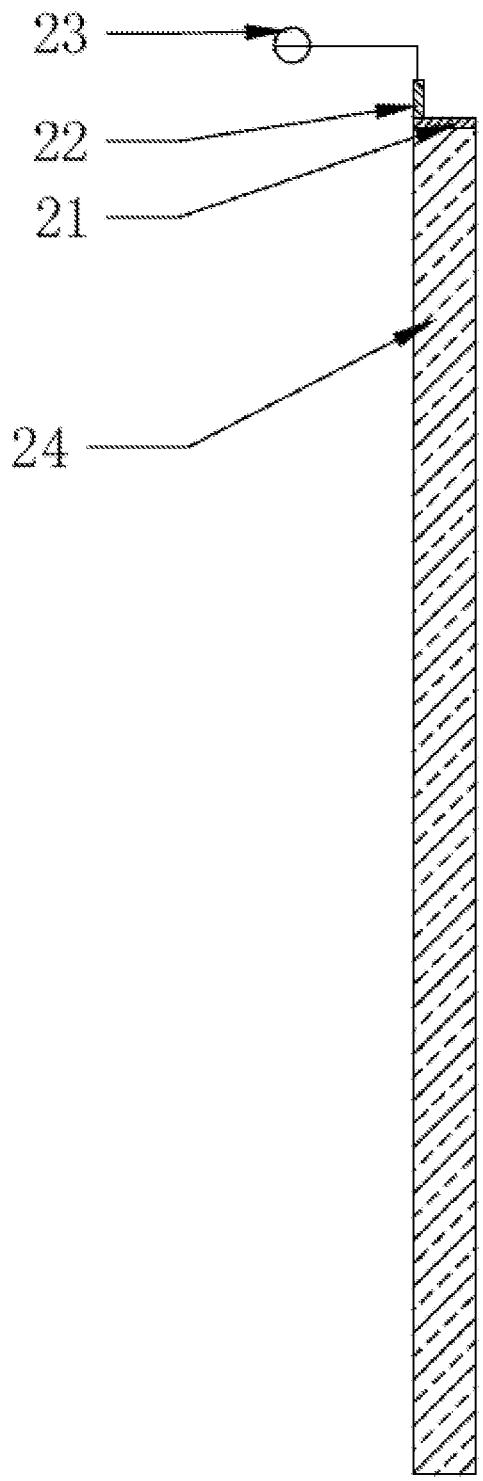
FIG. 15 shows a connection structure diagram of the metal negative collector and metal fuel, along section H-H in FIG. 14.
Figure 16:
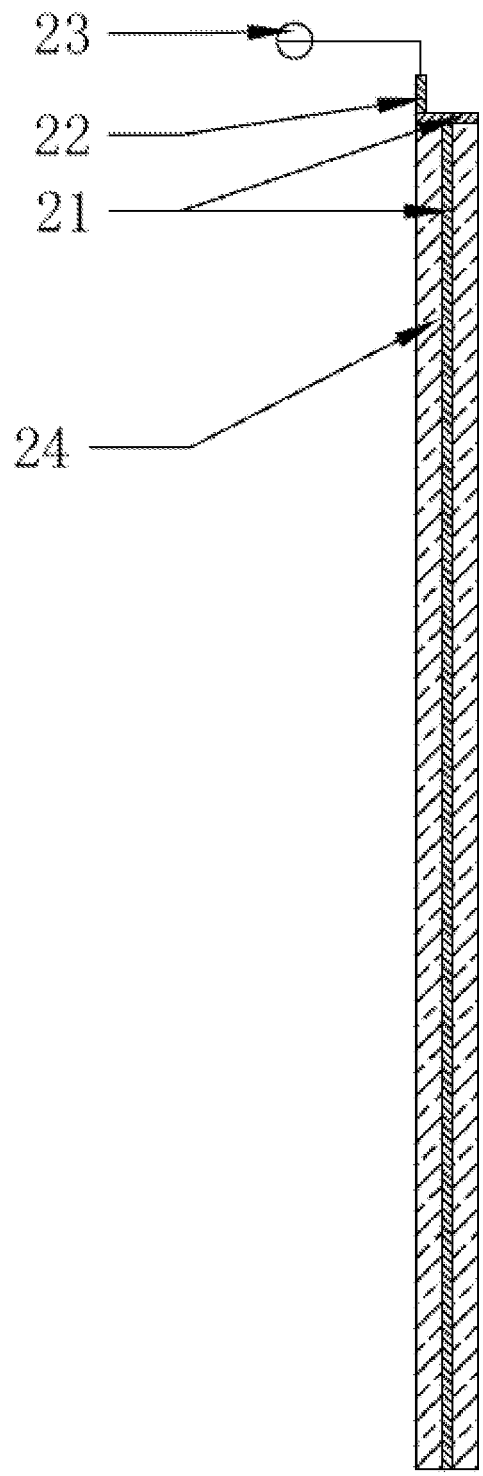
FIG. 16 shows another connection structure diagram of the metal negative current collector and metal fuel, along section H-H in FIG. 14.

FIGS. 15&16 show the sectional view along direction of FIG. 14 H-H.

In FIG. 15, Metal negative current collector 21 tightly connects to one side of Metal fuel 24 in same ways shown in FIG. 14.

Figure 22:
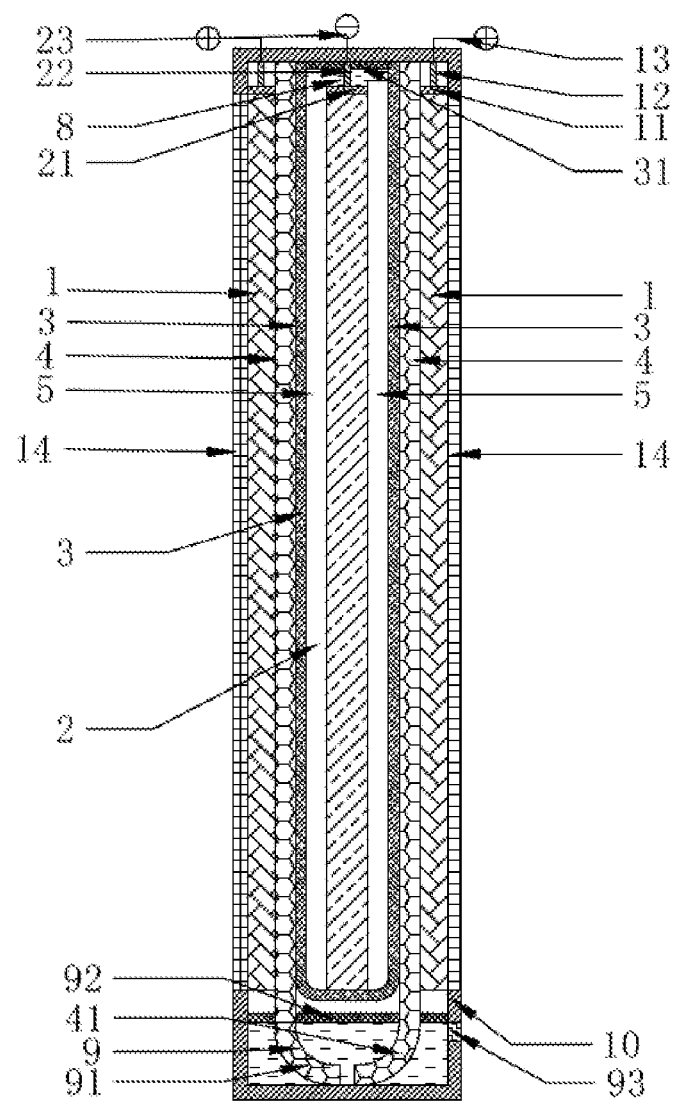
FIG. 22 shows another sectional view of the air metal fuel cell along direction of FIG. 1 E-E, including two negative units.
Figure 23:
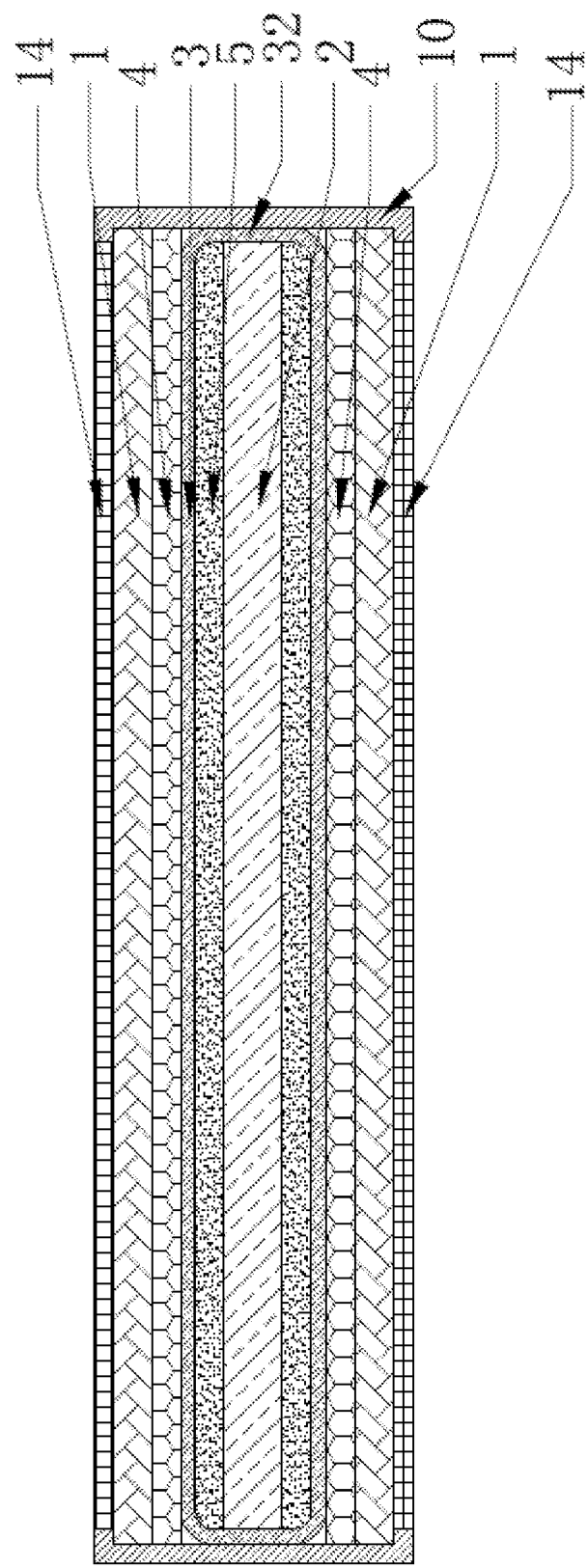
FIG. 23 shows another sectional view of the air metal fuel cell along direction of FIG. 1 A-A, including two negative units.

In FIG. 16, Metal negative current collector 21 embeds in Metal fuel 24, the connection structure can be applied in the cell in FIGS. 22&23. In the example cell, there is a Metal negative electrode 2 in the center and an Air positive electrode 1 on the two sides each. In this case, the two Air positive electrodes 1 share one Metal negative electrode 2. More specific information is shown as below.

Figure 17:
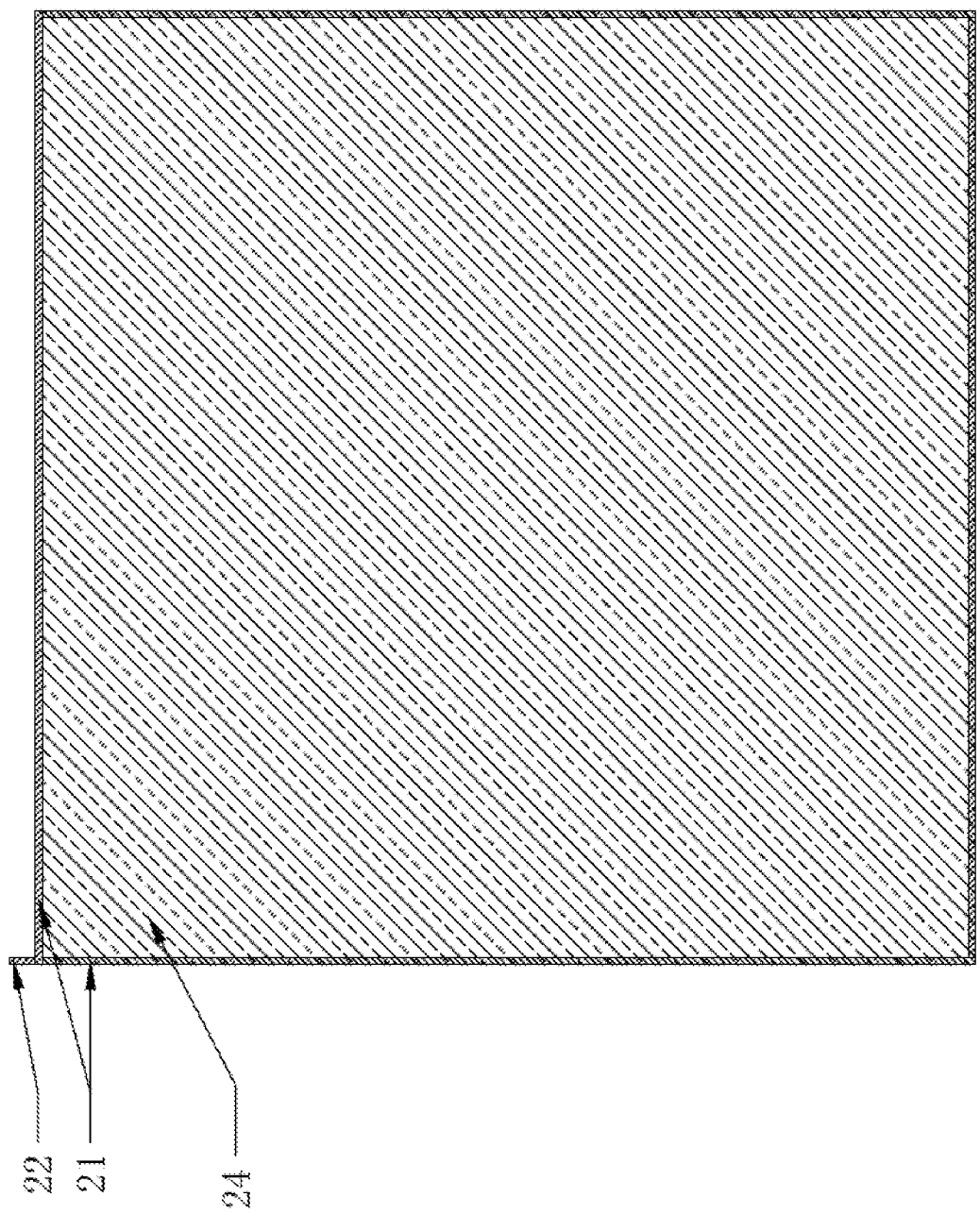
FIG. 17 shows another connection structure diagram of the metal negative current collector and metal fuel.

In FIG. 17, Metal negative collector 21 tightly connects to four sides of Metal fuel 24.

The ways of the tight connection include the following:

1) Metal negative current collector 21 in the form of foil and sheet metal, alloy, carbon products and so on, covers outside four sides of Metal fuel 24;

2) Metal negative current collector 21 in the form of filaments, fibrous, mesh metal, alloy, carbon products and so on, embeds in four sides of Metal fuel 24;

3) Metal negative collector 21 in the form of coating and plating to coat and plate metal, alloy and carbon products is painted outside four sides of Metal fuel 24;

4) Metal negative current collector 21 in the form of stamping, Mosaic, welding, printing, clips, casting, coating, high temperature high pressure spraying, and coating attaches to Metal fuel 24.

Figure 18:
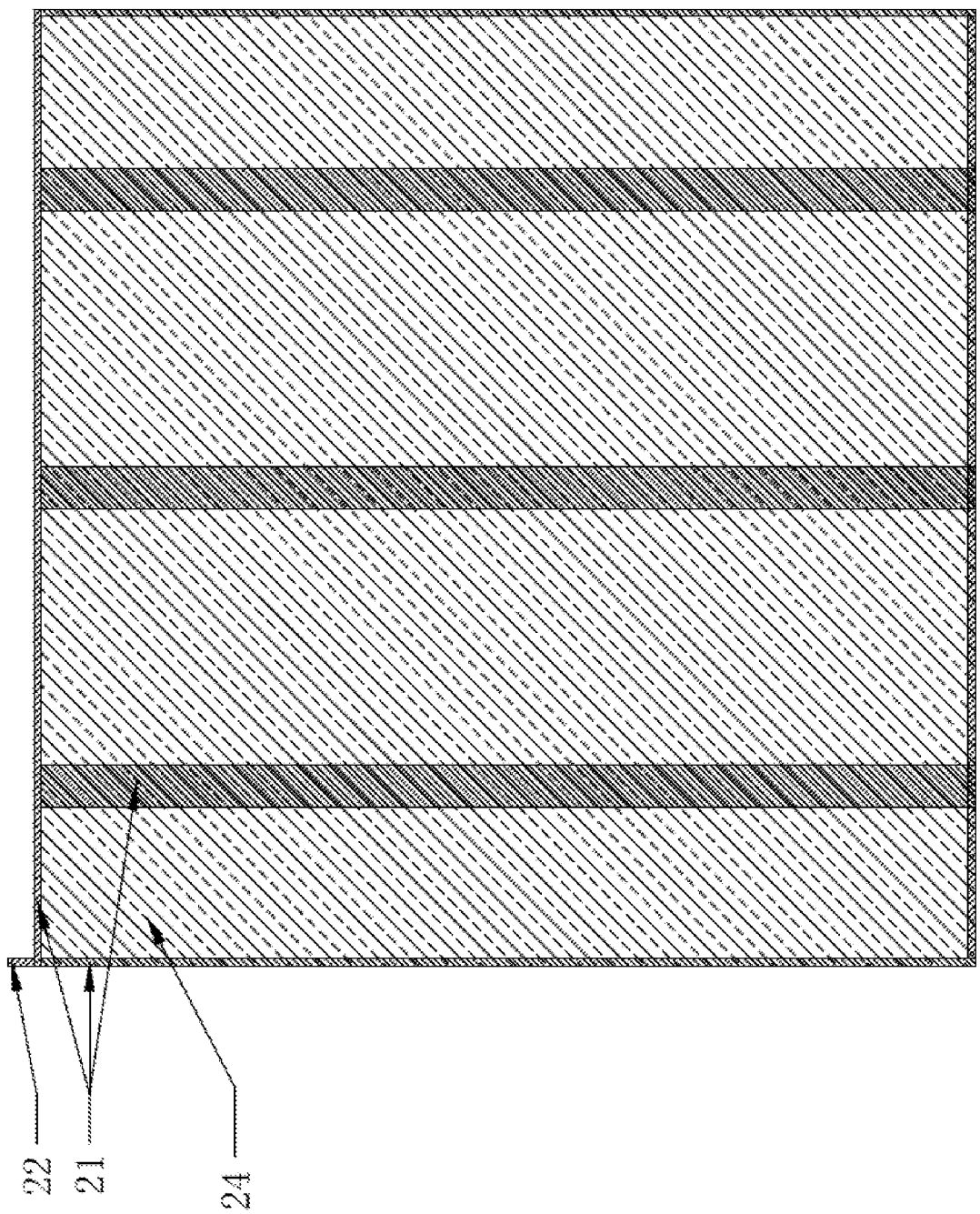
FIG. 18 shows another connection structure diagram of the metal negative current collector and metal fuel.

In FIG. 18, Metal negative collector 21 tightly connects to one side of Metal fuel 24.

The ways of the tight connection include the following:

1) Metal negative current collector 21 in the form of foil and sheet metal, alloy, carbon products and so on, covers outside one face of Metal fuel 24;

2) Metal negative current collector 21 in the form of foil and sheet metal, alloy, carbon products and so on, connects outside two sides of Metal fuel 24 as a unit;

3) Metal negative current collector 21 in the form of stamping, Mosaic, welding, printing, clips, casting, coating, high temperature high pressure spraying, and coating, attaches to Metal fuel 24.

Figure 19:
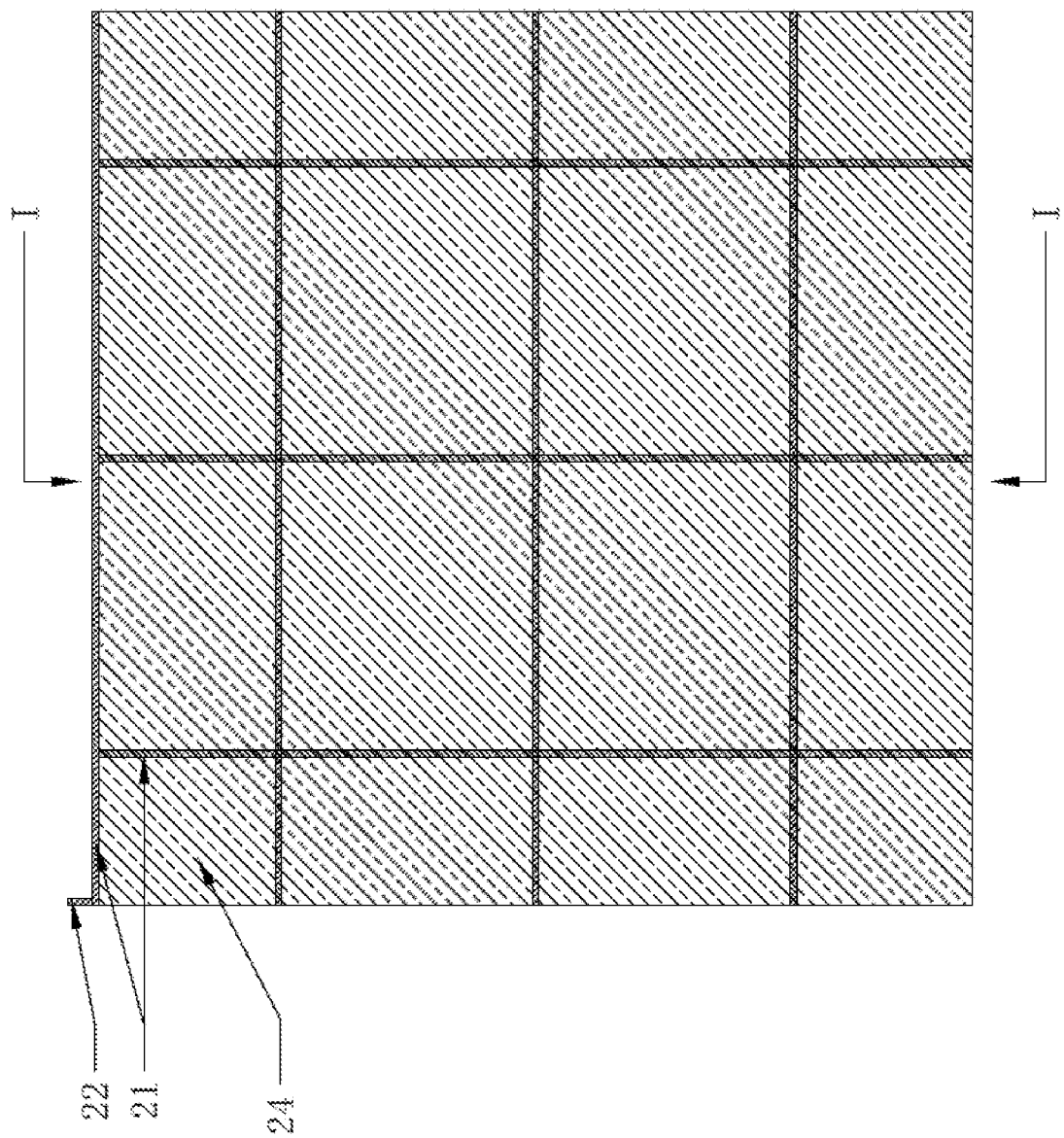
FIG. 19 shows another connection structure diagram of the metal negative current collector and metal fuel.

In FIG. 19, Metal negative current collector 21 tightly connects to one face of Metal fuel 24.

1) Metal negative current collector 21 in the form of sheet metal, alloy and carbon products, attaches to one face of Metal fuel 24;

2) Metal negative current collector 21 in the form of mesh metal, alloy and carbon products, attaches to two faces of Metal fuel 24 as a unit;

3) Metal negative current collector 21 in the form of stamping, Mosaic, welding, printing, clips, casting, coating, high temperature high pressure spraying, and coating, attaches to Metal fuel 24.

Figure 20:
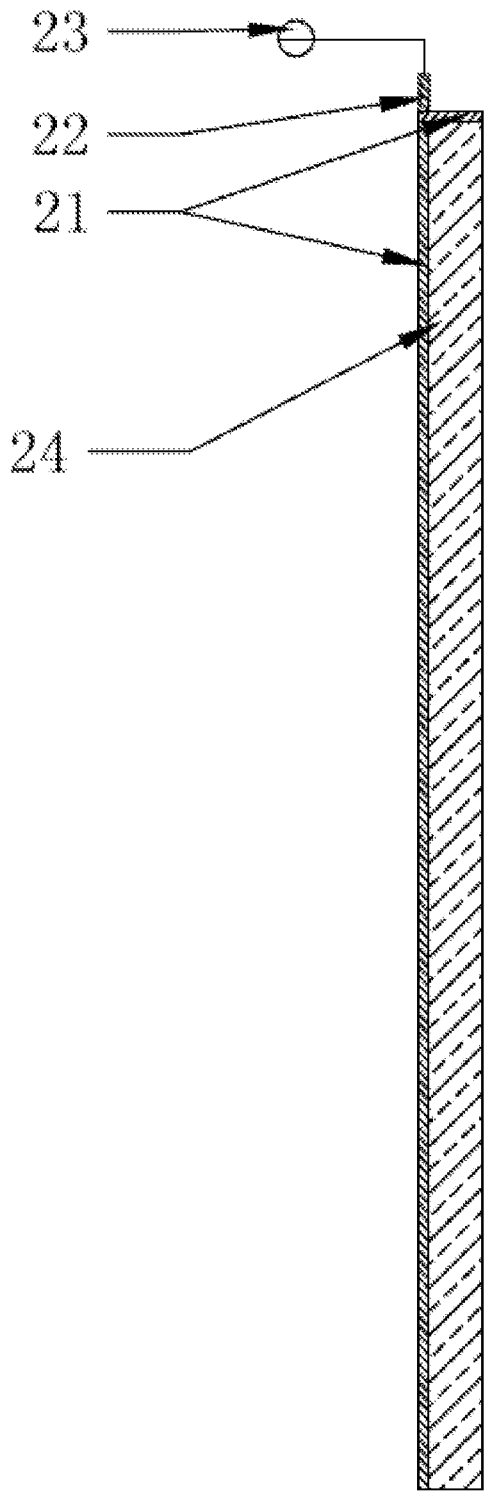
FIG. 20 shows a connection structure diagram of the metal negative current collector and metal fuel, along section I-I in FIG. 19.
Figure 21:
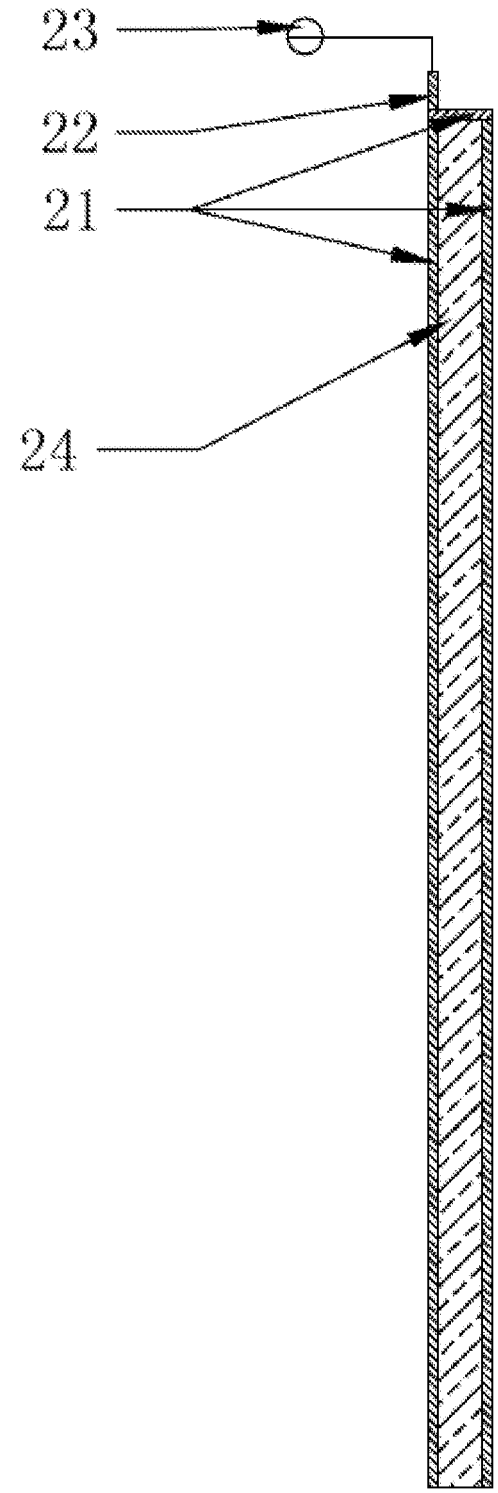
FIG. 21 shows another connection structure diagram of the metal negative current collector and metal fuel, along section I-I in FIG. 19.

FIGS. 20&21 show the sectional view along direction of FIG. 19 I-I.

In FIG. 20, Metal negative current collector 21 connects tightly to one face of Metal fuel 24 as a unit in the same way shown in FIG. 19.

In FIG. 21, Metal negative current collector 21 embeds in Metal fuel 24, which can be applied to the cell shown in FIGS. 22&23. In the example cell, there is a Metal negative electrode 2 in the center, and an Air positive electrode 1 on the two sides each. In this case, the two Air positive electrodes 1 share one Metal negative electrode 2. More specific information is shown as the following.

The mutual structure relationships between Air positive electrodes 1 and Metal fuel 24 shown in FIGS. 14-21 do not mean there are just these ones in the invented cell. On the contrary, all the mutual structure relationships between the two are in the range of the invention.

Air electrode positive collector 11, Air electrode positive lug 12 and Air electrode positive output circuit 13 can form a unit when dealt with the above methods and special technology.

(C-2) Metal negative lug 22

One end of Metal negative lug 22 connects to Metal negative current collector 21, conducts the collected electrical current from the cell, while the other side connects to Metal negative output circuit 23. The connection of Metal negative lug 22 to Metal negative current collector 21 and Metal negative output circuit 23 each is in way of welding, stamping, printing, spraying, high temperature high pressure spraying, coating etc, to conduct the electrical current effectively from Metal fuel 24. Meanwhile, the connection blocks the inside substances in Battery shell and supporting fixing device 10, ensuring the good leakproofness of the cell.

The materials of Metal negative lug 22 are the same with the ones of Metal negative current collector 21, including the following: 1) copper, nickel, silver, lead and other high conductivity of metal: 2) cigh conductivity of binary alloy, alloy material; 3) carbon fiber, carbon nanotube, carbon cloth, paper, carbon rope, graphite cloth, carbon graphite plate and other carbon products, while metal and alloy materials of high conductivity preferred.

The optional shapes can be the following: strip, sheet, column, line, and other shapes, strip and column preferred.

The thickness of Metal negative lug 22 can be any of the value among 0.001 nm-1 nm, 1 nm-1000 nm, 1 μm-1000 μm, 1 mm-1000 mm, and more than 1 m, or among 1 μm-100 μm. The length, the width, the diameter and the limitation of Metal negative lug 22 can be any of the value among 0.001 nm-1 nm, 1 nm-1000 nm, 1 μm-1000 μm, 1 mm-1000 mm, and more than 1 m.

Air electrode positive collector 11, Air electrode positive lug 12 and Air electrode positive output circuit 13 can form a unit when dealt with the above methods and special technology.

(C-3) Metal negative output circuit 23

One end of Metal negative output circuit 23 connects to Metal negative lug 22, while the other side connects to the load outside. When the cell discharges, Metal negative output circuit 23 carries electrical current to the outside load, to finish discharge reaction. Or one end connects to Metal negative lug 22, while the other end prepares to connect to the load outside, which means the invented cell is on sale, in storage before being put into use, or means the connection is cut off after discharging for a period.

The ways of connection between Metal negative output circuit 23 and Metal negative lug 22 includes welding, clip, clamp, screw etc.

Metal negative output circuit 23 connects to Metal negative current collector 21 and Metal negative lug 22 through welding, stamping, printing, spraying, high temperature high pressure spraying, coating etc, to conduct electrical current on metal fuel effectively.

The materials of Metal negative output circuit 23 include the following: 1) common metallic conductor in daily life, such as single strands of copper wire, single strands of aluminum conductor, double strands of copper conductor, double strands of aluminum conductor, strands of copper wire, and strands of aluminum conductor; 2) metal materials of high conductivity, such as copper, nickel, silver, lead etc; 3) binary alloy and alloy of high conductivity; 4) carbon fiber, carbon nanotube, carbon cloth, paper, carbon rope, graphite cloth, carbon graphite plate and other carbon products.

The shapes can be the following: strip, sheet, column, line, and other shapes, strip and column preferred.

The thickness can be any of the value among 0.001 nm-1 nm, 1 nm-1000 nm, 1 μm-1000 μm, 1 mm-1000 mm, and more than 1 m, or among 1 μm-100 μm. The length, the width, the diameter and the limitation can be any of the value among 0.001 nm-1 nm, 1 nm-1000 nm, 1 μm-1000 μm, 1 mm-1000 mm, and more than 1 m.

Air electrode positive collector 11, Air electrode positive lug 12 and Air electrode positive output circuit 13 can form a unit when dealt with the above methods and special technology.

(C-4) Metal fuel 24

The structures include Sheet structure, powder structure, columnar structure and paste structure.

The optional shapes include rectangle, circle, polygon and other shapes.

The thickness can be any of the value The thickness can be any of the value among 0.001 nm-1 nm, 1 nm-1000 nm, 1 μm-1000 μm, 1 mm-1000 mm, and more than 1 m, or among 1 μm-100 μm. The length, the width, the diameter and the limitation can be any of the value among 0.001 nm-1 nm, 1 nm-1000 nm, 1 μm-1000 μm, 1 mm-1000 mm, and more than 1 m.

Descriptions for the spatial position are shown in FIGS. 2&3, and FIGS. 22-29.

Figure 2:
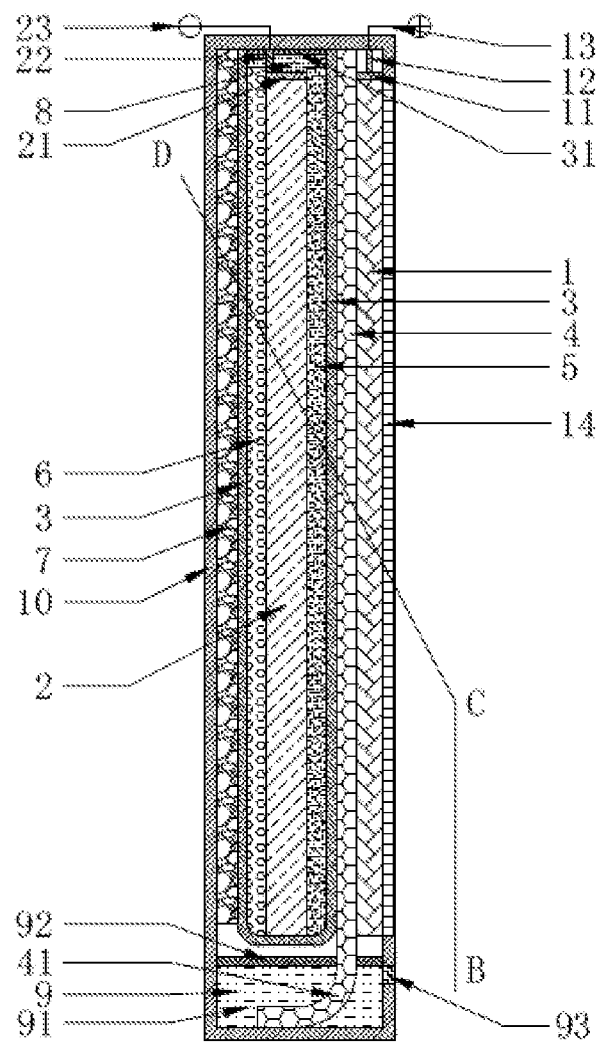
FIG. 2 shows the sectional view of the air metal fuel cell along direction of FIG. 1 E-E.
Figure 3:
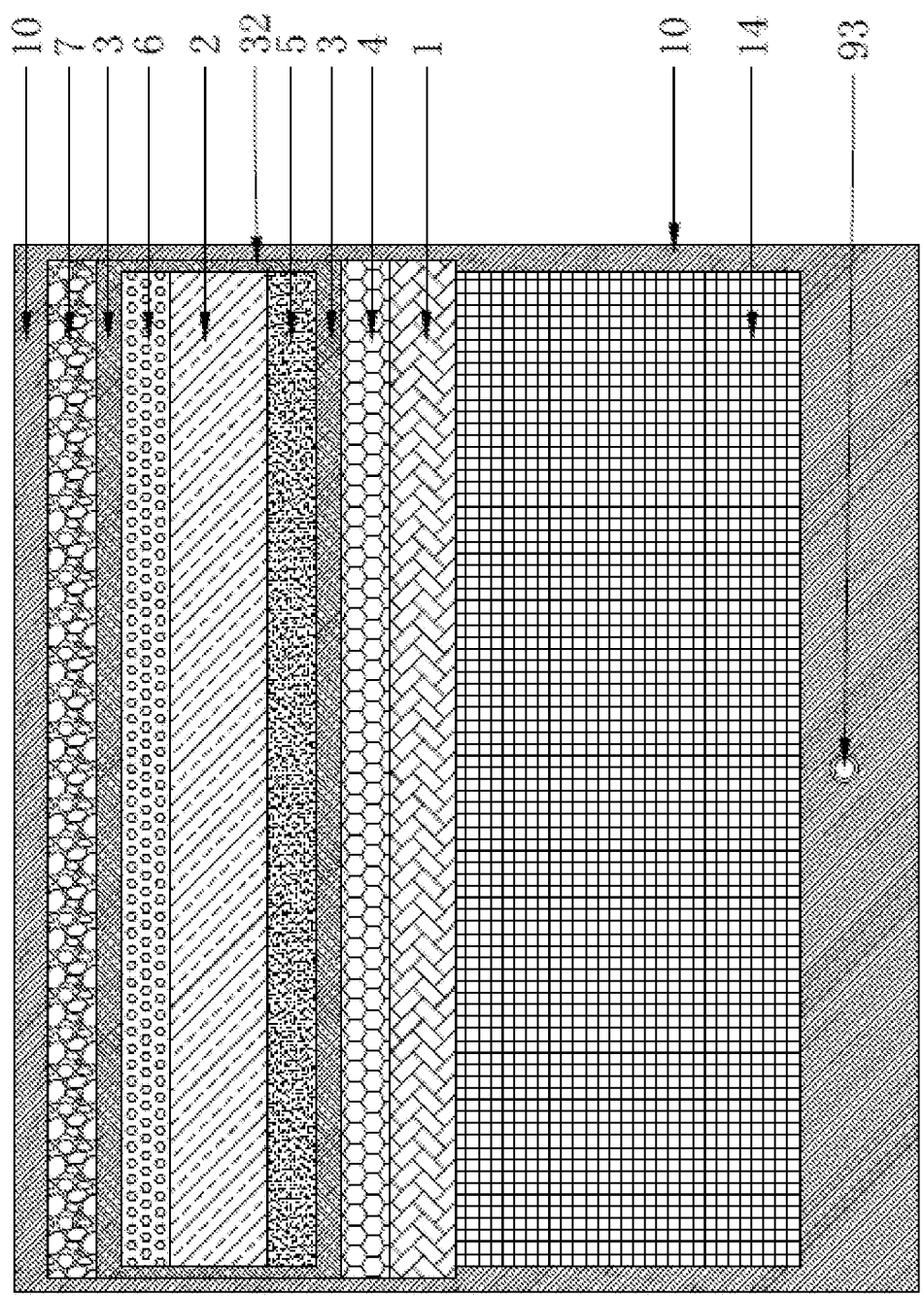
FIG. 3 shows the sectional view of the air metal fuel cell along direction of FIG. 2 BCD.

In FIGS. 2&3, Metal fuel 24 locates in Membrane, membrane bag, bioactive membrane bag, bioactive membrane 3. The left and right sides are adjacent to Membrane bag edge bonding part 3 of Membrane, membrane bag, bioactive membrane bag, bioactive membrane 3, which means the two sides are either connected or unconnected to Membrane bag edge bonding part 3. There exists some distance, in which filled with Electrolyte 5 and Negative electrolyte 8. Here the above two sides are called "Left" and "Right".

The lower edge is adjacent to the bottom of Membrane, membrane bag, bioactive membrane bag, bioactive membrane 3, which means the lower edge is either connected or unconnected to Membrane bag edge bonding part 3. There exists some distance, in which filled with Electrolyte 5 and Negative electrolyte 8. Here the lower edge is called "Lower".

The upper edge is adjacent to Membrane bag sealing device 31 of Membrane, membrane bag, bioactive membrane bag, bioactive membrane 3, which means the upper edge is either connected or unconnected to Membrane bag sealing device 31. There exists some distance, in which filled with Electrolyte 5 and Negative electrolyte 8. Here the upper edge is called "Upper".

In FIGS. 2&3, the connection part between Metal fuel 24 and Electrolyte 5 is called "Face" of Metal fuel 24, and the connection part between Metal fuel 24 and Mandrel 6 is also called "Face" of Metal fuel 24.

In FIGS. 22&23, the connection part between Metal fuel 24 and Electrolyte 5 is called "Face" of Metal fuel 24. In this structure, both the two "Face" of Metal fuel 24 connect to Electrolyte 5. In the example cell, there is a Metal negative electrode 2 in the center, and an Air positive electrode 1 on the two sides each. In this case, the two Air positive electrodes 1 share one Metal negative electrode 2.

Figure 24:
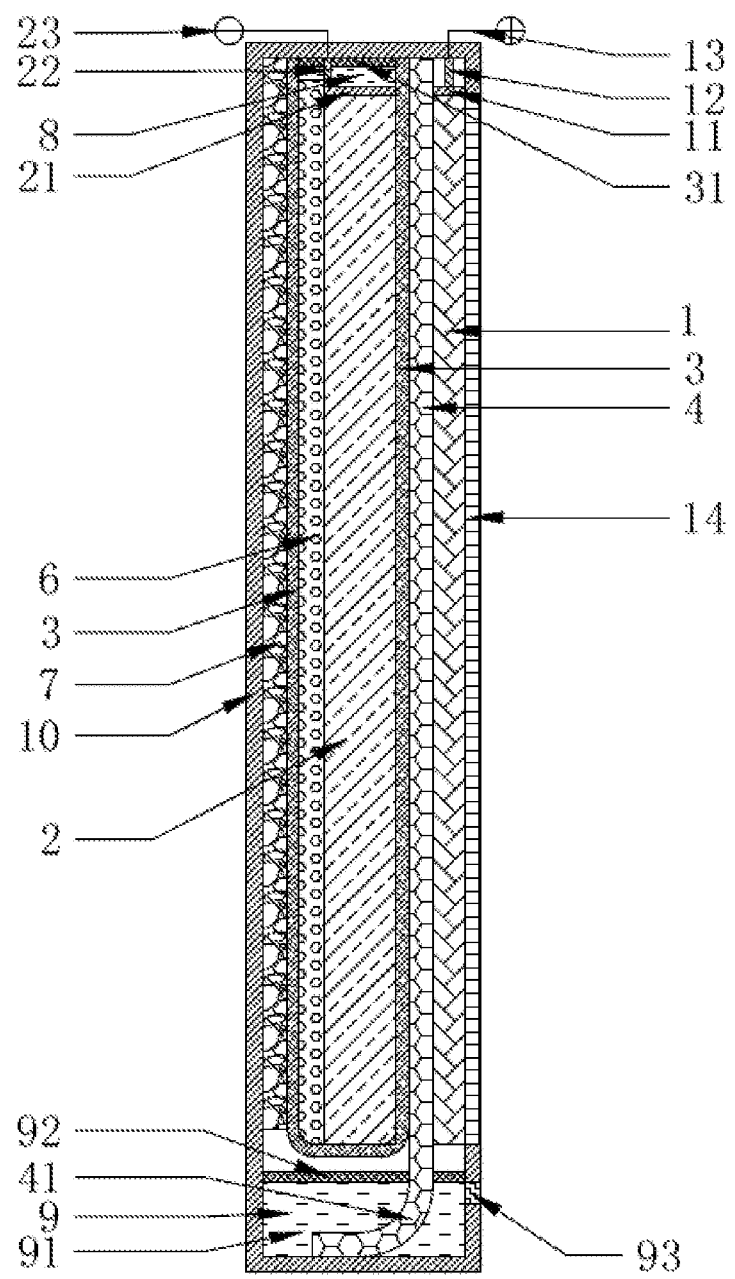
FIG. 24 shows another sectional view of the air metal fuel cell along direction of FIG. 1 E-E, without electrolyte.
Figure 25:
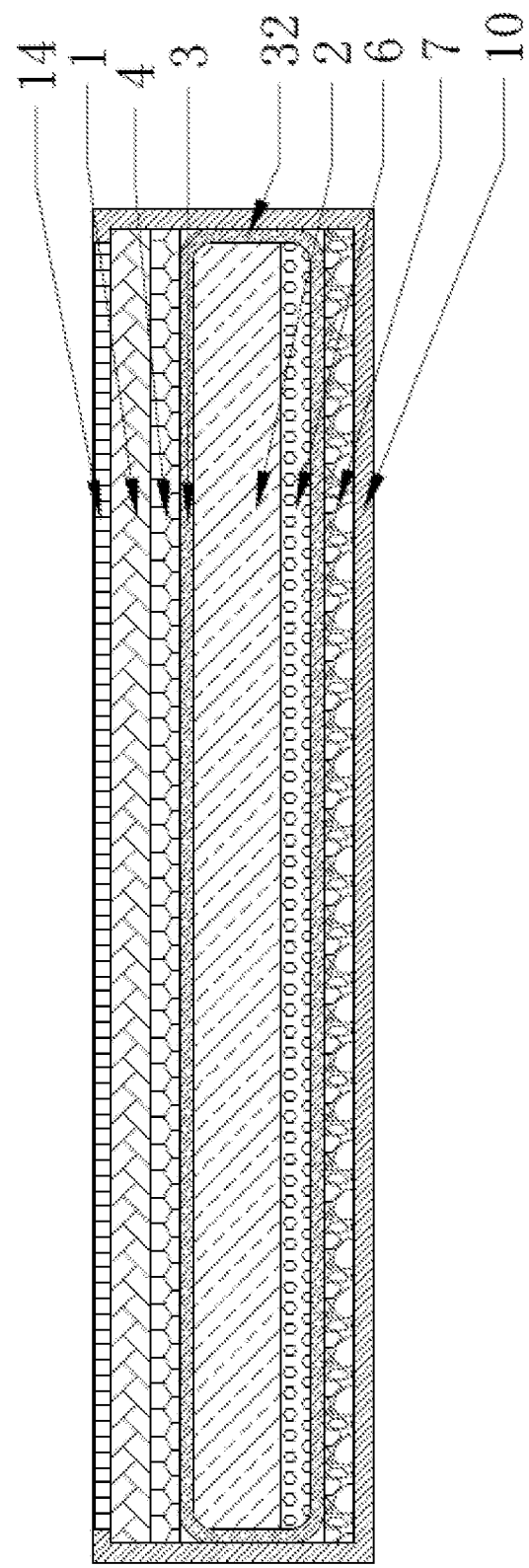
FIG. 25 shows another sectional view of the air metal fuel cell along direction of FIG. 1 A-A, without electrolyte.

In FIGS. 24&25, Metal fuel 24 is adjacent to an inner face of Membrane, membrane bag, bioactive membrane bag, bioactive membrane 3. The connection part between Metal fuel 24 and the inner face of Membrane, membrane bag, bioactive membrane bag, bioactive membrane 3, is called "Face" of Metal fuel 24. And the connection part between Metal fuel 24 and Mandrel 6 is also called "Face" of Metal fuel 24.

Being adjacent means the upper edge is either connected or unconnected to an inner face of Membrane, membrane bag, bioactive membrane bag, bioactive membrane 3. If unconnected, there exists some distance, in which filled with Negative electrolyte 8.

Figure 26:
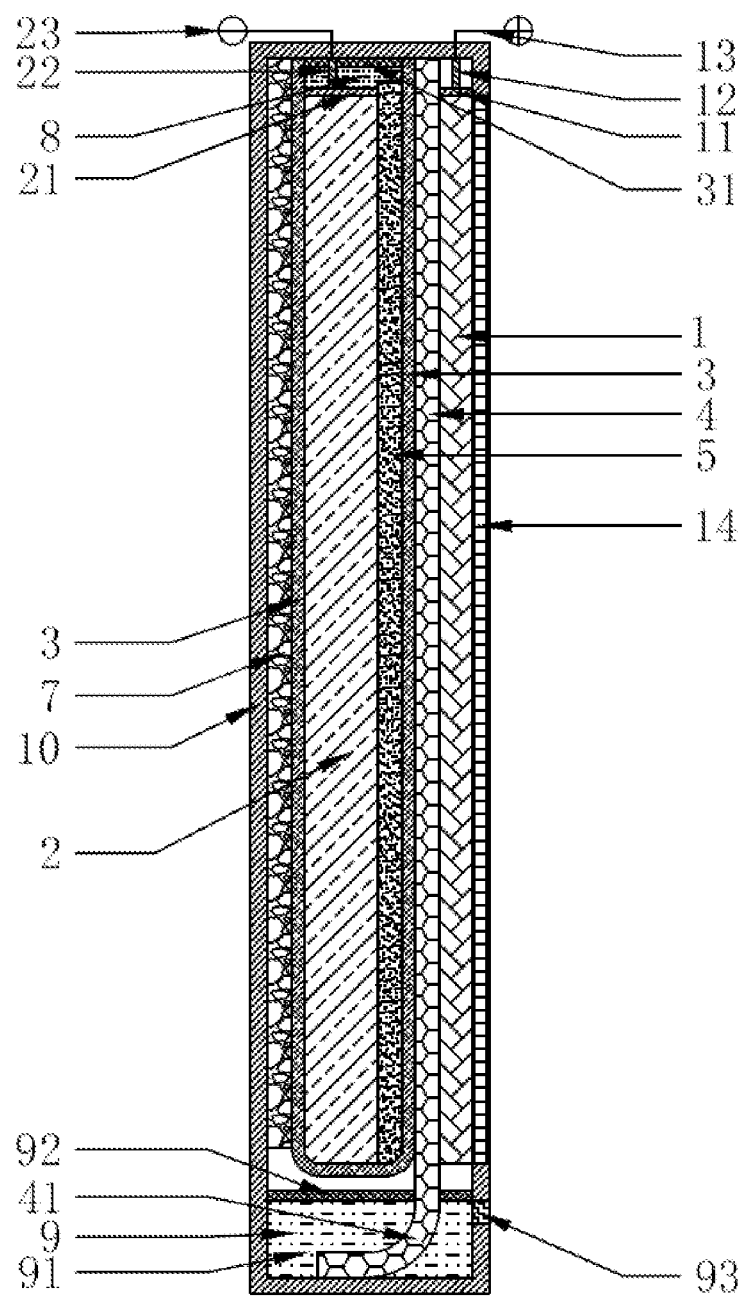
FIG. 26 shows another sectional view of the air metal fuel cell along direction of FIG. 1 E-E, without a mandrel.
Figure 27:
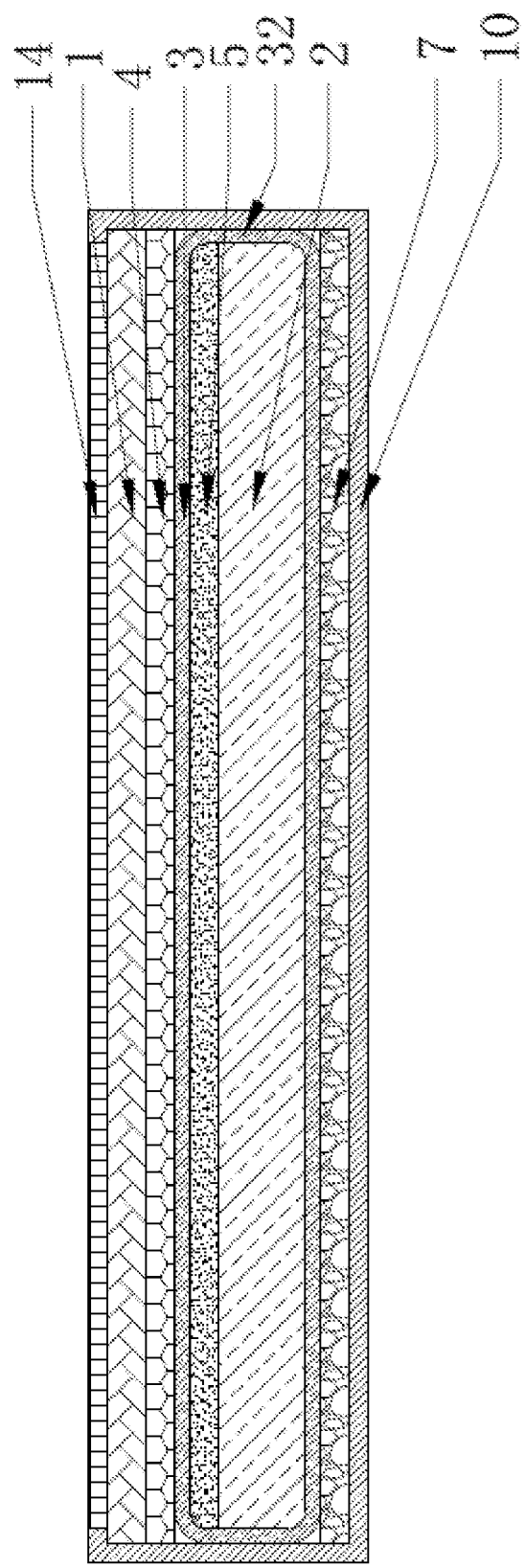
FIG. 27 shows another sectional view of the air metal fuel cell along direction of FIG. 1A-A, without a mandrel.

In FIGS. 26&27, the connection part between Metal fuel 24 and Electrolyte 5 is called "Face" of Metal fuel 24. And Metal fuel 24 is adjacent to an inner face of Membrane, membrane bag, bioactive membrane bag, bioactive membrane 3. The connection part between Metal fuel 24 and the inner face of Membrane, membrane bag, bioactive membrane bag, bioactive membrane 3, is called "Face" of Metal fuel 24.

Being adjacent means the upper edge is either connected or unconnected to an inner face of Membrane, membrane bag, bioactive membrane bag, bioactive membrane 3. If unconnected, there exists some distance, in which filled with Negative electrolyte 8.

Figure 28:
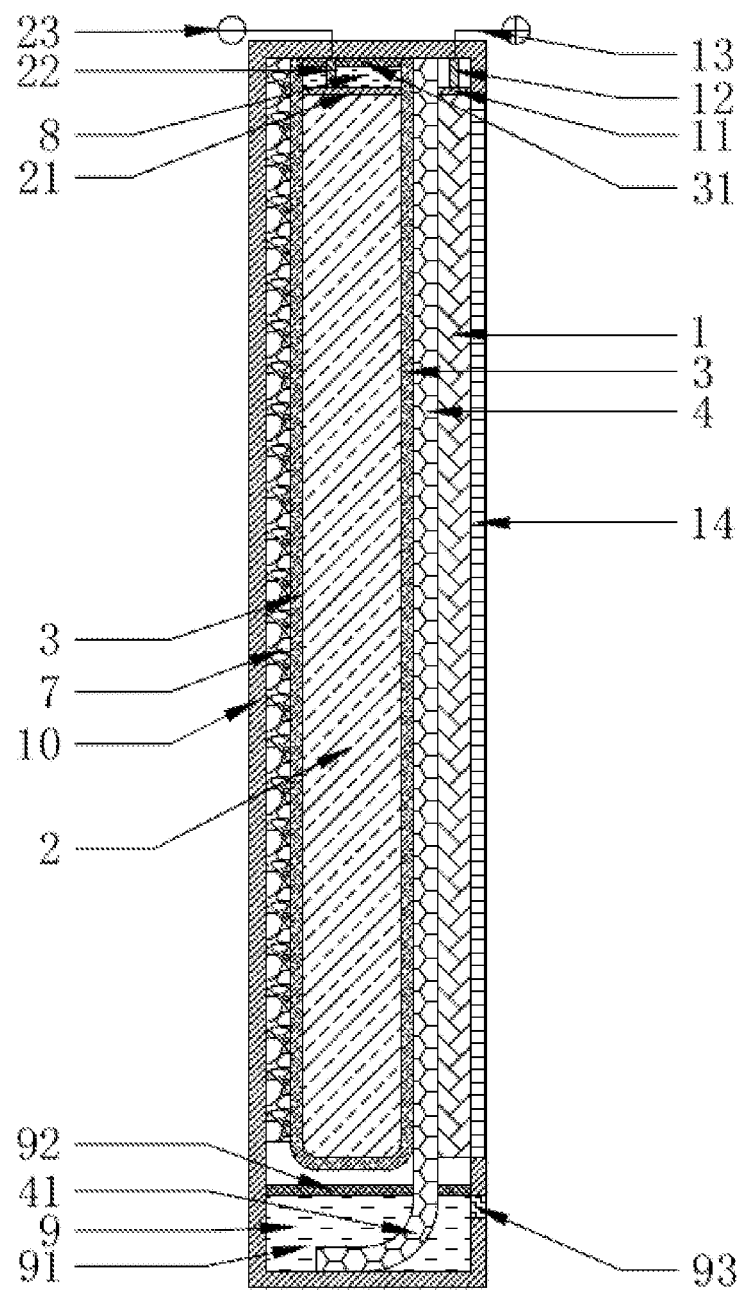
FIG. 28 shows another sectional view of the air metal fuel cell along direction of FIG. 1 E-E, without electrolyte and mandrel.
Figure 29:
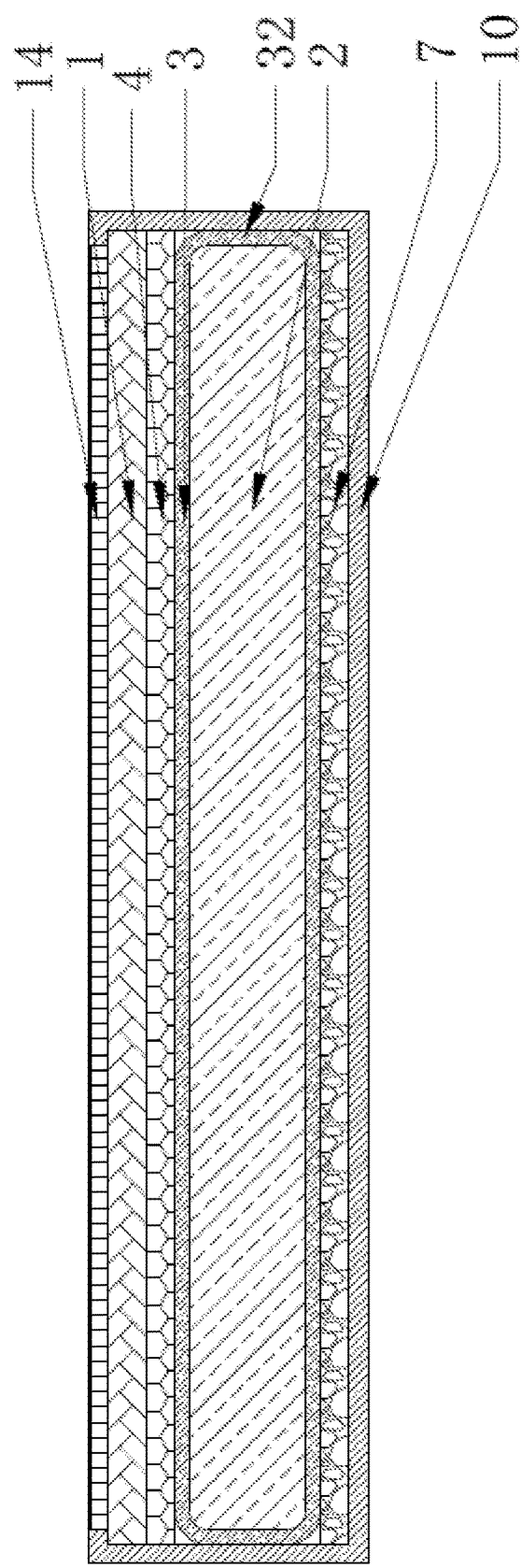
FIG. 29 shows another sectional view of the air metal fuel cell along direction of FIG. 1 A-A, without electrolyte and mandrel.

In FIGS. 28&29, Metal fuel 24 is adjacent to an inner face of Membrane, membrane bag, bioactive membrane bag, bioactive membrane 3. The connection part between Metal fuel 24 and the inner face of Membrane, membrane bag, bioactive membrane bag, bioactive membrane 3, is called "Face" of Metal fuel 24. And Metal fuel 24 is adjacent to another inner face of Membrane, membrane bag, bioactive membrane bag, bioactive membrane 3. The connection part between Metal fuel 24 and the inner face of Membrane, membrane bag, bioactive membrane bag, bioactive membrane 3, is also called "Face" of Metal fuel 24.

Being adjacent means the upper edge is either connected or unconnected to an inner face of Membrane, membrane bag, bioactive membrane bag, bioactive membrane 3. If unconnected, there exists some distance, in which filled with Negative electrolyte 8.

Metal fuel 24 can connect to Metal negative current collector 21 in different ways, which is shown in the instruction part of Metal negative current collector 21. Meanwhile, Metal fuel 24 tightly connects to Electrolyte 5, Mandrel 6, Negative electrolyte 8 and Membrane, membrane bag, bioactive membrane bag, bioactive membrane 3. What deserves attention is that the connection between Metal fuel 24 and Metal negative current collector 21 does not affect the others between Metal fuel 24 and Electrolyte 5, Mandrel, 6 Mandrel, Negative electrolyte 8 and Membrane, membrane bag, bioactive membrane bag, bioactive membrane 3.

Metal fuel 24 tightly connects to Electrolyte 5, which is achieved through painting electrode on "Face" of Metal fuel 24, drying and pressing by a roller press or by other ways. Negative electrolyte 8 is filled in the interspace after Metal fuel 24 tightly connects to Electrolyte 5, Mandrel 6, Negative electrolyte 8 and Membrane, membrane bag, bioactive membrane bag, bioactive membrane 3.

Metal fuel 24 is the storage part of the whole cell, and its effective weight and volume are the keys that determine the energy density of the cell.

The optional materials of Metal fuel 24 includes the following: metallic elements in the periodic table such as Zn, Mg, Al, Fe, Pb, Na, K, Ga, etc, or alloys made from one or more of these metallic elements such as magnesium alloy, lead calcium alloy, magnesium aluminum iron germanium manganese alloy, etc, or alloys made from one or more of the metallic elements and non-metallic element, such as carbon zinc alloy, tin alloy, calcium magnesium silicon aluminum alloy, etc, also includes sheet, rod, particles, powder, foam, multihole, fiber, silk, nano-metallic materials, nano-alloy materials and other materials made from the above metallic elements and alloys.

Metal fuel 24 can be made into blocks such as cuboids, cubes, round cakes, ellipsoid, cylinder and other shapes. Also, it can be made into software of semi-solid cells or fluid dynamic cells.

Component 3, Membrane, membrane bag, bioactive membrane bag, bioactive membrane 3.

Figure 30:
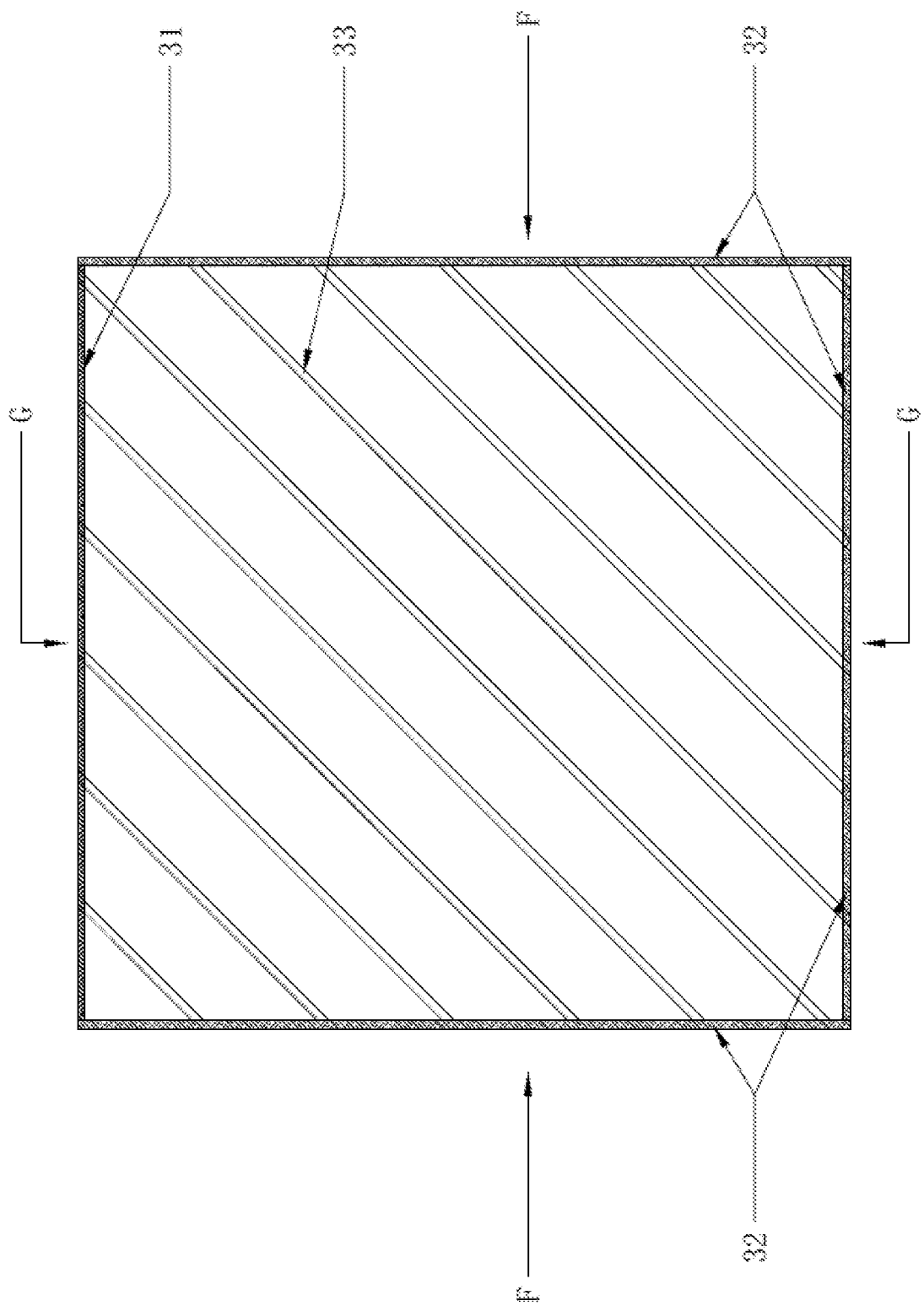
FIG. 30 shows the front view of the membrane bag.

(A) Structure features: consist of Membrane bag sealing device 31, Membrane bag edge bonding part 32, Membrane 33, Septum 34, Daub coating 35, and Daub coating B 36. In FIG. 30, Membrane, membrane bag, bioactive membrane bag, bioactive membrane 3 is in a shape of a bag, whose edge is open. The opening edge is called "Mouth" or "Opening", on the opposite edge of which is called "Bottom". And the two edges are called "Left" and "Right".

Inside Membrane, membrane bag, bioactive membrane bag, bioactive membrane 3, there are equipped all parts of Metal negative electrode 2, including Metal negative collector 21, Metal negative lug 22, Metal negative output circuit 23, Electrolyte 5, Mandrel 6 and Negative electrolyte 8, which means the negative materials of the cell are inside Membrane, membrane bag, bioactive membrane bag, bioactive membrane 3. One face outside Membrane, membrane bag, bioactive membrane bag, bioactive membrane 3 connects to High temperature anti-freezing material for siphon film 4, while the other face connects to Shock-proof buffer layer 7. And both the two outside faces can connect to High temperature anti-freezing material for siphon film 4 at the same time, which is shown in FIGS. 22&23.

Membrane 33 and Septum 34 are produced into Membrane, membrane bag, bioactive membrane bag, bioactive membrane 3 in different sizes, thicknesses, materials and shapes, according to practical requirements and conditions. Membrane, membrane bag, bioactive membrane bag, bioactive membrane 3 can be single-layer membrane bag, double-layer membrane bag and multi-layer membrane bag, as well as single-layer membrane, double-layer membrane and multi-layer membrane.

The thicknesses vary based on various practical requirements and conditions. They can be mini-cells such as pearl cells and button cells, medium cells such as mobile phone batteries and motorcycle batteries, and large cell such as vehicles batteries and batteries for transportation tools, super large cells such as batteries used in power stations.

The materials, properties and structures of membranes differ based on various practical requirements and conditions. For example, the optional membranes include some membrane of different materials such as polyethylene, polypropylene membrane, glass fiber diaphragm, PVC membrane, etc, or some membranes of different properties such as organic membranes, inorganic membranes, and fiber membrane, or some biofilms such as bioactive membranes, biological selective membranes, bacteria microbial biofilms etc.

(B) Running features: Depart Air positive electrode 1 from Metal negative electrode 2 without direct connection, to maintain the stable environment of electrolyze. Prevent water and other molecular substances from entering into Membrane, membrane bag, bioactive membrane bag, bioactive membrane 3, while the molecular substances inside Membrane, membrane bag, bioactive membrane bag, bioactive membrane 3 are prevented from flowing or leaking. But ions can pass through freely. This feature avoids the corruption of Metal negative electrode 2 and the speeding-up of self-discharge.

(C) Technical features of each component:

(C-1) Membrane bag sealing device 31

Membrane bag sealing device 31 includes some accessory devices like clip, clamp, colloidal, double-sided adhesive to seal all the parts of Metal negative electrode 2 inside. Membrane bag sealing device 31 is used to seal the mouth of Membrane, membrane bag, bioactive membrane bag, bioactive membrane 3, when all the parts of Metal negative electrode 2 including Metal negative current collector 21, Metal negative lug 22, Metal negative output circuit 23, Electrolyte 5, Mandrel 6 and Negative electrolyte 8 are equipped. And just Metal negative lug 22 is left out for conducting. Also Metal negative lug 22 is sealed by Membrane bag sealing device 31. After Membrane bag sealing device 31 seals the mouth of Membrane, membrane bag, bioactive membrane bag, bioactive membrane 3, the inner substances are prevented from passing through the mouth except electrical current.

When the cell is one-off, the optional materials of Membrane bag sealing device 31 used to seal Membrane, membrane bag, bioactive membrane bag, bioactive membrane 3 is the sealant including epoxy, unsaturated polyester resin, phenolic resin, acrylic resin, polyvinyl chloride (PVC) resin etc. Or the other method of sealing is hot melting.

When the cell is reusable, Membrane bag sealing device 31 can be in the form of clip, clamp, colloidal, double-sided adhesive. After the inner negative materials inside Membrane, membrane bag, bioactive membrane bag, bioactive membrane 3 finish discharging, Membrane bag sealing device 31 can be open for taking out and change negative electrode for later use.

(C-2) Membrane bag edge bonding parts 32

Membrane, membrane bag, bioactive membrane bag, bioactive membrane 3 seals "Bottom", "Left", and "Right" of two or more Membrane 33 and Septum 34 to be bags. Membrane, membrane bag, bioactive membrane bag, bioactive membrane 3

At least one pieces of Membrane 33 or Septum 34 are sealed at the "Bottom", on the "Left", and on the "Right" to from bags. The part of "Bottom", "Left", and "Right" of Membrane, membrane bag, bioactive membrane bag, bioactive membrane 3 are called Membrane bag edge bonding parts 32

Methods of sealing Membrane 33: sealant, glue and others to seal; hot melting, hot pressing and cold pressing to seal; or making Membrane 33 into a shape of bag while being produced. The part of "Bottom", "Left", and "Right" of Membrane, membrane bag, bioactive membrane bag, bioactive membrane 3 are called Membrane bag edge bonding parts 32

Methods of sealing the part of "Bottom", "Left", and "Right" of Membrane 33 and Septum 34 are the same, including: sealant, glue and others to seal, hot melting, hot pressing and cold pressing to seal, or making Membrane 33 and Septum 34 into bags while their being produced. The part of "Bottom", "Left", and "Right" of Membrane, membrane bag, bioactive membrane bag, bioactive membrane 3 are called Membrane bag edge bonding parts 32

(C-3) Membrane 33

The shape includes flake, stripe, rectangle, circle, polygon, triangle, etc.

The thickness can be any of the value among 0.001 nm-1 nm, 1 nm-1000 nm, 1 μm-1000 μm, 1 mm-1000 mm, and more than 1 m, or among 1 μm-100 μm. The length, the width, the diameter and the limitation can be any of the value among 0.001 nm-1 nm, 1 nm-1000 nm, 1 μm-1000 μm, 1 mm-1000 mm, and more than 1 m, or among 1 μm-100 μm, and more than 1 m.

Membrane 33 has a porous structure to let the ions of Negative electrolyte 8 and Positive electrolyte 9 can pass through freely. Membrane 33 is the main material to form Membrane, membrane bag, bioactive membrane bag, bioactive membrane 3.

The basic structure of Membrane, membrane bag, bioactive membrane bag, bioactive membrane 3 is made by sealing the part of "Bottom", "Left", and "Right" of two or more Membrane 33, or by sealing the part of "Bottom", "Left", and "Right" of at least one piece of Membrane 33 and Septum 34.

The sizes, thicknesses, materials and shapes of Membrane 33 vary based on practical requirements and conditions. The materials, properties and structures of membranes differ based on various practical requirements and conditions. For example, the optional membranes include some membrane of different materials such as polyethylene, polypropylene membrane, glass fiber diaphragm, PVC membrane, etc, or some membranes of different properties such as organic membranes, inorganic membranes, and fiber membrane, or some biofilms such as bioactive membranes, biological selective membranes, bacteria microbial biofilms etc.

Figure 31:
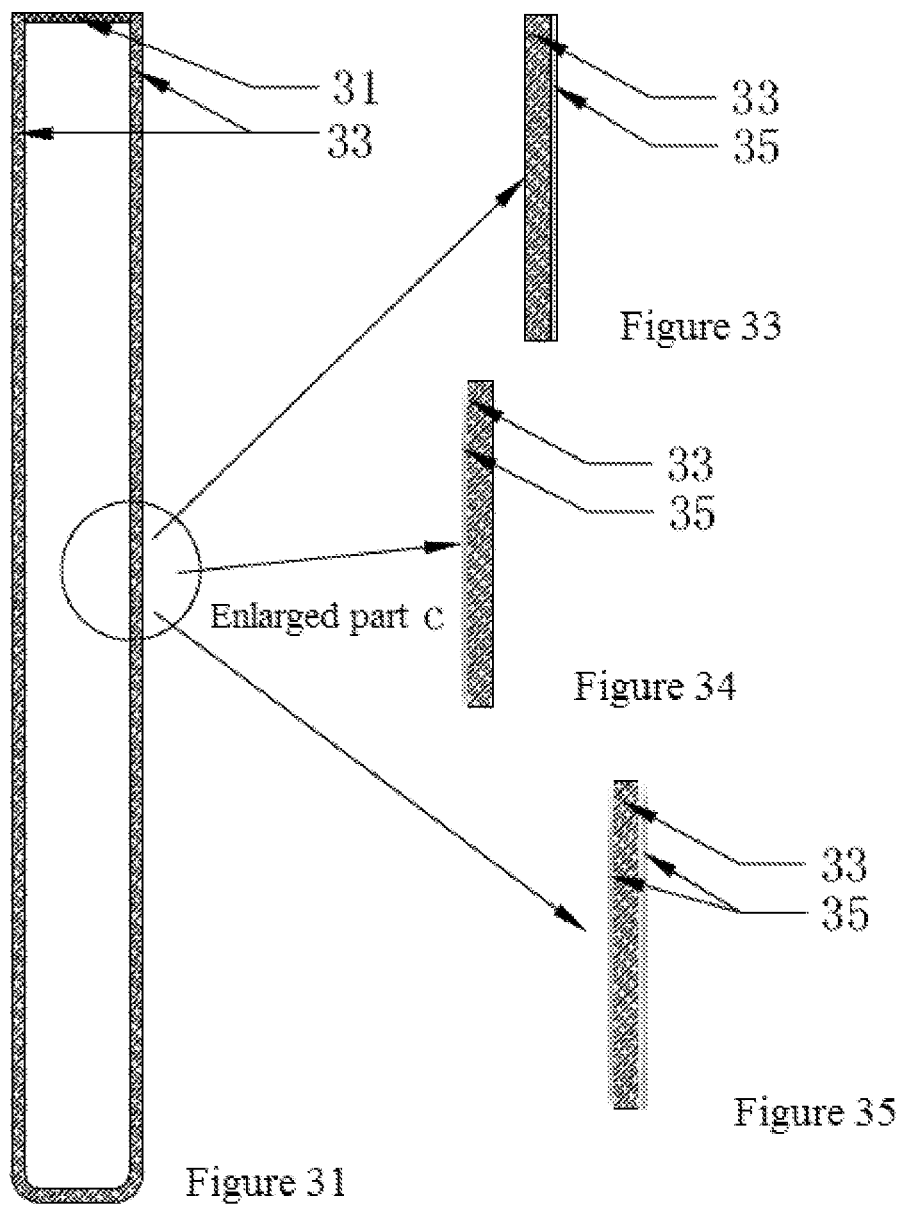
FIG. 31 shows a sectional view of the membrane bag along direction of FIG. 30 G-G.
Figures 32, 37, 46:
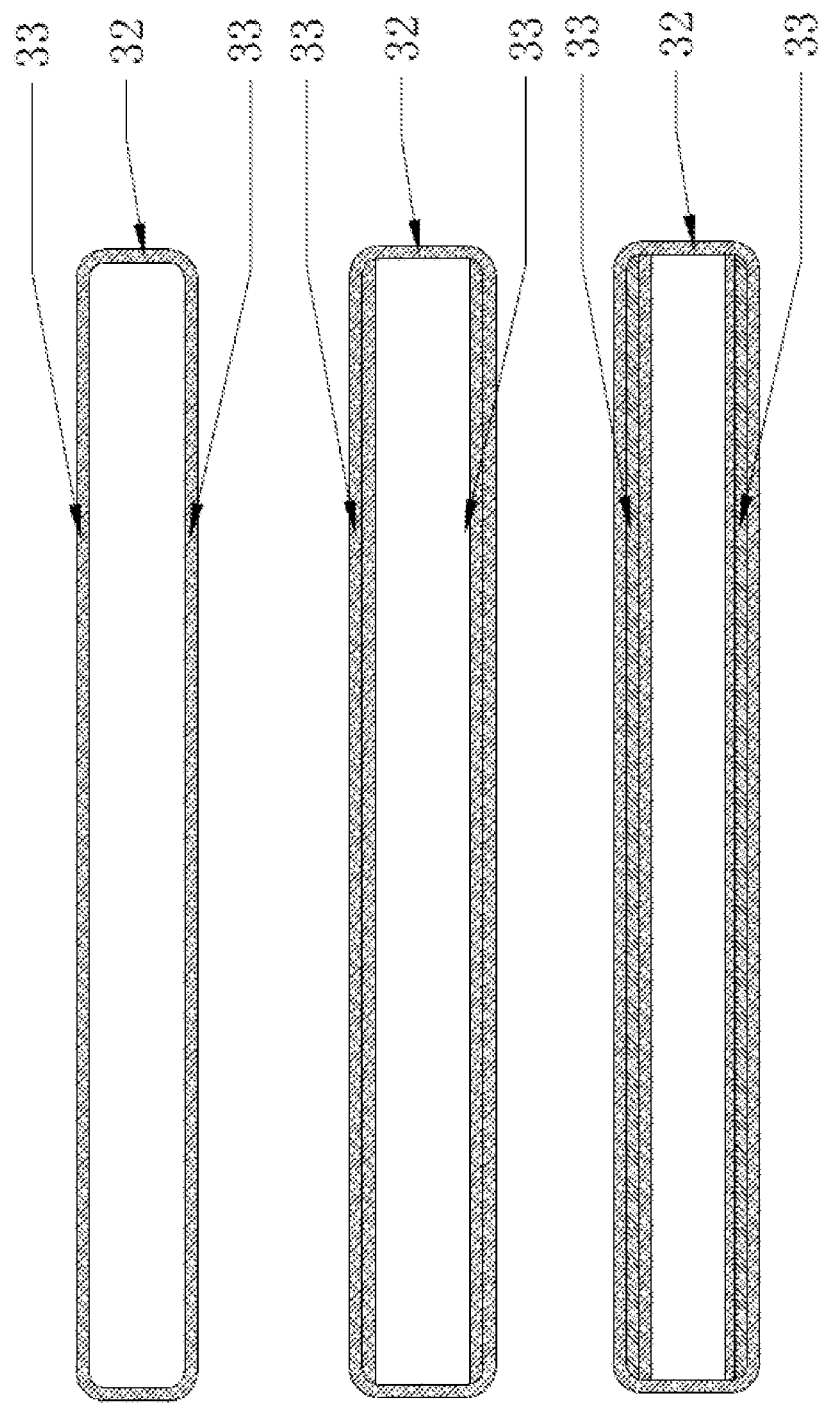
FIG. 32 shows a sectional view of the single-layer membrane bag along direction of FIG. 30 F-F.
FIG. 37 shows a sectional view of the double-layer membrane bag along direction of FIG. 30 F-F.
FIG. 46 shows a sectional view of multi-layer membrane bag along direction of FIG. 30 F-F.

FIGS. 31&32 show the basic structure of Membrane, membrane bag, bioactive membrane bag, bioactive membrane 3, for sealing the "Bottom", "Left", and "Right" of two pieces of Membrane 33. This type of membrane bag is monolayer membrane bag.

FIGS. 36&37 show the basic structure of Membrane, membrane bag, bioactive membrane bag, bioactive membrane 3, for sealing the "Bottom", "Left", and "Right" of four pieces of Membrane 33. This type of membrane bag is double-layer membrane bag.

Figure 45:
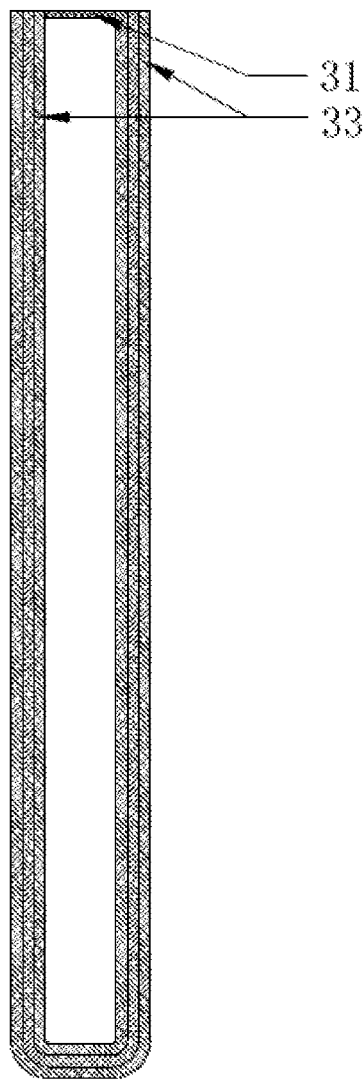
FIG. 45 shows a sectional view of the double-layer membrane bag along direction of FIG. 30 G-G.

FIGS. 45&46 show the basic structure of Membrane, membrane bag, bioactive membrane bag, bioactive membrane 3, for sealing the "Bottom", "Left", and "Right" of six pieces of Membrane 33. This type of membrane bag is three-layer membrane bag or multilayer membrane bag.

(C-4) Septum 34

The shapes include flake, bag shape, rectangle, circle, polygon, triangle etc.

The thickness can be e any of the value among 0.001 nm-1 nm, 1 nm-1000 nm, 1 μm-1000 μm, 1 mm-1000 mm, and more than 1 m, or among 1 μm-100 μm. The length, the width, the diameter and the limitation can be any of the value among 0.001 nm-1 nm, 1 nm-1000 nm, 1 μm-1000 μm, 1 mm-1000 mm, and more than 1 m, or among 1 μm-100 μm, and more than 1 m. Septum 34 can prevent the substances both inside and outside Membrane, membrane bag, bioactive membrane bag, bioactive membrane 3 from passing through.

Membrane 33 is the material to form Membrane, membrane bag, bioactive membrane bag, bioactive membrane 3.

The basic structure of Membrane, membrane bag, bioactive membrane bag, bioactive membrane 3 is made by sealing the part of "Bottom", "Left", and "Right" of at least one piece of Membrane 33 and at least one piece of Septum 34, by sealing the part of "Bottom", "Left", and "Right" of at least one piece of Membrane 33 and Septum 34.

The sizes, thicknesses, materials and shapes of Septum 34 vary based on practical requirements and conditions. The materials include the following: four fluorine polyethylene, PVC, polypropylene, PVC, polyvinyl chloride (PVC) etc.

Figure 47:
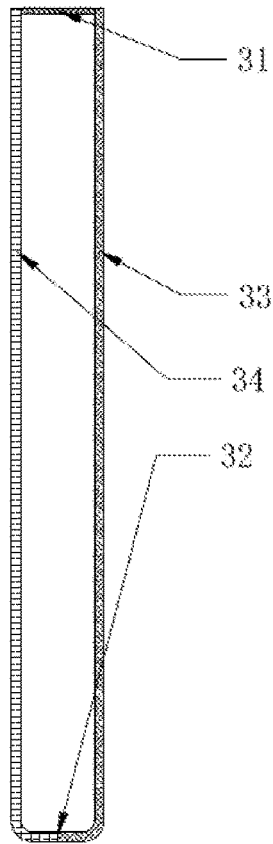
FIG. 47 shows a sectional view of the membrane bag along direction of FIG. 30 G-G, which is a single-layer membrane and single septum structure.
Figure 49:
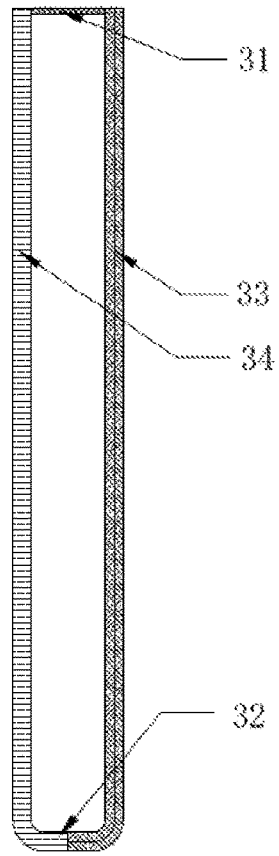
FIG. 49 shows another sectional view of the membrane bag along direction of FIG. 30 G-G, which is a double-layer membrane and single septum structure.
Figure 51:
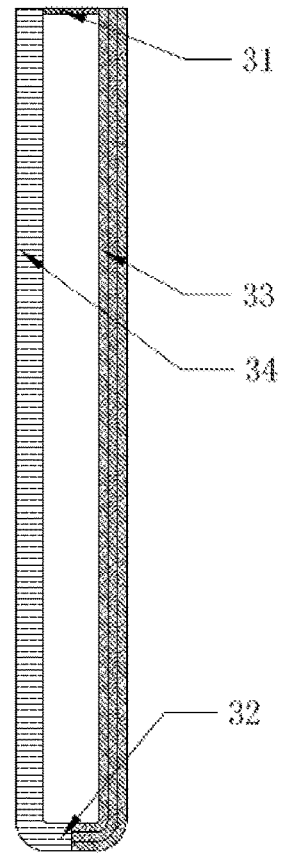
FIG. 51 shows another sectional view of the membrane bag along direction of FIG. 30 G-G, which is a multi-layer membrane and single septum structure.
Figures 48, 50, 52:
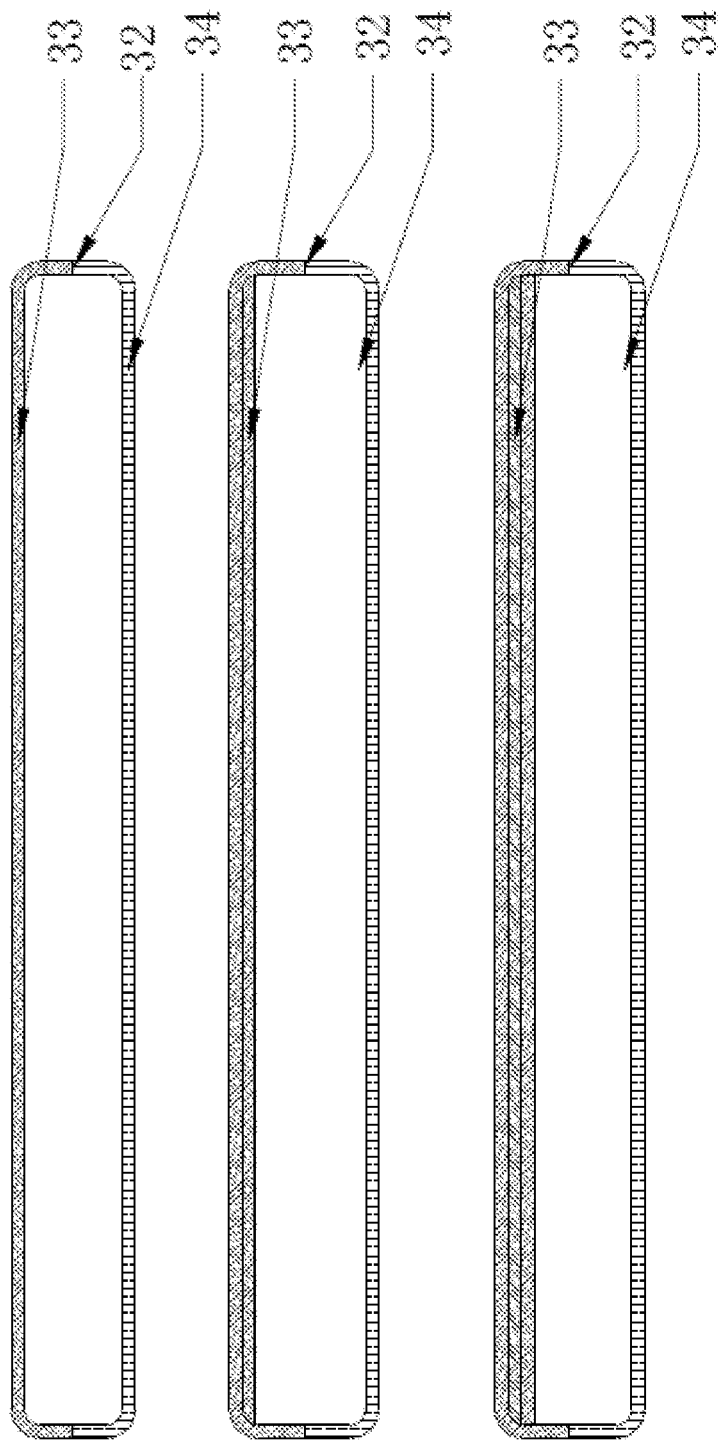
FIG. 48 shows a sectional view of the membrane bag along direction of FIG. 30 F-F, which is a single-layer membrane and single septum structure.
FIG. 50 shows another sectional view of the membrane bag along direction of FIG. 30 F-F, which is a double-layer membrane and single septum structure.
FIG. 52 shows another sectional view of the membrane bag along direction of FIG. 30 F-F, which is a multi-layer membrane and single septum structure.
Figure 60:
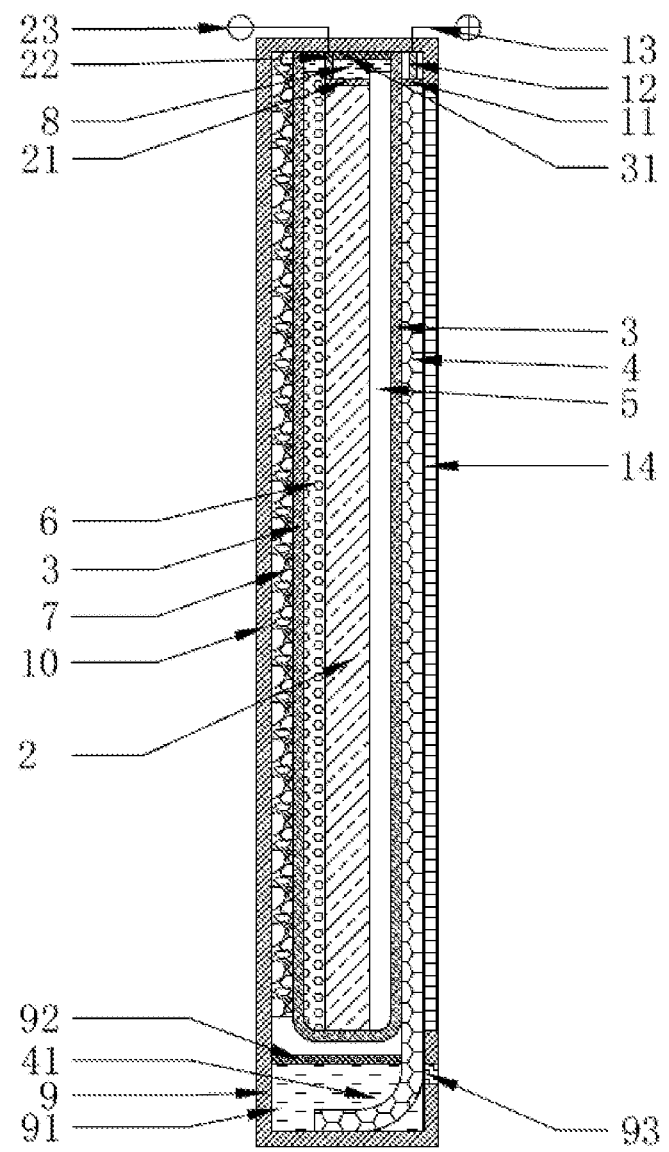
FIG. 60 shows another sectional view of the air metal fuel cell along direction of FIG. 1E-E, in which the siphon material functions as the air electrode carrier.
Figure 61:
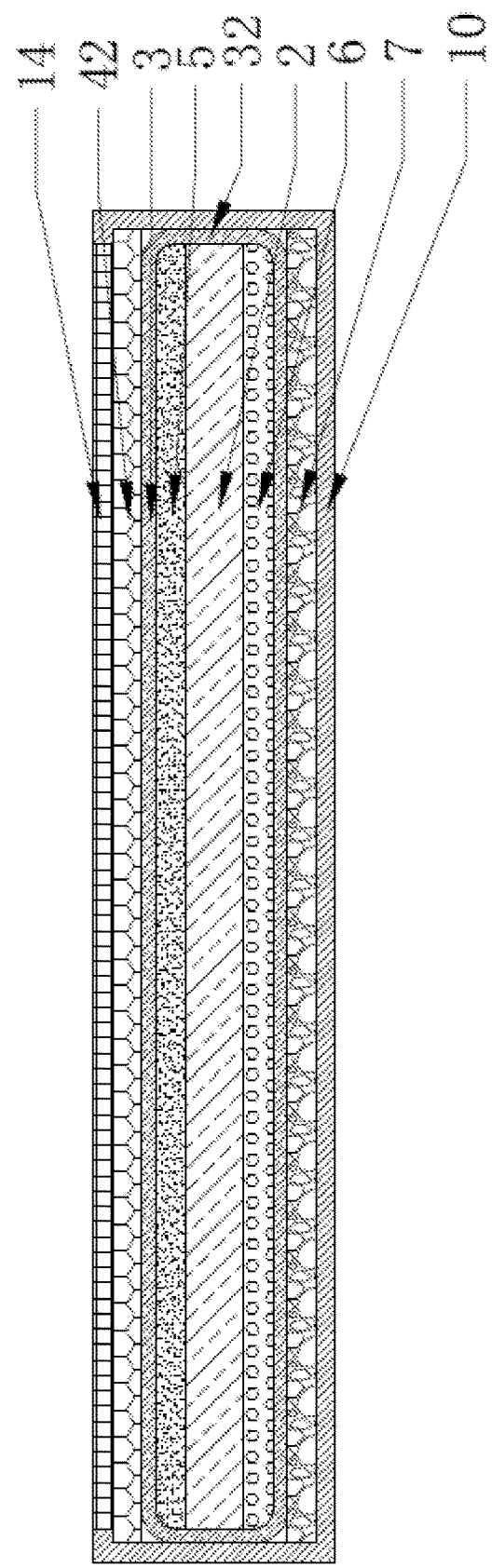
FIG. 61 shows another sectional view of the air metal fuel cell along direction of FIG. 1A-A, in which the siphon material functions as the air electrode carrier.

FIGS. 47&48 show the basic structure of Membrane, membrane bag, bioactive membrane bag, bioactive membrane 3, for sealing the "Bottom"", "Left", and "Right" of one piece of Membrane 33 and one piece of Septum 34. This type of membrane bag is single-layer & single-face membrane bag.

FIGS. 36&37 show the basic structure of Membrane, membrane bag, bioactive membrane bag, bioactive membrane 3, for sealing the "Bottom", "Left", and "Right" of two pieces of Membrane 33 and one piece of Septum 34. This type of membrane bag is double-layer & single-face membrane bag.

FIGS. 45&46 show the basic structure of Membrane, membrane bag, bioactive membrane bag, bioactive membrane 3, for sealing the "Bottom", "Left", and "Right" of two pieces of Membrane 33 and one piece of Septum 34. This type of membrane bag is three-layer & single-face membrane bag or multi-layer & single-face membrane bag.

(C-5) Daub coatings 35

It consists of some hydrophobic materials as the following: teflon, polyethylene, paraffin wax, lipid esters, vegetable oil, animal oil, oil, kerosene, diesel oil, petrol, vegetable oil, animal oil, cream, butter, cooking oil etc.

Melt one or more of Daub coatings 35 at a certain temperature (there is no need to melt if liquid), spray selectively on the corresponding parts of Membrane 33 in Membrane, membrane bag, bioactive membrane bag, bioactive membrane 3.

Melt one or more of Daub coatings 35 at a certain temperature (there is no need to melt if liquid), fume selectively on the corresponding parts of Membrane 33 in Membrane, membrane bag, bioactive membrane bag, bioactive membrane 3.

Melt one or more of Daub coatings 35 at a certain temperature (there is no need to melt if liquid), ion-coat selectively on the corresponding parts of Membrane 33 in Membrane, membrane bag, bioactive membrane bag, bioactive membrane 3.

Melt one or more of Daub coatings 35 at a certain temperature (there is no need to melt if liquid), adapt the method of vac-ion coating to selectively spay on the corresponding parts of Membrane 33 in Membrane, membrane bag, bioactive membrane bag, bioactive membrane 3.

Melt one or more of Daub coatings 35 at a certain temperature (there is no need to melt if liquid), adapt the method of high voltage ion spraying coating to selectively spay on the corresponding parts of Membrane 33 in Membrane, membrane bag, bioactive membrane bag, bioactive membrane 3.

Melt one or more of Daub coatings 35 at a certain temperature (there is no need to melt if liquid), mechanically brush selectively on the corresponding parts of Membrane 33 in Membrane, membrane bag, bioactive membrane bag, bioactive membrane 3.

Melt one or more of Daub coatings 35 at a certain temperature (there is no need to melt if liquid), artificially brush selectively on the corresponding parts of Membrane 33 in Membrane, membrane bag, bioactive membrane bag, bioactive membrane 3.

Melt one or more of Daub coatings 35 at a certain temperature (there is no need to melt if liquid), soak selectively on the corresponding parts of Membrane 33 in Membrane, membrane bag, bioactive membrane bag, bioactive membrane 3.

Melt one or more of Daub coatings 35 at a certain temperature (there is no need to melt if liquid), adapt synthesis method to compound selectively on the corresponding parts of Membrane 33 in Membrane, membrane bag, bioactive membrane bag, bioactive membrane 3.

Adapt other methods such as depositon and others to melt one or more of Daub coatings 35 at a certain temperature (there is no need to melt if liquid), to produce selectively on the corresponding parts of Membrane 33 in Membrane, membrane bag, bioactive membrane bag, bioactive membrane 3.

The most important point is that one or more of all the above methods can achieve the tight and inseparable connection, to form the unique and original (mixed) new structure and material of Membrane, membrane bag, bioactive membrane bag, bioactive membrane 3 in the present world.

The (mixed) new structure and material of Membrane, membrane bag, bioactive membrane bag, bioactive membrane 3 is the special and effective solution to the many universal problems in the present research and development of metal fuel cell.

The substances that are treated with all the above methods to be painted, coated, fumed, brushed, and compounded on Membrane, membrane bag, bioactive membrane bag, bioactive membrane 3 is called Daub coatings 35.

Daub coatings 35 can also be some substances that easily have affinity and easily soaked with Membrane 33.

Daub coatings 35 can be selectively produced on Membrane, membrane bag, bioactive membrane bag, bioactive membrane 3 through the various methods mentioned above.

The most important point is that Daub coatings 35 treated by the methods connects tightly with Membrane, membrane bag, bioactive membrane bag, bioactive membrane 3, to form an inseparable united accessory structure and materials.

In FIG. 33, Daub coating 35 is painted outside the monolayer membrane bag, and called external coating.

In FIG. 34, Daub coating 35 is painted inside the monolayer membrane bag, and called internal coating.

In FIG. 35, Daub coating 35 is painted both outside and inside the monolayer membrane bag, and called external coating.

In FIGS. 33-35, it seems that Daub coatings 35 is attached to Membrane 33, but the fact is that it is immersed in Membrane 33, in the film holes.

In FIG. 38, Daub coating 35 is painted on the inter-part between the two layers of Membrane 33 of the double-layer membrane bag.

In FIG. 41, Daub coating 35 is painted on the inter-part of the double-layer membrane bag, internal and external parts of the double-layer membrane bag.

In FIG. 42, Daub coating 35 is painted on the inter-part of the double-layer membrane bag and the internal part of the double-layer membrane bag.

In FIG. 43, Daub coating 35 is painted on the inter-part of the double-layer membrane bag, and the external part of the double-layer membrane bag.

(C-6) Daub coating B 36

The structure of Daub coating B 36 is the same with the one of Daub coating 35. The different numbers means there can be one or more membrane layers on Membrane 33 of Membrane, membrane bag, bioactive membrane bag, bioactive membrane 3, that the materials of membrane can also be more than one, and that different materials of membrane can be painted on different faces of Membrane 33 of Membrane, membrane bag, bioactive membrane bag, bioactive membrane 3.

IN FIG. 39, Daub coating B 36 is painted on inter-part between the two layers of Membrane 33 of the double-layer membrane bag as a second one after Daub coating 35 is painted on the same part.

In FIG. 40, Daub coating B 36 is painted on inter-part between the two layers of Membrane 33 of the double-layer membrane bag and on Membrane 33 inside Membrane, membrane bag, bioactive membrane bag, bioactive membrane 3, as a second one after Daub coating 35 is painted on the same part.

In FIG. 44, Daub coating B 36 is painted on inter-part between the two layers of Membrane 33 of the double-layer membrane bag as a second one after Daub coating 35 is painted on the same part inside and outside the double-layer membrane.

Component 4, High temperature anti-freezing material for siphon film 4

(A) Structure features: consists of Siphon end of siphon film 41 and Ion terminal of siphon film 42.

The shapes include sheet, strip, rectangle, bar, polygon, circle, oval, triangle etc.

The thickness can be any of the value among 0.001 nm-1 nm, 1 nm-1000 nm, 1 μm-1000 μm, 1 mm-1000 mm, and more than 1 m, or among 1 μm-100 μm. The length, the width, the diameter and the limitation can be any of the value among 0.001 nm-1 nm, 1 nm-1000 nm, 1 μm-1000 μm, 1 mm-1000 mm, and more than 1 m, or among 1 μm-100 μm, and more than 1 m. The shape of its cross-section can be regular rectangle, shown in FIGS. 13&53.

The shape of its cross-section can also be waves, like the shapes of asbestos shingle and caigang watt, shown FIGS. 54 & 55. This shape of High temperature anti-freezing material for siphon film 4 can increase the indirect contact area between Membrane, membrane bag, bioactive membrane bag, bioactive membrane 3 and Air positive electrode 1.

In FIGS. 54 & 55, High temperature anti-freezing material for siphon film 4 appears in the shape of asbestos shingle, so Air electrode positive air inlet device 14, Air electrode carrier 15, and Air electrode catalyst coating 17 on Air positive electrode 1, contacted with it, all change into waves. In this case, the surface area of Air positive electrode 1 is increased. Also Membrane, membrane bag, bioactive membrane bag, bioactive membrane 3 and Electrolyte 7 turn into waves, in which case, the surface area of them is increased as well.

Put Siphon end of siphon film 41, part of High temperature anti-freezing material for siphon film 4, into Positive electrolyte storage chamber 91 which is filled Positive electrolyte 9, and seal the joint of High temperature anti-freezing material for siphon film 4 and Positive electrolyte storage chamber 91 with Positive electrolyte isolation device 92.

The thicknesses, sizes and shapes of High temperature anti-freezing material for siphon film 4 vary based on practical requirements and conditions. The advantages of this structure include the following: maintain the property of Positive electrolyte 9 and be there as solid and semi-solid; connect well to Air positive electrode 1 and Membrane, membrane bag, bioactive membrane bag, bioactive membrane 3 as well as keep the essential boundaries between the two, which greatly reduces and saves the amount of Positive electrolyte 9. That is to say, the cost is decreased, the stable running state of Positive electrolyte 9 is ensured, and the volume and weight of the cell are reduced.

The thicknesses, sizes and shapes of High temperature anti-freezing material for siphon film 4 vary based on practical requirements and conditions, to adjust the quantity and temperature of supplied Positive electrolyte 9, ensuring the stable magnitude of current, to completely solve the problems of too high temperature, inflation, and spontaneous combustion of the cell, ensuring to perfect the running state in normal temperature while in the condition of high and low temperature.

The shape of the cross-section can be half-wavy, which means one side is wavy while the other is straight, shown in FIGS. 56-59. This shape of High temperature anti-freezing material for siphon film 4 can increase the indirect contact area between Membrane, membrane bag, bioactive membrane bag, bioactive membrane 3 and Air positive electrode 1 as well.

In FIGS. 56 & 57, High temperature anti-freezing material for siphon film 4 appears half-wavy, so Air electrode positive air inlet device 14, Air electrode carrier 15, and Air electrode catalyst coating 17 on Air positive electrode 1, contacted to it on the wavy side, all change into waves. In this case, the surface area of Air positive electrode 1 is increased In FIGS. 58 & 59, High temperature anti-freezing material for siphon film 4 appears half-wavy, so Membrane, membrane bag, bioactive membrane bag, bioactive membrane 3 and Electrolyte 7, contacted to it on the wavy side, turn into waves, in which case, the surface area of them is increased as well (B) Running features: High temperature anti-freezing material for siphon film 4 adsorbs Positive electrolyte 9 from Positive electrolyte storage chamber 91 to the interspace between Membrane, membrane bag, bioactive membrane bag, bioactive membrane 3 and Air positive electrode 1 through capillary action, to provide ion channels as well as ion running electrolyte for the positive and negative electrodes of the cell, in order to reduce the liquid pressure caused by the direct soak of membrane bags in Positive electrolyte 9.

The thicknesses, sizes and shapes of High temperature anti-freezing material for siphon film 4 vary based on practical requirements and conditions, to adjust the quantity and temperature of supplied Positive electrolyte 9, ensuring the stable magnitude of current, to completely solve the problems of too high temperature, inflation, and spontaneous combustion of the cell, ensuring to perfect the running state in normal temperature while in the condition of high and low temperature.

(C) Technical features of each component:
Siphon end of siphon film 41 and Ion terminal of siphon film 42

Part of High temperature anti-freezing material for siphon film 4 soaks in Positive electrolyte 9 from Positive electrolyte storage chamber 91, which is called Siphon end of siphon film 41. And another part is clipped between Membrane, membrane bag, bioactive membrane bag, bioactive membrane 3 and Air positive electrode 1, called Ion terminal of siphon film 42

The optional Materials of High temperature anti-freezing material for siphon film 4 can be materials with adsorption capacity, capillary structure, such as polyethylene membrane, polypropylene membrane, glass fiber membrane, PVC membrane, foam nanocarbon, absorbent cotton, linen etc Moreover, High temperature anti-freezing material for siphon film 4 can replace Air electrode carrier 15 on Air positive electrode 1, shown in FIGS. 60-65. Catalyst 16 needs making in High temperature anti-freezing material for siphon film 4 through various methods and techniques including chemical vapor deposition, vapor deposition, ion plating, electrolytic plating, spraying, etc, and precipitation method, electrolytic method, hydrothermal method, normalization method, microwave method, normalization & microwave method, acetylene black restoring potassium permanganate method, manganese nitrate decomposition method, ion plating method, vacuum ion plating method, high temperature vacuum ion plating method, high temperature and high pressure ion plating method, high temperature, high pressure spraying ion plating method, high temperature and high pressure spraying method, mannal spraying method etc.

High temperature anti-freezing material for siphon film 4 is also a type of porous absorptive material. Conductive agent also needs producing in High temperature anti-freezing material for siphon film 4 to replace Air electrode carrier 15 on Air positive electrode 1, through the methods of spray and ion plating. Also, conductive agent, Catalyst 16 and binder mix together to be painted on High temperature anti-freezing material for siphon film 4 through other methods to reduce the cost as well as simplify the structure of the cell. And this kind of substitute structure to replace Air electrode carrier 15 is called Air electrode siphon catalytic conductive integration.

In FIG. 63, High temperature anti-freezing material for siphon film 4, conductive agent, Catalyst 16, and Air electrode positive air inlet device 14 form Air positive electrode 1.

In FIG. 64, High temperature anti-freezing material for siphon film 4, conductive agent, Catalyst 16, Air electrode catalyst coating 17 and Air electrode positive air inlet device 14 form Air positive electrode 1. Air electrode catalyst coating 17 is between High temperature anti-freezing material for siphon film 4 and Air electrode positive air inlet device 14, and the three tightly connect to each other.

In FIG. 65, Air electrode catalyst coating 17, High temperature anti freezing material for siphon film 4, the conductive, Catalyst 16, Air electrode catalyst coating 17 and Air electrode positive air inlet device 14 constitute Air positive electrode 1; Air electrode catalyst coating 17 lies on the two sides of High temperature anti freezing material for siphon film 4; Air electrode catalyst coating 17 is between High temperature anti freezing material for siphon film 4 and Air electrode positive air inlet device 14, and the three are closely linked with each other.

Net structure and fibrillar materials are selected for Air electrode positive collector 11 to export the current of air electrode catalytic and conductive collector constituted by High temperature anti freezing material for siphon film 4, conductive agent, and Catalyst 16.

Noted that: Conductive agent and Catalyst 16 are usually fabricated on Ion terminal of siphon film 42, not on the entire High temperature anti freezing material for siphon film 4 (fabrication on the entire High temperature anti freezing material for siphon film 4 is passable and it is preferred on Ion terminal of siphon film 42).

Component 5 Electrolyte 5
(A) Structural characteristics: solid Electrolyte, Polymer electrolyte or Semi-solid electrolyte
1) Solid electrolyte: such as $\beta$-A1203, zircon alba, ceramic material;
2) polymer electrolyte: selection from such as PEO, PVDF, PMMA or PAN.

3) semi-solid electrolyte: section such as oligosaccharides, polysaccharides, lipids, oils or esters prepared by carbon materials or magnetic materials in organic solvent under the alkalinity environment; selection such as oligosaccharides, polysaccharides, lipids, oils or esters prepared by carbon materials or magnetic materials in organic solvent under the alkalinity environment; selection such as oligosaccharides, polysaccharides, lipids, oils or esters prepared by magnetic materials in organic solvent under the alkalinity environment; and selection such as oligosaccharides, polysaccharides, lipids, oils or esters prepared by carbon materials or conductive agent in organic solvent under the alkalinity environment.

Oligosaccharide: isomaltooligosaccharide, oligosaccharide, dextrin, dextrinos, etc.

Polysaccharides: starch, glycogen, cellulose, agar, chitin etc.

Lipid: triglyceride, phospholipid, wax, terpene etc.

Oil: Vegetable oil or Animal oil such as Soybean oil, sesame oil, peanut oil, sheep oil, fish oil, butter, chicken oil, kerosene, gasoline, diesel etc.

Ester: methyl formate, ethyl acetate, sodium nitrate, sodium stearate etc.

Organic solvent: dimethyl sulfoxide, carbonic ester, methanol, ethanol etc.

Carbon material: activated carbon, graphite etc.

Magnetic material: FeCr(Co), FeCrMo, FeAlC, magnet etc.

Alkali: sodium hydroxide, potassium hydroxide, lithium hydroxide, sodium bicarbonate, potassium bicarbonate etc.

Conductive agent: graphite (ks-6), carbon black (KB), Acetylene black (AB), metal fiber, metal powder, Vapor grown carbon fiber (VGCF), carbon nano-tube CNTs etc.

For example, the following formula can be used to produce Electrolyte 5:

Dextrin: Methanol:Magnet:Butter:Sodium hydroxide=X: Y:Z:W:U . . . etc (greater than 0 each)

The formula and the proportion of electrolyte

| Dextrin (g) | Methanol (g) | Magnet (g) | Butter (g) | Sodium hydroxide (g) |
|---|---|---|---|---|
| 5 | 50 | 27 | 3 | 6 |
| 7 | 70 | 40 | 5 | 8 |
| 8 | 60 | 30 | 6 | 7 |
| 10 | 100 | 60 | 10 | 12 |
| 1 | 9 | 5 | 1 | 2 |

| Dextrin (g) | Methanol (g) | Magnet (g) | Butter (g) | Potassium hydroxide (g) |
|---|---|---|---|---|
| 5 | 50 | 27 | 3 | 6 |
| 7 | 70 | 40 | 5 | 8 |
| 8 | 60 | 30 | 6 | 7 |
| 10 | 100 | 60 | 10 | 12 |
| 1 | 9 | 5 | 1 | 2 |

| Starch (g) | Methanol (g) | Magnet (g) | Butter (g) | Sodium hydroxide (g) |
|---|---|---|---|---|
| 5 | 50 | 27 | 3 | 6 |
| 7 | 70 | 40 | 5 | 8 |
| 8 | 60 | 30 | 6 | 7 |
| 10 | 100 | 60 | 10 | 12 |
| 1 | 9 | 5 | 1 | 2 |

| Starch (g) | Methanol (g) | Magnet (g) | Butter (g) | Otassium hydroxide (g) |
|---|---|---|---|---|
| 5 | 50 | 27 | 3 | 6 |
| 7 | 70 | 40 | 5 | 8 |
| 8 | 60 | 30 | 6 | 7 |
| 10 | 100 | 60 | 10 | 12 |
| 1 | 9 | 5 | 1 | 2 |

Inside the membrane bag, tight binding with Metal fuel 24 and with Membrane, membrane bag, bioactive membrane bag and bioactive membrane 3.

Out of the bag, tight binding with Membrane, membrane bag, bioactive membrane bag and bioactive membrane 3, and with High temperature anti freezing material for siphon film 4.

(B) Operation characteristics: providing an ion channel for the positive and negative poles of the battery, and providing an electrolyte for the ion of the battery negative.

There is no Electrolyte 5 in some battery structures, for instance, in FIGS. 28 & 29.

For example, the following formula can be used to produce Electrolyte 5:

Dextrin:Methanol:Magnet:Butter:Sodium hydroxide=X: Y:Z:W:U . . . etc. (greater than 0 each)

The formula and the proportion of electrolyte Dextrin Methanol (g) Magnet Butter Sodium hydroxide (g)

| Dextrin (g) | Methanol (g) | Magnet (g) | Butter (g) | Sodium hydroxide (g) |
|---|---|---|---|---|
| 5 | 50 | 27 | 3 | 6 |
| 7 | 70 | 40 | 5 | 8 |
| 8 | 60 | 30 | 6 | 7 |
| 10 | 100 | 60 | 10 | 12 |
| 1 | 9 | 5 | 1 | 2 |

| Dextrin (g) | Methanol (g) | Magnet (g) | Butter (g) | Potassium hydroxide (g) |
|---|---|---|---|---|
| 5 | 50 | 27 | 3 | 6 |
| 7 | 70 | 40 | 5 | 8 |
| 8 | 60 | 30 | 6 | 7 |
| 10 | 100 | 60 | 10 | 12 |
| 1 | 9 | 5 | 1 | 2 |

| Starch (g) | Methanol (g) | Magnet (g) | Butter (g) | Podium hydroxide (g) |
|---|---|---|---|---|
| 5 | 50 | 27 | 3 | 6 |
| 7 | 70 | 40 | 5 | 8 |
| 8 | 60 | 30 | 6 | 7 |
| 10 | 100 | 60 | 10 | 12 |
| 1 | 9 | 5 | 1 | 2 |

| Starch (g) | Methanol (g) | Magnet (g) | Butter (g) | Potassium hydroxide (g) |
|---|---|---|---|---|
| 5 | 50 | 27 | 3 | 6 |
| 7 | 70 | 40 | 5 | 8 |
| 8 | 60 | 30 | 6 | 7 |
| 10 | 100 | 60 | 10 | 12 |
| 1 | 9 | 5 | 1 | 2 |

Inside the membrane bag, tight binding with Metal fuel 24 and with Membrane, membrane bag, bioactive membrane bag and bioactive membrane 3.

Out of the bag, tight binding with Membrane, membrane bag, bioactive membrane bag and bioactive membrane 3, and with high temperature anti freezing material for siphon film 4.

(B) Operation characteristics providing an ion channel for the positive and negative poles of the battery, and providing an electrolyte for the ion of the battery negative.

There is no Electrolyte 5 in some battery structures, for instance, in FIGS. 28 & 29.

Component 6 Mandrel 6

Shape: flake-like, similar in shape of Metal fuel 24,

The thickness can be any value within the range of 0.001 nm-1 nm, 1 nm-1000 nm, 1 μm-1000 μm, 1 mm-1000 mm, greater than 1 m or the value within the range of 1 μm-100 μm. The length, width, diameter, and limit can be any value within the range of 0.001 nm-1 nm, 1 nm-1000 nm, 1 μm-1000 μm, 1 mm-1000 mm, greater than 1 m.

Mandrel 6 is with adsorption, so the material with adsorption capacity can be chosen, for instance, polyethylene membrane, polypropylene membrane, glass fiber membrane, PVC membrane. Carbon foam, cotton, flax etc. It is positioned in Membrane, membrane bag, bioactive membrane bag and bioactive membrane 3, adsorbent to Negative electrolyte 8, with one side tight binding with Metal fuel 24 and the other side with Membrane, membrane bag, bioactive membrane bag and bioactive membrane 3, Storing and adsorbing negative electrolyte for the negative to maintain a tight connection between the negative and the electrolyte. It can also play a buffering role, and after the collision and vibration of the battery, the internal components of the battery can be tightly combined. Meanwhile, Negative electrolyte 8 penetrates into Mandrel 6 to meet the requirements of the storage tank, which can be decided according to the actual requirements The advantage of this structure is that it can maintain the properties of Negative electrolyte 8, which exists in solid or semi-solid form, and has very good fusion connection to Electrolyte 5, at the same time, maintain the basic boundaries to Electrolyte 5.

In some battery structures, there is no Mandrel 6, for example, FIG. 22, FIG. 23, FIG. 26, FIG. 27, FIG. 28 and FIG. 29.

Component 7 Shockproof buffer layer 7

Shape: flake-like, similar in shape of Membrane, membrane bag, bioactive membrane bag and bioactive membrane 3.

The thickness can be any value within the range of 0.001 nm-1 nm, 1 nm-1000 nm, 1 μm-1000 μm, 1 mm-1000 mm, greater than 1 m, or the value within the range of 1 μm-100 μm. The length, width, diameter, and limit can be any value within the range of 0.001 nm-1 nm, 1 nm-1000 nm, 1 μm-1000 μm, 1 mm-1000 mm, greater than 1 m.

With a certain degree of softness, flexibility, for instance, options like rubber, sponge, shock absorbing rubber, foam board, spring, etc. Positioned between Membrane, membrane bag, bioactive membrane bag and bioactive membrane 3 and battery casing and support fixing device, it can maintain tight connection of various components of the battery. When the battery vibrates, the internal components of the battery are tightly combined, so as to prevent sudden blockout or current change. In some battery structures, Shockproof buffer layer 7 can be chosen, for example, FIG. 22 and FIG. 23.

Component 8 Negative electrolyte 8

Negative electrolyte 8: providing an ion channel for the positive and negative poles of the battery, and providing the electrolyte for the ion of the battery to operate. Positioned in Membrane, membrane bag, bioactive membrane bag and bioactive membrane 3, and partially stored in Mandrel 6. It has no chemical reaction with Metal fuel 24, and also can protect it from being corroded by other materials. In some battery structures, Negative electrolyte 8 may not be required, for example, when around the negative fuel is the ionic solid electrolyte, thus, Electrolyte 8 can be disused or can be used accordingly, which shall be determined and designed according to the actual needs and conditions of the battery.

For example, aluminum metal—Negative electrolyte 8 can be: methanol sodium hydroxide solution, methanol potassium hydroxide solution, methanol lithium hydroxide solution, ethanol sodium hydroxide solution, ethanol potassium hydroxide solution, ethanol lithium hydroxide solution etc.

| methanol sodium hydroxide solution (%) | methanol potassium hydroxide solution (%) | methanol lithium hydroxide solution (%) |
| --- | --- | --- |
| 5 | 5 | 5 |
| 6 | 6 | 6 |
| 7 | 7 | 7 |
| 8 | 8 | 8 |
| 9 | 9 | 9 |
| 10 | 10 | 10 |
| 11 | 11 | 11 |
| 12 | 12 | 12 |
| 13 | 13 | 13 |
| 14 | 14 | 14 |

| ethanol sodium hydroxide solution (%) | ethanol potassium hydroxide solution (%) | ethanol lithium hydroxide solution (%) |
| --- | --- | --- |
| 5 | 5 | 5 |
| 6 | 6 | 6 |
| 7 | 7 | 7 |
| 8 | 8 | 8 |
| 9 | 9 | 9 |
| 10 | 10 | 10 |
| 11 | 11 | 11 |
| 12 | 12 | 12 |
| 13 | 13 | 13 |
| 14 | 14 | 14 |

The combination of the electrolyte formula and Metal fuel 24, Mandrel 6 and Electrolyte 5 is the exclusive invention and innovation of our company, in which Mandrel 6 is not necessary but it is better and more ideal to have Mandrel 6, so is Electrolyte 5.

Negative electrolyte 8 can be an alkaline electrolyte, an acidic electrolyte, a neutral electrolyte, an organic electrolyte, etc.

For example: the alkaline electrolyte can be sodium hydroxide, potassium hydroxide, lithium hydroxide, sodium bicarbonate, calcium hydroxide, aluminum hydroxide, zinc hydroxide, sodium methoxide, potassium methoxide and other inorganic alkali or Weak base organic base to prepare a certain concentration of Negative electrolyte 8 with organic solvent (ethanol, methanol, acetonitrile, dimethyl sulfoxide, carbonic ester, etc.)

For example: acid electrolyt can be formic acid, acetic acid and other organic or inorganic weak acid to prepare a certain concentration of Negative electrolyte 8 with organic solvent (ethanol, methanol, acetonitrile, dimethyl sulfoxide, carbonic ester, etc.)

For example: neutral electrolyte can be sodium chloride, sodium fluoride, sodium iodide, potassium chloride, potassium fluoride, potassium iodide and some salt to prepare a certain concentration of negative electrolyte with organic solvent (ethanol, methanol, acetonitrile, dimethyl sulfoxide, carbonic ester, etc.) Negative electrolyte 8 can also be metal halide to prepare a certain concentration of Negative electrolyte 8 with quaternary ammonium salt. Metal halide can be, for example, aluminum chloride, ferric chloride, zinc chloride, sodium chloride, sodium fluoride, sodium iodide, potassium chloride, fluoride potassium, potassium iodide, etc.

The choice of Negative electrolyte 8 should be decided and designed according to the actual requirements and conditions of the battery.

Component 9 Positive electrolyte 9

Positive electrolyte 9: providing an ion channel for the positive and negative poles of the battery, and providing an electrolyte for the operation of the positive of the battery, positioned in Positive electrolyte storage chamber 91 and High temperature anti freezing material for siphon film 4.

Positive electrolyte 9 can be an alkaline electrolyte, an acidic electrolyte, a neutral electrolyte, an organic electrolyte, etc.

For example: the alkaline electrolyte can be sodium hydroxide, potassium hydroxide, lithium hydroxide, sodium bicarbonate, calcium hydroxide, aluminum hydroxide, zinc hydroxide, sodium methoxide, potassium methoxide and other inorganic alkali or weak base organic base to prepare a certain concentration of Positive electrolyte 9 with organic solvent (ethanol, methanol, acetonitrile, dimethyl sulfoxide, carbonic ester, etc.)

For example: acid electrolyt can be formic acid, acetic acid and other organic or inorganic weak acid to prepare a certain concentration of Positive electrolyte 9 with organic solvent (ethanol, methanol, acetonitrile, dimethyl sulfoxide, carbonic ester, etc.)

For example: neutral electrolyte can be sodium chloride, sodium fluoride, sodium iodide, potassium chloride, potassium fluoride, potassium iodide and some salt to prepare a certain concentration of Positive electrolyte 9 with organic solvent (ethanol, methanol, acetonitrile, dimethyl sulfoxide, carbonic ester, etc.) Positive electrolyte 9 can also be aluminum chloride to prepare a certain concentration of Positive electrolyte 9 with quaternary ammonium salt.

The choice of Positive electrolyte 9 should be decided and designed according to the actual requirements and conditions of the battery.

In the existing air metal fuel, the above-mentioned use of Positive electrolyte 9 can be only used in the air zinc battery, such as in a micropower disposable metal air zinc battery; in especial, in the use of high power series parallel air metal fuel cells in the experiment, the self discharge, the high battery temperature, expansion, spontaneous combustion and other global problems still can not be avoided. However, our method to combine Positive electrolyte 9 with High temperature anti-freezing material for siphon film 4 can effectively solve the unavoidable and global problems above-mentioned.

The new structure to combine Positive electrolyte 9 with High temperature anti-freezing material for siphon film 4 has the advantages of maintaining the liquid property of Positive electrolyte 9, which exists in the form of a solid state and a semi-solid state, and being well connected with Air positive electrode 1, Membrane, membrane bag, bioactive membrane bag and bioactive membrane 3, at the same time, maintaining the basic boundaries to Air positive electrode 1, Membrane, membrane bag, bioactive membrane bag and bioactive membrane 3, which not only greatly reduces and save the amount of Positive electrolyte 9, reducing the cost, but also stabilizes the running state of the electrolyte, reducing the volume and the weight of the battery.

More importantly, it is effective to control and adjust the supply quantity of Positive electrolyte 9, and simultaneously control and regulate the operating temperature of the battery, and control the stability of the current. And the problems of high temperature, expansion and spontaneous combustion of the battery are completely solved under the condition that Membrane, membrane bag, bioactive membrane bag and bioactive membrane 3 are matched to ensure that the battery to improve the operating state in normal temperature, in the state of high and low temperature Positive electrolyte storage chamber 91: for storing Positive electrolyte 9, a hollow cavity in shape of cuboid, cube, cylinder, sphere and other shapes, with at least two openings, One of which is the inlet opening of Siphon end of siphon film 41, which is used for adsorbing Positive electrolyte 9, which is then adsorbed to the ion end of the siphon membrane, and the other is an supply opening of Positive electrolyte 9.

Positive electrode storage chamber 91 can be connected with the battery, so that the battery shell and the supporting fixing device can be shared with the other components of the battery, and it can also be separated from the battery or two or more cells share one Positive electrolyte storage chamber 91.

In order to prevent leakage of Positive electrode 9 from the two openings in Positive electrolyte storage chamber 91, a plurality of adsorbing materials can be filled in Positive electrode storage chamber 91 to fix Positive electrode 9 on the adsorbing material, choice: sponge, absorbent cotton, foam carbon nano materials, glass fiber, etc. and the materials used: ABS, polyethylene, polypropylene, PVC, PVC, alloy, metal etc.

Positive electrolyte isolation device 92: Positive electrode storage chamber 91 is provided with an inlet for the siphon end of the siphon film, and in order to prevent the leakage of the electrolyte from the opening and Siphon end of the siphon film 41, a positive electrode electrolyte isolation device is arranged, which will not affect the adsorption capacity of the siphon end of the siphon film, and is a sealing device which can be sealed rubber ring, PTFE sealing rubber ring, graphite sealing mud, etc.

Positive electrolyte storage chamber access channel 93: an opening on Positive electrolyte storage chamber 91, which is used for supplementing the positive electrode electrolyte, and also can be used for discharging Positive electrolyte 9. A switch is arranged on Positive electrolyte storage chamber access channel 93, which is on when supplementing the positive electrode electrolyte and off when finishing. It is the same when discharging Positive electrolyte Component 10 Battery shell and supporting fixing device 10

Combining the various components of the battery tightly and effectively, and maintaining the stability of the environment of each component of the battery, so as to ensure the stable and effective discharge of the cell.

Component 11 Shell of air metal fuel cell or battery pack and ventilation device A: Air inlet and outlet device of single cell or series & and parallel battery pack without shell:

Applied to the power supply, the residential area, the power plant and the large power plant.

Combined into a battery pack, not limited to one piece through a series of 102 parallel batteries, and then placed in a family chamber, a residential building, a power plant, or a large power plant.

Figure 91:
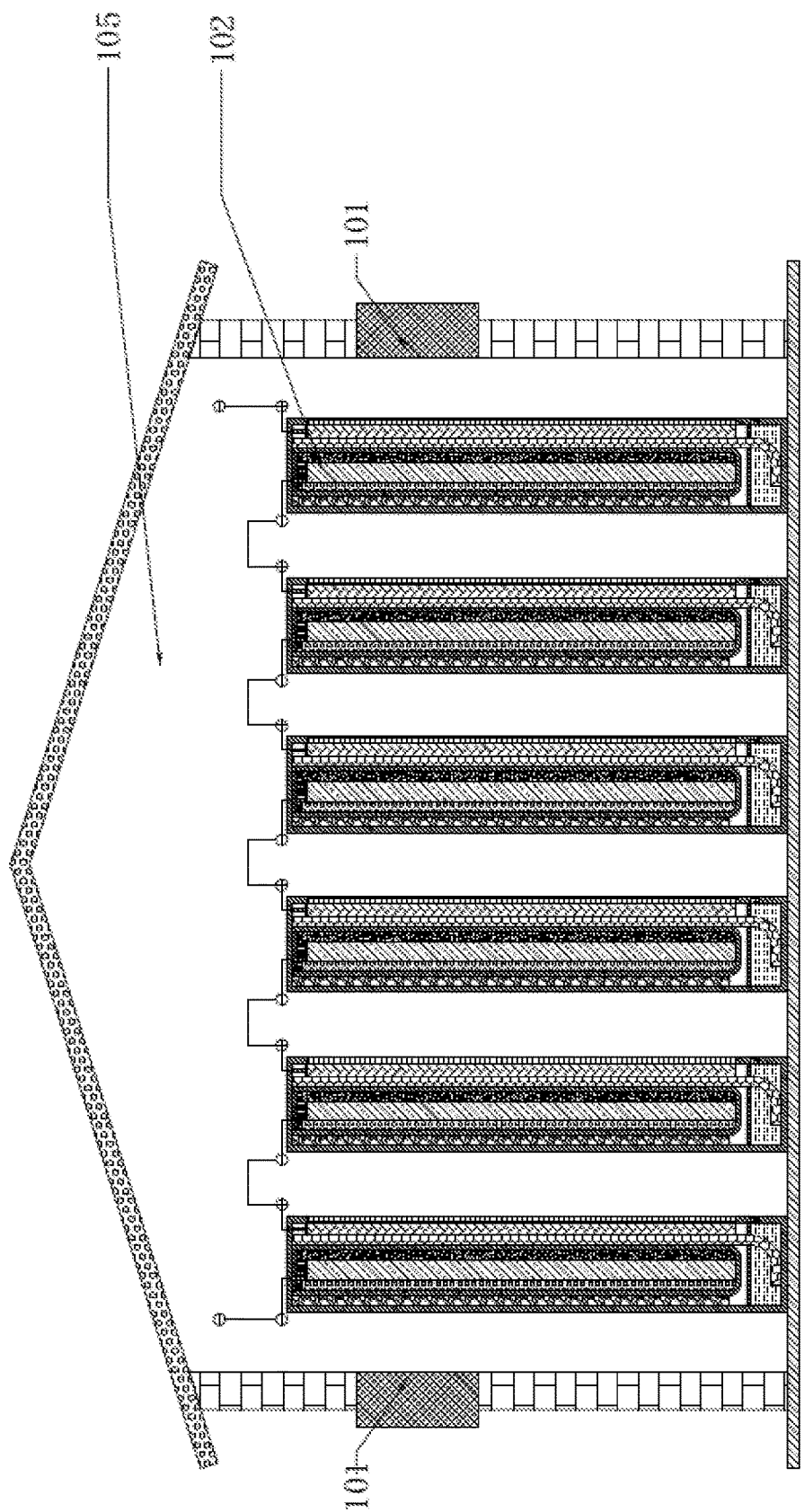
FIG. 91 shows another front view of the battery pack.

As is shown in FIG. 91: the six groups of Monocell 102 are connected in series to form a battery pack, which is installed in Plant 105. An Air inlet and outlet device 101 is arranged on the window, the air inlet and the door of Plant 105, and Air inlet and outlet device 101 is an air filtering device. Air inlet and outlet device 101 is as follows: air filter element, air purifier, air filter membrane, etc. Air inlet and outlet device 101 can filter impurities in the air, dust and other solid substances, to prevent impurities in the air, dust and other solid substances into Pant 105, and the air inside and outside Plant 105 can freely pass through Air inlet and outlet device 101. The free entry and exit of air can provide sufficient oxygen for the normal operation of a single cell in the battery pack in Plant 105.

B: Air inlet and outlet device of single cell or series & parallel battery pack with shell:

According to the actual demand and the change of the conditions, the high efficiency battery group which is used to control and close and open the carbon dioxide inlet and outlet channel in a single cell or a series parallel way is effectively controlled through Air inlet and outlet device 101 on the shell. The main purpose of closing and opening the carbon dioxide inlet and outlet channel is to allow the carbon dioxide to freely enter and exit in Air inlet and outlet device 101 of the battery or the battery pack when the battery works.

At this point, a small amount of carbon dioxide has a few effects on the running battery or battery pack, but in the long term without using, if carbon dioxide pass freely through the shell of Air inlet and outlet device 101 on the battery or battery pack, the long time exposure between carbon dioxide and battery electrolyte will cause electrolyte damage, such as curing, neutralization, carbonation. Therefore, we can solve this problem by closing and opening up the carbon dioxide inlet and outlet channel, that is, when the battery works, allow the carbon dioxide in the battery or battery pack to pass freely. When the battery is not put into operation for a long time, Air inlet and outlet device 101 on the outer shell of the battery or the battery pack is completely closed, which will effectively avoid the damage of carbon dioxide to the electrolyte in the battery or battery pack (such as curing, neutralization, carbonation and so on).

The technology can be applied to: electric vehicles, street lamp power supply, cameras, cameras, personal desktop lighting, table lamps, mobile phone charging device, marine lighthouse, night lights etc.

The technique is not suitable for a single cell or a series of high power battery stacks working for long periods without stopping. Either he import or the export of the battery or the battery pack, is a dual-purpose, that is, import and export are the same with few distinctions.

FIG. 84, FIG. 85, FIG. 89, and FIG. 86 show a battery pack consisting of three single cells. The battery pack is arranged in the outer Shell 103, the "Front" and the "Back" of which are provided with an air inlet and outlet device which can automatically open and close automatically according to the actual demand and the change of the conditions.

As is mentioned above, Air inlet and outlet device 101 which can automatically turn on and turn off automatically according to the change of the actual demand and the condition is composed of three parts: Filter device 1011, Switch device 1012 and Switch control device 1013. For the operation of the three parts described as below.

1) When the battery is operated, Switch device 1012 is opened under the control and the action of Switch control device 1013 and the outside air is filtered through Filter device 1011, and then enters the battery or the battery pack in Shell 103 through an open Switch device 1012. At the same time, the air in Shell 103 passes through Switch device 1012, and then passes through the filter unit to the outside air through Filter device 1011.

2) When the battery is not working and placed for a long time: under the control and the function of Switch control device 1013, Switch device 1012 is closed, and the outside air can not enter into the battery or the battery pack in Shell 103. The air inside Shell 103 cannot export outside.

Thus, on the one hand, the free movement of air can provide sufficient oxygen for the normal operation of a single battery in the battery pack, on the other hand, it can effectively avoid the damage of carbon dioxide to the electrolyte in the battery or battery pack (such as solidification, neutralization, carbonation, etc.)

Filter device 1011 is an air filtering device, which can filter the solid matter such as impurities and dust in the air to prevent them from entering into the battery pack.

Switch device 1012 is a channel which is automatically opened and closed on Air inlet and outlet device 101 according to the actual demand and the change of the condition, which is performed under the control and function of Switch control device 1013.

Control device 1013 is a control and power device of Switch device 1012, which controls the opening and closing of Switch device 1012 according to the change of actual requirements and conditions. The power of Switch control device 1013 is derived from the power of a single battery or battery pack, and can also be derived from the external power or the manual power.

FIG. 84 shows the front view of an air fuel cell battery pack, in which there are the orientations of the battery pack, "Front", "Left", "Right", "Up", and "Down"".

In FIG. 84, the "Front" of the battery pack is provided with an air inlet and outlet device 101 which can automatically turn on and off automatically according to the actual requirements and conditions.

In FIG. 84, the "Up" of the housing 103 can be open to facilitate the installation of a single cell to the housing 103.

FIG. 85 shows a rear view of the air fuel cell stack, where the battery pack has the orientation of the "Back", "Left", "Right", "Up", and "Down".

In FIG. 85, the "Back" of the battery pack is provided with Air inlet and outlet device 101 which can automatically turn on and off automatically according to the actual requirements and conditions.

Figure 89:
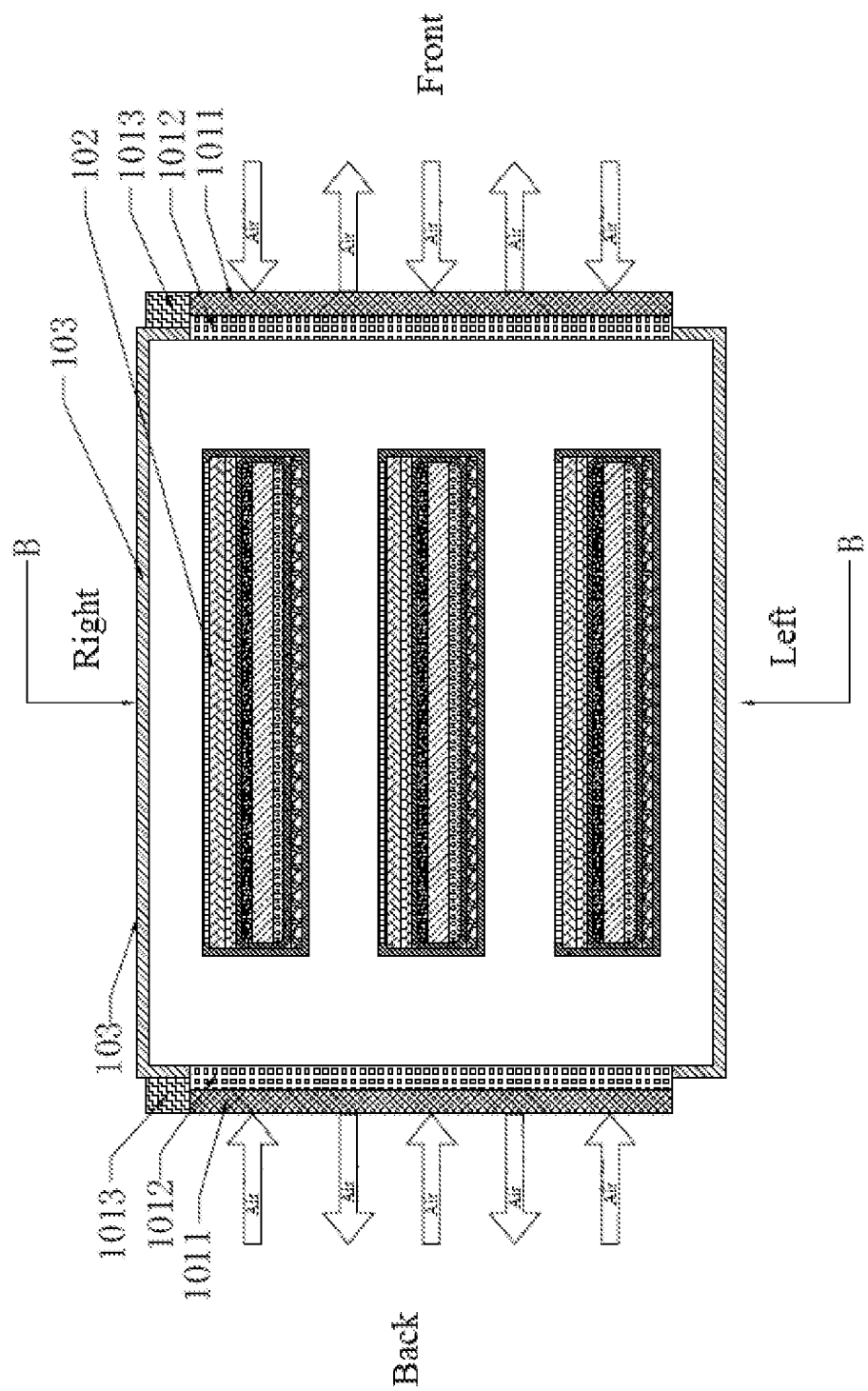
FIG. 89 shows a sectional view of FIG. 84 along direction of A-A.
Figure 90:
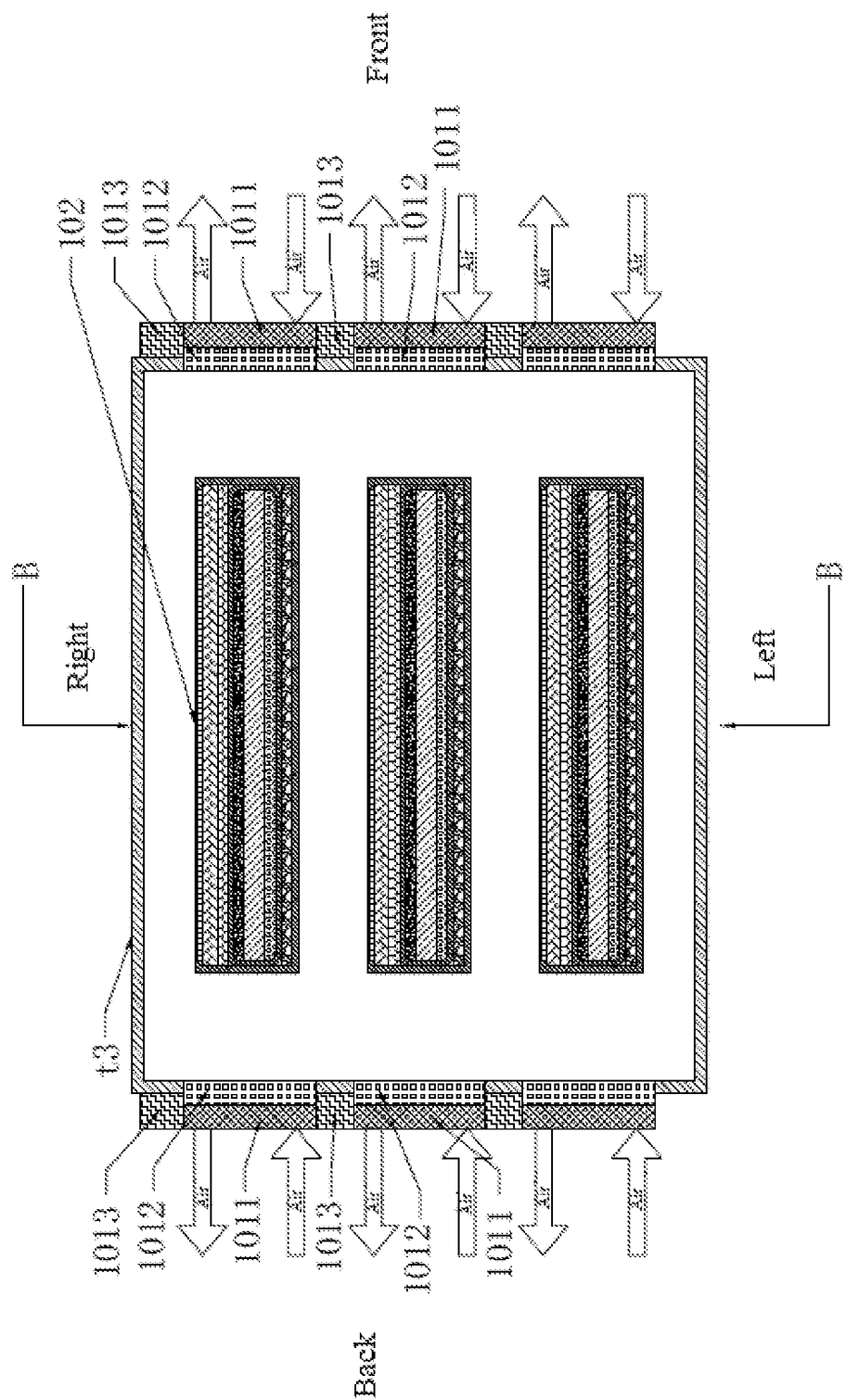
FIG. 90 shows a sectional view of FIG. 87 along direction of A-A.

FIG. 89 shows a sectional view of FIGS. 84 & 85 in the A-A direction, with the orientation of the battery pack, "Front", "Back", "Left", and "Right""

In FIG. 89, the "Front" of the battery pack is provided with an air inlet and outlet device 101 which can automatically turn on and off automatically according to the actual requirements and conditions.

The "Back" of the battery pack is also provided with Air inlet and outlet device 101 which can automatically turn on and off automatically according to the actual requirements and conditions. The battery pack is composed of three single cells. In practice, according to the actual needs and conditions, the battery pack can not be limited to the composition of the three single cells.

Figure 86:
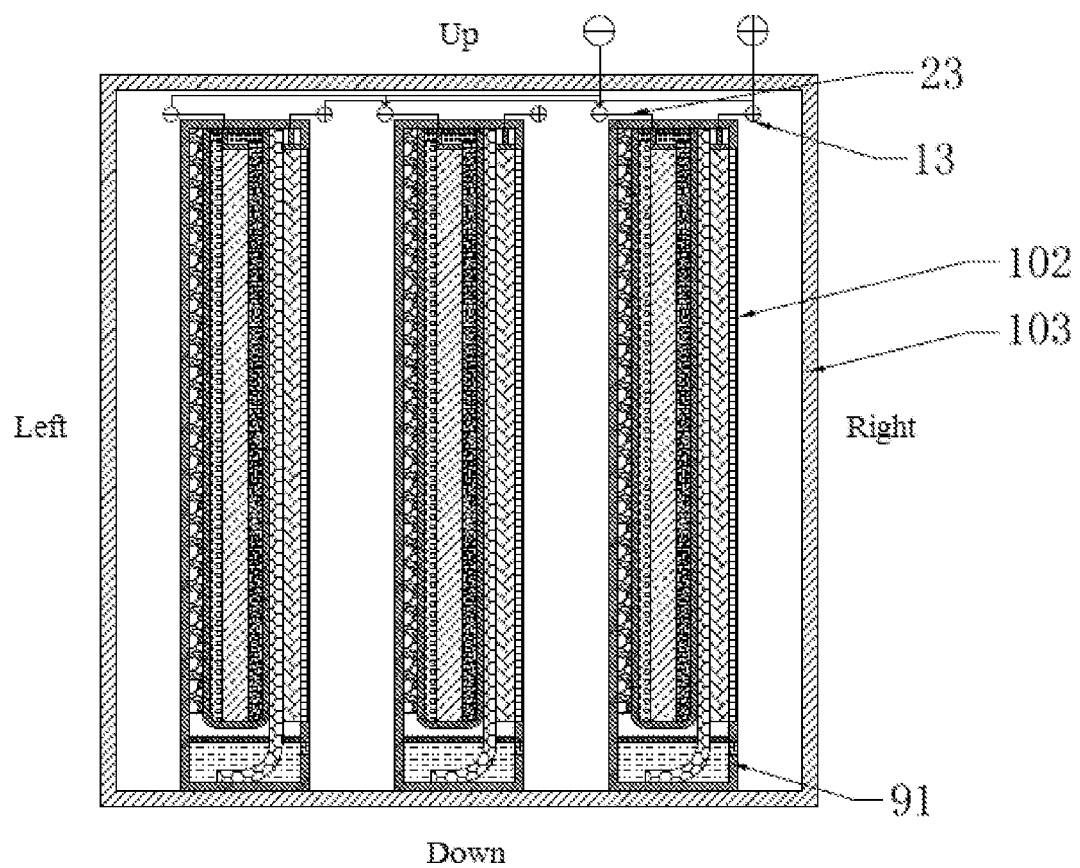
FIG. 86 shows a sectional view of FIG. 89 along direction of B-B.

FIG. 86 shows a sectional view of FIG. 89 in the direction of the B-B, with the orientation of the battery pack, "Up", "Down", "Left" and "Right". In FIG. 86, the battery pack is composed of three single cells connected in parallel, and the three single batteries are fixed on the inner bottom surface of the battery housing. The battery pack is composed of three single cells. In practice, according to the actual needs and conditions, the battery pack can not be limited to the composition of the three single cells.

In FIG. 87, FIG. 89, FIG. 90, and FIG. 86, three pieces of monocell 102 are connected in parallel to form a battery pack, which is arranged in Shell 103, and the "Front" and "Back" of Shell 103 are provided with Air inlet and outlet device 101 which can automatically turn on and off according to the change of the actual demand and the conditions.

C: A monocell or battery pack effectively preventing and controlling carbon dioxide with a shell According to the actual demand and the change of the condition, Air inlet and outlet device 101 is arranged on Shell 103 of the battery or the battery pack, and an air inlet and outlet device of the utility model is provided with a carbon dioxide isolating film which can effectively prevent the carbon dioxide from passing through. The carbon dioxide isolation film can prevent the carbon dioxide in the air from entering into Shell 103 through Air inlet and outlet device 101, and the other gas components in the air are unrestricted, which can effectively avoid the damage of carbon dioxide to the electrolyte in the battery or the battery pack (such as solidification, neutralization, carbonation, etc), in particular to a monocell or a series of large power battery stacks which are connected in a long term without stopping, such as communication data tower, mine road lighting, tunnel lighting, mobile phone batteries, tablet PCs, notebook computers, field portable power supply, billboards, etc.

In FIG. 84, FIG. 85, FIG. 92, and FIG. 86, three pieces monocell 102 are connected in parallel to form a battery pack, which is arranged in Shell 103, and the front and the back of the shell 103 are provided with Air inlet and outlet device 101 which can effectively prevent the carbon dioxide from passing freely, Air inlet and outlet device 101, which can effectively prevent the carbon dioxide from passing freely, consists of the following two parts:

Filter device 1011, and Carbon dioxide membrane 1014, which function as below.

1) When the battery is operated, the outside air is filtered through the filter device 1011, and then enters the battery or the battery pack in Shell 103 through Carbon dioxide membrane 1014. At the same time, the air in Shell 103 passes through Filter device 1011, and then passes through the filter unit to the outside air through Filter device 1011.

2) When the battery is not working and placed for a long time: due to effective prevention of Carbon dioxide membrane 1014 on Air inlet and outlet device 101, the outside air can not enter into the battery or the battery pack in Shell 103, which can effectively and thoroughly avoid the damage of carbon dioxide to the electrolyte in the battery or battery pack (such as solidification, neutralization, carbonation, etc.)

Filter device 1011 is an air filtering device, which can filter the solid matter such as impurities and dust in the air to prevent them from entering into the battery pack. Carbon dioxide membrane 1014 is a selective membrane, which can effectively prevent the carbon dioxide from passing through the air, and the other gas components in the air are not restricted, and can freely enter and exit Shell 103.

FIG. 84 shows the front view of an air fuel cell battery pack, in which there are the orientations of the battery pack, "Front", "Left", "Right", "Up", and "Down"".

In FIG. 84, the "Front" of the battery pack is provided with Air inlet and outlet device 101 which can effectively prevent carbon dioxide from passing freely.

FIG. 85 shows a rear view of the air fuel cell stack, where the battery pack has the orientation of the "Back", "Left", "Right", "Up", and "Down".

In FIG. 85, the "Back" of the battery pack is, as well, provided with an air inlet and outlet device 101 which can effectively prevent carbon dioxide from passing freely.

Figure 92:
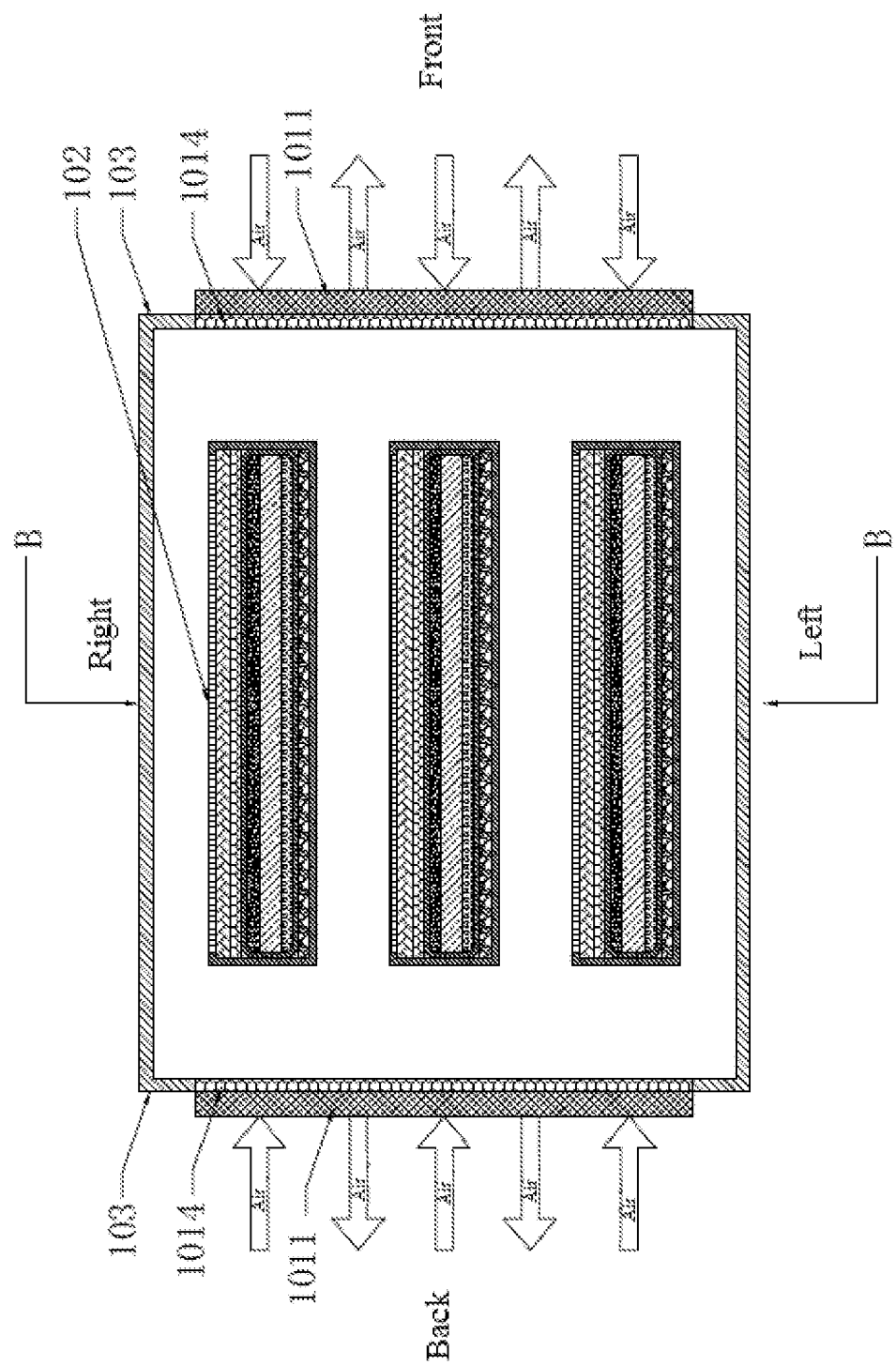
FIG. 92 shows a sectional view of FIG. 84 along direction of A-A.
Figure 93:
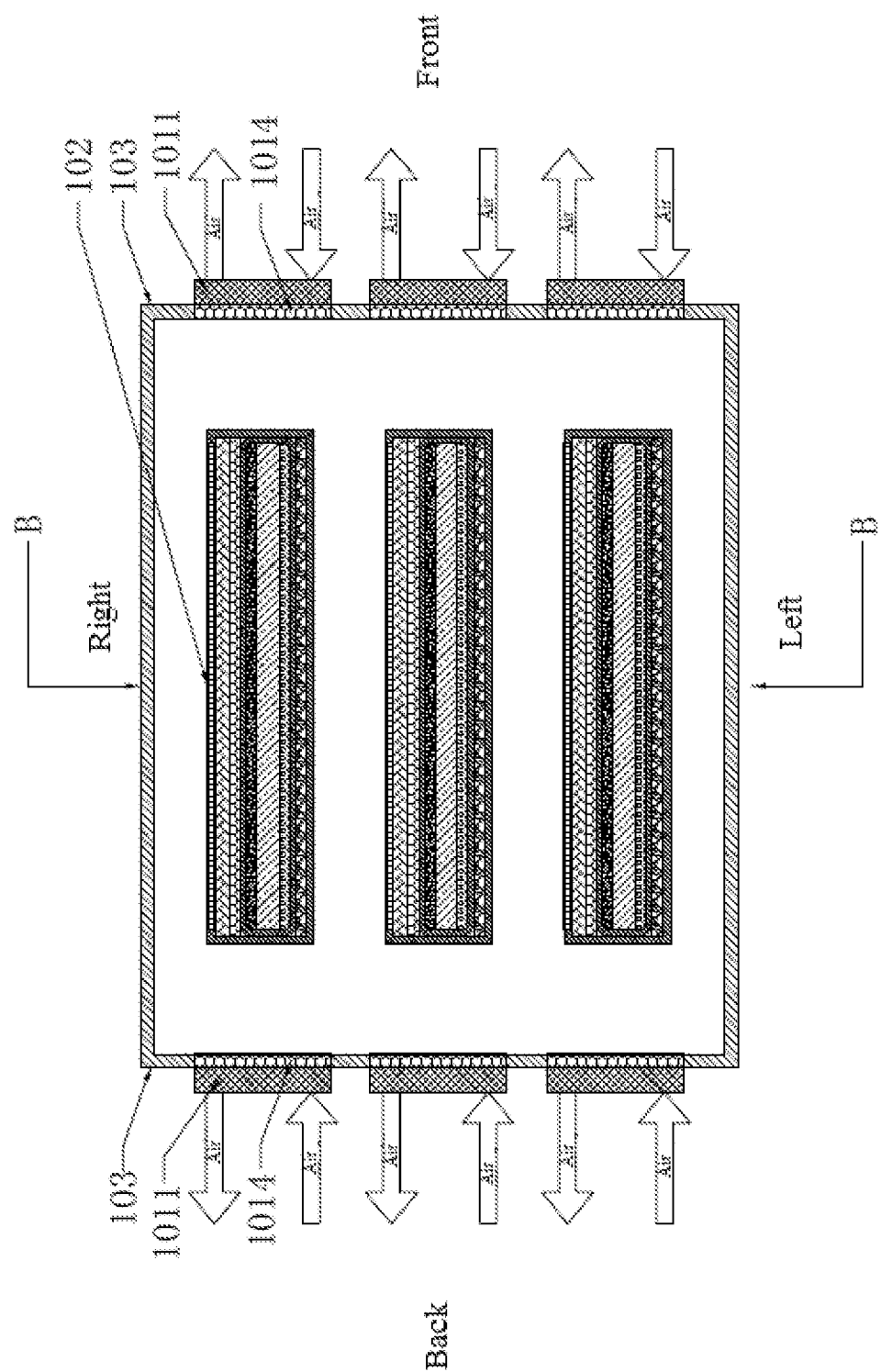
FIG. 93 shows another sectional view of FIG. 84 along direction of A-A.

FIG. 92 is a sectional view of FIG. 84 and FIG. 85 in the A-A direction, with the orientation of the battery pack, "Front", "Back", "Left", and "Right""

In FIG. 89, the "Front" of the battery pack is provided with Air inlet and outlet device 101 which can effectively prevent carbon dioxide from passing freely.

The "Back" of the battery pack is also provided with Air inlet and outlet device 101 which effectively prevent carbon dioxide from passing freely.

FIG. 86 shows a sectional view of FIG. 89 in the direction of B-B, with the orientation of the battery pack, "Up", "Down", "Left" and "Right". In FIG. 86, the battery pack is composed of three single cells connected in parallel, and the three single batteries are fixed on the inner bottom surface of the battery housing. The battery pack is composed of three single cells. In practice, according to the actual needs and conditions, the battery pack can not be limited to the composition of the three single cells.

In FIG. 87, FIG. 89, FIG. 93, and FIG. 86, three pieces of monocell 102 are connected in parallel to form a battery pack, which is arranged in Shell 103, and the "Front" and the "Back" of Shell 103 are provided with Air inlet and outlet device 101 which can automatically turn on and off according to the change of the actual demand and the conditions.

D: A monocell or battery pack with solid or solid oxygen as a positive electrode with a shell but with an inlet or outlet device According to the actual needs and conditions, effectively controlling and effectively deploying pure oxygen, such as solid oxygen, Liquid oxygen as a monocell or battery positive material is used in places where the air is thin, where oxygen is lacking or no oxygen is available, such as the atmosphere, outer space, the deep sea, or underwater and sub space, and also used in aerobic normal air environment.

Pure oxygen, including but not limited to liquid oxygen, solid oxygen, gaseous oxygen, gaseous oxygen, etc.

Figure 94:
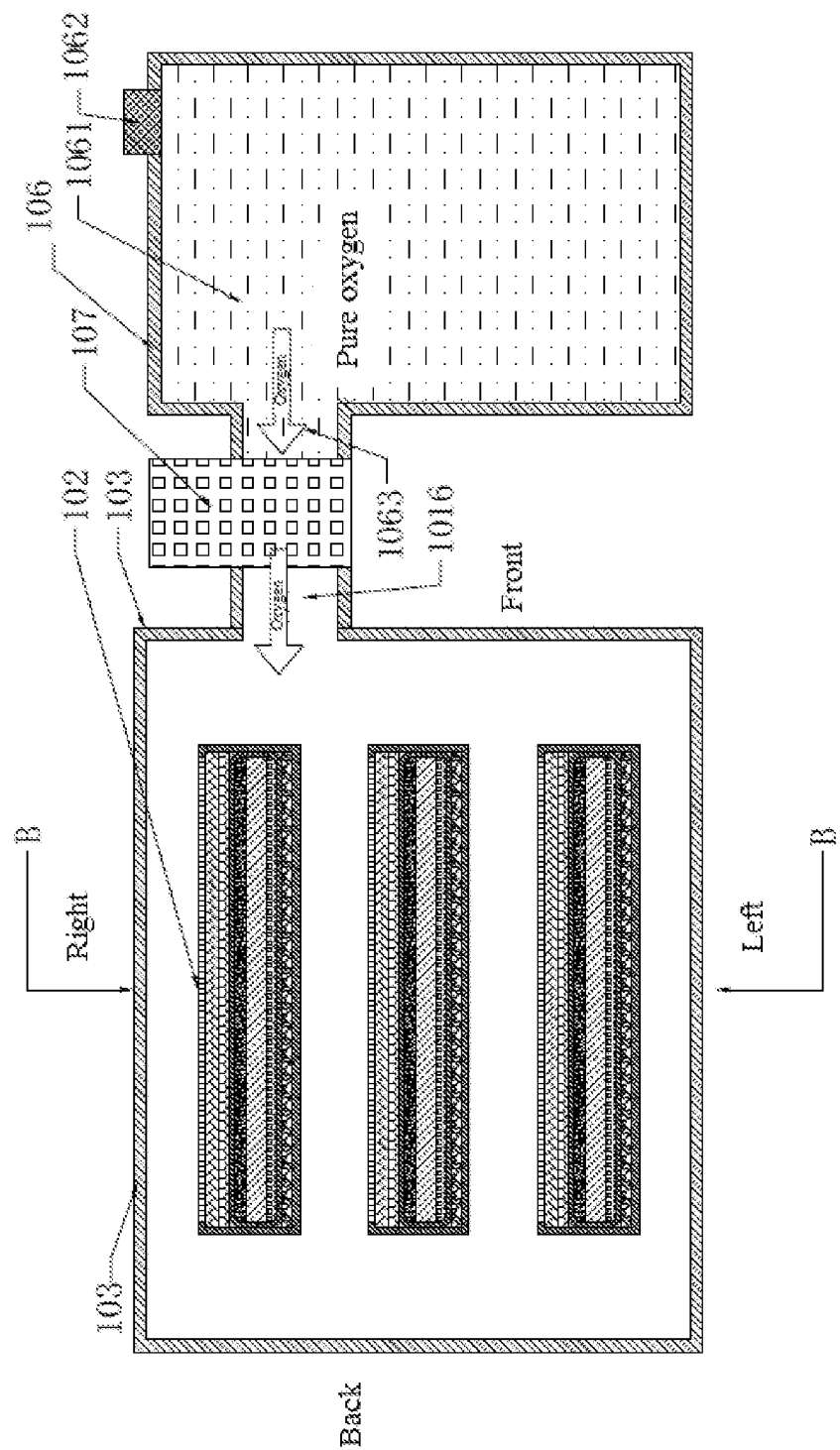
FIG. 94 shows the type of metal fuel battery pack with oxygen storage as its oxygen supply mode.

FIG. 94 & FIG. 86 describe a metal fuel (bio) cell with pure oxygen as a positive electrode material.

The battery or the battery pack is divided into three parts, one part is the storage part of the positive electrode material, one is a power generating part, the third is the connecting part of the storage part and the power generating part.

The storage part of the positive electrode material is composed of Pure oxygen storage tank 106, Aerator 1062, Oxygen supply device 1063 and Pure oxygen 1061.

The power generation part is composed of Shell 103, monocell 102, and Pure oxygen device 1016.

The connecting part of the storage part and the power generating part are composed of a voltage regulating Switch device 107.

In the storage part of the positive electrode material: Pure oxygen storage tank 106 is used to store Pure oxygen 1061, Pure oxygen 1061 is added to Pure oxygen storage tank 106 through Aerator 1062, and the pure oxygen in Pure oxygen storage tank 106 is supplied to the power generation part through Oxygen supply device 1063, the positive material is used as a power generating part to participate in power generation.

In the power generation section: the 3 groups of single cells are composed of a series of parallel batteries, which is mounted in Shell 103 that is provided with Pure oxygen device 1016, and Pure oxygen device 1016 is connected with Oxygen supply device 1063 on the pure oxygen storage tank through Voltage regulating Switch device 107, and Pure oxygen 1061 in Pure oxygen storage tank 106 is communicated to the power generating part.

Voltage regulating switch device 107 connects the storage part and the power generating part, transferring Pure oxygen 1061 of the storage part to the power generation part through pressure regulation according to the actual demand and the change of the conditions. The positive material is used as a power generating part to participate in power generation.

Pure oxygen storage tank 106 can be set according to the actual requirements and conditions of the appropriate location. The shape, size and volume of Pure oxygen storage tank 106, according to the standard conditions, the actual needs and conditions of the changes, is designed, such as a car and mobile phone Pure oxygen storage tank 106 design are completely different.

The operation of the above three parts:

1. According to the change of actual needs and conditions, Pure oxygen device 1016 on Shell 103 is connected with Oxygen supply device 1063 through Voltage regulating switch device 107 and Voltage regulating switch device 107 is in a completely closed state at the same time;

2. Then, according to the change of actual needs and conditions, Pure oxygen 1061 is added to Pure oxygen storage tank 106 through Aerator 1062.

3. According to the change of actual needs and conditions, Voltage regulating switch device 107 is switched to adjust the relevant the pressure, then oxygen passes through Shell 103 to provide oxygen for Pure oxygen device 1016, and perform the generating for the positive part as a power generating part.

FIG. 86 shows a sectional view of FIG. 94 in the direction of B-B, with the orientation of the battery pack, "Up", "Down", "Left" and "Right". In FIG. 86, the battery pack is composed of three single cells connected in parallel, and the three single batteries are fixed on the inner bottom surface of the battery housing. The battery pack is composed of three monocells. In practice, according to the actual needs and conditions, the battery pack can not be limited to the composition of the three monocells.

In FIG. 86, the "Up" of Shell 103 is open to facilitate the installation of a monocell to Shell 103.

E: A metal fuel cell with a shell that can restrict the entry of other gases while allowing oxygen only to enter a monocell or battery pack of oxygen selective membranes The battery can be provided with a pure oxygen air inlet outside the battery shell, and an oxygen usage condition tester is arranged inside the shell.

For example: for residential power plants, large power plants, home battery packs, special high-power power demands, other tools, etc.

Figure 95:
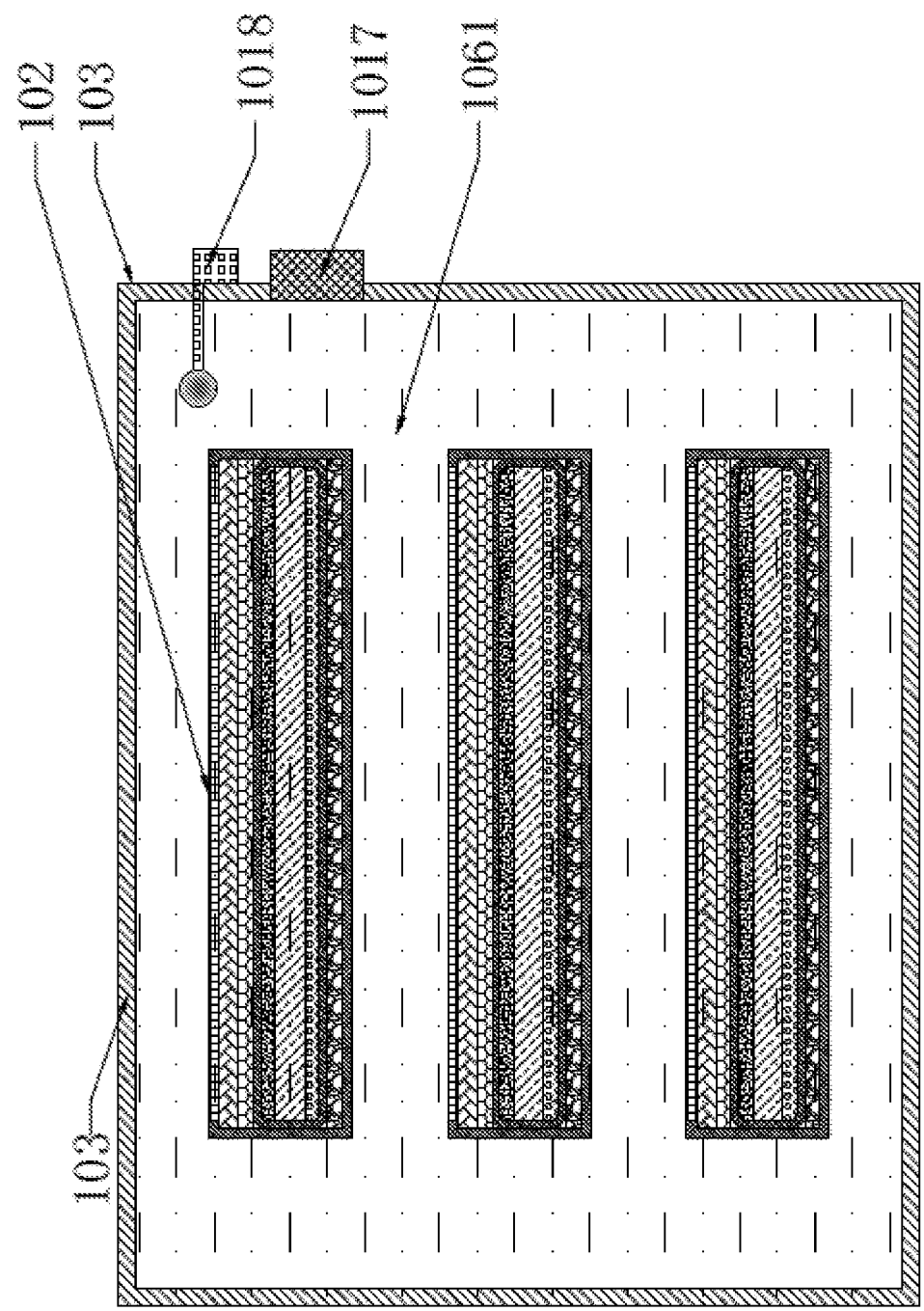
FIG. 95 shows the type of metal fuel battery pack that can test the oxygen in the cell pack.
Figure 96:
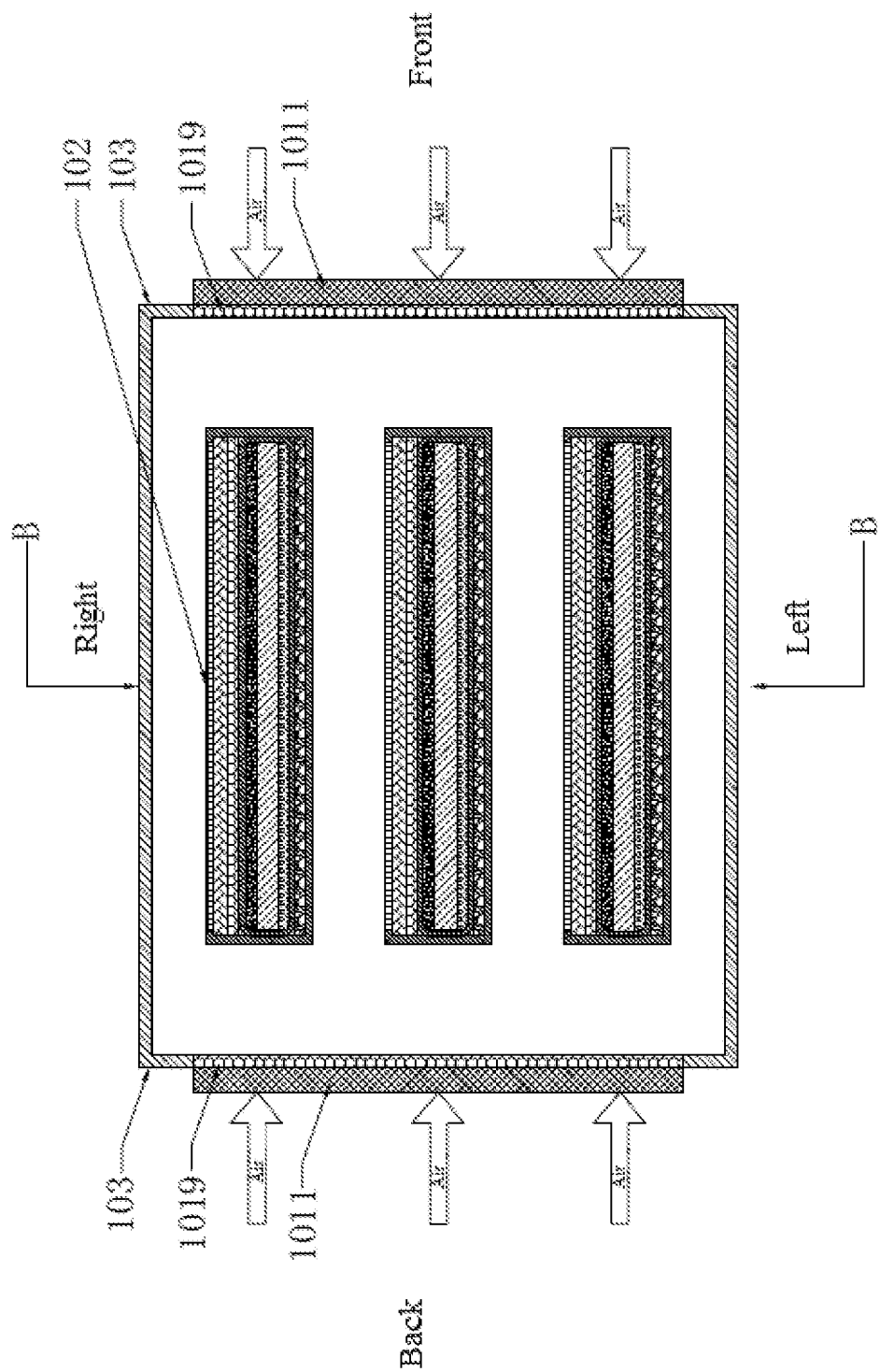
FIG. 96 shows the type of metal fuel battery pack with oxygen selective filtering membrane.

In FIG. 95, a battery pack is composed of three monocells in series and parallel way. The battery pack is arranged in Shell 103, and the shell is provided with Pure oxygen inlet device 1017 and Oxygen condition tester 1018.

Pure oxygen inlet device 1017 is a switching device that can add pure oxygen to Shell 103 through Pure oxygen inlet device 1017. The positive material is used as a power generating part to participate in power generation.

Oxygen condition tester 1018 is a test instrument for the oxygen pressure, temperature, concentration and other parameters in Shell 103, which is used to detect the dynamic state of oxygen in Shell 103. Air inlet and outlet device 101 can restrict the entry of other gases while only allowing oxygen to enter.

Air inlet and outlet device 101, which can effectively prevent carbon dioxide from passing freely, consists of the following two parts: Filter device 1011, Oxygen selective membrane 1019, which function as the following:

The outside air is filtered through Filter device 1011, and then enters the battery or the battery pack inside Shell 103 through Oxygen selective membrane 1019. Oxygen selective membrane 1019 can effectively restrict the other gas into and only allow oxygen to enter, and effectively solves the problem of carbon dioxide on the electrolyte battery or battery in damage (such as curing, neutralization, carbonation etc.).

Figure 97:
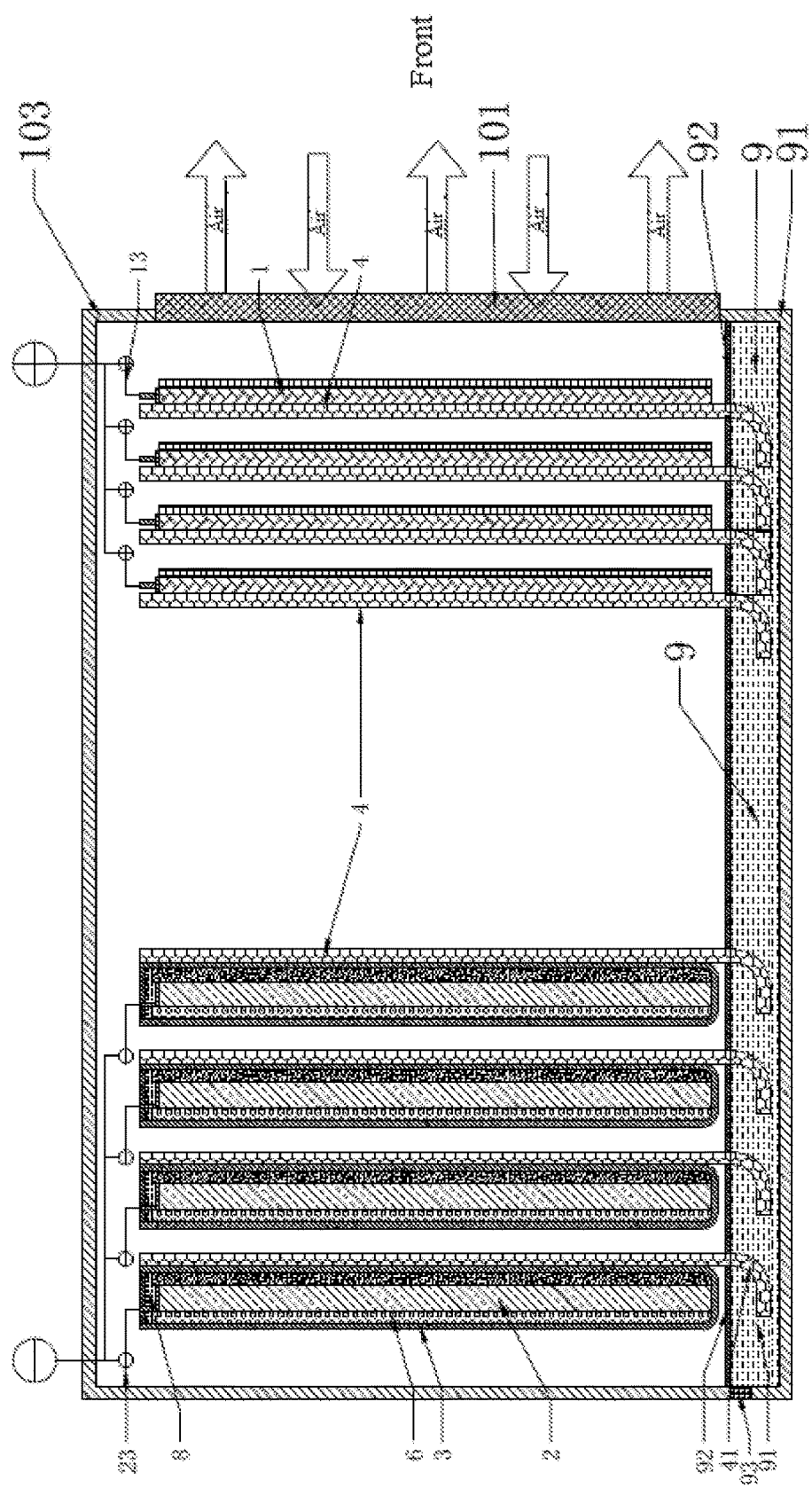
FIG. 97 shows the battery pack that has separate positive electrode and negative electrode.

F. A positive and negative electrode integration and separation metal fuel battery pack with a shell The specific structure is shown in FIG. 97. In FIG. 97, the side surface of Shell 103 is provided with Air inlet and outlet device 101, and Positive electrode electrolyte storage chamber 91 for storing Positive electrode electrolyte 9 is arranged on the bottom surface. Positive electrode storage chamber 91 is located at the bottom of the case, which is made into a piece with its shell, and the whole battery pack uses the same Positive electrode electrolyte storage chamber 91; Positive electrolyte storage chamber 91 is provided with a plurality of openings, each opening corresponding to at least one High temperature anti freezing material for siphon film 4; In FIG. 97, Positive electrolyte storage chamber 91 is provided with 8 openings associated with 8 High temperature anti-freezing materials for siphon film 4. Positive electrode 9 is added and discharged through Positive electrolyte storage chamber access channel 93.

(F-1) The basic structure of the positive electrode integration:

A group or a plurality of groups of Air positive electrodes 1 and a part of Ion terminal of siphon films 42 belonging to High temperature anti-freezing materials for siphon film 4 are tightly adhered together to form a positive electrode unit, and a part of Siphon end of siphon film 41 which is used in High temperature anti-freezing material for siphon film 4 in the positive electrode unit is inserted into the corresponding opening of Positive electrolyte storage chamber 91. The electrolyte in Positive electrolyte storage chamber 91 is adsorbed on the whole High temperature anti freezing material for siphon film 4, and Positive electrode 9 is supplied to the Air positive electrode 1 by diffusion. In the positive unit, a part of Siphon end of siphon film 41 on High temperature anti-freezing material for siphon film 4 is inserted in Positive electrolyte membrane chamber 91 while the positive unit is fixed on Shell 103, adhesive, screws can be used, or in the case of the card slot set directly to a single cell fixed in the slot, and other methods to fix.

According to the change of actual needs and conditions, a group or a plurality of positive electrode units are formed into the positive electrode integration in the corresponding sequence and arrangement, and the corresponding distance space is provided between the positive electrode units, which is helpful to the circulation flow and diffusion of air and pure oxygen. Air positive electrode output circuit 13 of the positive electrode unit is connected with each other through welding, stamping, printing, spraying, super pressure-high temperature spraying, coating, etc. and form the positive electrode of the battery pack.

In FIG. 97, the positive integration consists of 4 positive units.

(F-2) Basic structure of the negative integration:

Negative electrolyte 8, Mandrel 6, Electrolyte 5 and Metal negative electrode 2 are arranged in Membrane, membrane bag, bioactive membrane bag, bioactive membrane 3, or in the middle of the double membrane bag. Electrolyte 5 and Negative electrolyte 8 are bonded with the inner surface film holes of Membrane, membrane bag, bioactive film bag, bioactive film 3, and Metal negative electrode 2 is clamped between Mandrel 6 and Electrolyte 5, tightly adhered and combined. Membrane, membrane bag, bioactive membrane bag, bioactive membrane 3 is sealed by Membrane bag sealing device 31.

One or more Membrane, membrane bag, bioactive membrane bag, bioactive membrane 3 assembled with Mandrel 6, Negative electrolyte 8 and Metal negative electrode 2, are pasted together and closely fixed to a part of Siphon end of siphon film 42 on High temperature siphon anti-freezing material for siphon film 4 to form a negative unit.

A part of Siphon end of siphon film 41 on High temperature siphon anti-freezing material for siphon film 4 in the negative unit is inserted in the corresponding opening part of Positive electrolyte storage chamber 91.

While a part of Siphon end of siphon film 41 on High temperature siphon anti-freezing material for siphon film 4 in the negative unit is inserted Positive electrolyte storage chamber 91, the negative unit is fixed on Shell 103 adhesive, screws can be used, or in the case of the card slot set directly to a single cell fixed in the slot, and other methods to fix.

According to the actual demand and the change of the conditions, a group or a plurality of negative units are formed in the corresponding sequence and arrangement, and the negative unit can be closely stuck and also have the corresponding distance space, which contributes to heat dissipation.

Metal negative output circuit 23 of the negative unit is connected with each other through welding, stamping, printing, spraying, super pressure-high temperature spraying, coating and the like.

In FIG. 97, the negative electrode assembly consists of 4 negative elements.

Thus, the battery pack is composed of positive electrode integration, a negative electrode integration, Positive electrolyte 9, Positive electrolyte storage chamber 91, Shell 103, etc.

In the battery pack, the ion channels are integrated on the positive and the negative electrodes, and High temperature anti freezing material for siphon film 4 on the integration of the positive and the negative electrodes, is connected with Positive electrolyte 9 in Positive electrolyte storage room. 91.

The advantage of this structure of the battery is: according to the actual demand and the change of the conditions, Metal fuel 24 replacement is convenient and fast; the replacement of Metal fuel 24 will not affect Air positive electrode 1.

In the introduction of A, B, C, D, E, and F, the advantages of pure oxygen as a positive material for the battery or battery pack include high power, high current density, and current stability. If used on the vehicle, it can reduce the volume and weight of the battery.

Because, at present, the invention of the metal fuel cell (bio) is unique in the world, the corresponding battery accessory structure is the only original invention, for example, the supply structure is the only original invention, especially high power series and gas supply structure in the battery.

G: Special descriptions

Sealing problems of positive electrolyte (to prevent evaporation)

In order to prevent leakage of Positive electrolyte 9 from the opening of Positive electrolyte storage chamber 91, a plurality of absorbent materials can be filled in Positive electrolyte storage chamber 91 to solidify Positive electrolyte 9 to the optional absorbent materials: sponge, absorbent cotton, foam carbon nano material, glass fiber, etc. This item is stated in words only, and does not involve high technology.

In order to prevent leakage of Positive electrolyte 9 from the opening of Positive electrolyte storage chamber 91, and Positive electrolyte isolation device 92 does not affect the adsorption capacity of Siphon end of the siphon film 41, which is a sealing device of the utility model, and can be sealed by rubber ring, PTFE sealing rubber ring, graphite sealing mud, etc.

Examples of Air Metal Fuel Cells

Example I

FIG. 1, FIG. 2, FIG. 3, FIG. 13, and FIG. 68, are concerned with a rectangular bulk air metal fuel cell. The thickness can be any value within the range of 0.001 nm-1 nm, 1 nm-1000 nm, 1 µm-1000 µm, 1 mm-1000 mm, greater than 1 m or the value within the range of 1 µm-100 µm. The length and the width can be any value within the range of 0.001 nm-1 nm, 1 nm-1000 nm, 1 µm-1000 µm, 1 mm-1000 mm, greater than 1 m.

Figure 13:
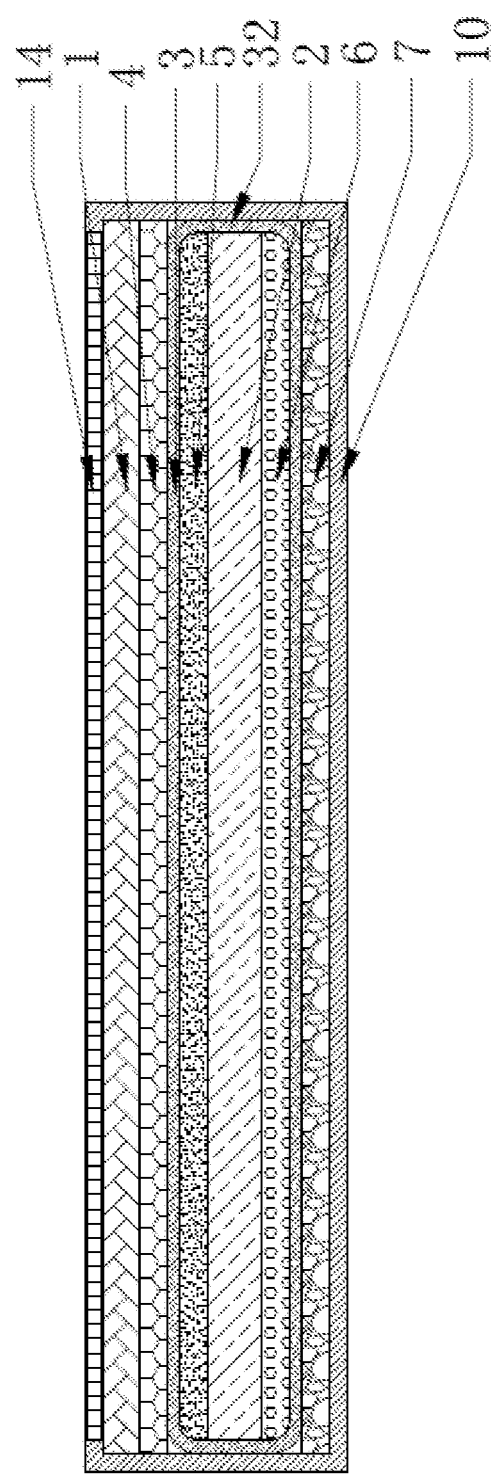
FIG. 13 shows a typical sectional view of the air metal fuel cell along direction of FIG. 1 A-A.
Figure 68:
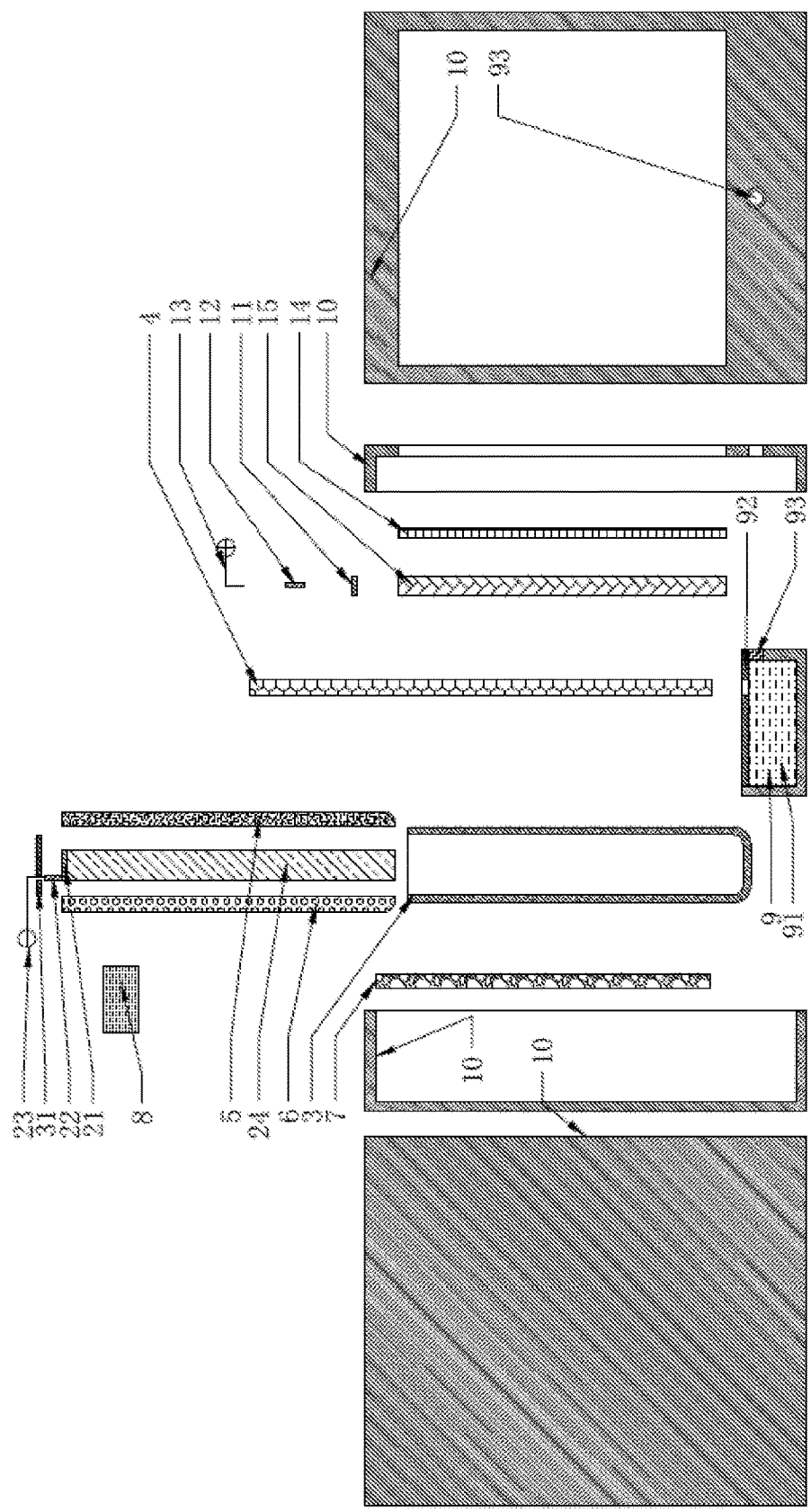
FIG. 68 shows a typical split diagram of each component.

FIG. 1 shows the main view, FIG. 2 shows a sectional drawing of FIG. 1 on E-E, FIG. 3 shows a sectional drawing of FIG. 1 on B-C-D, FIG. 13 shows a sectional drawing of figure on A-A and FIG. 68 is a schematic diagram of the example.

Example 1 consists of the Air positive electrode 1, Air electrode positive current collector 11, Air electrode positive lug 12, Air electrode positive output circuit 13 Air electrode positive air inlet device, Air electrode carrier 15, Catalyst 16, Metal negative electrode 2, Metal negative current collector 21, Metal negative lug 22, Metal negative output circuit 23, Metal fuel 24, Membrane, membrane bag, bioactive membrane bag, bioactive membrane 3, Membrane bag sealing device 31, Membrane bag edge bonding part 32, Membrane 33, Septum 34, Daub coating 35, Daub coating 36, High temperature anti-freezing material for siphon film 4, Siphon end of siphon film 41, Ion terminal of siphon film 42, Electrolyte 5, Mandrel 6, Shockproof buffer layer 7, Negative electrolyte 8, Positive electrolyte 9, Positive electrolyte storage chamber 91, Positive electrolyte isolation device 92, Positive electrolyte storage chamber access channel 93, Battery shell and supporting fixing device 10, etc.

Wherein, Catalyst 16 (in Air positive electrode 1), Membrane bag sealing device 31, Membrane bag edge bonding part 32, Membrane 33, Septum 34, Daub coating 35, and Daub coating B 36 (on Membrane, membrane bag, bioactive membrane bag, bioactive membrane 3); and Siphon end of siphon film 41 as well as Ion terminal of siphon film 42 (on High temperature anti-freezing material for siphon film 4) are not marked in FIG. 1, FIG. 2, FIG. 3, FIG. 13, and FIG. 68. Here's an explanation: these structures do not exist in the example, which are present on the embodiment. Specific content in the above detailed descriptions of the corresponding components can be seen.

Each component of the first example is installed in accordance with the characteristics of FIG. 68 and the characteristics of each component as well as the actual requirements.

(A) Assembly preparation (Methods and Techniques)

(A-1) Preparation of Air positive electrode 1 (Methods and Techniques)

The periphery of Air electrode positive air inlet device is fixed on Battery shell and supporting fixing device 10 adhered, extruded mechanically by glue, adhesive, etc. Air electrode positive current collector 11 is connected with Air electrode carrier 15 by stamping, inlaying, welding, printing, clamping, casting, spraying, high pressure high temperature spraying, coating, etc. Air electrode positive lug 12 of the air electrode is connected with Air electrode positive current collector 11 by welding, stamping, printing, spraying, high pressure high temperature spraying and coating, etc. Air positive electrode output circuit 13 of the air electrode is connected with Air electrode positive lug 12 which can be welded, punched, printed, sprayed, super pressure-high temperature spraying, and film coating, etc. Catalyst 16 can be made to Air electrode carrier 15, by chemical deposition method, vapor deposition, ion plating, electroless plating method, spraying method, hydrothermal method, normalization method, microwave method, normalization & microwave method, acetylene black Potassium Permanganate manganese nitrate and cobalt nitrate decomposition, vacuum ion plating method, high temperature vacuum ion plating method, ion plating method, high temperature and high pressure high temperature and high pressure spraying ion plating method, biological bacteria method, biological fermentation method, biological bonding technology as well as other various methods and techniques. Air electrode carrier 15 is fixed on Battery shell and supporting fixing device 10. Then the fixed Air electrode positive air inlet device 14 evenly and tightly combines with Air electrode carrier 15 that filled with catalyst. In the process combined with uniform paste, the air is discharged, thus, preparatory work of Air positive electrode 1 is completed.

After the processing technology and the special process technology, Air electrode positive current collector 11, Air electrode positive lug 12. Air electrode positive output circuit 13 can be a whole.

(A-2) Assembly preparation of Metal negative electrode 2, Membrane, membrane bag, bioactive membrane bag, bioactive membrane 3, Negative electrolyte 8, Mandrel 6, and Electrolyte 5 (Methods and Techniques)

Metal negative current collector 21 is connected to Metal fuels 24 by stamping, inlaying, welding, printing, clamping, casting, spraying, high pressure and high temperature spraying, coating, etc.

Metal negative lug 22 is connected to Metal negative current collector 21 by welding, stamping, printing, spraying, high pressure high temperature spraying, coating and other methods and Metal negative output circuit 23 is connected to Metal negative lug 22 by welding, stamping, printing, spraying, high pressure high temperature spraying and coating, etc.

Through the above process technology and special process technology, the metal negative electrode collector 21, Metal negative lug 22, Metal negative output circuit 23 can be a whole. The preparation of the metal negative 2 is completed.

According to the required sizes, thicknesses, as well as the different membrane materials and shapes, Membrane 33 and Septum 34 are made into Membrane, membrane bag, bioactive membrane bag, bioactive membrane 3, which can be a single layer membrane bag, a double-layer membrane bag, or a multilayer membrane bag, and can be a single layer membrane, a double-layer membrane, or a multilayer membrane.

The thickness of the utility model is changed according to different requirements and conditions, for example, in micro batteries such as pearl batteries, button batteries, etc, neutral batteries such as mobile phone batteries, motorcycles, etc, large batteries, such as batteries for cars, vehicles, etc, and ultra-large type batteries, such as large power stations, etc, the thicknesses of Membrane, membrane bag, bioactive membrane bag, bioactive membrane are also different.

According to a certain method, Daub coating 35 and Daub coating B 36 are applied to the corresponding parts of Membrane, membrane bag, bioactive membrane bag, bioactive membrane 3. The single layer film bag can be coated on the inner surface, the outer surface of the bag or the inner and the outer surfaces. The single layer film bag can be coated on the inner surface, the outer surface of the bag or the inner and the outer surfaces; The double layer film bag can be coated in the middle of the two layers of double-layer Membrane 33, and can be applied to the middle of the double layer film bag in the middle of the two layers of the inner layer of the double-layer film bag or the outer layer of the double layer film bag in the two layer; it can be applied to the middle of the two layers of the double-layer film bag, and the inner layer of the double-layer film bag can be coated on the outer part of the middle of the double-layer film bag and the double-layer film bag at the same time, which is chosen and decided on the actual requirements and conditions of the different changes. At the same time, Membrane bag sealing device 31 is prepared, so that the preparation of Membrane, membrane bag, bioactive membrane bag, bioactive membrane 3 is completed.

Negative electrolyte 8, Mandrel 6, Electrolyte 5 and Metal negative electrode 2 are arranged in Membrane, membrane bag, bioactive membrane bag, bioactive membrane 3, or the middle of the double membrane bag. Electrolyte 5 and Negative electrolyte 8 are bonded with the inner surface film holes of Membrane, membrane bag, bioactive membrane bag, bioactive membrane 3, and the metal negative electrode is clamped between Mandrel 6 and Electrolyte 5, and is tightly adhered and combined, and, at the same time. Negative electrolyte 8 is mainly infiltrated into Mandrel 6 to meet the reserve requirement, which can be decided according to the actual requirements. The advantage of this structure is that it can maintain the properties of Negative electrolyte 8, which exists in solid or semi-solid form, and has very good fusion connection to Electrolyte 5, at the same time, maintain the basic boundaries to Electrolyte 5. The sealing of Membrane, membrane bag, bioactive membrane bag, bioactive membrane 3 is best carried out under vacuum (also in natural environment), using Membrane bag sealing device 31 for sealing the mouth of Membrane, membrane bag, bioactive membrane bag, bioactive membrane 3.

(A-3) Assembly preparations of High temperature anti-freezing material for siphon film 4 and Positive electrolyte 9

Part of Siphon end of siphon film 41 of High temperature anti freezing material for siphon film 4 is put into Positive electrolyte storage chamber 91 with Positive electrolyte 9, and Positive electrolyte isolation device 92 is used for sealing the junction between High temperature anti-freezing material for siphon film 4 and Positive electrolyte storage chamber 91.

The thickness, size and shape of High temperature anti-freezing material for siphon film 4 can be decided according to the actual needs and conditions.

The advantage of this structure is maintaining the liquid property of Positive electrolyte 9, which exists in the form of a solid state and a semi-solid state, and being well connected with Air positive electrode 1, Membrane, membrane bag, bioactive membrane bag, bioactive membrane 3, at the same time, maintaining the basic boundaries to Air positive electrode 1 and Membrane, membrane bag, bioactive membrane bag, bioactive membrane, which not only greatly reduces and save the amount of Positive electrolyte 9, reducing the cost, but also stabilizes the running state of the electrolyte, reducing the volume and the weight of the battery.

According to the actual needs and conditions change, the thickness, size and shape of High temperature anti-freezing material for siphon film 4 can be determined, thereby regulating the quantity and temperature of the Positive electrolyte 9, regulating the amount of the current stability. And the problems of high temperature, expansion and spontaneous combustion of the battery are completely solved under the condition that Membrane, membrane bag, bioactive membrane bag, bioactive membrane 3 is matched to ensure that the battery to improve the operating state in normal temperature in the state of high and low temperature Positive electrolyte 9 is added to Positive electrolyte storage chamber 91 through Positive electrolyte storage chamber access channel 93. After High temperature anti-freezing material for siphon film 4 is inserted into Positive electrolyte storage chamber 91, Positive electrolyte isolation device 92 is used for sealing the junction between High temperature anti-freezing material for siphon film 4 and Positive electrolyte storage chamber 91, which is mainly used for isolating the water in Positive electrolyte 9 to prevent water penetration.

(B) Assembly of the air metal fuel (bio) cell

According to FIG. 68 and the characteristics of each component as well as the actual demands, Air positive electrode 1, which is ready to be completed, is tightly connected with a part of Siphon end of siphon film 42 on High temperature anti-freezing material for siphon film 4. Siphon end of siphon film 42 of High temperature anti-freezing material for siphon film 4 is tightly connected with Membrane, membrane bag, bioactive membrane bag, bioactive membrane 3. Membrane, membrane bag, bioactive membrane bag, bioactive membrane 3 are tightly combined with Shockproof buffer layer 7, and Ion terminal of siphon film 42 of High temperature anti-freezing material for siphon film 4 is closely connected with Air positive electrode 1 and Membrane, membrane bag, bioactive membrane bag, bioactive membrane 3. Meanwhile, Siphon end of siphon film 42 of High-temperature anti-freezing material for siphon film 4 has been immersed in Positive electrolyte 9 of Positive electrolyte storage chamber 91. Then, parts of the battery along with Battery shell and supporting fixing device 10 is fixed and formed by spraying, welding, bonding and binding.

The principle of assembly and installation of the battery is that under the condition of close adhesion, the closer and less air, the more stable the current, power, and the reduction of consumption and consumption, which is the most ideal to complete in fully mechanized and vacuum (We are now successful in the production of all hand and hand tools. Therefore, there is still much room for further improvement and perfection in the process technology, so the battery itself has a lot of room for improvement and perfection).

(C) Operation of air metal fuel (bio) cell:

(C-1) Metal hydroxide is formed in the negative electrode of the battery, and Negative electrode 8 is an alkaline electrolyte.

After assembling the battery in the mentioned methods, under the adsorption of High temperature anti-freezing material for siphon film 4, Positive electrolyte 9 is adsorbed to the whole Siphon end of siphon film 42 of High temperature anti-freezing material for siphon film 4. Positive electrode 9 is adsorbed to Siphon end of siphon film 42, and Positive electrolyte 9 is also adsorbed on Air electrode carrier 15 which is in close contact with High temperature anti-freezing material for siphon film 4, thus, the preparation procedure for the discharge of the battery is completed.

At this time, the positive and negative electrodes of the load (Load is the transformation of the current, such as testing instruments, multimeter, resistance, light bulbs, the use of electric appliances, coffee pots, mobile phones, a variety of electrical appliances, etc.) are respectively connected to Air electrode positive output circuit 13 and Metal negative output circuit 23 (The output circuits of the positive electrode and the negative electrode are respectively connected with the lugs of the positive electrode and the negative electrode, and the lugs of the positive electrode and the negative electrode are respectively connected with the current collectors of the positive electrode and the negative electrode; the positive electrode and the negative electrode current collectors are respectively connected with the positive electrode and the negative electrode.); When the positive and negative electrodes are switched on (turn on the power supply and start to discharge), oxygen in the positive air enters into Air electrode carrier 15 through Air electrode positive air inlet device 14; Oxygen molecules are combined with Catalyst 16 on Air electrode carrier 15, and, under the catalysis of Catalyst 16, oxygen molecules dissociate into oxygen ions; The hydroxyl ions react with the water in Positive electrolyte 9 to form hydrated hydroxyl ions, and with the help of the battery positive and negative electric field, and the hydrated hydroxyl ions can pass through Siphon end of siphon film 42 and reach the surface of Membrane, membrane bag, bioactive membrane bag, bioactive membrane 3.

Because Membrane, membrane bag, bioactive membrane bag, bioactive membrane 3 are coated with Daub coating 35, which is a kind of hydrophobic substance, water molecules can not enter into Electrolyte 5 and Negative electrolyte 8 Membrane, membrane bag, bioactive membrane bag, bioactive membrane 3 while Negative electrolyte 8 and Daub coating 35 are the same nature of the material (that is, non polar substances), which can be mutually compatible. Negative electrolyte 8 is arranged in Membrane, membrane bag, bioactive membrane bag, bioactive membrane 3, and attached to the membrane holes of the inner surface of the membrane. At this time, hydrated hydroxyl ions in Positive electrolyte 9 will be transferred the hydroxyl ions to Negative electrolyte 8, and then the hydroxyl ions across Membrane, membrane bag, bioactive membrane bag, bioactive membrane 3 go into Negative electrolyte 8 and Electrolyte 5, and continues to move under the action of the positive and negative electric field of the battery in Negative electrolyte 8 and Electrolyte 5, and up to the surface of Metal fuel 24, and combine with metal ions on the surface of Metal fuel 24 to form a metal hydroxide; In the combination of hydroxyl ions and metal ions, the electrons released from the metal ions on the surface of Metal fuel 24 pass through Metal fuel 24 and enter into Metal negative current collector 21, with the help of which the collected electrons are transmitted to the load through Metal negative lug 22 and Metal negative output circuit 23, and then, through the load, the collected electrons enter into Air electrode positive output circuit 13, Air electrode positive lug 12 and Air electrode positive current collector 11. Under the conduction of Air electrode positive output circuit 13, Air electrode positive lug 12 and Air electrode positive current collector 11, the electrons are moved on to Air electrode carrier 15 to form a continuous and stable current.

Because of the structural characteristics of Membrane, membrane bag, bioactive membrane bag, bioactive membrane 3 in the metal fuel (bio) cell, Daub coating 35 coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, which is a fundamental solution to Metal fuel 24 corrosion, gas production, and battery voltage hysteresis, heat, expansion, self combustion, explosion and other global problems.

The advantage of High temperature anti-freezing material for siphon film 4 is maintaining the liquid property of Positive electrolyte 9, which exists in the form of a solid state and a semi-solid state, and being well connected with Air positive electrode 1 and Membrane, membrane bag, bioactive membrane bag, bioactive membrane 3, at the same time, maintaining the basic boundaries to Air positive electrode 1 and Membrane, membrane bag, bioactive membrane bag, bioactive membrane 3, which not only greatly reduces and save the amount of Positive electrolyte 9, reducing the cost, but also stabilizes the running state of the electrolyte, reducing the volume and the weight of the battery.

More importantly, it is effective to control and adjust the supply quantity of Positive electrolyte 9, and simultaneously control and regulate the operating temperature of the battery, and control the stability of the current. And the problems of high temperature, expansion and spontaneous combustion of the battery are completely solved under the condition that Membrane, membrane bag, bioactive film bag, bioactive film 3 is matched to ensure that the battery to improve the operating state in normal temperature in the state of high and low temperature.

The above operation processes of hydroxyl ions and electrons are done in an instant speed, that is, the speed of light.

In addition, after the load connected to the battery is disconnected, the battery in the hydroxyl ions and electrons will also stop the movement.

Because of the structural characteristics of Membrane, membrane bag, bioactive membrane bag, bioactive membrane 3 in the metal fuel (bio) cell, Daub coating coated 35 on it, water in Positive electrolyte 9 and other molecular substances cannot pass through Membrane, membrane bag, bioactive membrane bag, bioactive membrane 3 into Negative electrolyte 8 and Electrolyte 5, not onto the surface of Metal fuel 24, therefore, there is no problem of battery self-discharge in the process of battery placement.

(C-2) The metal oxides are formed in the positive electrode of the cell, and the metal oxide is formed in the positive electrode of the cell: Negative electrolyte 8 is the neutral electrolyte. For the example of aluminum, Negative electrolyte 8 is the organic solution of aluminum chloride.

After assembling the battery in the mentioned methods, under the adsorption of High temperature anti-freezing material for siphon film 4, Positive electrode 9 is adsorbed to the whole Siphon end of siphon film 42 of High temperature anti-freezing material for siphon film 4. Positive electrolyte 9 is adsorbed to Siphon end of siphon film 42, and Positive electrolyte 9 is also adsorbed on Air electrode carrier 15 which is in tightly contact with High temperature anti-freezing material for siphon film 4, thus, the preparation procedure for the discharge of the battery is completed.

At this time, the positive and negative electrodes of the load (Load is the transformation of the current, such as testing instruments, multimeter, resistance, light bulbs, the use of electric appliances, coffee pots, mobile phones, a variety of electrical appliances, etc.) are respectively connected to Air electrode positive output circuit 13 and Metal negative output circuit 23 (The output circuits of the positive electrode and the negative electrode are respectively connected with the lugs of the positive electrode and the negative electrode, and the lugs of the positive electrode and the negative electrodes are respectively connected with the current collectors of the positive electrode and the negative electrode. The current collectors of positive electrode and the negative electrode are respectively connected with the positive electrode and the negative electrode.); When the positive and negative electrodes are switched on (turn on the power supply and start to discharge), oxygen in the positive air enters into Air electrode carrier 15 through Air electrode positive air inlet device 14; Oxygen molecules are combined with Catalyst 16 on Air electrode carrier 15, and under catalysis of Catalyst 16, oxygen molecules dissociate into hydroxyl ions.

Under the action of positive and negative electric field, the metal ions on the surface of Metal fuel 24 enter into Negative electrolyte 8 and Electrolyte 5, and move through Negative electrolyte 8 and Electrolyte 5 to the membrane holes and the outer membrane surface of Membrane, membrane bag, bioactive membrane bag, bioactive membrane 3.

At the same time, Positive electrolyte 9 is attached to the outer surface of Membrane, membrane bag, bioactive membrane bag, bioactive membrane 3, and because Membrane, membrane bag, bioactive membrane bag, bioactive membrane 3 are coated with Daub coating 35, which is a hydrophobic substance, the water molecules can not enter into Electrolyte 5 and Negative electrolyte 8 through Membrane, membrane bag, bioactive film bag, bioactive film 3 while Negative electrolyte 8 and Daub coating 35 are the same nature of the materials (that is, non polar substances), which can be mutually compatible. Negative electrolyte 8 is arranged in Membrane, membrane bag, bioactive membrane bag, bioactive membrane 3, and attached to the membrane holes of the inner surface of the membrane. At this time, hydrated hydroxyl ions in Positive electrolyte 9 will be transferred to hydroxyl ions in Positive electrolyte 9, and then the hydroxyl ions across Membrane, membrane bag, bioactive membrane bag, bioactive membrane 3 go into Negative electrolyte 8 and Electrolyte 5, and continues to move under the action of the positive and negative electric field of the battery in Negative electrolyte 8 and Electrolyte 5, and up to the surface of Metal fuel 24, is combined with metal ions on the surface of Metal fuel 24 to form a metal hydroxide; In the combination of hydroxyl ions and metal ions, the electrons released from the metal ions on the surface of Metal fuel 24 pass through Metal fuel 24 and enter into Metal negative current collector 21, with the help of which the collected electrons are transmitted to the load through Metal negative lug 22 and Metal negative output circuit 23, and then, through the load, the collected electrons enter into Air electrode positive output circuit 13, Air electrode positive lug 12 and Air electrode positive current collector 11. Under the conduction of Air electrode positive output circuit 13, Air electrode positive lug 12 and Air electrode positive current collector 11, the electrodes are moved to Air electrode carrier 15 to form a continuous and stable current.

Because of the structural characteristics of Membrane, membrane bag, bioactive membrane bag, bioactive membrane 3 in the metal fuel (bio) cell, Daub coating 35 coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, which is a fundamental solution to Metal fuel 24 corrosion, gas production, and battery voltage hysteresis, heat, expansion, self combustion, explosion and other global problems.

The advantage of High temperature anti-freezing material for siphon film 4 is maintaining the liquid property of Positive electrolyte 9, which exists in the form of a solid state and a semi-solid state, and being well connected with Air positive electrode 1 and Membrane, membrane bag, bioactive membrane bag, bioactive membrane 3, at the same time, maintaining the basic boundaries to Air positive electrode 1 and Membrane, membrane bag, bioactive membrane bag, bioactive membrane 3, which not only greatly reduces and save the amount of Positive electrolyte 9, reducing the cost, but also stabilizes the running state of the electrolyte, reducing the volume and the weight of the battery.

More importantly, it is effective to control and adjust the supply quantity of Positive electrolyte 9, and simultaneously control and regulate the operating temperature of the battery, and control the stability of the current. And the problems of high temperature, expansion and spontaneous combustion of the battery are completely solved under the condition that Membrane, membrane bag, bioactive membrane bag, bioactive membrane 3 is matched to ensure that the battery to improve the operating state in normal temperature in the state of high and low temperature.

The above operation processes of hydroxyl ions and electrons are done in an instant speed, that is, the speed of light.

In addition, after the load connected to the battery is disconnected, the hydroxyl ions and electrons in the battery will also stop the movement.

Because of the structural characteristics of Membrane, membrane bag, bioactive membrane bag, bioactive membrane 3 in the metal fuel (bio) cell, Daub coating 35 coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, therefore, there is no problem of battery self discharge in the process of battery placement.

Example II

In this case, the air metal fuel power is a double-positive battery composed of two Air positive electrodes 1 and one Metal negative electrode 2 along with other components. The structure is shown in FIG. 1, FIG. 22, FIG. 23, and FIG. 69.

Figure 69:
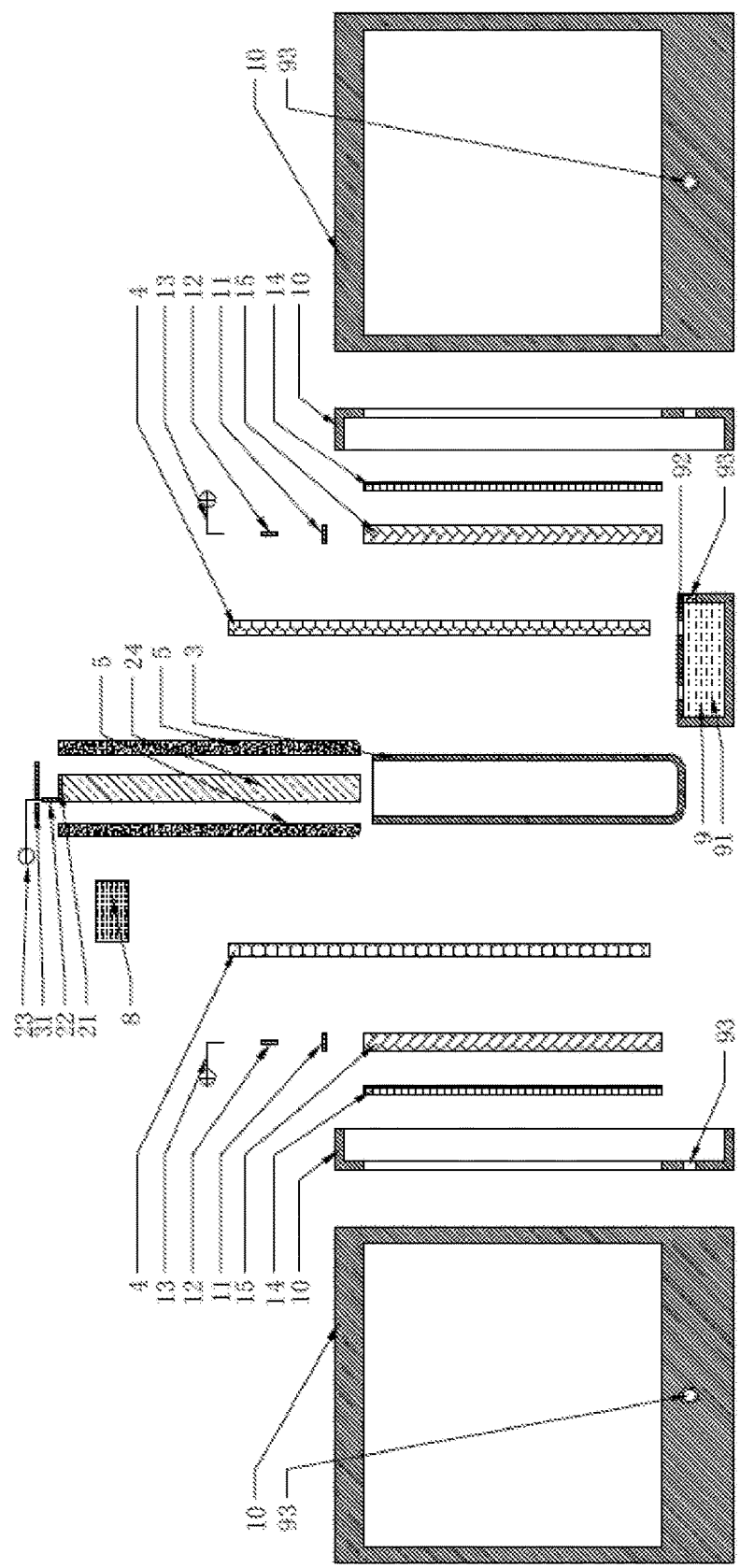
FIG. 69 shows a split diagram of the double-positive electrode air metal fuel cell.

FIG. 1 shows the main view. FIG. 22 shows a sectional drawing of FIG. 1 on the E-E. FIG. 23 shows a sectional drawing of figure on the A-A, and FIG. 69 shows the schematic diagram of the part of the example.

This example is made up of Air positive electrode 1, Air electrode positive current collector 11, Air electrode positive lug 12, Air electrode positive output circuit 13, Air electrode positive air inlet device 14, Air electrode carrier 15, Catalyst 16, Metal negative electrode 2, Metal negative current collector 21, Metal negative lug 22, Metal negative output circuit 23, Metal fuel 24, Membrane, membrane bag, bioactive membrane bag, bioactive membrane 3, Membrane bag sealing device 31, Membrane bag edge bonding part 32, Membrane 33, Septum 34, Daub coating 35, Daub coating B 36, High temperature anti-freezing material for siphon film 4, Siphon end of siphon film 41, Ion terminal of siphon film 42, Electrolyte 5, Negative electrolyte 8, Positive electrolyte 9, Positive electrolyte storage chamber 91, Positive electrolyte isolation device 92, Positive electrolyte storage chamber access channel 93, Battery shell and support fixing device 10, etc.

Wherein, Catalyst 16 on Air positive electrode 1, Membrane bag sealing device 31 on Membrane, membrane bag, bioactive membrane bag, bioactive membrane 3, Membrane bag edge bonding part 32, Membrane 33, Septum 34, Daub coating 35, Daub coating B 36, Siphon end of siphon film 41, Ion terminal of siphon film 42 of High temperature anti-freezing material for siphon film 4 are not marked in FIG. 1, FIG. 22, FIG. 23, and FIG. 69. Here's an explanation: these structures do not exist in the example II, which are present on the embodiment. Specific content in the above detailed description of the corresponding components can be seen above.

Each component of the first example is installed in accordance with the characteristics of FIG. 68 and the characteristics of each component as well as the actual requirements.

The assembly and operation of the battery is basically the same as the Example 1.

Example III

FIG. 1, FIG. 24, FIG. 25, and FIG. 70 are concerned with a rectangular bulk electrolyte free air metal fuel cell.

Figure 70:
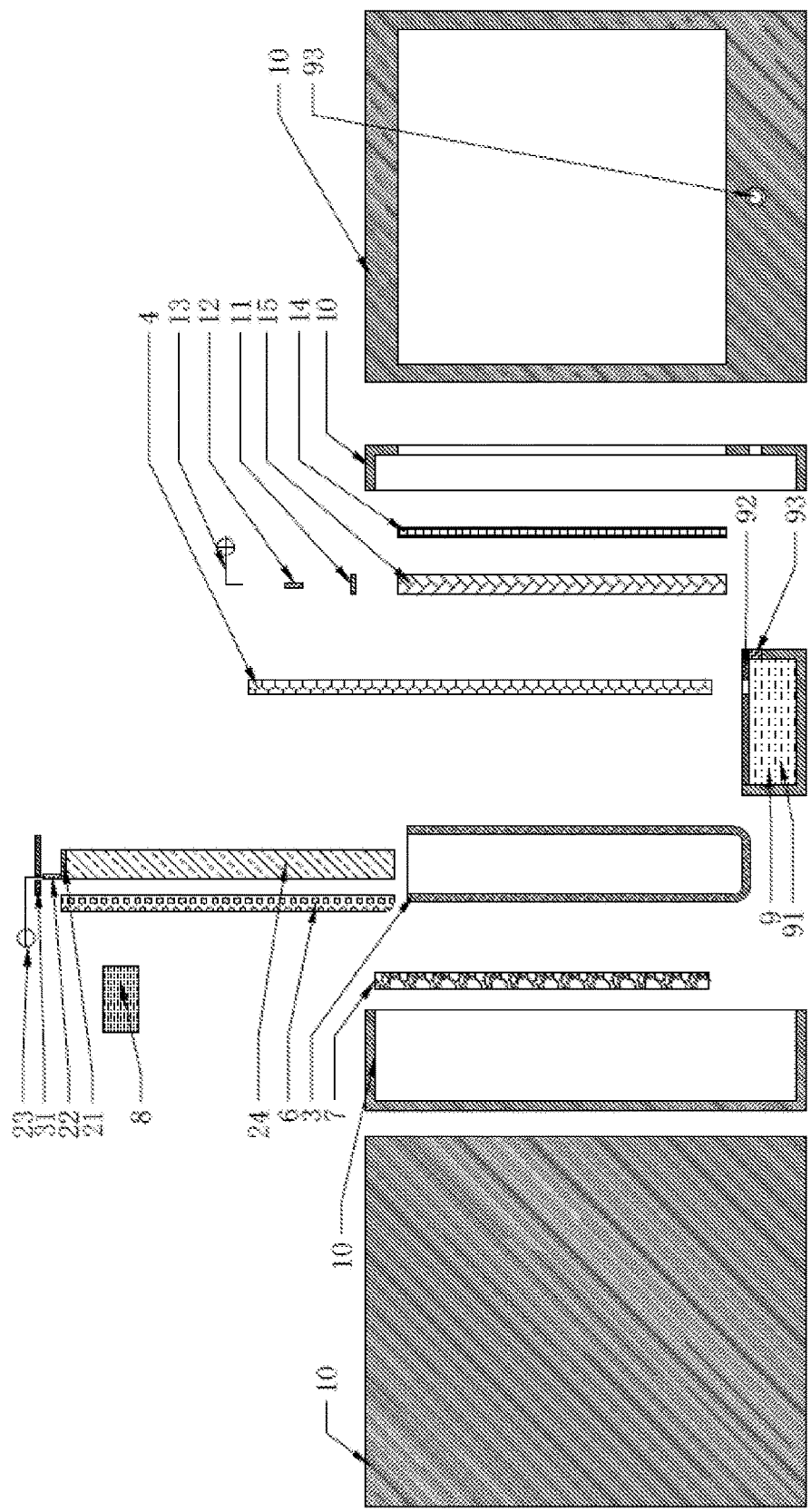
FIG. 70 shows a split diagram of the non-electrolyte air metal fuel cell.

FIG. 1 shows the main view, FIG. 22 shows a sectional drawing of FIG. 1 on the E-E, FIG. 25 shows a sectional drawing of FIG. 1 on the A-A, and FIG. 70 shows the schematic diagram of the part of the example.

In the example, there is no Electrolyte 5 in Membrane, membrane bag, bioactive membrane bag, bioactive membrane 3.

This example is made up of Air positive electrode 1, Air electrode positive current collector 11, Air electrode positive lug 12, Air electrode positive output circuit 13, Air electrode positive air inlet device 14, Air electrode carrier 15, Catalyst 16, Metal negative electrode 2, Metal negative current collector 21, Metal negative lug 22, Metal negative output circuit 23, Metal fuel 24, Membrane, membrane bag, bioactive membrane bag, bioactive membrane 3, Membrane bag sealing device 31, Membrane bag edge bonding part 32, Membrane 33, Septum 34, Daub coating 35, Daub coating B 36, High temperature anti-freezing material for siphon film 4, Siphon end of siphon film 41, Ion terminal of siphon film 42, Electrolyte 5, Negative electrolyte 8, Positive electrolyte 9, Positive electrolyte storage chamber 91, Positive electrolyte isolation device 92, Positive electrolyte storage chamber access channel 93, Battery shell and support fixing device 10, etc.

Each component of the first example is installed in accordance with the characteristics of FIG. 70 and the characteristics of each component as well as the actual requirements.

In the example, Negative electrolyte 8, Mandrel 6, Electrolyte 5 and Metal negative electrode 2 are arranged in Membrane, membrane bag, bioactive membrane bag, bioactive membrane 3, or the middle of the double membrane bag. Electrolyte 5 and Negative electrolyte 8 are bonded with the inner surface film holes of Membrane, membrane bag, bioactive membrane bag, bioactive membrane 3, and the metal negative electrode is clamped between Mandrel 6 and Electrolyte 5, and is tightly adhered and combined, and, at the same time, Negative electrolyte 8 is mainly infiltrated into Mandrel 6 to meet the reserve requirement, which can be decided according to the actual requirements. The advantage of this structure is that it can maintain the properties of Negative electrolyte 8, which exists in solid or semi-solid form, and has very good fusion connection to Electrolyte 5, at the same time, maintain the basic boundaries to Electrolyte 5. The sealing of Membrane, membrane bag, bioactive membrane bag, bioactive membrane 3 is best carried out under vacuum (also in natural environment), using Membrane bag sealing device 31 to seal the opening of Membrane, membrane bag, bioactive membrane bag, bioactive membrane 3.

In this example, the assembly and operation of the battery is basically the same as Example I, however, because of the absence of Electrolyte 5, the ions in the negative unit are operated by negative electrolyte.

Example IV

FIG. 1, FIG. 26, FIG. 27, and FIG. 71 are concerned with a rectangular bulk air metal fuel cell without the mandrel.

In the example, Membrane, membrane bag, bioactive film bag, bioactive film 3 is not provided with Mandrel 6.

This example is made up of Air positive electrode 1, Air electrode positive current collector 11, Air electrode positive lug 12, Air electrode positive output circuit 13, Air electrode positive air inlet device 14, Air electrode carrier 15, Catalyst 16, Metal negative electrode 2, Metal negative current collector 21, Metal negative lug 22, Metal negative output circuit 23, Metal fuel 24, Membrane, membrane bag, bioactive membrane bag, bioactive membrane 3, Membrane bag sealing device 31, Membrane bag edge bonding part 32, Membrane 33, Septum 34, Daub coating 35, Daub coating B 36, High temperature anti-freezing material for siphon film 4, Siphon end of siphon film 41, Ion terminal of siphon film 42, Electrolyte 5, Negative electrolyte 8, Positive electrolyte 9, Positive electrolyte storage chamber 91, Positive electrolyte isolation device 92, Positive electrolyte storage chamber access channel 93, Battery shell and support fixing device 10, etc.

Figure 71:
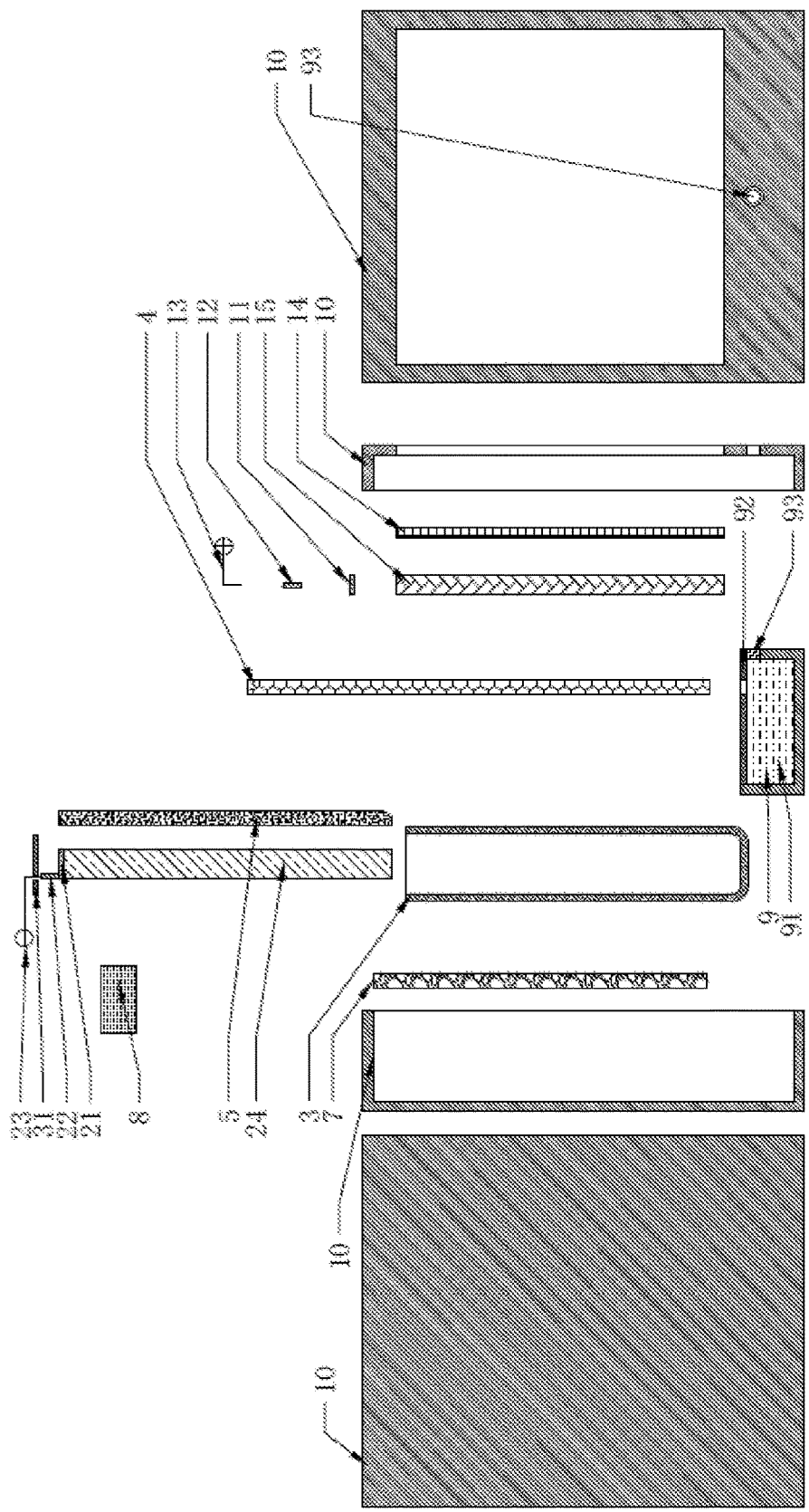
FIG. 71 shows a split diagram of the non-mandrel air metal fuel cell.

Each component of the first example is installed in accordance with the characteristics of FIG. 71 and the characteristics of each component as well as the actual requirements.

The assembly and operation in this example are basically the same as the example I, but no Mandrel 6 is involved.

Example V

FIG. 1, FIG. 28, FIG. 29, and FIG. 72 each shows a rectangular metal fuel cell with no electrolyte air and the mandrel in membrane bag.

In the Example V, Membrane, membrane bag, bioactive film bag, bioactive film are not provided with Electrolyte 5 and Mandrel 6.

This example is made up of Air positive electrode 1, Air electrode positive current collector 11, Air electrode positive lug 12, Air electrode positive output circuit 13, Air electrode positive air inlet device 14, Air electrode carrier 15, Catalyst 16, Metal negative electrode 2, Metal negative current collector 21, Metal negative lug 22, Metal negative output circuit 23, Metal fuel 24, Membrane, membrane bag, bioactive membrane bag, bioactive membrane 3, Membrane bag sealing device 31, Membrane bag edge bonding part 32, Membrane 33, Septum 34, Daub coating 35, Daub coating B 36, High temperature anti-freezing material for siphon film 4, Siphon end of siphon film 41, Ion terminal of siphon film 42, Shockproof buffer layer 7, Negative electrolyte 8, Positive electrolyte 9, Positive electrolyte storage chamber 91, Positive electrolyte isolation device 92, Positive electrolyte storage chamber access channel 93, Battery shell and support fixing device 10, etc.

Figure 72:
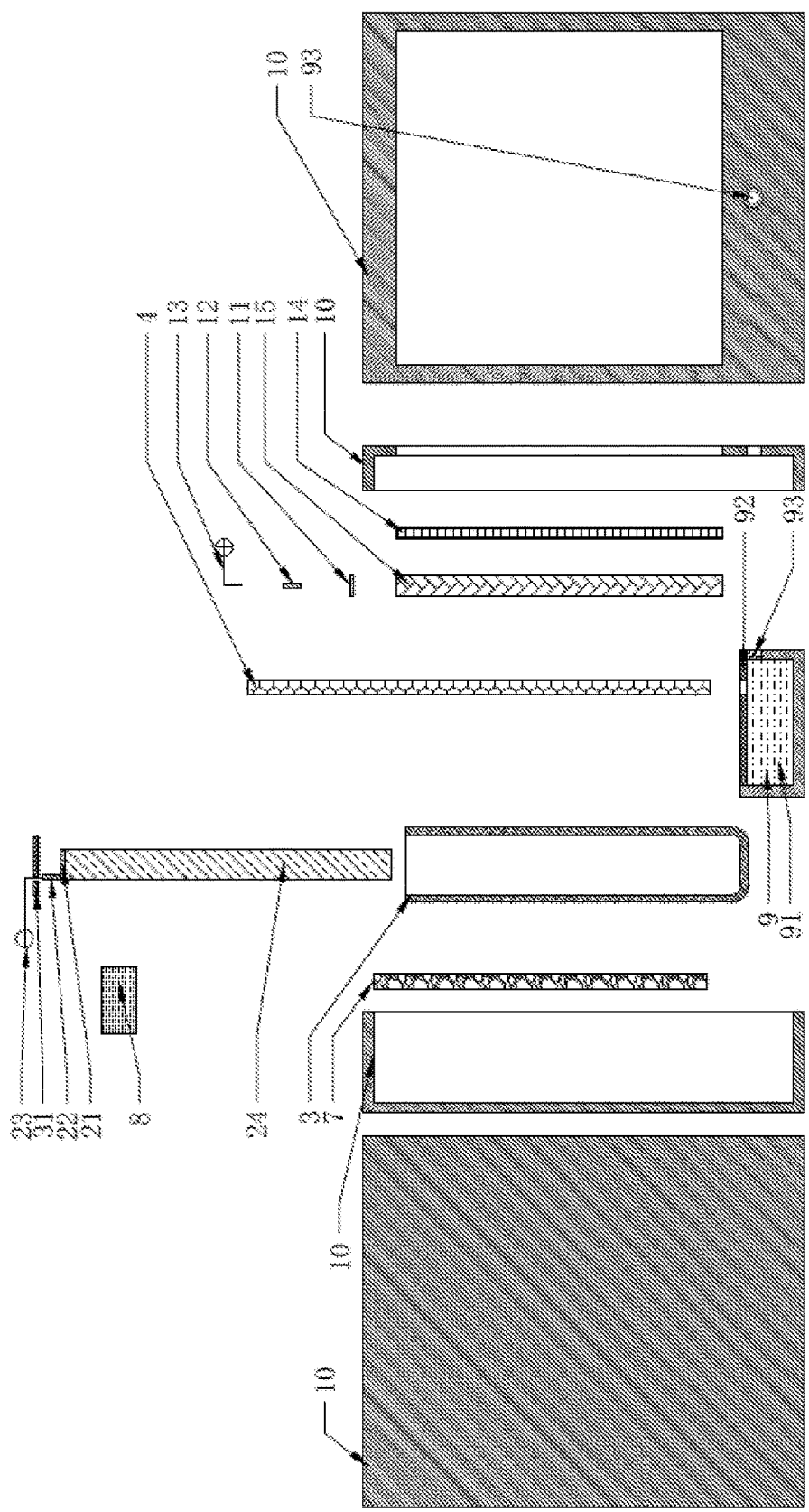
FIG. 72 shows a split diagram of the non-mandrel and non-electrolyte air metal fuel cell.

Each component of the example is installed in accordance with the characteristics of FIG. 72 and the characteristics of each component as well as the actual requirements.

The assembly and operation are basically the same as the example I, but no Mandrel 6 and Electrolyte 5 is involved.

Example VI

FIG. 1, FIG. 4, FIG. 7, and FIG. 73 each is concerned with a rectangular bulk air metal fuel cell.

A layer of Air electrode catalyst coating 17 is arranged between Air electrode positive air inlet device 14 of Air positive electrode 1 and Air electrode carrier 15.

Figure 4:
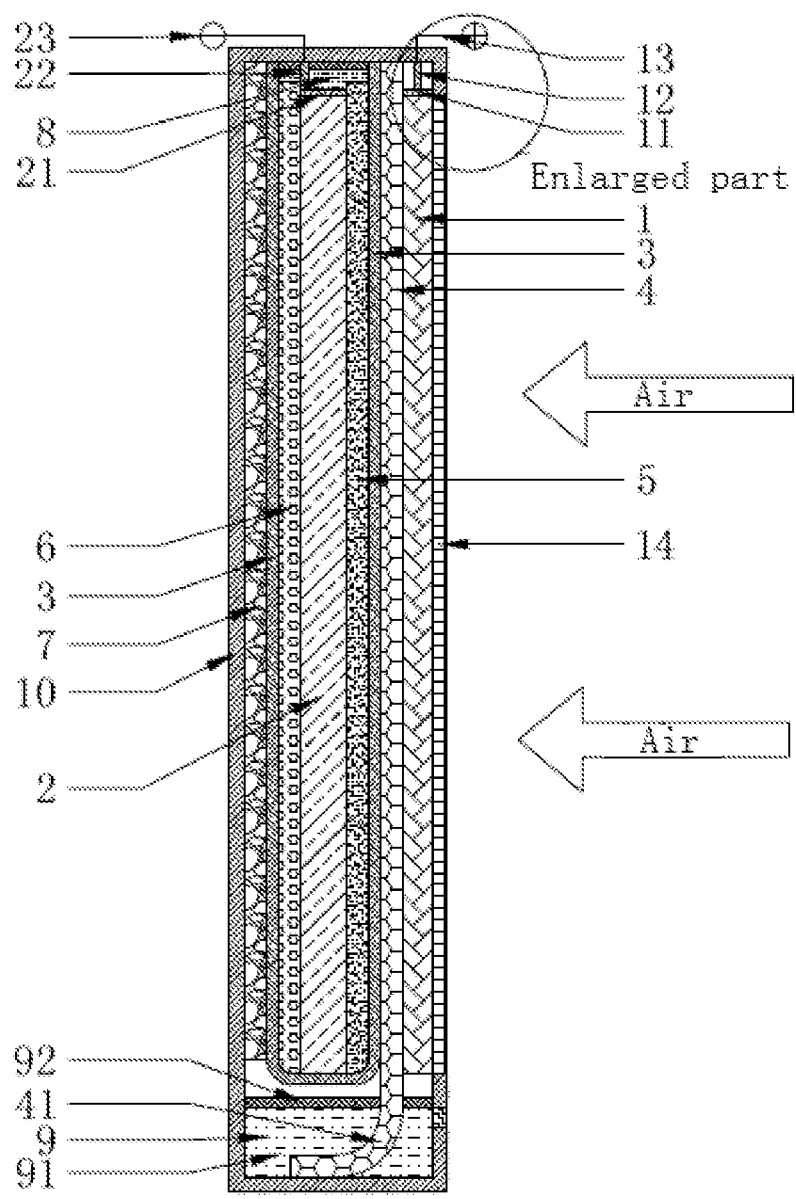
FIG. 4 shows a typical sectional view of the air metal fuel cell along direction of FIG. 1 E-E (The enlarged part is marked).
Figure 73:
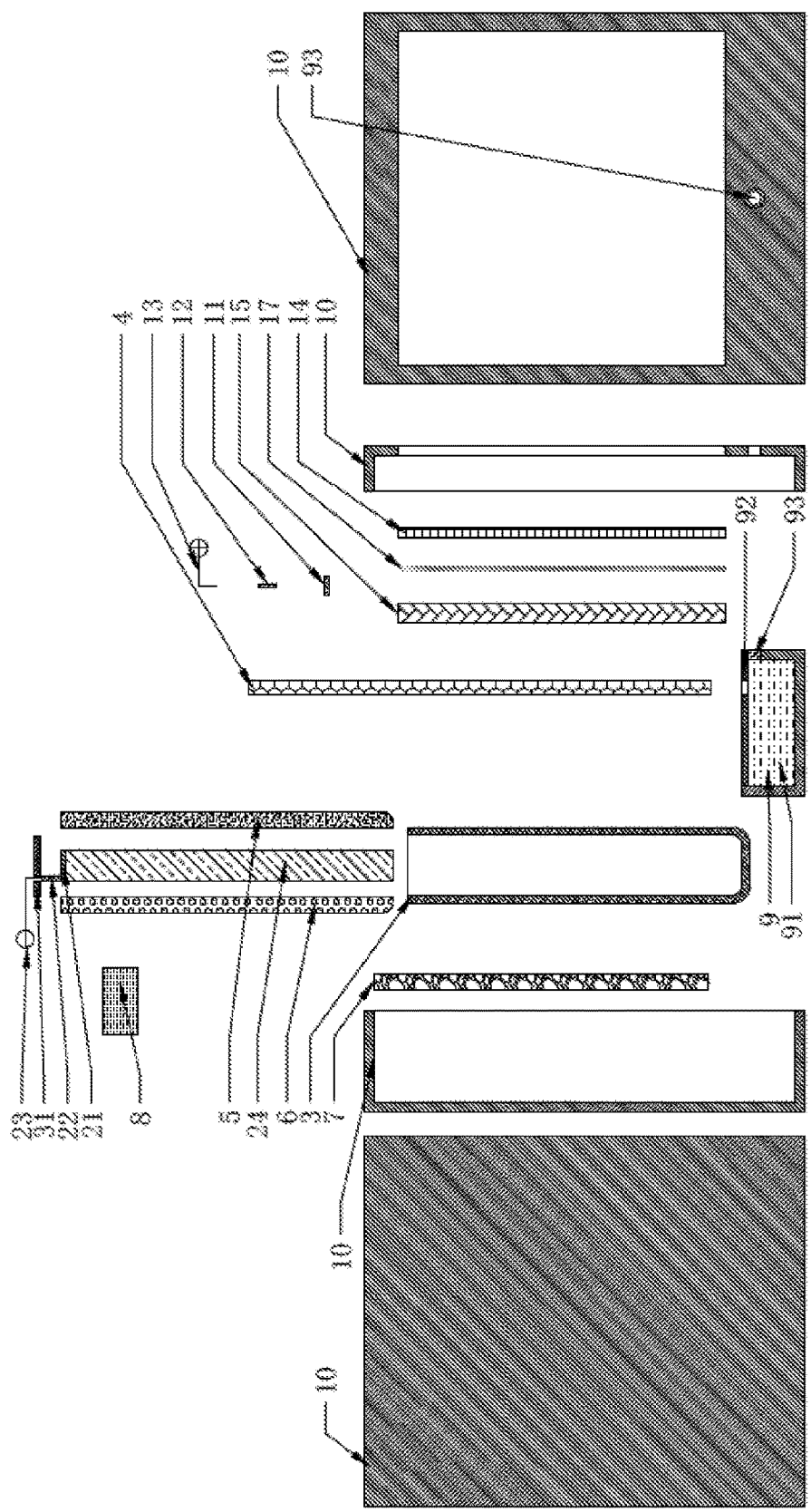
FIG. 73 shows a split diagram of the air metal fuel cell with catalyst coating.

FIG. 1 is the main view, FIG. 4 is a section of FIG. 1 on the E-E, FIG. 7 is the image of the enlarged area of FIG. 4, and FIG. 73 is a part of the schematic diagram of the example.

This example is made up of Air positive electrode 1, Air electrode positive current collector 11, Air electrode positive lug 12, Air electrode positive output circuit 13, Air electrode positive air inlet device 14, Air electrode carrier 15, Catalyst 16, Air electrode catalyst coating 17, Metal negative electrode 2, Metal negative current collector 21, Metal negative lug 22, Metal negative output circuit 23, Metal fuel 24, Membrane, membrane bag, bioactive membrane bag, bioactive membrane 3, Membrane bag sealing device 31, Membrane bag edge bonding part 32, Membrane 33, Septum 34, Daub coating 35, Daub coating B 36, High temperature anti-freezing material for siphon film 4, Siphon end of siphon film 41, Ion terminal of siphon film 42, Electrolyte 5, Mandrel 6, Shockproof buffer layer 7, Negative electrolyte 8, Positive electrolyte 9, Positive electrolyte storage chamber 91, Positive electrolyte isolation device 92, Positive electrolyte storage chamber access channel 93, Battery shell and support fixing device 10, etc.

Each component of the first example is installed in accordance with the characteristics of FIG. 73 and the characteristics of each component as well as the actual requirements, but in Air electrode positive air intake device 14 and Air electrode carrier 15, Air electrode catalyst coating 17 and Air electrode carrier 15 are combined with uniform paste. Air electrode catalyst coating 17 is involved in oxygen catalysis and current conduction.

Example VII

Figure 66:
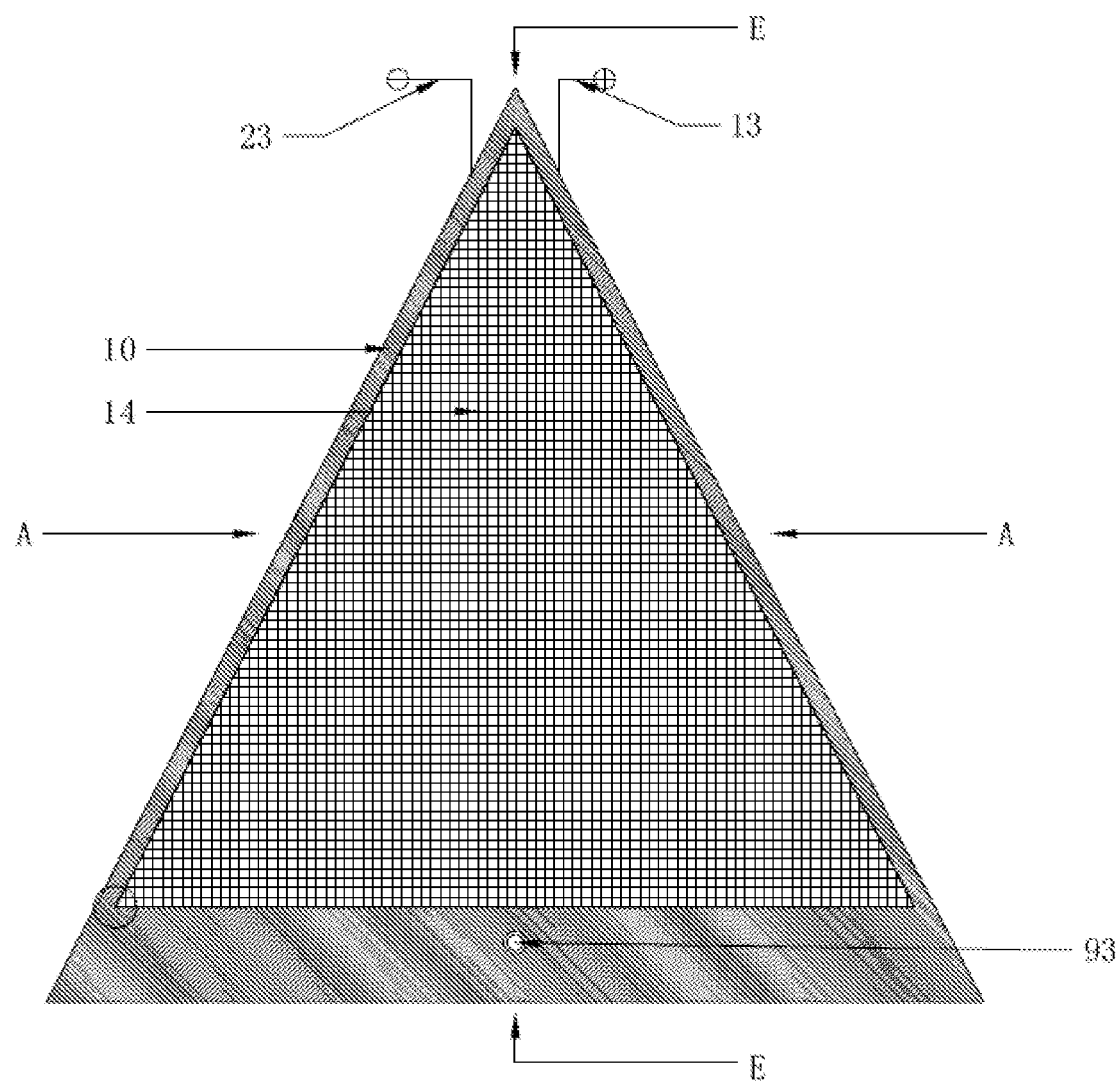
FIG. 66 shows a front view of the tri-angle air metal fuel cell.

FIG. 66 relates to a triangular air metal fuel cell.

Example VIII

Figure 67:
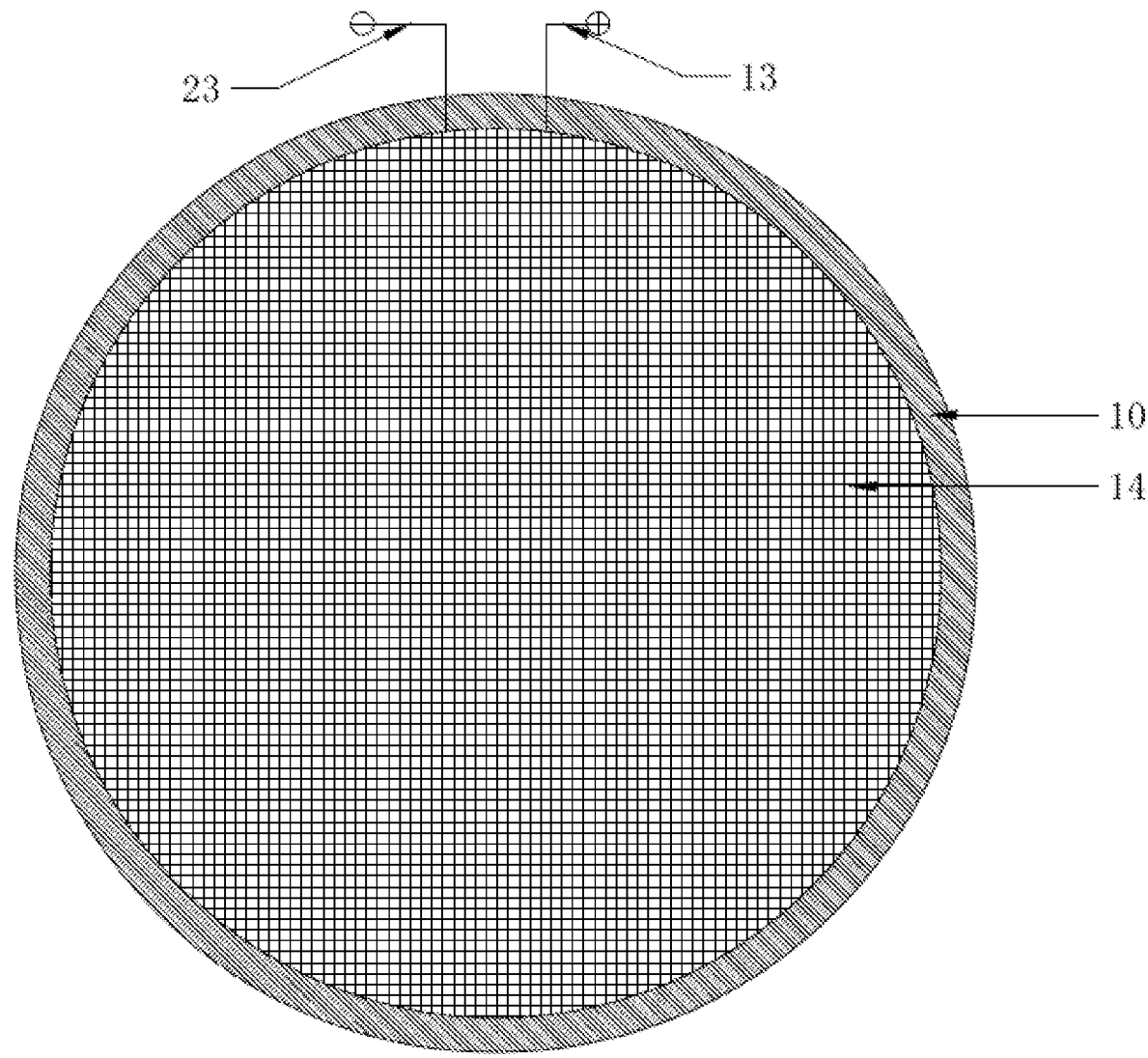
FIG. 67 shows a front view of the circle air metal fuel cell.

FIG. 67 is a circular air metal fuel cell.

Example IX

A single battery or a series of parallel battery packs with a shell

According to the actual demand and the change of the conditions, the high efficiency battery group which is used to control and close and open the carbon dioxide inlet and outlet channel in a single cell or a series parallel way is effectively controlled through Air inlet and outlet device 101 on the shell. The main purpose of closing and opening the carbon dioxide inlet and outlet channel is to allow the carbon dioxide to freely enter and exit in Air inlet and outlet device 101 of the battery or the battery pack when the battery works.

At this point, a small amount of carbon dioxide in the work of the battery or battery has little effect, but in the long term for idle, if the gas inlet and outlet device of carbon dioxide in the cell or Air inlet and outlet device 101 freely, the long time exposure between carbon dioxide and battery electrolyte will cause electrolyte damage, such as curing, neutralization, carbonation. Therefore, we can solve this problem by closing and opening up the carbon dioxide inlet and outlet channel, that is, when the battery works, allow the carbon dioxide in the battery or battery pack on Air inlet and outlet device 101 free access. When the battery is not put into operation for a long time, Air inlet and outlet device 101 of the outer shell of the battery or the battery pack is completely closed, which will effectively avoid the damage of carbon dioxide to the electrolyte in the battery or battery pack (such as curing, neutralization, carbonation and so on).

I. Preparation of monocell:

FIG. 1, FIG. 2, FIG. 3, FIG. 13 and FIG. 68 each is related to an air metal fuel monocell innovated by the invention.

This example is made up of Air positive electrode 1, Air electrode positive current collector 11, Air electrode positive lug 12, Air electrode positive output circuit 13, Air electrode positive air inlet device 14, Air electrode carrier 15, Catalyst 16, Metal negative electrode 2, Metal negative current collector 21, Metal negative lug 22, Metal negative output circuit 23, Metal fuel 24, Membrane, membrane bag, bioactive membrane bag, bioactive membrane 3, Membrane bag sealing device 31, membrane bag edge bonding part 32, Membrane 33, Septum 34, Daub coating 35, Daub coating B 36, High temperature anti-freezing material for siphon film 4, Siphon end of siphon film 41, Ion terminal of siphon film 42, Electrolyte 5, Mandrel 6, Shockproof buffer layer 7, Negative electrolyte 8, Positive electrolyte 9, Positive electrolyte storage chamber 91, Positive electrolyte isolation device 92, Positive electrolyte storage chamber access channel 93, Battery shell and support fixing device 10, etc.

Each component of the first example is installed in accordance with the characteristics of FIG. 68 and the characteristics of each component as well as the actual requirements. The assembly and operation are basically the same as the example I.

II. Preparation of battery shell and preparation of battery pack:

In FIG. 84, FIG. 85, FIG. 89, FIG. 86:

FIG. 84 is the front view of the air metal fuel cell battery case.

FIG. 85 is the rear view of the air fuel cell battery pack.

(A) Installation of air inlet and outlet unit 101 on the shell of a metal fuel cell or battery pack Air inlet and outlet device 101 is composed of three parts: Filter device 1011, Switching device 1012 and Switch control device 1013. The Filter device 1011 is an air filtering device, which can filter the solid matter such as impurities and dust in the air to prevent them from entering into the battery pack.

Switching device 1012 is a channel which is automatically opened and closed on Air inlet and outlet device 101 according to the actual demand and the change of the condition, which is performed under the control and function of Switch control device 1013.

Switch control device 1013 is a control and power device of Switching device 1012, which controls the opening and closing of Switching device 1012 according to the change of actual requirements and conditions. The power of Switch control device 1013 is derived from the power of a single battery or battery pack, and can also be derived from the external power or the manual power.

1) First, Switching device 1012 is installed on the "Front" surface of the shell according to the actual requirements and conditions, then another Switching device 1012 is installed on the "Back" surface of the shell according to the actual requirements and conditions.

2) After the installation of the two Switching devices 1012 before and after the shell, Switch control device 1013 is installed on the corresponding part of the shell according to the actual requirements and conditions, 3) After the two Switching devices 1012 and Switch control device 1013 are installed, Filter device 1011 is arranged on Switching device 1012 on the "Front" surface of the shell.

Another Filter device 1011 is arranged on Switch device 1012 on the "Back" surface of the shell.

Thus, the installation of Air inlet and outlet device 101 on the "Front" and "Back" surface of the shell of the air metal fuel cell battery pack is completed.

(B) Single cell fixing and battery series parallel connection

It should be noted that, because the "Up" surface of the air metal fuel cell battery pack can be opened, after the installation of Air inlet and outlet device 101 of the front and back surfaces of the air fuel cell battery pack through the above-mentioned technical process, the following installation work begins.

Notice: Switching device 1012 on the "Front" and "Back" surface is turned off Open the "Up" surface of the shell of the air fuel cell battery pack.

In the structure of the prepared single cell shown in FIG. 89 and FIG. 86, one side of Air positive electrode 1 of the three groups of single cells is faced to the right surface of the metal fuel cell battery pack, and in accordance with the "Before" and "After" trends, a single battery is placed evenly on the bottom of the shell.

After a single battery is placed evenly on the bottom of the shell, adhesive, screws can be used, or in the case of the card slot set directly to a single cell fixed in the slot, and other methods to fix.

The three single cells are connected in parallel according to the single cell parallel structure shown in FIG. 86, Air electrode positive electrode output circuit 13 of the positive electrode unit is connected with each other through welding, stamping, printing, spraying, super pressure-high temperature spraying, coating, etc. and form the positive electrode of the battery pack and Metal negative output circuit 23 of the negative electrode unit is connected with each other through welding, stamping, printing, spraying, super pressure-high temperature spraying, coating etc. and form the negative electrode of the battery pack. Thus, the battery pack in the example is formed.

Close and seal the "Up" surface of the shell.

Thus, the fixing of the single cell and the connection of the battery pack are completed.

Integrated the A and B installation technology mentioned above, the installation work of the air metal fuel cell battery in Example IX is completed.

The installation process is best on conditions of the vacuum environment or dust-free environment, but also can be completed in the natural environment.

III. Operation of air metal fuel cell battery pack (III-1) Operation of air in and out of the shell of air metal fuel cell battery pack Switch control device 1013 is activated by the power of the battery pack, the external power or the manual mode. Under the control and the function of Switch control device 1013, Switching device 1012 is opened, and the outside air is filtered through Filter device 1011, and then enters the battery or the battery pack in Shell 103 through the switch of Switching device 1012. At the same time, the air in Shell 103 passes through Switching device 1012, and then passes through the filtering device into the outside air.

(III-2) Connect load, turn on electricity

The assembled air metal fuel battery positive and negative electrodes are connected to the positive pole and the negative pole of the load (Load is the transformation of the current, such as testing instruments, multimeter, resistance, light bulbs, the use of electric appliances, coffee pots, mobile phones, a variety of electrical appliances, etc.); When the positive and negative poles are connected, the power supply is switched on and the discharge is started.

(III-3) Generation process on monocell

According to the different nature of Negative electrolyte 8, the generation process of a single cell can be divided into two kinds of operation scheme: When Electrolyte 8 is alkaline, it is the first operation scheme; when Electrolyte 8 is a neutral electrolyte, it is the second operating scheme.

(III-3-1) The first operation scheme

Through Air inlet and outlet device 101 on the shell, the oxygen into the air in the shell enters into Air electrode carrier 15 through diffusion and, under the catalysis of Catalyst 16, oxygen molecules dissociate into oxygen ions; The hydroxyl ions and the water in electrolyte form hydrated hydroxyl ions, and with the help of the battery positive and negative electric field, the hydrated hydroxyl ions through Ion terminal of siphon film 42 to siphon membrane ion membrane, hydrated hydroxyl ions can pass through Ion terminal of siphon film 42 and reach the surface of the membrane the membrane bag, the biological active film bag and the biological active membrane 3. Because Membrane, membrane bag, bioactive membrane bag, bioactive membrane 3 are coated with Daub coating 35, which is hydrophobic substance, the water molecules can not enter into Electrolyte 5 and Negative electrolyte 8 through Membrane, membrane bag, bioactive membrane bag, bioactive membrane 3 while Negative electrode 8 and Daub coating 35 are the same nature of the material (that is, non polar substances), which can be mutually compatible; Negative electrode 8 is arranged in Membrane, membrane bag, bioactive membrane bag, bioactive membrane 3, and attached to the membrane hole of the inner surface of the membrane. At this time, hydrated hydroxyl ions in Positive electrolyte 9 will be transferred to the hydroxyl ion Negative electrolyte 8, and then the hydroxyl ion across Membrane, membrane bag, bioactive membrane bag, bioactive membrane 3 goes into Negative electrolyte 8 and Electrolyte 5, and continues to move under the action of the positive and negative electric field of the battery in Negative electrode 8 and Electrolyte 5, and up to the surface of Metal fuel 24, is combined with metal ions on the surface of Metal fuel 24 to form a metal hydroxide; In the combination of hydroxyl ions and metal ions, the electrons released from the metal ions on the surface of Metal fuel 24 pass through Metal fuel 24 and enter into Metal negative current collector 21, with the help of which the collected electrons are transmitted to the load through Metal negative lug 22 and Metal negative output circuit 23, and then, through the load, the collected electrons enter into Air electrode positive output circuit 13, Air electrode positive lug 12 and Air electrode positive current collector 11. Under the conduction of Air electrode positive output circuit 13, Air electrode positive lug 12 and Air electrode positive current collector 11, the electrode is moved to Air electrode carrier 15 to form a continuous and stable current.

Because of the structural characteristics of the membrane, Membrane, membrane bag, bioactive membrane bag, bioactive membrane 3 in the metal fuel (bio) cell, coating film coated on it, water in Positive electrolyte 9 and other molecular substances cannot pass through Membrane, membrane/bag, bioactive membrane bag, bioactive membrane 3 into Negative electrolyte 8 and Electrolyte 5, not into the surface of Metal fuel 24, which is a fundamental solution to Metal fuel 24 corrosion, gas production and battery voltage hysteresis, heat, expansion, self combustion, explosion and other global problems.

The advantage of High temperature anti freezing material for siphon film 4 is maintaining the liquid property of Positive electrolyte 9, which exists in the form of a solid state and a semi-solid state, and being well connected with Air positive electrode 1, Membrane, membrane bag, bioactive membrane bag, bioactive membrane, at the same time, maintaining the basic boundaries to Air positive electrode 1, Membrane, membrane bag, bioactive membrane bag, bioactive membrane 3, which not only greatly reduces and save the amount of Positive electrolyte 9, reducing the cost, but also stabilizes the running state of the electrolyte, reducing the volume and the weight of the battery.

More importantly, it is effective to control and adjust the supply quantity of Positive electrolyte 9, and simultaneously control and regulate the operating temperature of the battery, and control the stability of the current. And the problems of high temperature, expansion and spontaneous combustion of the battery are completely solved under the condition that Membrane, membrane bag, bioactive membrane bag, bioactive membrane 3 are matched to ensure that the battery to improve the operating state in normal temperature in the state of high and low temperature The above operation process of hydroxyl ions and electrons are done in an instant speed, that is, the speed of light.

In addition, after the load connected to the battery is disconnected, the battery in the hydroxyl ion and electron will also stop the movement.

Because of the structural characteristics of Membrane, membrane bag, bioactive membrane bag, bioactive membrane 3 in the metal fuel (bio) cell, coating film coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, therefore, there is no problem such as battery self discharge, overheating, expansion, explosion, etc. in the process of battery placement.

(III-3-2) The second operation scheme

Through Air inlet and outlet device 101 on the shell, the oxygen into the air in the shell enters into Air electrode carrier 15 through diffusion and, under the catalysis of Catalyst 16, oxygen molecules dissociate into oxygen ions;

Meanwhile, under the action of positive and negative electric field, the metal ions on the surface of Metal fuel 24 enter into Negative electrolyte 8 and Electrolyte 5, and move through Negative electrolyte 8 and Electrolyte 5 to Membrane, membrane bag, bioactive membrane bag, bioactive membrane 3. At the same time, Positive electrolyte 9 is attached to the outer surface of Membrane, membrane bag, bioactive membrane bag, bioactive membrane 3, and because Membrane, membrane bag, bioactive membrane bag, bioactive membrane 3 are coated with Daub coating 35, which is hydrophobic substance, the water molecules can not enter into Electrolyte 5 and Negative electrolyte 8 through Membrane, membrane bag, bioactive membrane bag, bioactive membrane 3 while the negative electrode 8 and the coating film coating 35 are the same nature of the material (that is, non polar substances), which can be mutually compatible; Negative electrolyte 8 is arranged in Membrane, membrane bag, bioactive membrane bag, bioactive membrane 3, and attached to the membrane hole of the inner surface of the membrane. At this time, hydrated hydroxyl ions in positive electrolyte 9 will be transferred to the hydroxyl ion cathode electrolyte 8, and then the hydroxyl ion across Membrane, membrane bag, bioactive membrane bag, bioactive membrane 3 goes into Negative electrolyte 8 and Electrolyte 5, and continues to move under the action of the positive and negative electric field of the battery in Negative electrode 8 and Electrolyte 5, and up to the surface Metal fuel 24, is combined with metal ions on the surface of Metal fuel 24 to form a metal hydroxide; In the combination of hydroxyl ions and metal ions, the electrons released from the metal ions on the surface of Metal fuel 24 pass through the Metal fuel 24 and enter into Metal negative current collector 21, with the help of which the collected electrons are transmitted to the load through Metal negative lug 22 and Metal negative output circuit 23, and then, through the load, the collected electrons enter into Air electrode positive output circuit 13, Air electrode positive lug 12 and Air electrode positive current collector 11. Under the conduction of Air electrode positive output circuit 13, Air electrode positive lug 12 and Air electrode positive current collector 11, the electrode is moved to the Air electrode carrier 15 to form a continuous and stable current.

(If the positive electrode material is pure oxygen, the current of the battery and the battery pack will be more stable, the electric power is larger, and the current density is higher, at least 3 times as air as cathode material.)

Because of the structural characteristics of Membrane, membrane bag, bioactive membrane bag, bioactive membrane 3 in the metal fuel (bio) cell, coating film coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, which is a fundamental solution to Metal fuel 24 corrosion, gas production and battery voltage hysteresis, heat, expansion, self combustion, explosion and other global problems.

The advantage of High temperature anti-freezing material for siphon film 4 is maintaining the liquid property of Positive electrolyte 9, which exists in the form of a solid state and a semi-solid state, and being well connected with Air positive electrode 1, Membrane, membrane bag, bioactive membrane bag, bioactive membrane 3, at the same time, maintaining the basic boundaries to Air positive electrode 1, Membrane, membrane bag, bioactive membrane bag, bioactive membrane 3, which not only greatly reduces and save the amount of Positive electrolyte 9, reducing the cost, but also stabilizes the running state of the electrolyte, reducing the volume and the weight of the battery.

More importantly, it is effective to control and adjust the supply quantity of Positive electrolyte 9, and simultaneously control and regulate the operating temperature of the battery, and control the stability of the current. And the problems of high temperature, expansion and spontaneous combustion of the battery are completely solved under the condition that the membrane, Membrane, membrane bag, bioactive membrane bag, bioactive membrane 3 are matched to ensure that the battery to improve the operating state in normal temperature in the state of high and low temperature The above operation process of hydroxyl ions and electrons are done in an instant speed, that is, the speed of light.

In addition, after the load connected to the battery is disconnected, the battery in the hydroxyl ion and electron will also stop the movement.

Because of the structural characteristics of Membrane, membrane bag, bioactive membrane bag, bioactive membrane 3 in the metal fuel (bio) cell, coating film coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, therefore, there is no problem of battery self discharge in the process of battery placement.

(III-4) Shutdown process of air metal fuel cell battery pack

When the battery does not work for a long time, the connection between the battery pack and the load is disconnected. After the disconnection, the discharge is stopped.

Switch control device 1013 is activated by the power of the battery pack, the external power or the manual mode. Under the control and the function of Switch control device 1013, Switching device 1012 is closed, so that the outside air is not allowed to enter the battery or battery pack inside the Shell 103. The air inside the Shell 103 cannot enter the outside air, which effectively solves the problem of carbon dioxide on the electrolyte battery or battery in damage (such as curing, neutralization, carbonation etc.).

Example X: Metal Fuel Cell with Pure Oxygen as Positive Electrode Material

If the positive electrode material is pure oxygen, the current of the battery and the battery pack will be more stable, the electric power is larger, and the current density is higher, at least 3 times as air as cathode material.

At the same time, the volume of the battery and the battery pack can be reduced as well as the weight of the battery and the battery pack, and the cost of the battery and the battery pack can be saved.

It can be used in a natural state, can also be used in places where the air is thin, the lack of oxygen or no oxygen, such as the atmosphere, outer space, the deep sea, or underwater and sub space, I. Preparation of monocell:

FIG. 1, FIG. 2, FIG. 3, FIG. 13, FIG. 68 each relates to metal fuel cell single cell with pure oxygen as positive electrode material, which is innovated by the invention.

This example is made up of Air positive electrode 1, Air electrode positive current collector 11, Air electrode positive lug 12, Air electrode positive output circuit 13, Air electrode positive air inlet device 14, Air electrode carrier 15, Catalyst 16, Metal negative electrode 2, Metal negative current collector 21, Metal negative lug 22, Metal negative output circuit, Metal fuel 24, Membrane, membrane bag, bioactive membrane bag, bioactive membrane 3, Membrane bag sealing device 31, Membrane bag edge bonding part 32, Membrane 33, Membrane 34, Daub coating 35, Daub coating B 36, High temperature anti freezing material for siphon film 4, Siphon end of siphon film 41, Ion terminal of siphon film 42, Electrolyte 5, Negative electrolyte 8, Positive electrolyte 9, Positive electrolyte storage chamber 91, Positive electrolyte isolation device 92, Positive electrolyte storage chamber access channel 93, Battery shell and support fixing device 10, etc.

Each component of the first example is installed in accordance with the characteristics of FIG. 68 and the characteristics of each component as well as the actual requirements. The assembly and operation are basically the same as the example I.

II. Metal fuel cell with pure oxygen as positive electrode material

Preparation of battery shell and preparation of battery pack:

In FIG. 86, and FIG. 94: FIG. 94 is a sectional view of a metal fuel cell battery pack with pure oxygen as the cathode material. FIG. 86 is a cross section of figure in the B-B direction.

The battery or the battery pack is divided into three parts, one part is the storage part of the positive electrode material, one is a power generating part, and one is the connecting part of the storage part and the power generating part.

The storage part of the positive electrode material is composed of Pure oxygen storage tank 106, Aerator 1062, Oxygen supply device 1063 and Pure oxygen 1061.

The power generation part is composed of Shell 103, Monocell 102, and Pure oxygen supply device 1016.

The connecting part of the storage part and the power generating part is composed of Voltage regulating switch device 107.

(A) Fixing of single cell of metal fuel cell with pure oxygen as positive electrode and series parallel connection of battery, that is, assembly of power generation part.

It should be noted that the "Up" surface of the metal fuel cell with pure oxygen as positive electrode can be opened.

1. Open the "Up" surface of the shell of the air fuel cell battery pack.

2. In the structure of the prepared single cell shown in FIG. 89 and FIG. 86, one side of Air positive electrode 1 of the three groups of single cells is faced to the right surface of the metal fuel cell battery pack, and in accordance with the "Before" and "After" trend, a single battery is placed evenly on the bottom of the shell.

3. After a single battery is placed evenly on the bottom of the shell, adhesive, screws can be used, or in the case of the card slot set directly to a single cell fixed in the slot, and other methods to fix.

4. The three single cells are connected in parallel according to the single cell parallel structure shown in FIG. 86, Air positive electrode output circuit 13 of the positive electrode unit is connected with each other through welding, stamping, printing, spraying, super pressure-high temperature spraying, coating, etc. and form the positive electrode of the battery pack and Metal negative output circuit 23 of the negative electrode unit is connected with each other through welding, stamping, printing, spraying, super pressure-high temperature spraying, coating etc. and form the negative electrode of the battery pack. Thus, the battery pack in the example is formed.

5. Close and seal the "Up" surface of the shell,

Thus, the fixing of the single cell and the connection of the battery pack are completed.

(B) Assembly and deployment of three parts of metal fuel cell with pure oxygen as positive electrode 1. After the power generation part is assembled, the storage part of the positive electrode material and the assembled power generation part are connected with the connecting part of the storage part and the power generation part. That is, Voltage regulating switch device 107, an oxygen supply device which is provided with Pure oxygen supply device 1016 and Pure oxygen storage tank (106) on Shell 103 is provided. At this time, Voltage regulating switch device 107 is in a completely closed state.

2. Then, according to the actual demand and the change of conditions, the pure oxygen 1061 is added to Pure oxygen storage tank 106 through Aerator 1062.

Integrated the installation technology A and B mentioned above, the installation work of the metal fuel cell with pure oxygen as positive electrode in Example X is completed. The installation process is best on conditions of the vacuum environment or dust-free environment, but also can be completed in the natural environment.

III. Operation of metal fuel battery pack with pure oxygen as positive electrode (III-1) According to the actual demand and the change of the condition, open Voltage regulating switch device 107 to adjust the pressure, oxygen is supplied to a single cell or a battery pack through Pure oxygen supply device 1016 on Shell 103, and the cathode material is used as a power generating part to participate in power generation. At this time, the shell is filled with the pressure of oxygen.

(III-2) The positive and negative electrodes of assembled metal fuel battery are connected to the positive pole and the negative pole of the load (Load is the transformation of the current, such as testing instruments, multimeter, resistance, light bulbs, the use of electric appliances, coffee pots, mobile phones, a variety of electrical appliances, etc.); When the positive and negative poles are connected, the power supply is switched on and the discharge is started.

(III-3)

According to the different nature of the negative electrolyte 8, the generation process of a single cell can be divided into two kinds of operation scheme: When the cathode electrolyte 8 is alkaline, it is the first operation scheme; when the cathode electrolyte 8 is a neutral electrolyte, it is the second operating scheme.

(III-3-1) The first operation scheme

Through the Pure oxygen plant 1016 on the shell, the oxygen into the air in the shell enters into the air electrode carrier 15 through diffusion and, under the catalysis of catalyst 16, oxygen molecules dissociate into oxygen ions;

The hydroxyl ion in electrolyte and cathode water form hydrated hydroxyl ions, and with the help of the battery positive and negative electric field, hydrated hydroxyl ions can pass through Ion terminal of siphon film 42 and reach the surface of Membrane, membrane bag, bioactive membrane bag, bioactive membrane 3. Because Membrane, membrane bag, bioactive membrane bag, bioactive membrane 3 are coated with Daub coating 35, which is hydrophobic substance, the water molecules can not enter into Electrolyte 5 and Negative electrolyte 8 through Membrane, membrane bag, bioactive membrane bag, bioactive membrane 3 while Negative electrode 8 and Daub coating 35 are the same nature of the material (that is, non polar substances), which can be mutually compatible; Negative electrode 8 is arranged in the membrane, Membrane, membrane bag, bioactive membrane bag, bioactive membrane 3, and attached to the membrane hole of the inner surface of the membrane. At this time, hydrated hydroxyl ions in Positive electrolyte 9 will be transferred to the hydroxyl ions in Negative electrolyte 8, and then the hydroxyl ion across Membrane, membrane bag, bioactive membrane bag, bioactive membrane 3 goes into Negative electrolyte 8 and Electrolyte 5, and continues to move under the action of the positive and negative electric field of the battery in Negative electrolyte 8 and the Electrolyte 5, and up to the surface of Metal fuel 24, is combined with metal ions on the surface of Metal fuel 24 to form a metal hydroxide; In the combination of hydroxyl ions and metal ions, the electrons released from the metal ions on the surface of Metal fuel 24 pass through the Metal fuel 24 and enter into Metal negative current collector 21, with the help of which the collected electrons are transmitted to the load through Metal negative lug 22 and Metal negative output circuit 23, and then, through the load, the collected electrons enter into Air electrode positive output circuit 13, Air electrode positive lug 12 and Air positive electrode current collector 11. Under the conduction of Air positive electrode output circuit 13, Air electrode positive lug 12 and Air positive electrode current collector 11, the electrons are moved to the Air electrode carrier 15 to form a continuous and stable current.

Because of the structural characteristics of Membrane, membrane bag, bioactive membrane bag, bioactive membrane 3 in the metal fuel (bio) cell, coating film coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, which is a fundamental solution to Metal fuel 24 corrosion, gas production and battery voltage hysteresis, heat, expansion, self combustion, explosion and other global problems.

The advantage of High temperature anti freezing material for siphon film 4 is maintaining the liquid property of Positive electrolyte 9, which exists in the form of a solid state and a semi-solid state, and being well connected with Air positive electrode 1, Membrane, membrane bag, bioactive membrane bag, bioactive membrane 3, at the same time, maintaining the basic boundaries to Air positive electrode 1, Membrane, membrane bag, bioactive membrane bag, bioactive membrane 3, which not only greatly reduces and save the amount of Positive electrolyte 9, reducing the cost, but also stabilizes the running state of the electrolyte, reducing the volume and the weight of the battery.

More importantly, it is effective to control and adjust the supply quantity of Positive electrolyte 9, and simultaneously control and regulate the operating temperature of the battery, and control the stability of the current. And the problems of high temperature, expansion and spontaneous combustion of the battery are completely solved under Membrane, membrane bag, bioactive membrane bag, bioactive membrane 3 are matched to ensure that the battery to improve the operating state in normal temperature in the state of high and low temperature The above operation processes of hydroxyl ions and electrons are done in an instant speed, that is, the speed of light.

In addition, after the load connected to the battery is disconnected, and the battery in the hydroxyl ion and electron will also stop the movement.

Because of the structural characteristics of Membrane, membrane bag, bioactive membrane bag, bioactive membrane 3 in the metal fuel (bio) cell, coating film coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, therefore, there is no problem such as battery self discharge, overheating, expansion, explosion, etc. in the process of battery placement.

(III-3-2) The second operation scheme

Through the Pure oxygen plant 1016 on the shell, the oxygen into the air in the shell enters into Air electrode carrier 15 through diffusion and, under the catalysis of Catalyst 16, oxygen molecules dissociate into oxygen ions:

Under the action of positive and negative electric field, the metal ions on the surface of Metal fuel 24 enter into Negative electrolyte 8 and Electrolyte 5, and move through Negative electrolyte 8 and Electrolyte 5 to the membrane holes and the outer membrane surface of Membrane, membrane bag, bioactive membrane bag, bioactive membrane 3.

At the same time, Positive electrolyte 9 is attached to the outer surface of Membrane, membrane bag, bioactive membrane bag, bioactive membrane 3. Because Membrane, membrane bag, bioactive membrane bag, bioactive membrane 3 are coated with Daub coating 35, which is hydrophobic substance, the water molecules can not enter into Electrolyte 5 and Negative electrolyte 8 through Membrane, membrane bag, bioactive membrane bag, bioactive membrane 3 while Negative electrode 8 and Daub coating 35 are the same nature of the material (that is, non polar substances), which can be mutually compatible; Negative electrode 8 is arranged in Membrane, membrane bag, bioactive membrane bag, bioactive membrane 3, and attached to the membrane hole of the inner surface of the membrane. At this time, hydrated hydroxyl ions in Positive electrolyte 9 will be transferred to the hydroxyl ion Negative electrolyte 8, and then the hydroxyl ions across Membrane, membrane bag, bioactive membrane bag, bioactive membrane 3 go into Negative electrolyte 8 and Electrolyte 5, and continues to move under the action of the positive and negative electric field of the battery in the Negative electrolyte 8 and Electrolyte 5, and up to the surface of Metal fuel 24, is combined with metal ions on the surface of Negative fuel 24 to form a metal hydroxide; In the combination of hydroxyl ions and metal ions, the electrons released from the metal ions on the surface of Negative fuel 24 pass through Metal fuel 24 and enter into Metal negative current collector 21, with the help of which the collected electrons are transmitted to the load through Metal negative lug 22 and Metal negative output circuit 23, and then, through the load, the collected electrons enter into Air electrode positive output circuit 13, Air electrode positive lug 12 and the positive electrode of the air electrode 11. Under the conduction of Air electrode positive output circuit 13, Air electrode positive lug 12 and Air positive electrode current collector 11, the electrons are moved to Air electrode carrier 15 to form a continuous and stable current.

Because of the structural characteristics of Membrane, membrane bag, bioactive membrane bag, bioactive membrane 3 in the metal fuel (bio) cell, coating film coated on it, water in Positive electrolyte 9 and other molecular substances cannot pass through Membrane, membrane bag, bioactive membrane bag, bioactive membrane 3 into Negative electrolyte 8 and Electrolyte 5, not onto the surface of Metal fuel 24, which is a fundamental solution to Metal fuel 24 corrosion, gas production and battery voltage hysteresis, heat, expansion, self combustion, explosion and other global problems.

The advantage of High temperature anti freezing material for siphon film 4 is maintaining the liquid property of Positive electrolyte 9, which exists in the form of a solid state and a semi-solid state, and being well connected with Air positive electrode 1, Membrane, membrane bag, bioactive membrane bag, bioactive membrane 3, at the same time, maintaining the basic boundaries to Air positive electrode 1, Membrane, membrane bag, bioactive membrane bag, bioactive membrane 3, which not only greatly reduces and save the amount of Positive electrolyte 9, reducing the cost, but also stabilizes the running state of the electrolyte, reducing the volume and the weight of the battery.

More importantly, it is effective to control and adjust the supply quantity of Positive electrolyte 9, and simultaneously control and regulate the operating temperature of the battery, and control the stability of the current. And the problems of high temperature, expansion and spontaneous combustion of the battery are completely solved under the condition that Membrane, membrane bag, bioactive membrane bag, bioactive membrane 3 are matched to ensure that the battery to improve the operating state in normal temperature in the state of high and low temperature The above operation process of hydroxyl ions and electrons are done in an instant speed, that is, the speed of light.

In addition, after the load connected to the battery is disconnected, and the battery in the hydroxyl ion and electron will also stop the movement.

Because of the structural characteristics of the membrane, Membrane, membrane bag, bioactive membrane bag, bioactive membrane 3 in the metal fuel (bio) cell, coating film coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, therefore, there is no problem such as battery self discharge in the process of battery placement.

(III-4) Shutdown process of metal fuel battery pack with pure oxygen as positive electrode When the battery does not work for a long time, the connection between the battery pack and the load is disconnected. After the disconnection, the discharge is stopped.

Because of the structural characteristics of Membrane, membrane bag, bioactive membrane bag, bioactive membrane 3 in the metal fuel (bio) cell, coating film coated on it, water in Positive electrolyte 9 and other molecular substances cannot pass through Membrane, membrane bag, bioactive membrane bag, bioactive membrane 3 into Negative electrolyte 8 and Electrolyte 5, not into the surface of Metal fuel 24, therefore, there is no problem such as battery self discharge in the process of battery placement.

The positive electrode material used in metal fuel cell battery for pure oxygen is pure oxygen. Therefore, the battery and the battery pack are completely isolated from the outside air, and the carbon dioxide in the air and the air can not enter into the battery and the battery pack, which is to stabilize the current, increase the power, increase the current density, and effectively solves the problem of carbon dioxide on the electrolyte battery or battery in damage (such as curing, neutralization, carbonation etc.).

Example XI: Metal Alloy "Immerse" Membrane, Membrane Bag, Bioactive Membrane Bag, Bioactive Membrane 3, Electrolyte 5

In FIG. 74, FIG. 75, FIG. 76, FIG. 77, FIG. 74 each is a sectional drawing of FIG. 1 on G-G.

Figure 77:
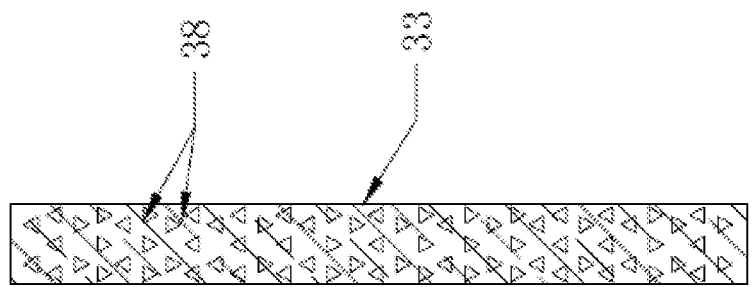
FIG. 77 shows another partial enlarged view of the membrane bag along direction of FIG. 74.
Figure 76:
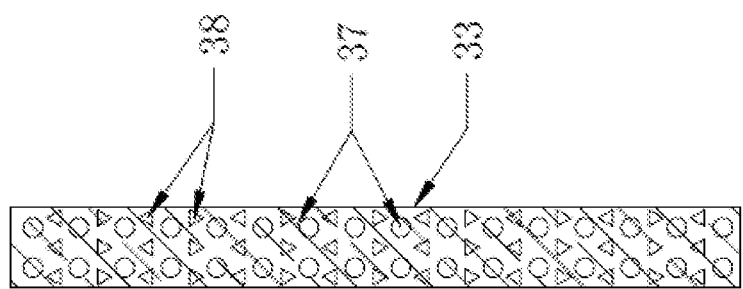
FIG. 76 shows another partial enlarged view of the membrane bag along direction of FIG. 74.
Figure 75:
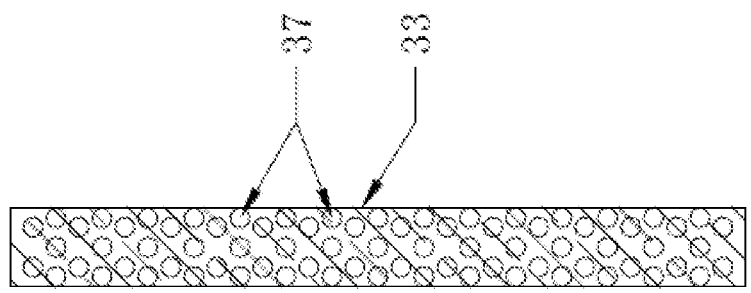
FIG. 75 shows a partial enlarged view of the membrane bag along direction of FIG. 74.
Figure 74:
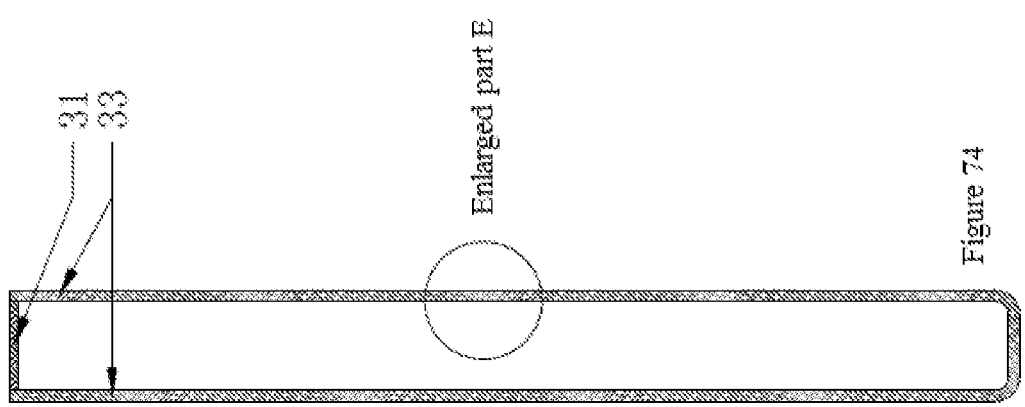
FIG. 74 shows a structure diagram of the membrane bag (Partially enlarged in Part E).

FIG. 75, FIG. 76, and FIG. 77 each is an enlarged image of FIG. 74 in the E area.

The word "immersion" means, through a certain method, Metal alloy elements 37 and Nonmetal alloy elements 38 are added to Membrane, membrane bag, bioactive membrane bag, bioactive membrane 3, Electrolyte 5, like the oil slowly infiltrated into the paper, but, at the same time, the ionic permeability and permeability of the film, film bag, film bag, biological activity of bioactive membrane 3, Electrolyte 5 should be ensured According to the different requirements and conditions in practical application, one or more kinds of technological methods are used to selectively prepare the metal alloy to the corresponding parts of Membrane, membrane bag, bioactive membrane bag, bioactive membrane 3. Chemical immersion method for metal alloy: chemical deposition, electroplating, ion plating, vapor deposition, vacuum ion plating, high pressure ion spraying coating, high temperature and high pressure ion spraying coating, synthesis, etc. Physical methods used: spraying method, molecular sputtering method, nano technology, ultrasonic mixing, etc. Biological methods used: biological bacteria, biological fermentation, biological bonding, etc.

According to the different requirements and conditions in practical application, one or more kinds of technological methods are used to prepare or not to prepare the metal alloy to the corresponding parts of electrolyte 5 (no preparation is the most ideal, which can reduce costs)

Chemical immersion method for metal alloy: chemical deposition, electroplating, ion plating, vapor deposition, vacuum ion plating, high pressure ion spraying coating, high temperature and high pressure ion spraying coating, synthesis, etc. Physical methods used: spraying method, molecular sputtering method, nano technology, ultrasonic mixing, etc. Biological methods used: biological bacteria, biological fermentation, biological bonding, etc.

By the technique above, at least one metal alloy element 37 (not limited to one), such as magnesium, aluminum, plumbum, tin, indium, manganese, nickel, germanium, antimony, platinum and other metals in the periodic table, and at least one Non metal alloy elements 38 38 (not limited to one), such as silicon, carbon, selenium, iodine, sulfur and other non-metallic elements of the periodic table selectively are produced to the corresponding part of membrane, membrane bag, bioactive film bag, biological active membrane 3.

By the technique above, at least one Metal alloy elements 37 (not limited to one) is produced to the corresponding part of Membrane, membrane bag, bioactive membrane bag, bioactive membrane 3.

By the technique above, at least one Non metal alloy elements 38 38 (not limited to one) is produced to the corresponding part of Membrane, membrane bag, bioactive membrane bag, bioactive membrane 3.

Most importantly, through the variety of process methods above, at least one Metal alloy elements 37 (not limited to one) is combined to Membrane, membrane bag, bioactive membrane bag, bioactive membrane, or t least one Nonmetal alloy elements 38 (not limited to one) is combined to Membrane, membrane bag, bioactive membrane bag, bioactive membrane 3, or at least one Metal alloy elements 37 (not limited to one) and at least one Nonmetal alloy elements 38 (not limited to one) are combined to Membrane, membrane bag, bioactive membrane bag, bioactive membrane 3 and dorms the indivisible, the world's unique and innovative new structure, new material of Membrane, membrane bag, bioactive membrane bag, bioactive membrane 3.

To sum up, the method above can also effectively solve the global problems of air metal fuel cell which has not been solved yet. For example: metal corrosion, discharge stop, short period of time current failure, power failure, high battery temperature, expansion, self combustion and other issues. Moreover, this method is more widely used than the current research and development of metal alloys to reduce the cost of the process, making it easier.

A metal alloy film bag is effectively formed by the technical process, which effectively replaces the metal fuel alloy (In order to reduce and prevent the metal from corrosion, the corrosion resistance of the metal is added to the metal. This method has been used in the experiment for many years, the effect is not ideal and the cost is high because of a composite alloy metal, such as aluminum alloy, zinc alloy, iron alloy, etc.) Our original process is not the use of alloy metal directly with a single metal, such as aluminum, magnesium, zinc, iron, tin, etc. The metal alloy film bag can be used repeatedly, thereby greatly saving the cost, and solving a series of difficult problems safely and reliably.

In FIG. 76, Nonmetal alloy elements 38 is "immersed" into the membrane, the membrane bag, the bioactive film bag, and the bioactive membrane 3, that is, at least one Nonmetal alloy elements 38 is immersed in Membrane, membrane bag, bioactive membrane bag, bioactive membrane 3.

Therein, Nonmetal alloy elements 38 is at least one nonmetal element, and is added to Metal fuel 24 to form the alloy metal fuel; here is the "immersion" of Nonmetal alloy elements 38 to Membrane, membrane bag, bioactive membrane bag, bioactive membrane 3, which can be a nonmetallic element in the periodic table such as silicon, carbon, selenium, iodine, sulfur, etc.

In FIG. 77, Metal alloy elements 37 and non metallic element 38 are "immersed" into Membrane, membrane bag, bioactive membrane bag, bioactive membrane 3, that is, at least one Metal alloy elements 37 and at least one Nonmetal alloy elements 38 are immersed in Membrane, membrane bag, bioactive membrane bag, bioactive membrane 3.

Therein, Metal alloy elements 37 is at least one metal element, and is added to Metal fuel 24 to form the alloy metal fuel; here is the "immersion" of Metal alloy elements 37 to Membrane, membrane bag, bioactive membrane bag, bioactive membrane 3, which can be a metallic element in the periodic table such as silicon, carbon, selenium, iodine, sulfur, etc.

Therein, Nonmetal alloy elements 38 is at least one nonmetal element, and is added to the metal fuel 24 to form the alloy metal fuel; here is the "immersion" of non metallic element 38 to Membrane, membrane bag, bioactive membrane bag, bioactive membrane 3, which can be a nonmetallic element in the periodic table such as silicon, carbon, selenium, iodine, sulfur, etc.

In the same way, Metal alloy elements 37 and Nonmetal alloy elements 38 can be "immersed" in Electrolyte 5 in different ways and techniques.

Metallic alloy element 37 is "immersed" into Electrolyte 5, that is, at least one Metal alloy elements 37 different from Metal fuel 24 is "immersed" in Electrolyte 5.

Non metal alloy elements 38 is "immersed" in Electrolyte 5, that is, at least one non-metallic alloy element 38 is "immersed" in Electrolyte 5.

Metal alloy elements 37 and Nonmetal alloy elements 38 are "immersed" in Electrolyte 5, that is at least one nonmetal alloy elements 38 are "immersed" in Electrolyte 5.

Similarly, Metal alloy elements 37 and Nonmetal alloy elements 38 can be made into a structure with ion permeability of Membrane, membrane bag, bioactive membrane bag, bioactive membrane 3 and electrolyte 5, directly replacing the membrane, membrane bag, bioactive membrane bag, biological active membrane 3, and Electrolyte 5. It can also be combined into Membrane, membrane bag, bioactive membrane bag, bioactive membrane 3 and Electrolyte 5 to form a battery.

The innovative structure and technology of the invention not only has the function of eliminating the corrosion of the metal by the method of the alloy, but also can reduce the cost of manufacturing the alloy. Under normal circumstances, Metal fuel 24 is made into an alloy, which can reduce the corrosion of the electrolyte to the metal fuel by 24, thus reducing the self discharge of the battery. However, each time the battery is discharged, Metal alloy elements 37 of Metal fuel 24 will be reduced, which requires more programs. Even after the completion of the reduction, it is necessary to increase the number of steps to alloy, thus making alloy Metal fuel 24, in particular, some precious metals and rare elements. This is bound to increase the battery alloy Metal fuel 24 of the production process and production costs. The structure and technology of the invention only needs to "immerse" Metal alloy elements 37, non metal alloy element 38 to Membrane, membrane bag, bioactive membrane bag, bioactive membrane 3, Electrolyte 5 one-time, which can solve the problem of the corrosion of Metal fuel 24, and The production process of Metal fuel 24 is reduced, and the production cost of Metal fuel 24 is reduced.

Aluminum alloy (Al) is used as the substrate, in which Indium In, magnesium Mg, tin Sn, lead Pb are added to make the aluminum alloy as the negative electrode of the battery, which has a smaller corrosion rate.

By using the innovative structure and technology of the invention, only indium In, magnesium Mg, tin Sn, lead Pb and other elements are added to Membrane, membrane bag bioactive membrane bag, bioactive membrane 3, Electrolyte 5, and can solve the corrosion problem of aluminum (Al) permanently. The production process of Metal fuel 24 is reduced, and the production cost of Metal fuel 24 is reduced.

Example XII: Dynamic Air Metal Fuel Cell Structure

FIG. 78, FIG. 79, FIG. 80, FIG. 81, and FIG. 82 are the innovation of several dynamic structure of the air metal fuel cell.

Figure 78:
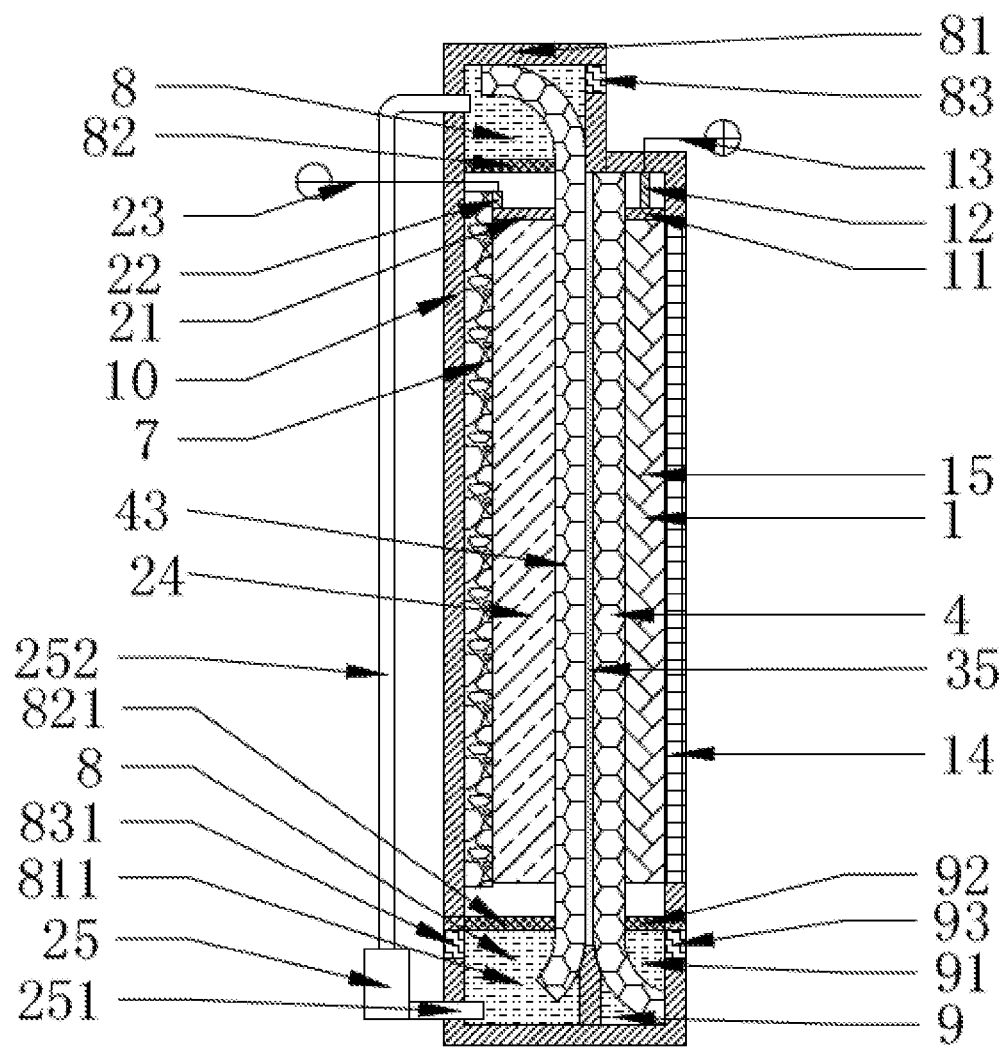
FIG. 78 shows a structure diagram of the air metal fuel cell with dynamic negative electrolyte.

1. FIG. 78 is a dynamic structure air metal fuel cell with Negative electrolyte 8 movement.

(1-1) first introduction to several battery components:

Negative electrolyte pump 25, Liquid inlet device of negative electrolyte pump 251, Liquid discharging device of negative electrolyte pump 252, Negative electrolyte storage chamber 81, Negative electrolyte isolation device 82, Negative electrolyte storage chamber access channel 83, Negative electrolyte second storage chamber 811, Negative electrolyte second isolation device 821, Negative electrolyte second storage access channel 831, High temperature anti-freezing material for negative electrode electrolyte membrane 43, Daub coating 35.

(DT-1) Negative electrolyte pump 25: A device capable of beating the movement of Negative electrolyte 8, withstanding the corrosion of Negative electrolyte 8, and being used for a long time. It can be a diaphragm pump, a peristaltic pump, a vacuum pump, and other devices.

(DT-2) Liquid inlet device of negative electrolyte pump 251: a tube in which Negative electrolyte 8 can flow, the suction end of Negative electrolyte pump 25. One end is connected with Negative electrolyte storage chamber 811, and the other end is connected with Negative electrolyte pump 25. Negative electrode 8 can be introduced into Negative electrolyte pump 25 by means of Liquid inlet device of negative electrolyte pump 251.

(DT-3) Liquid discharging device of negative electrolyte pump 252: a tube in which Negative electrolyte 8 can flow, the outlet end of Negative electrolyte pump 25. One end is connected with Negative electrolyte storage chamber 81, and the other end is connected with Negative electrolyte pump 25. Under the action of Negative electrolyte pump 25, Negative electrode 8 can be introduced into Negative electrolyte pump 25 by means of Liquid discharging device of negative electrolyte pump 252.

(DT-4) Negative electrolyte storage chamber 81: A hollow cavity in shape of cuboids, cube, cylinder, sphere and other shapes, for storing Negative electrode 8 with at least two openings, one of which is High temperature anti-freezing material for negative electrode electrolyte membrane 43, which is used for adsorbing Negative electrode 8 then adsorbed to the ion end of the siphon membrane, and the other is an supply opening of Negative electrode 8.

Negative electrode storage chamber 81 can be connected with the battery, so that the battery shell and the supporting fixing device can be shared with the other components of the battery, and it can also be separated from the battery or two or more cells share Negative electrolyte storage chamber 81.

In order to prevent leakage of Negative electrode 8 from the two openings in Negative electrolyte storage chamber 81, a plurality of adsorbing materials can be filled in Negative electrolyte storage chamber 81 to fix Negative electrode 8 on the adsorbing material, choice: sponge, absorbent cotton, foam carbon nano materials, glass fiber, etc. and the materials used: ABS, polyethylene, polypropylene, PVC, PVC, alloy, metal etc.

(DT-5) Negative electrolyte isolation device 82

Negative electrolyte storage chamber 81 is provided with an inlet for the siphon end of the siphon film, and in order to prevent the leakage of the electrolyte from the opening and the siphon end of High temperature anti-freezing material for negative electrode electrolyte membrane 43, Negative electrolyte isolation device 82 is arranged, which will not affect the adsorption capacity of the siphon end of the siphon film, and is a sealing device which can be sealed rubber ring, PTFE sealing rubber ring, graphite sealing mud, etc.

(DT-6) Negative electrolyte storage chamber access channel 83: an opening on Negative electrolyte storage chamber 81, which is used for supplementing the negative electrode electrolyte, and also can be used for discharging Negative electrolyte 8. A switch is arranged on Negative electrolyte storage chamber access channel 83, which is on when supplementing Negative electrolyte 8 is off when finishing. It is the same when discharging Negative electrolyte 8

(DT-7) Negative electrolyte second storage chamber 811:

A hollow cavity in shape of cuboids, cube, cylinder, sphere and other shapes, for storing Negative electrode 8 with at least two openings, one of which is High temperature anti-freezing material for negative electrode electrolyte membrane 43, which is used for adsorbing Negative electrode 8 then adsorbed to the ion end of the siphon membrane, and the other is an supply opening of Negative electrode 8.

Negative electrolyte storage chamber 81 can be connected with the battery, so that the battery shell and the supporting fixing device can be shared with the other components of the battery, and it can also be separated from the battery or two or more cells share Negative electrolyte storage chamber 81.

In order to prevent leakage of Negative electrode 8 from the two openings in Negative electrolyte storage chamber 81, a plurality of adsorbing materials can be filled in Negative electrolyte storage chamber 81 to fix Negative electrode 8 on the adsorbing material, choice: sponge, absorbent cotton, foam carbon nano materials, glass fiber, etc. and the materials used: ABS, polyethylene, polypropylene, PVC, PVC, alloy, metal etc.

(DT-8) Negative electrolyte second isolation device 821

Negative electrolyte storage chamber 81 is provided with an inlet for the siphon end of the siphon film, and in order to prevent the leakage of the electrolyte from the opening and the siphon end of High temperature anti-freezing material for negative electrode electrolyte membrane 43, Negative electrolyte isolation device 82 is arranged, which will not affect the adsorption capacity of the siphon end of the siphon film, and is a sealing device which can be sealed rubber ring, PTFE sealing rubber ring, graphite sealing mud, etc.

(DT-9) Negative electrolyte second storage access channel 831: an opening on Negative electrolyte storage chamber 81, which is used for supplementing the negative electrode electrolyte, and also can be used for discharging Negative electrolyte 8. A switch is arranged on Negative electrolyte storage chamber access channel 83, which is on when supplementing Negative electrolyte 8 is off when finishing. It is the same when discharging Negative electrolyte 8

(DT-10) High temperature anti-freezing material for negative electrode electrolyte membrane 43

Structure characteristics: In the form of sheet, strip, rectangle, bar, polygon, circle, ellipse, triangle, polygon, etc. The thickness can be any value within the range of 0.001 nm-1 nm, 1 nm-1000 nm, 1 µm-1000 µm, 1 mm-1000 mm, greater than 1 m or the value within the range of 1 µm-100 µm. The length, width, diameter, and limit can be any value within the range of 0.001 nm-1 nm, 1 nm-1000 nm, 1 µm-1000 µm, 1 mm-1000 mm, greater than 1 m. The shape of the cross section can be a regular rectangle or a wave shape, similar to the shape of asbestos tile, color steel tile. One end of High temperature anti-freezing material for negative electrode electrolyte membrane 43 is arranged in Negative electrolyte storage chamber 81, and the other end is arranged in Negative electrolyte second storage chamber 811, and Negative electrolyte 8 is sucked from Negative electrolyte storage chamber 81 to Negative electrolyte second storage chamber 811 at a certain speed, and most of the rest is sandwiched between Metal fuel 24 and High temperature anti-freezing material for siphon film 4, which provides an ion channel for the positive and negative electrodes of the battery. It should be noted that, in FIG. 78, and FIG. 80, we can see that the coating film coating is located between High temperature anti-freezing material for negative electrode electrolyte membrane 43 and High temperature anti-freezing material for siphon film 4. In fact, Daub coating 35 is coated on High temperature anti-freezing material for negative electrode electrolyte membrane 43, here to do a special note.

Operating characteristics: Negative electrolyte 8 is sucked from a Negative electrolyte storage chamber 81 to Negative electrolyte second storage chamber 811 at a certain speed, and most of the rest is sandwiched between Metal fuel 24 and High temperature anti-freezing material for siphon film 4, which provides an ion channel for the positive and negative electrodes of the battery. At the same time, a metal oxide is generated on Metal fuel 24 due to discharge, and is carried into Negative electrolyte second storage chamber 811 through the flow of Negative electrolyte 8. The material with adsorption capacity can be chosen, for instance, polyethylene membrane, polypropylene membrane, glass fiber membrane, PVC membrane. Carbon foam, cotton, flax etc.

(DT-11) Daub coating 35: Daub coating 35 is coated on High temperature anti-freezing material for negative electrode electrolyte membrane 43, not on Membrane, membrane bag, bioactive membrane bag, bioactive membrane 3, while the methods and the material are the same. Here is no more detail for it.

(1-2) Introduction to is a dynamic structure air metal fuel cell with Negative electrolyte 8 movement in FIG. 78

The dynamic structure consists of Air positive electrode 1, Air electrode positive current collector 11, Air electrode positive lug 12, Air electrode positive output circuit 13, Air electrode positive air inlet device 14, Air electrode carrier 15, Catalyst 16, Metal negative electrode 2 Metal negative current collector 21, Metal negative lug 22, Metal negative output circuit 23, Metal fuel 24, Negative electrolyte pump 25 Liquid inlet device of negative electrolyte pump 251, Liquid discharging device of negative electrolyte pump 252, Daub coating film 35, High temperature anti-freezing material for siphon film 4, siphon end of siphon film 41, Ion terminal of siphon film 42, High temperature anti-freezing material for negative electrode electrolyte membrane 43, Shockproof buffer layer 7, Negative electrolyte 8, Negative electrolyte storage chamber 81, Negative electrolyte isolation device 82, Negative electrolyte storage chamber access channel 83. Negative electrolyte second storage chamber 811, Negative electrolyte second isolation device 821, Negative electrolyte second storage room access channel 831, Positive electrolyte 9, Positive electrolyte storage chamber 91, Positive electrolyte isolation device 92, Positive electrolyte storage chamber access channel 93, Battery shell and support fixing device 10, etc.

The structure of Air positive electrode 1, High temperature anti-freezing material for siphon film 4, Positive electrolyte 9 is the same as the example I, For Air positive electrode 1: Air positive electrode 1 is arranged on the periphery of Air electrode positive air inlet device 14, and is fixed on Battery shell and supporting fixing device 10. Air positive electrode 1 can be directly adhered with glue, adhesive, etc. or fixed by a sealing ring and a sealing pad by a mechanical method of extrusion, or fixed by a pressure device, and can be fixed by other methods.

Air electrode positive current collector 11 is connected with Air electrode carrier 15. Air electrode positive lug 12 of the air electrode is connected with Air electrode positive current collector 11. Air electrode positive output circuit 13 of the air electrode is connected with Air electrode positive lug 12. Catalyst 16 can be made to Air electrode carrier 15, by chemical deposition method, vapor deposition, ion plating, electroless plating method, spraying method, hydrothermal method, normalization method, microwave method, normalization & microwave method, acetylene black restoring Potassium Permanganate manganese method, nitrate and cobalt nitrate decomposition method, vacuum ion plating method, high temperature vacuum ion plating method, ion plating method, high temperature and high pressure high temperature and high pressure spraying ion plating method, biological method, biological fermentation method, biological method and other methods of bond technology. Air electrode carrier 15 is fixed on Battery shell and supporting fixing device 10, Air electrode positive air inlet device 14 combined with uniform paste is fixed in front of the cathode electrode with good load of Air electrode carrier 15. In the process combined with uniform paste, the air is discharged, thus, preparatory work of Air positive electrode 1 is completed.

For Metal negative electrode 2: Metal negative current collector 21 is connected to Metal fuel 24, Metal negative lug 22 is connected to Metal negative current collector 21 and Metal negative output circuit 23 is connected to Metal negative lug 22. The preparation of Metal negative electrode 2 is completed. Negative electrolyte pump 25 is connected with Liquid inlet device of negative electrolyte pump 251 and Liquid discharging device of negative electrolyte pump 252; Liquid inlet device of negative electrolyte pump 251 is connected to Negative electrolyte second storage chamber 811; Liquid discharging device of negative electrolyte pump 252 is connected to Negative electrolyte storage chamber 81.

For High temperature anti-freezing material for siphon film 4: Ion terminal of siphon film 42 of High temperature anti-freezing material for siphon film 4 is placed in Positive electrolyte storage chamber 91 with Positive electrolyte 9, and Positive electrolyte isolation device 92 seals the junction of High temperature anti-freezing material for siphon film 4 and Positive electrolyte storage chamber 91.

For High temperature anti-freezing material for negative electrode electrolyte membrane 43: One end of High temperature anti-freezing material for negative electrode electrolyte membrane 43 is arranged in Negative electrolyte storage chamber 81, and the other end is arranged in Negative electrolyte second storage chamber 811, and Negative electrolyte second isolation device 821 seals the junction of High temperature anti-freezing material for negative electrode electrolyte membrane 43 and Positive electrolyte second isolation device 921.

For Negative electrolyte 8: Negative electrolyte 8 is added to Negative electrolyte storage chamber 81 through Negative electrolyte storage chamber access channel 83.

For Positive electrode 9: Positive electrode 9 is added to the positive electrolyte storage chamber 91 through Positive electrolyte storage chamber access channel 93. After High temperature anti-freezing material for siphon film 4 is placed in Positive electrolyte storage chamber 91 with Positive electrolyte 9, Positive electrolyte isolation device 92 seals the junction of High temperature anti-freezing material for siphon film 4 and Positive electrolyte storage chamber 91.

In this way, Air positive electrode 1, Metal negative electrode 2, High temperature anti-freezing material for siphon film 4, High temperature anti-freezing material for negative electrode electrolyte membrane 43, Shockproof buffer layer 7, Negative electrolyte 8, Negative electrode electrolyte storage chamber 81, Positive electrolyte 9, Positive electrolyte storage chamber 91, Battery shell and support fixing device 10, which are ready to be installed, can be installed into a battery in accordance with FIG. 78 and the characteristics of each component as well as the actual requirements. When the positive and negative poles of the battery are connected with the load, the current output can be obtained.

Specific materials and specific functions of each component of a dynamic structure air metal fuel cell with Negative electrolyte 8 movement are described above.

Figure 79:
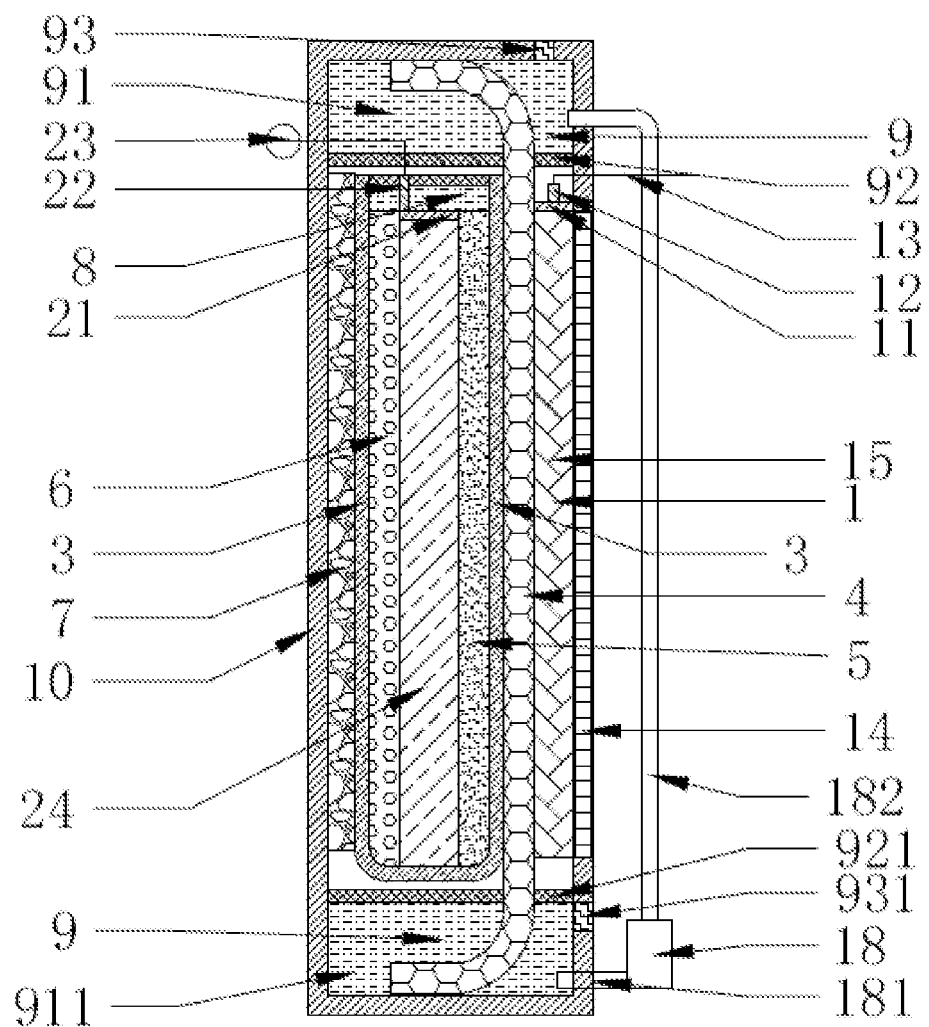
FIG. 79 shows a structure diagram of the air metal fuel cell with dynamic positive electrolyte.

II. FIG. 79 is a dynamic structure air metal fuel cell with Positive electrolyte 9 movement.

(2-1) first introduction to several battery components:

Positive electrolyte pump 18, Liquid inlet device of positive electrolyte pump 181, Liquid outlet device of positive electrolyte pump 182, Positive electrolyte second storage chamber 911, Positive electrolyte second isolation device 921, Positive electrolyte second storage chamber access channel 931.

(DT-12) Positive electrolyte pump 18: A device capable of beating the movement of Positive electrolyte 9, withstanding the corrosion of the Positive electrolyte 9, and being used for a long time. It can be a diaphragm pump, a peristaltic pump, a vacuum pump, and other devices.

(DT-13) Liquid outlet device of positive electrolyte pump 182: a tube in which Positive electrolyte 9 can flow, the suction end of Positive electrolyte pump 18. One end is connected with Positive electrolyte second storage chamber 911, and the other end is connected with the positive electrolyte pump 18. Positive electrolyte 9 can be introduced into Positive electrolyte pump 18 by means of Liquid inlet device of positive electrolyte pump 181.

(DT-14) Liquid outlet device of positive electrolyte pump 182: a tube in which Positive electrolyte 9 can flow, the outlet end of Positive electrolyte pump 18. One end is connected with Positive electrode electrolyte storage chamber 91, and the other end is connected with Positive electrolyte pump 18. Under the action of Positive electrolyte pump 18, Positive electrode 9 can be introduced into Positive electrolyte pump 18 by means of Liquid outlet device of positive electrolyte pump 182.

(DT-15) Positive electrolyte second storage chamber 911:

Positive electrolyte second storage chamber 911 is used to store Positive electrolyte 9, and Positive electrode 9 is stored in Positive electrolyte storage chamber 91, which, after being adsorbed by High temperature anti-freezing material for siphon film of the siphon film, flows into the positive electrode second storage room at a certain speed.

It is a hollow cavity in shape of cuboids, cube, cylinder, sphere and other shapes, for storing Positive electrode 9 with at least two openings, one of which is the inlet opening of the by the high temperature anti freezing material 4, which is used for adsorbing Positive electrode 9 then adsorbed to Positive electrolyte second storage chamber 911, and the other is an supply opening of Positive electrode 9.

Positive electrolyte second storage chamber 911 can be connected with the battery, so that Battery shell and supporting fixing device 10 can be shared with the other components of the battery, and it can also be separated from the battery or two or more cells share Positive electrolyte second storage chamber 911.

In order to prevent leakage of Positive electrode 9 from the two openings in Positive electrolyte second storage chamber 911, a plurality of adsorbing materials can be filled in Positive electrolyte second storage chamber 911 to fix Positive electrode 9 on the adsorbing material, choice: sponge, absorbent cotton, foam carbon nano materials, glass fiber, etc.

(DT-16) Positive electrolyte second isolation device 921

Positive electrolyte second isolation device 921 is provided with an inlet for High temperature anti-freezing material for siphon film 14, and in order to prevent the leakage of the electrolyte from the opening High temperature anti-freezing material for siphon film 4, Positive electrolyte second isolation device 921 is arranged, which will not affect the adsorption capacity of High temperature anti-freezing material for siphon film 4, and is a sealing device which can be sealing rubber ring, PTFE sealing rubber ring, graphite sealing mud, etc.

(DT-17) Positive electrolyte second storage chamber access channel 931: an opening on Positive electrolyte second storage chamber 911, which is used for supplementing Positive electrolyte 9, and also can be used for discharging Positive electrolyte 9. A switch is arranged on Positive electrolyte second storage chamber access channel 931, which is on when supplementing Positive electrolyte 9 is off when finishing. It is the same when discharging Positive electrolyte 9.

(2-2) Introduction to is a dynamic structure air metal fuel cell with positive electrolyte 9 movement in FIG. 79

Air positive electrode 1, Air electrode positive current collector 11, Air electrode positive lug 12, Air electrode positive output circuit 13, Air electrode positive air inlet device 14, Air electrode carrier 15, Catalyst 16, Positive electrolyte pump 18, Metal negative electrode 2, Metal negative current collector 21, Metal negative lug 22, Metal negative output circuit 23, Metal fuel 24, Membrane, membrane bag, bioactive membrane bag, bioactive membrane 3, Membrane bag sealing device 31, Membrane bag edge bonding part 32, Membrane 33, Septum 34, Daub coating 35, Daub coating B 36, High temperature anti-freezing material for siphon film 4, Siphon end of siphon film 41, Ion terminal of siphon film 42, Electrolyte 5, Mandrel 6, Shockproof buffer layer 7, Negative electrolyte 8, Positive electrolyte 9, Positive electrolyte storage chamber 91, Positive electrolyte isolation device 92, Positive electrolyte storage chamber access channel 93, Liquid inlet device of positive electrolyte pump 181, Liquid outlet device of positive electrolyte pump 182, Positive electrolyte second storage chamber 911, Positive electrolyte second isolation device 921, Positive electrolyte second storage chamber access channel 931 Battery shell and support fixing device 10, etc.

The structure of Metal negative electrode 2, Membrane, membrane bag, bioactive membrane bag, bioactive membrane 3 and High temperature anti-freezing material for siphon film 4 is the same as the example I, For Air positive electrode 1: Air electrode positive current collector 11 is connected with Air electrode carrier 15. Air electrode positive lug 12 of the air electrode is connected with Air electrode positive current collector 11. Air electrode positive output circuit 13 of the air electrode is connected with Air electrode positive lug 12. Catalyst 16 can be made to Air electrode carrier 15, by chemical deposition method, vapor deposition, ion plating, electroless plating method, spraying method, hydrothermal method, normalization method, microwave method, normalization & microwave method, normalized reduction method, acetylene black restoring Potassium Permanganate manganese method, nitrate and cobalt decomposition method, vacuum ion plating method, high temperature vacuum ion plating method, ion plating method, high temperature and high pressure high temperature and high pressure spraying ion plating method, biological method, biological fermentation method, biological method and other methods of bond technology. Air electrode carrier 15 is fixed on Battery shell and supporting fixing device 10, and then Air electrode positive inlet device 14 combined with uniform paste is fixed in front of the cathode electrode with good load of Air electrode carrier 15. In the process combined with uniform paste, the air is discharged, thus, preparatory work of Air electrode positive 1 is completed.

Positive electrolyte pump 18 is connected with Liquid inlet device of positive electrolyte pump 181 and Liquid outlet device of positive electrolyte pump 182; Liquid inlet device of positive electrolyte pump 181 is connected to Positive electrolyte second storage chamber 911; Liquid outlet device of positive electrolyte pump 182 is connected to Positive electrode electrolyte storage chamber 91.

For Metal negative electrode 2: Metal positive current collector 21 is connected to Metal fuel 24. Metal negative lug 22 is connected to Metal negative output circuit 23 is connected to Metal negative lug 22. The preparation of Metal negative electrode 2 is completed.

For Membrane, membrane bag, bioactive membrane bag, bioactive membrane 3: According to a certain method, Daub coating 35 and Daub coating B 36 are applied to the corresponding parts of Membrane, membrane bag, bioactive membrane bag, bioactive membrane 3. At the same time, Membrane bag sealing device 31 is prepared, so that the preparation of Membrane, membrane bag, bioactive membrane bag, bioactive membrane 3 is completed.

For High temperature anti-freezing material for negative electrode electrolyte membrane 43: One end of High temperature anti-freezing material for negative electrode electrolyte membrane 43 is arranged in Negative electrolyte storage chamber 81, and the other end is arranged in Negative electrolyte second storage room 811, and Negative electrolyte second isolation device 821 seals the junction of High temperature anti-freezing material for negative electrode electrolyte membrane 43 and Negative electrolyte second storage chamber 921.

For Negative electrolyte 8: Negative electrolyte 8 is added to Negative electrolyte storage chamber 81 through Negative electrolyte storage chamber access channel 83.

For Positive electrode 9: Positive electrode 9 is added to Positive electrolyte storage chamber 91 through Positive electrolyte storage chamber access channel 93. After the siphon film to high temperature anti freezing material 4 is placed in Positive electrolyte storage chamber 91 with Positive electrolyte 9, Positive electrolyte isolation device 92 seals the junction of High temperature anti-freezing material for siphon film 4 and Positive electrolyte storage chamber 91.

For Electrolyte 5, Mandrel 6: The finished Electrolyte 5 is applied to Metal fuel 24. After treatment, Mandrel 6 is placed into the membrane bag with a certain order, and Electrolyte 5 can also be made into a sheet structure, together with Mandrel 6, Metal fuel 24, and placed in the membrane bag in a certain order. After Negative electrolyte 8 are added into Membrane, membrane bag, bioactive membrane bag, bioactive membrane 3, which is immersed in Electrolyte 5, Mandrel 6 and Metal fuel 24, Membrane, membrane bag, bioactive membrane bag, bioactive membrane 3 are sealed by Membrane bag sealing device 31. A film bag with a Negative electrolyte 8, Electrolyte 5, Mandrel 6 and Metal fuel of 24 is fixed on Battery shell and supporting fixing device 10. Then film bag with Negative electrolyte 8, Electrolyte 5, Mandrel of 6 and Metal fuel 24, Ion terminal of siphon film 42 and Air positive electrode 1 are closely combined, exhausting air at the junction of the three, which can be operated directly in a vacuum glove box.

In this way, Air electrode positive electrode 1, Metal negative electrode 2, High temperature anti-freezing material for siphon film 4, Electrolyte 5, Mandrel 6, Membrane, membrane bag, bioactive membrane bag, bioactive membrane 3, Shockproof buffer layer 7, Negative electrolyte 8, Positive electrolyte 9, Positive electrolyte storage chamber 91, Battery shell and support fixing device 10, which are ready to be installed, can be installed into a battery in accordance with FIG. 79 and the characteristics of each component as well as the actual requirements. When the positive and negative poles of the battery are connected with the load, the current output can be obtained.

Specific materials and specific functions of each component of a dynamic structure air metal fuel cell with Positive electrolyte 9 movement are described above.

Figure 80:
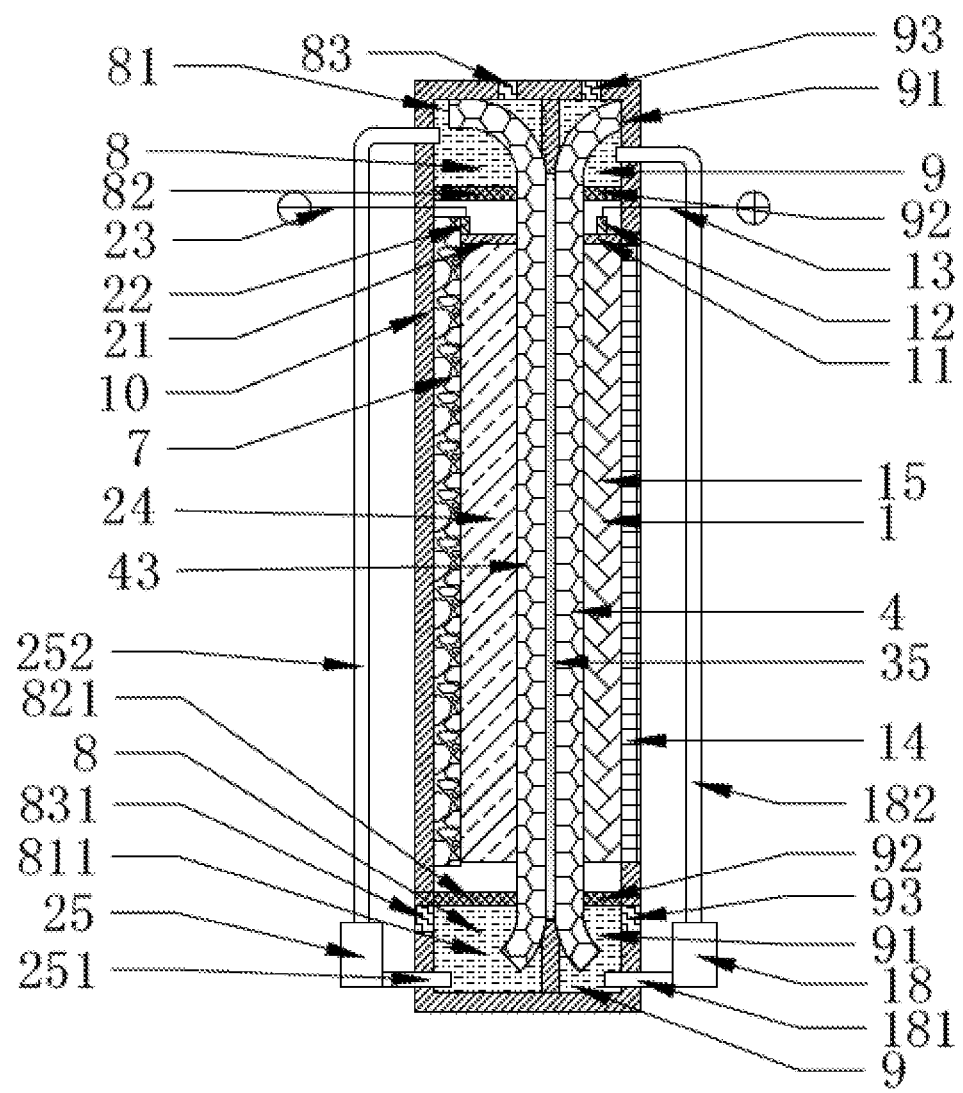
FIG. 80 shows a structure diagram of the air metal fuel cell with dynamic positive and negative electrolyte.

III. FIG. 80 is a dynamic structure air metal fuel cell with the movement of Negative electrolyte 8 and Positive electrolyte 9.

Introduction to several battery components of air metal fuel cell with the movement of Negative electrolyte 8 and Positive electrolyte 9:

The dynamic structure of air metal fuel cell with the movement of Negative electrolyte 8 and Positive electrolyte 9 consists of Air electrode positive electrode 1, Air electrode positive current collector 11, Air electrode positive lug 12, Air electrode positive output circuit 13, Air electrode positive air inlet device 14, Air electrode carrier 15, Catalyst 16, Positive electrode electrolyte pump 18, Liquid inlet device of positive electrolyte pump 181, Liquid outlet device of positive electrolyte pump 182, Metal negative electrode 2, Metal negative current collector 21, Metal negative lug 22, Metal negative output circuit 23, Metal fuel 24, Membrane, membrane bag, bioactive membrane bag, bioactive membrane 3, Membrane bag sealing device 31, Membrane bag edge bonding part 32, Membrane 33, Septum 34, Daub coating 35, Daub coating B: 36, High temperature anti-freezing material for siphon film 4, Siphon end of siphon film 41, Ion terminal of siphon film 42, Electrolyte 5, Mandrel 6, Shockproof buffer layer 7, Negative electrode electrolyte 8, Positive electrolyte solution 9, Positive electrode electrolyte storage chamber 91, Positive electrode electrolyte isolation device 92, Positive electrolyte storage chamber access channel 93, Positive electrode second storage chamber 911, Positive electrolyte second isolation device 921, Positive electrolyte second camber access channel 931, Battery shell and support fixing device 10, etc.

For Air positive electrode 1: Air positive electrode 1 is arranged on the periphery of Air electrode positive air inlet device 14, and is fixed on Battery shell and supporting fixing device 10. Air positive electrode 1 can be directly adhered with glue, adhesive, etc. or fixed by a sealing ring and a sealing pad by a mechanical method of extrusion, or fixed by a pressure device, and can be fixed by other methods.

For Positive electrode 1: Air electrode positive current collector 11 is connected with Air electrode carrier 15. Air positive electrode lug 12 of the air electrode is connected with Air electrode positive electrode current collector 11. Air positive electrode output circuit 13 of the air electrode is connected with Air electrode positive lug 12. Catalyst 16 can be made to Air electrode carrier 15, by chemical deposition method, vapor deposition, ion plating, electroless plating method, spraying method, hydrothermal method, normalization method, microwave method, normalization & microwave method, acetylene black restoring Potassium Permanganate manganese method, nitrate and cobalt nitrate decomposition, vacuum ion plating method, high temperature vacuum ion plating method, ion plating method, high temperature and high pressure high temperature and high pressure spraying ion plating method, biological method, biological fermentation method, biological method and other methods of bond technology. Air electrode carrier 15 is fixed on Battery shell and supporting fixing device 10, and then Air electrode positive air inlet device 14 combined with uniform paste is fixed in front of the cathode electrode with good load of Air electrode carrier 15. In the process combined with uniform paste, the air is discharged, thus, preparatory work of Air electrode positive 1 is completed. Positive electrolyte pump 18 is connected with Liquid inlet device of positive electrolyte pump 181 and Liquid outlet device of positive electrolyte pump 182; Liquid inlet device of positive electrolyte pump 181 is connected to Positive electrolyte second storage room 911; Liquid outlet device of positive electrolyte pump 182 is connected to the Positive electrode electrolyte storage chamber 91.

For Metal negative electrode 2: Metal negative current collector 21 is connected to Metal fuel 24. Metal negative lug 22 is connected to Metal negative output circuit 23 is connected to Metal negative lug 22. The preparation of Metal negative 2 is completed. Negative electrolyte pump 25 is connected with Liquid inlet device of negative electrolyte pump 251 and the Liquid discharging device of negative electrolyte pump 252; Liquid inlet device of negative electrolyte pump 251 is connected to Negative electrolyte second storage room 811; Liquid discharging device of negative electrolyte pump 252 is connected to the negative electrode electrolyte storage chamber 81.

For High temperature anti-freezing material for siphon film 4: Ion terminal of siphon film 42 of High temperature anti-freezing material for siphon film 4 is placed in Positive electrolyte storage chamber 91 with Positive electrolyte 9, and Positive electrolyte isolation device 92 seals the junction of High temperature anti-freezing material for siphon film 4 and Positive electrolyte storage chamber 91.

For High temperature anti-freezing material for negative electrode electrolyte membrane 43: One end of High temperature anti-freezing material for negative electrode electrolyte membrane 43 is arranged in Negative electrode electrolyte storage chamber 81, and the other end is arranged in Negative electrolyte second storage room 811, and Negative electrolyte second isolation device 821 seals the junction of High temperature anti-freezing material for negative electrode electrolyte membrane 43 and Negative electrolyte second storage chamber 921.

For Positive electrode 9: Positive electrode 9 is added to Positive electrolyte storage chamber 91 through Positive electrolyte storage chamber access channel 93. After High temperature anti-freezing material for siphon film 4 is placed in Positive electrolyte storage chamber 91 with Positive electrolyte 9, Positive electrolyte isolation device 92 seals the junction of High temperature anti-freezing material for siphon film 4 and Positive electrolyte storage chamber 91.

In this way, Air positive electrode 1, Metal negative electrode 2, High temperature anti-freezing material for siphon film 4, Electrolyte 5, Mandrel 6, Membrane, membrane bag, bioactive membrane bag, bioactive membrane 3, Shockproof buffer layer 7, Negative electrolyte 8, Positive electrolyte 9, Positive electrolyte storage chamber 91, Battery shell and support fixing device 10, which are ready to be installed, can be installed into a battery in accordance with FIG. 80 and the characteristics of each component as well as the actual requirements. When the positive and negative poles of the battery are connected with the load, the current output can be obtained.

Specific materials and specific functions of each component of a dynamic structure air metal fuel cell with the movement of Negative electrolyte 8 and Positive electrolyte 9 are described above.

Figure 81:
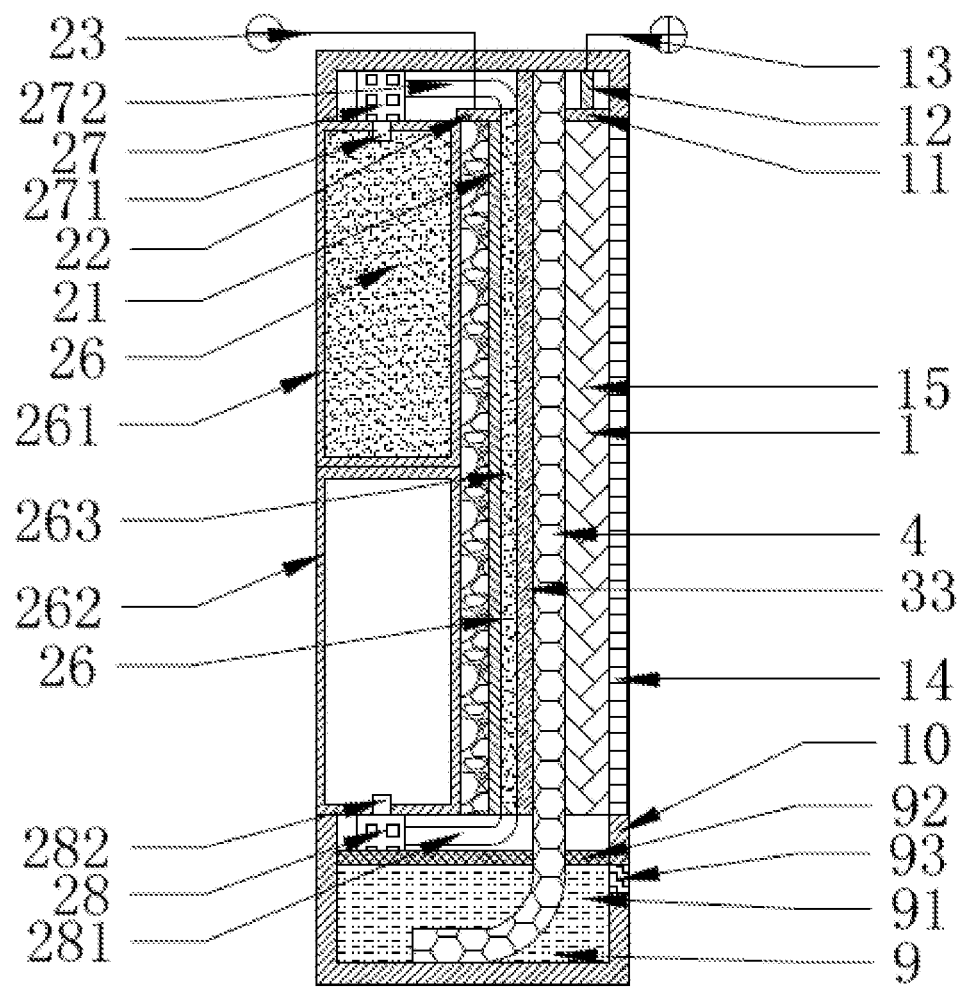
FIG. 81 shows a structure diagram of the air metal fuel cell with dynamic metal negative electrode.

IV. FIG. 81 is a dynamic structure air metal fuel cell with the movement of Metal electrode 2.

(4-1) First introduction to several battery components:

Semi solid metal fuel 26, Metal fuel chamber 261, Metal fuel recycle room 262, Metal fuel discharge area 263, Metal fuel pump 27, Metal fuel pump feeding device 271, Metal fuel pump discharge device 272, Metal fuel recycle pump 28, Metal fuel recycle pump feeding device 281, Metal fuel recycle pump discharge device 282

(DT-18) Semi solid metal fuel 26: a semisolid metal or metal mixture with certain fluidity.

Semi solid metal fuel 26 is the storage portion of the battery capacity, whose effective weight and effective volume are the key to the energy density of the battery.

Selection of materials for Semi solid metal fuel 26 can be metal elements in periodic table of elements such as Zinc Zn, magnesium Mg, aluminum Al, iron Fe, lead Pb, sodium Na, potassium K, calcium Ga, etc, or one of two or more alloys of these metals, such as Mg Al alloy, Pb Ca Fe alloy, mg Al Fe Ge Mn alloy, etc. It can also be one of the two kinds of metals, a variety of alloys made of non-metallic elements, such as Carbon zinc alloy, Carbon iron tin alloy, Silicon aluminum Magnesium calcium alloy, etc.

Semi solid metal fuel 26 is a semi solid mixture with a certain fluidity mixed with powders, particles, conductive agents, thickeners, and the like.

(DT-19) Metal fuel chamber 261:

A hollow box for storage of Semi-solid metal fuel 26. Its shape is rectangular, square, round, oval, triangular or other shapes. The material can be: ABS, polyethylene, polypropylene, PVC, PVC, alloy, metal etc.

(DT-20) Metal fuel recycle room 262:

A hollow box for storage of Semi-solid metal fuel 26 after discharge. Its shape is rectangular, square, round, oval, triangular or other shapes. The material can be: ABS, polyethylene, polypropylene, PVC, PVC, alloy, metal etc.

(DT-21) Metal fuel discharge area 263: Located between Metal negative collector 21 and Membrane 33. In FIG. 81, Metal negative electrode current collector is a block, consistent with the size of Membrane 33, and Negative electrode current collector 21 has a certain distance from Membrane 33, which is the Metal fuel discharge area 263, where Semi solid metal fuel 26 is discharged.

(DT-22) Metal fuel pump 27: A device capable of beating the movement of Semi-solid metal fuel 26, withstanding the corrosion of Semi-solid metal fuel 26, and being used for a long time. It can be a Membrane pump, a peristaltic pump, a vacuum pump, and other devices.

The power of Metal fuel pump 27 can be derived from the external power supply, but also can be derived from the battery itself as well as other equipments. Its operation and stop are controlled by the battery management system.

(DT-23) Metal fuel pump feeding device 271: A tube in which Semi-solid metal fuel 26 can flow and the suction end of Metal fuel pump 27. One end is connected with Metal fuel discharge area 263, and the other end is connected with Metal fuel pump 27. Semi-solid metal fuel 26 can be introduced into Metal fuel discharge area 263 by means of Metal fuel pump feeding device 271.

(DT-24) Metal fuel pump discharging device 272: A tube in which Semi-solid metal fuel 26 can flow and the outlet end of Metal fuel pump 27. One end is connected with Metal fuel discharge area 263, and the other end is connected with Metal fuel pump 27. Under the action of Metal fuel pump 27, Semi-solid metal fuel 26 can be introduced into Metal fuel discharge area 263 by means of Metal fuel pump discharging device 272.

(DT-25) Metal fuel recovery pump 28: A device capable of beating the movement of Semi-solid metal fuel 26, withstanding the corrosion of Semi-solid metal fuel 26, and being used for a long time. It can be a Membrane pump, a peristaltic pump, a vacuum pump, and other devices.

The power of Metal fuel recycle pump 28 can be derived from the external power supply, but also can be derived from the battery itself as well as other equipments. Its operation and stop are controlled by the battery management system.

(DT-26) Metal fuel recycle pump feeding device 281: A tube in which Semi-solid metal fuel 26 can flow and the suction end of Metal fuel recycle pump 28. One end is connected with Metal fuel discharge area 263, and the other end is connected with Metal fuel recycle pump 28. Semi-solid metal fuel 26 can be introduced into Metal fuel discharge area 263 by means of Metal fuel recycle pump feeding device 281.

(DT-27) Metal fuel recycle pump discharging device 282: A tube in which Semi-solid metal fuel 26 can flow and the outlet end of Metal fuel recycle pump 28. One end is connected with Metal fuel discharge area 263, and the other end is connected with Metal fuel recycle pump 28. Under the action of Metal fuel recycle pump 28, Semi-solid metal fuel 26 can be introduced into Metal fuel discharge area 263 by means of Metal fuel recycle pump discharging device 282.

(4-2) Introduction to a dynamic structure air metal fuel cell with Metal electrode 2 in FIG. 81

The dynamic structure of air metal fuel cell with the movement of Negative electrolyte 8 and Positive electrolyte 9 consists of Air positive electrode 1, Air electrode positive current collector 11, Air electrode positive lug 12, Air electrode positive output circuit 13, Air electrode positive air inlet device 14, Air electrode carrier 15, Catalyst 16, Metal negative electrode 2, Metal negative current collector 21, Metal negative lug 22, Metal negative output circuit 23, Semi solid metal fuel 26, Metal fuel chamber 261, Metal fuel recycle room 262, Metal fuel discharge area 263, Metal fuel pump 27, Metal fuel pump feeding device 271, Metal fuel pump discharging device 272, Metal fuel recycle pump 28, Metal fuel recycle pump feeding device 281, Metal fuel recycle pump discharging device 282, Membrane 33, High temperature anti-freezing material for siphon film 4, Siphon end of siphon film 41, Ion terminal of siphon film 42, Shockproof buffer layer 7, Negative electrolyte 8, Positive electrolyte 9, Positive electrode electrolyte storage chamber 91, Positive electrode electrolyte isolation device 92, Positive electrolyte storage chamber access channel 93, Battery shell and support fixing device 10, etc.

For Air positive electrode 1: Air positive electrode 1 is arranged on the periphery of Air electrode positive air inlet device 14, and is fixed on Battery shell and supporting fixing device 10. Air positive electrode 1 can be directly adhered with glue, adhesive, etc. or fixed by a sealing ring and a sealing pad by a mechanical method of extrusion, or fixed by a pressure device, and can be fixed by other methods.

For Air positive electrode 1: Air electrode positive current collector 11 is connected with Air electrode carrier 15. Air electrode positive lug 12 of the air electrode is connected with Air electrode positive current collector 11. Air electrode positive output circuit 13 of the air electrode is connected with Air electrode positive lug 12. Catalyst 16 can be made to Air electrode carrier 15, by chemical deposition method, vapor deposition, ion plating, electroless plating method, spraying method, hydrothermal method, normalization method, microwave method, normalization & microwave method, acetylene black restoring Potassium Permanganate manganese method, nitrate and cobalt nitrate decomposition, vacuum ion plating method, high temperature vacuum ion plating method, ion plating method, high temperature and high pressure high temperature and high pressure spraying ion plating method, biological method, biological fermentation method, biological method and other methods of bond technology. Air electrode carrier 15 is fixed on Battery shell and supporting fixing device 10, and then the air intake device 14 combined with uniform paste is fixed in front of the cathode electrode with good load of Air electrode carrier 15. In the process combined with uniform paste, the air is discharged, thus, preparatory work of Air electrode positive 1 is completed. Positive electrolyte pump 18 is connected with Liquid inlet device of positive electrolyte pump 181 and Liquid outlet device of positive electrolyte pump 182; Liquid inlet device of positive electrolyte pump 181 is connected to Positive electrolyte second storage room 911; Liquid outlet device of positive electrolyte pump 182 is connected to Positive electrode electrolyte storage chamber 91.

For Metal negative electrode 2: Metal negative current collector 21 is connected to Battery shell and support fixing device 10. Metal fuel discharge area 263 is formed with Membrane 33. Metal negative lug 22 is connected to Metal negative current collector 21 and Metal negative output circuit 23 is connected to Metal negative lug 22. Semi-solid metal fuel 26 is added to Metal fuel chamber 261. Metal fuel pump 27 is connected with Metal fuel pump feeding device 271, and Metal fuel pump discharging device 272 is connected with Metal fuel discharge area 263. Metal fuel recycle pump 28 is connected with Metal fuel recycle pump feeding device 281, Metal fuel recycle pump discharging device 282. Metal fuel recycle pump feeding device 281 is connected with Metal fuel discharge area 263. Metal fuel recycle pump discharging device 282 is connected with Metal fuel recycle room 262. In this way, the installation of Metal negative electrode 2 is ready.

Membrane 33 is fixed on Battery shell and support fixing device 10, and is coated with Daub coating 35.

For High temperature anti-freezing material for siphon film 4: Ion terminal of siphon film 42 of High temperature anti-freezing material for siphon film 4 is placed in Positive electrolyte storage chamber 91 with Positive electrolyte 9, and Positive electrolyte isolation device 92 seals the junction of High temperature anti freezing material for siphon film 4 and Positive electrolyte storage chamber 91.

For Positive electrode 9: Positive electrode 9 is added to Positive electrolyte storage chamber 91 through Positive electrolyte storage chamber access channel 93. After High temperature anti-freezing material for siphon film 4 is placed in Positive electrolyte storage chamber 91 with Positive electrolyte 9, Positive electrolyte isolation device 92 seals the junction of High temperature anti-freezing material for siphon film 4 and Positive electrolyte storage chamber 91.

In this way, Air positive electrode 1, Metal negative electrode 2, High temperature anti-freezing material for siphon film 4, Shockproof buffer layer 7, Negative electrolyte 8, Positive electrolyte 9, Positive electrolyte storage chamber 91, Battery shell and support fixing device 10, which are ready to be installed, can be installed into a battery in accordance with FIG. 81 and the characteristics of each component as well as the actual requirements. When the positive and negative poles of the battery are connected with the load, the current output can be obtained.

Specific materials and specific functions of each component of a dynamic structure air metal fuel cell with the movement of Metal negative electrode 2 are described above.

Figure 82:
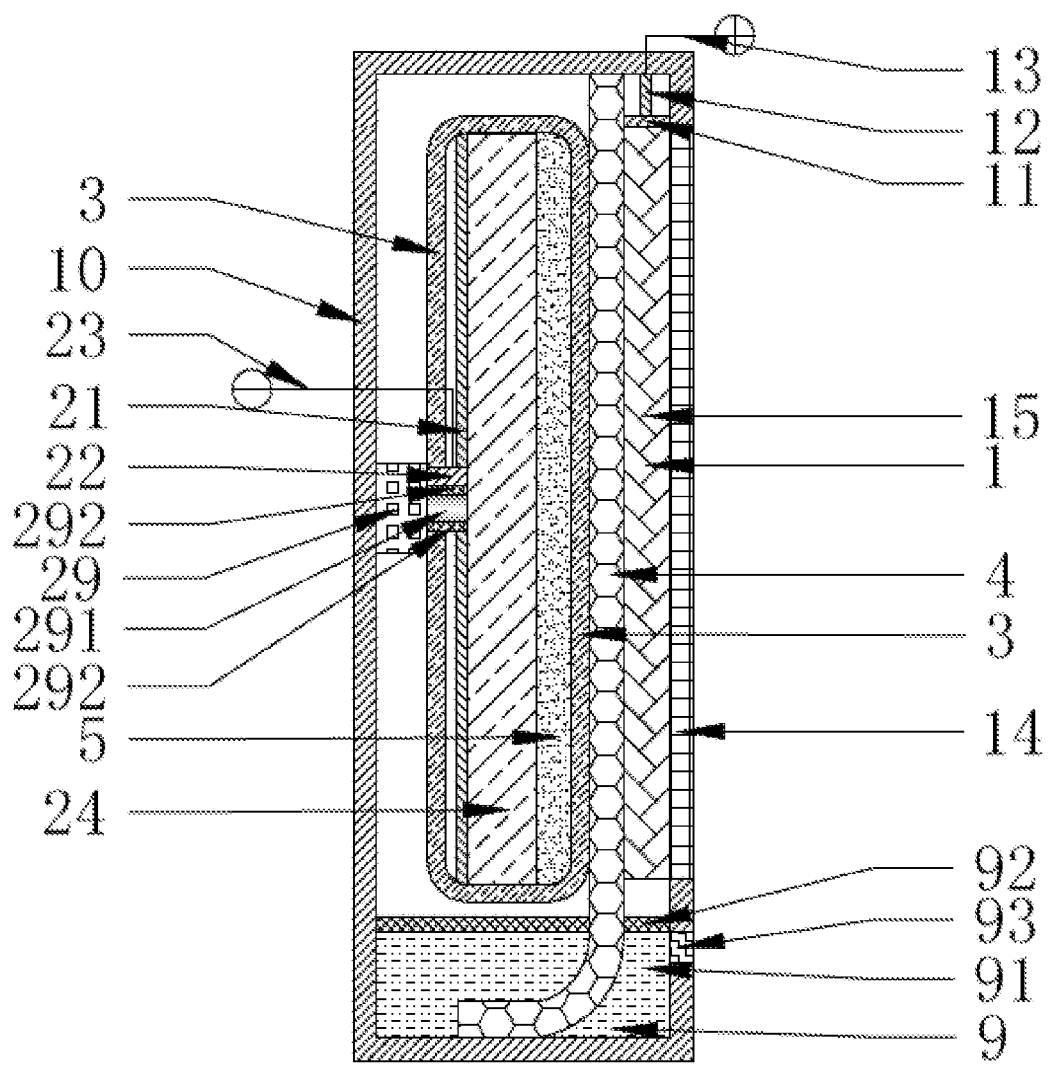
FIG. 82 shows a structure diagram of the air metal fuel cell with rotating metal negative electrode.

V. FIG. 82 is a dynamic structure air metal fuel cell with the rotation of Metal negative electrode 2.

(5-1) First introduction to several battery components:

Negative rotation motor 29, Negative rotation axis 291, Rotating seal 292

(DT-28) Negative rotation motor 29: A motor that drives Metal fuel 24 to rotate at a certain speed, which is fixed on Battery shell and support fixing device 10. The power output end of Negative rotation motor 29 is connected with Negative rotation axis 291, and transmits power to Metal fuel 24, which is a circular turntable type. The power of Negative rotation motor 29 can be derived from the external power supply, but also can be derived from the battery itself as well as other equipments. Its operation and stop are controlled by the battery management system.

(DT-29) Negative rotation axis 291:

The only transmission device. One end is connected with the power output end of Negative rotation motor 29, and the other end is connected with Metal fuel 24, and transmits the power of Negative rotation motor 29 to Metal fuel 24 to drive Metal fuel 24 to rotate at a certain speed.

(DT-30) Rotating seal 292: A sealing device, materials available: sealing rubber ring, PTFE sealing rubber ring, graphite sealing mud and so on. Without affecting the option of Metal fuel 24, it prevents the leakage of electrolyte in Membrane, membrane bag, bioactive membrane bag, bioactive membrane 3. It is located between Membrane, membrane bag, bioactive membrane bag, bioactive membrane 3 and Negative rotation axis 291.

(5-2) Introduction to a dynamic structure air metal fuel cell with the rotation of Metal negative electrode 2.

The dynamic structure air metal fuel cell with the rotation of Metal electrode 2 consists of Air positive electrode 1, Air electrode positive current collector 11, Air electrode positive lug 12, Air electrode positive output circuit 13, Air electrode positive air inlet device 14, Air electrode carrier 15, Catalyst 16, Metal negative electrode 2, Metal negative current collector 21, Metal electrode lug 22, Metal negative output circuit 23, Metal fuel 24, Negative rotation motor 29, Negative rotation axis 291, Rotating seal 292, Membrane, membrane bag, bioactive membrane bag, bioactive membrane 3, Membrane bag sealing device 31, Membrane 33, Septum 34, Daub coating 35, Daub coating film B: 36, High temperature anti-freezing material for siphon film 4, Siphon end of siphon film 41, Ion terminal of siphon film 42, Electrolyte 5, Negative electrode electrolyte 8, Positive electrolyte 9, Positive electrode electrolyte storage chamber 91, Positive electrode electrolyte isolation device 92, Positive electrolyte storage chamber access channel 93, Battery shell and support fixing device 10, etc.

For Air positive electrode 1: Air positive electrode 1 is arranged on the periphery of Air electrode positive air inlet device 14, and is fixed on Battery shell and the supporting fixing device 10. Air positive electrode 1 can be directly adhered with glue, adhesive, etc. or fixed by a sealing ring and a sealing pad by a mechanical method of extrusion, or fixed by a pressure device, and can be fixed by other methods.

For Air positive electrode 1: Air electrode positive current collector 11 is connected with Air electrode carrier 15. Air electrode positive lug 12 of the air electrode is connected with Air electrode positive current collector 11. Air electrode positive output circuit 13 of the air electrode is connected with Air electrode positive lug 12. Catalyst 16 can be made to Air electrode carrier 15, by chemical deposition method, vapor deposition, ion plating, electroless plating method, spraying method, hydrothermal method, normalization method, microwave method, normalization & microwave method, acetylene black restoring Potassium Permanganate manganese method, nitrate and cobalt nitrate decomposition, vacuum ion plating method, high temperature vacuum ion plating method, ion plating method, high temperature and high pressure high temperature and high pressure spraying ion plating method, biological method, biological fermentation method, biological method and other methods of bond technology. Air electrode carrier 15 is fixed on Battery shell and supporting fixing device 10, and then the air intake device 14 combined with uniform paste is fixed in front of the cathode electrode with good load of Air electrode carrier 15. In the process combined with uniform paste, the air is discharged, thus, preparatory work of Air electrode positive 1 is completed.

For Metal negative electrode 2: Metal negative current collector 21 is connected to Metal fuel 24. Metal negative lug 22 is connected to Metal negative current collector 21 and Metal negative output circuit 23 is connected to Metal negative lug 22. Negative rotation motor 29 is connected with Battery shell and support fixing device 10 and the negative electrode electrolyte pump liquid outlet device 252; Negative rotation axis 291 is connected to Negative rotation motor 29; Negative rotation axis 291 is connected to Metal fuel 24. The preparation of Metal negative electrode 2 is completed.

For Membrane, membrane bag, bioactive membrane bag, bioactive membrane 3: According to a certain method, Daub coating 35 and Daub coating B 36 are applied to the corresponding parts of Membrane, membrane bag, bioactive membrane bag, bioactive membrane 3. At the same time, Membrane bag sealing device 31 is prepared.

For High temperature anti-freezing material for siphon film 4: Ion terminal of siphon film 42 of High temperature anti-freezing material for siphon film 4 is placed in Positive electrolyte storage chamber 91 with Positive electrolyte 9, and Positive electrolyte isolation device 92 seals the junction of High temperature anti freezing material 4 and Positive electrolyte storage chamber 91.

For Electrolyte 5: The finished Electrolyte 5 is applied to Metal fuel 24, after treatment, placed into the membrane bag with a certain order, and Electrolyte 5 can also be made into a sheet structure, and placed in the membrane bag in a certain order. After Negative electrolyte 8 are added into Membrane, membrane bag, bioactive membrane bag, bioactive membrane 3, which is immersed in Electrolyte 5 and Metal fuel 24, Membrane, membrane bag, bioactive membrane bag, bioactive membrane 3. Membrane, membrane bag, bioactive membrane bag, bioactive membrane 3 are sealed by Membrane bag sealing device 31. A film bag with Negative electrode 8, Electrolyte 5, and Metal fuel of 24 is fixed on Battery shell and the supporting fixing device 10. Then film bag with Negative electrode 8, Electrolyte and Metal fuel 24, Ion terminal of siphon film 42 and Air positive electrode 1 are closely combined, exhausting air at the junction of the three, which can be operated directly in a vacuum glove box.

In this way, Air positive electrode 1, Metal negative electrode 2, High temperature anti-freezing material for siphon film 4, Shockproof buffer layer 7, Negative electrolyte 8, Positive electrolyte 9, Positive electrolyte storage chamber 91, Battery shell and support fixing device 10, which are ready to be installed, can be installed into a battery in accordance with FIG. 82 and the characteristics of each component as well as the actual requirements. When the positive and negative poles of the battery are connected with the load, the current output can be obtained.

Specific materials and specific functions of each component of a dynamic structure air metal fuel cell with the rotation of Metal negative electrode 2 are described above.

Figure 83:
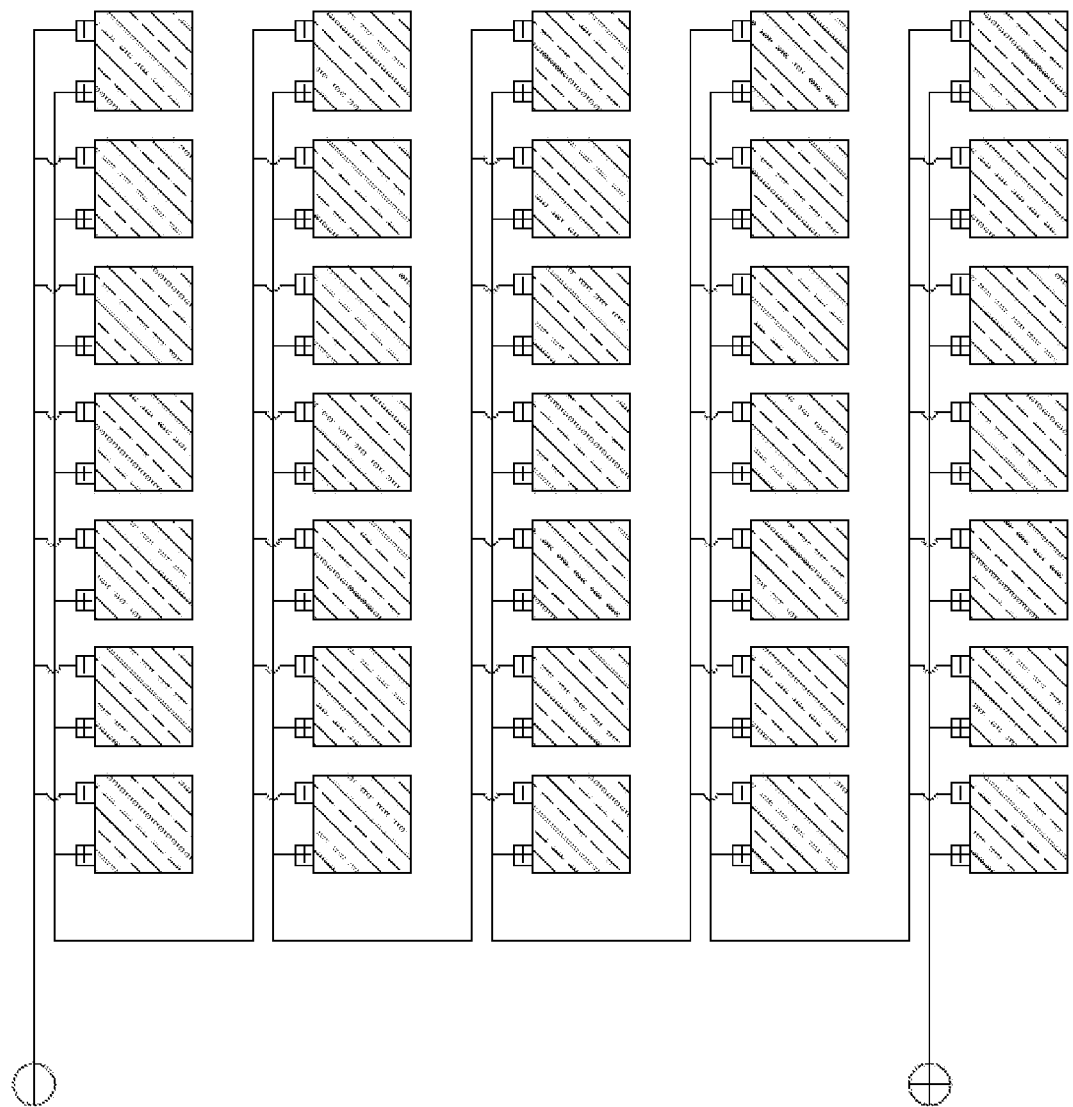
FIG. 83 shows a sketch of a series of and paralleled cells.

VI. Parallel and tandem operation of air metal fuel cells:

The inventive battery can be connected in parallel and in series to form a battery pack, or a battery pack consisting of at least two single cells is connected in series and in parallel according to different requirements and conditions, as is shown in FIG. 83.

Recovery and reduction of metal oxides and metal hydroxides

After the discharge of an air metal fuel cell, the metal is converted into metal oxide and metal hydroxide, the metal converted into metal oxides and the metal hydroxides are recovered and reduced in the factory to regenerate the metal fuel.

For the recycle of metal oxides and hydroxide of the discharge of metal fuels, the following methods can be used for reduction:

1) Electrolysis using the power of a power plant: The electric energy of water power, thermal power, nuclear power, solar energy, wind power and so on restores metal oxides and metal hydroxides to metal fuels by electrolysis.

The metal fuel is then placed into an air metal fuel cell to continue discharging so that a cycle of metal fuel in the battery is formed. The excess electric energy of a power plant: water power, thermal power, nuclear power, solar energy, wind power and so on, can be used to restore the metal oxide and metal hydroxide into metal fuel by electrolysis and technology, thus achieving the regulation of the peak ratio of electric field power.

2) Direct reduction with fossil material: Coke restores metal oxides and metal hydroxides to metal fuels. The metal fuel is then placed into an air metal fuel cell to continue discharging so that a cycle of metal fuel in the battery is formed.

3) Thermal decomposition using solar thermal energy: The solar energy is focused, and the focused temperature restores metal oxides and metal hydroxides to metal fuels. The metal fuel is then placed into an air metal fuel cell to continue discharging so that a cycle of metal fuel in the battery is formed.

In the process of the reduction of calmogastrin to aluminum to circulate electricity with energy supplied by wind or solar energy (including hydropower), The conversion of the solar energy used can reach 40%-50%, or even more, which is because, in the use of solar energy to reduce the calmogastrin into aluminum, the process can directly use solar energy heat, instead of converting solar energy into electricity, which can be used to reduce calmogastrin to aluminum. This will increase the utilization of solar energy to 40%-50%, and eliminates the need for silicon wafers, reducing the cost of producing large amounts of silicon wafers, and the pollution caused by the production of silicon crystal plate has been completely eliminated.

4) Other methods.

Example XIII: Experimental Data of Aluminum Battery 1

The following, although specific parameters are given, are only intended to illustrate the present invention and should not be understood as limitations to the present invention.

1. Composition of the battery

The structure of the battery is the same as Example 1. Hereinto, Membrane is made of polypropylene film, Daub coating is butter, high temperature anti-freezing material for siphon film is polyethylene separator, the electrolyte is semi-solid electrolyte (starch:butter:8% sodium hydroxide, methanol solution:glass fiber powder, =1:5:22:0.5), the negative electrolyte is 8% sodium hydroxide methanol solution, the positive electrolyte is 10% sodium hydroxide water solution, the metal fuel is pure aluminum and the air electrode carrier is carbon cloth, which is made into a carrier according to the method of producing an example of the catalyst for the distribution of the air electrode carrier. According to Example 1, a battery is fabricated and assembled.

2. Discharge test

Figure 98:
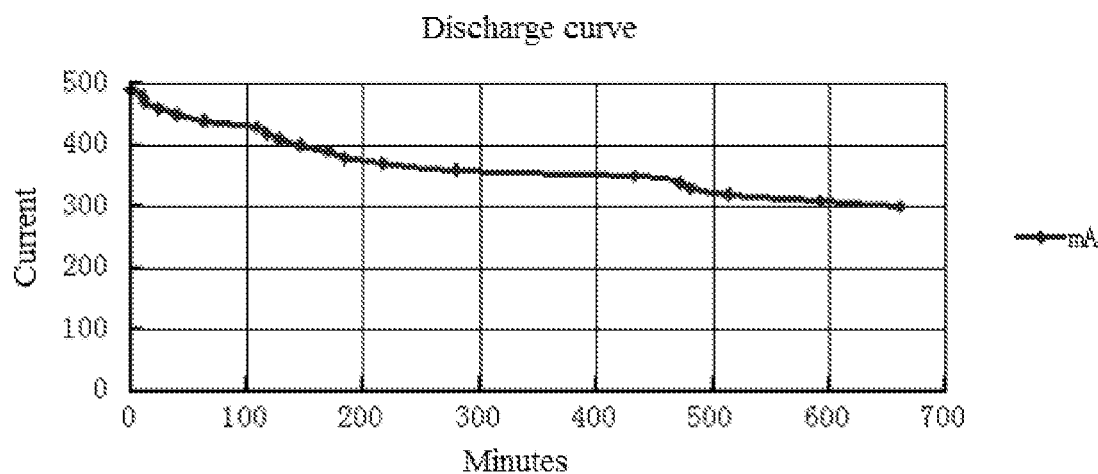
FIG. 98 shows the discharge experiment curve.

1) Discharge test 1
Aluminum sheet size: 12 m×12 cm×0.03 cm
Mass of aluminum sheet: 17.56 g
Duration of discharge: 600 minutes (10 hours)
Mass of aluminum sheet 600 minutes later: 16.98 g
Aluminum consumption 600 minutes later: 0.58 g
Aluminum consumption per hour: 0.058 g
Average current: 340 mA
Average voltage: 1.22V
Energy density: 7152 Wh/Kg
The discharge curve is shown in FIG. 98.

Figure 99:
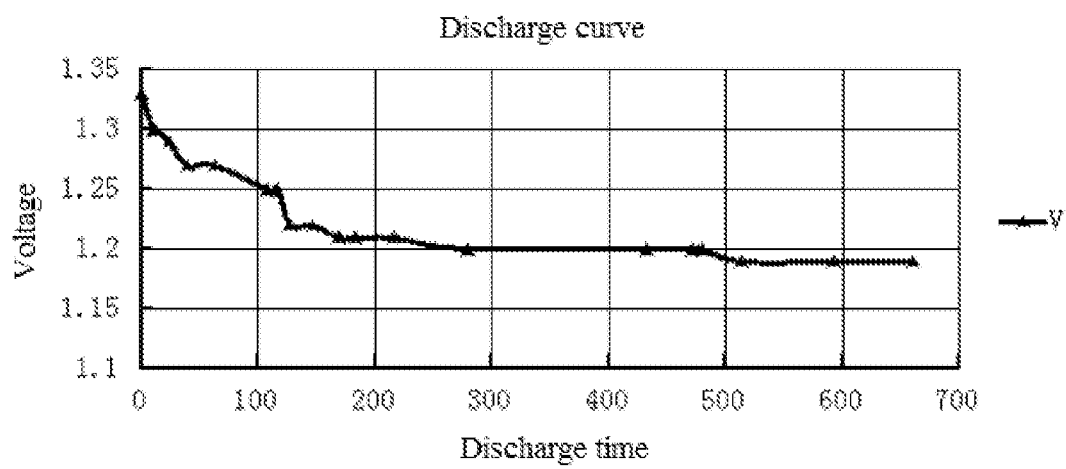
FIG. 99 is another discharge experiment curve.

2) Discharge test 2
Aluminum sheet size: 5.5 m×5.5 cm×0.03 cm
Mass of aluminum sheet: 3.37 g
Duration of discharge: 600 minutes (10 hours)
Mass of aluminum sheet 600 minutes later: 3.24 g
Aluminum consumption 600 minutes later: 0.13 g
Aluminum consumption per hour: 0.013 g
Average current: 76 mA
Average voltage: 1.20V
Energy density: 7015 Wh/Kg
The discharge curve is shown in FIG. 99.

2) Early long term test
Aluminum sheet size: 5.5 m×5.5 cm×0.03 cm
Mass of aluminum sheet: 5.40 g
Duration of discharge: 14230 minutes (273.16 hours)
Mass of aluminum sheet 14230 minutes later: 3.43 g
Aluminum consumption 14230 minutes later: 1.97 g
Aluminum consumption per hour: 0.0083066 g
Average current: 30 mA
Average voltage: 1.25V
Energy density: 4514 Wh/Kg 3. Negative corrosion test 3.1 Experimental grouping
Test group: the battery composition is the same as test 1.
Aluminum sheet size: 12 m×12 cm×0.03 cm
Mass of aluminum sheet: 17.56 g
Control group: the battery structure is the same as the experimental group, but there is no Membrane material and no Daub coating.

3.2 Test method
Control group 10, Experimental group 10
Battery in the room temperature environment
Air humidity is 45%.
Placed for 100 days
Remove the aluminum sheet to investigate the degree of corrosion.

3.3 Test result
There was no explosion in the experimental group, and an explosion occurred in 3 cases in the control group.

Example XIV: Experimental Data of Aluminum Battery 2

The following, although specific parameters are given, are only intended to illustrate the present invention and should not be understood as limitations to the present invention.

1. Composition of the battery

The structure of the battery is the same as Example 1. Hereinto, the Membrane is made of glass fiber membrane, The tin, manganese, silicon and indium elements are added to the Membrane and doped to the glass fiber film (thickness 50 nm) by electroplating and sputtering. The molar ratio of tin, manganese, silicon and indium is 1.5:1.5:0.7:1. No coating film and Siphon to high temperature antifreeze material is polyethylene separator, the electrolyte is semi-solid electrolyte (The mass fraction ratio of ethyl cellulose, sheep's fat, 18% potassium hydroxide methyl sulfoxide solution and glass fiber powder is 1:4:20:3), the negative electrolyte is 18% potassium hydroxide methyl sulfoxide solution, the positive electrolyte is 18% potassium hydroxide aqueous solution, the metal fuel is pure aluminum. % is mass percent. The air electrode carrier is carbon cloth, and the manganese catalyst is prepared onto the carrier by the decomposition method. According to Example 1, a battery is fabricated and assembled.

2. Discharge test
Aluminum sheet size: 5.5 m×5.5 cm×0.03 cm

Mass of aluminum sheet: 3.35 g
Duration of discharge: 600 minutes (10 hours)
Mass of aluminum sheet 600 minutes later: 3.22 g
Aluminum consumption 600 minutes later: 0.13 g
Aluminum consumption per hour: 0.013 g
Average current: 75 mA
Average voltage: 1.20V
Energy density: 6923 Wh/Kg
3. Negative corrosion test
3.1 Experimental grouping
Test group: the battery composition is the same as test 1.
Aluminum sheet size: 5.5 m×5.5 cm×0.03 cm
Mass of aluminum sheet: 3.53 g
Control group: the battery structure is the same as the experimental group, but there is no Membrane material.
3.2 Test method
Control group 10, Experimental group 10
Battery in the room temperature environment
Air humidity is 45%.
Placed for 100 days
Remove the aluminum sheet to investigate the degree of corrosion.
3.3 Test result
The average corrosion rate of the experimental group was 0.017%, and the average corrosion rate of the control group was 16.87%.

INDUSTRIAL APPLICABILITY

The air metal fuel cell of the invention has the advantages of large energy density, low cost and high safety, and can be widely used in mobile phone batteries, power batteries and energy storage power plants.

What is claimed is:

1. A metal air fuel cell comprising at least one positive unit and at least one negative unit,
    wherein the positive unit comprises a positive air electrode comprising an air electrode carrier containing a catalyst, a positive electrolyte, and a wicking material, wherein the catalyst catalyzes oxygen and create anions,
    wherein the negative unit comprises a metal negative electrode containing a metal fuel and a first negative electrolyte, wherein the metal fuel provides cations for a discharge of the metal air fuel cell,
    wherein the wicking material conveys the positive electrolyte to the positive air carrier, and connects the positive electrolyte to the positive air carrier, wherein the metal negative electrode connects to the first negative electrolyte, wherein an ion path exists between the positive air electrode and the metal negative electrode,
    wherein the metal air fuel cell comprises a hydrophobic structure layer between the positive air electrode and the metal negative electrode, wherein the hydrophobic structure layer is able to let an ion pass through, and has hydrophobicity,
    wherein the negative unit further comprises a membrane which has one or more layer(s),
    wherein at least one of said one or more layers possesses a hydrophobic coating and forms the hydrophobic structure layer, wherein a material for the hydrophobic coating is selected from the group consisting of PTFE (polytetrafluoroethylene), polyethylene, microcrystalline wax, fluid wax, polyethylene wax, cream, butter, mutton fat, lard, fish oil, avian oil, bean oil, sunflower oil, colza oil, castor oil, peanut oil, and synthetic lipid based compounds,
    wherein the metal fuel is semisolid,
    wherein the metal air fuel cell further comprises a metal fuel storage room and a metal fuel recycle room, wherein the metal fuel enters fuel enters the metal fuel recycle room from the metal fuel storage room after discharging via a negative discharge area of the metal air fuel cell.

2. The metal air fuel cell of claim 1, wherein the negative unit contains the metal negative electrode, the first negative electrolyte and a second negative electrolyte.

3. The metal air fuel cell of claim 1, wherein the positive air electrode further comprises an air electrode positive collector, an air electrode positive lug and a positive output circuit, wherein the positive output circuit, the air electrode positive lug, the air electrode positive collector and the air electrode carrier sequentially connects to each other.

4. The metal air fuel cell of claim 1, wherein the positive unit further comprises an air electrode positive air inlet device, wherein the oxygen gets into the positive unit through the air electrode positive air inlet device, and touches the catalyst of the air electrode carrier.

5. The metal air fuel cell of claim 4, wherein the air electrode positive air inlet device has a breathable material layer, wherein the breathable material layer contains a waterproof breathable membrane and/or a carbon dioxide isolation membrane.

6. The metal air fuel cell of claim 1, wherein the catalyst is positioned inside and/or on the surface of the air electrode carrier.

7. The metal air fuel cell of claim 1, further comprising an air electrode catalyst coating that contains the catalyst on the surface of the air electrode carrier.

8. The metal air fuel cell of claim 7, wherein the air electrode catalyst coating is made of the catalyst, a long acting adsorbent, a conductive agent, a dispersing agent and an adhesion agent.

9. The metal air fuel cell of claim 8, wherein the adsorbent is selected from the group consisting of an active carbon, an activated aluminum oxide, a molecular sieve, and a silica gel, wherein the conductive agent is selected from the group consisting of acetylene black, graphene, graphite powder, carbon black, super carbon black, polyaniline, polyacetylene, polypyrrole, polythiophene, and metal powder, wherein the adhesion agent is selected from the group consisting of PTFE emulsion, fatty acid metal salt, polyvinyl acetate, polyvingakohol, polyoxyethylene, PVP (poly vinyl pyrrolidone), polyvinylether, polymethyl methacrylate, polyvinylidene fluoride, PVC (polyvinyl chloride), polyacrylonitrile, polyvinyl pyridine, polystyrene, and their ramifications and copolymers.

10. The metal air fuel cell of claim 1, wherein the catalyst is selected from the group consisting of silver catalyst, perovskite-type catalyst, platinum catalyst, palladium catalyst, manganese catalyst, metal complex oxide catalyst, metallic oxide catalyst, organic metal catalyst, and metal complex catalyst.

11. The metal air fuel cell of claim 1, wherein the air electrode carrier is selected from the group consisting of: 1) a membrane structure, a chain structure, a fabric structure, a grain structure, a powder structure, nanometer materials that made of carbon materials or carbon based materials, 2) a net structure, a foaming structure, a membrane structure, a fabric structure, a grain structure, a powder structure that made of carbon nanomaterials, or 3) a net structure, a foaming structure, a membrane structure, a fabric structure, a grain structure, a powder structure that made of metal and metal nanomaterials.

12. The metal air fuel cell of claim 11, wherein the air electrode carrier is selected from the group consisting of: 1) a carbon cloth, a carbon paper, a carbon fiber cloth, carbon nanofibers, a carbon nano paper, 2) a nickel wire mesh, a nickel plated steel wire mesh, a copper wire mesh, a nickel plated copper wire mesh, a copper coated wire mesh, or 3) a nickel foam, copper foam, a copper fiber, silver foam particles.

13. The metal air fuel cell of claim 1, wherein the metal negative electrode further comprises a metal collector, a metal lug, and a metal output circuit, wherein the output circuit, the metal lug, the metal collector, and the metal fuel sequentially connects to each other.

14. The metal air fuel cell of claim 1, wherein the metal fuel is selected from the group consisting of Lithium, Zinc, Magnesium, Aluminum, Iron, Lead, Sodium, Potassium, Calcium, an alloy of metals thereof, and an alloy of one or more metals thereof and nonmetals.

15. The metal air fuel cell of claim 14, wherein the metal fuel is Aluminum.

16. The metal air fuel cell of claim 1, wherein the metal fuel pumps into the negative discharge area of the metal air fuel cell via a metal fuel pump, and pumps into the metal fuel recycle room via the metal fuel recycle pump.

17. The metal air fuel cell of claim 1, wherein the semisolid metal fuel is selected from the group consisting of a fluid semisolid mixture made of powder or particles, a conductive agent, and a thickening agent of one or more of materials selected from the group consisting of Zinc, Magnesium, Aluminum, Iron, Lead, Sodium, Potassium, and Calcium.

18. The metal air fuel cell of claim 1, wherein the membrane has multiple layers, wherein the hydrophobic structure layer exists at least between one group of two layers of the multiple layers.

19. The metal air fuel cell of claim 1, wherein the membrane is polyethylene film, polypropylene film, glass fiber separator, PVC diaphragm, bioactive film, or bacterial microbial biofilm.

20. The metal air fuel cell of claim 1, wherein the negative unit further comprises a second negative electrolyte, which fits with the membrane.

21. The metal air fuel cell of claim 20, wherein the membrane forms a baggy-looking membrane bag by itself or with supplementary materials.

22. The metal air fuel cell of claim 21, wherein the metal negative electrode, the first negative electrolyte and/or the second negative electrolyte are located inside the membrane bag.

23. The metal air fuel cell of claim 21, wherein the membrane bag has a membrane bag sealing device, which is located at the opening of the bag and is used for sealing up a bag opening.

24. The metal air fuel cell of claim 21, wherein the membrane bag contains a membrane and a septum, which form a bag shape together.

25. The metal air fuel cell of claim 24, wherein a material for the septum is PTFE polyethylene, polyethylene, polypropylene, PVC, polyvinyl chloride or ABS.

26. The metal air fuel cell of claim 1, further comprising a positive electrolyte first storage chamber, wherein part of the wicking material inserts into the positive electrolyte first storage chamber, while part of the wicking material touches the air positive carrier.

27. The metal air fuel cell of claim 26, further comprising a positive electrolyte second storage chamber, wherein both ends of the wicking material insert into the positive electrolyte first storage chamber and the positive electrolyte second storage chamber, while middle part of the wicking material touches the air positive carrier.

28. The metal air fuel cell of claim 27, wherein the positive electrolyte first storage chamber is connected to the positive electrolyte second storage chamber via piping, which is equipped with a positive electrolyte pump, wherein the positive electrolyte is achievable to circulate between the first storage chamber and the second storage chamber by driving the positive electrolyte pump.

29. The metal air fuel cell of claim 27, further comprising a positive electrolyte isolation device respectively at the entrance of where the wicking material is inserted into the positive electrolyte first and second storage chamber, wherein the device seals up joint of the wicking material and the positive electrolyte storage chamber.

30. The metal air fuel cell of claim 1, wherein the air electrode carrier is the wicking material, wherein the metal air fuel cell further comprises a positive electrolyte storage chamber, wherein part of the wicking material is inserted into the positive electrolyte storage chamber.

31. The metal air fuel cell of claim 1, wherein the negative unit contains the first negative electrolyte, as well as a mandrel, which has adsorbability so that it can absorb and store the first negative electrolyte, wherein the mandrel and the metal fuel touch each other.

32. The metal air fuel cell of claim 31, wherein the cell contains the first negative electrolyte, the mandrel and a third electrolyte, wherein the metal fuel is located in between the mandrel and the third electrolyte, and fits up with the mandrel and the third electrolyte respectively.

33. The metal air fuel cell of claim 1, wherein the negative unit contains a negative wicking material, wherein part of the negative wicking material fits up with the metal fuel, and convey the first negative electrolyte to the metal fuel via the negative wicking material.

34. The metal air fuel cell of claim 33, wherein a face of the negative wicking material that facing the positive unit has a hydrophobic coating, which forms up the hydrophobic structure layer.

35. The metal air fuel cell of claim 34, further comprising a negative electrolyte first storage chamber and a second storage chamber, wherein both ends of the negative wicking material insert into the negative electrolyte first storage chamber and the second storage chamber respectively, while middle part of the negative wicking material touches the metal fuel.

36. The metal air fuel cell of claim 35, wherein the negative electrolyte first storage chamber is connected to the negative electrolyte second storage chamber via piping, which is equipped with a negative electrolyte pump, wherein the first negative electrolyte is achievable to circulate between the first storage chamber and the second storage chamber by driving the negative electrolyte pump.

37. The metal air fuel cell of claim 1, further comprising a third electrolyte, wherein the electrolyte is solid or semisolid electrolyte that provides ion channel for the positive and negative electrodes, and provides ion running for the negative electrode.

38. The metal air fuel cell of claim 37, wherein the third electrolyte is selected from the group consisting of: 1) Solid electrolyte $\beta$-Al2O3, zirconium dioxide or the ceramic material, 2) Polymer electrolyte: PEO series, Polyvinylidene fluoride series, Polymethyl methacrylate series or Polyacrylonitrile, or 3) Semi-solid electrolyte: which is made via reaction by taking at least one from oligose, polysaccharide, amylum, dextrin, ethyl cellulose, and at least one from lipid, higher order alkanes, esters, and at least one from carbon material, magnetic material, glass fiber, then mixing with at least one alkaline organic solution from caustic soda, caustic potash, lithium hydroxide under waterless environment.

39. The metal air fuel cell of claim 1, wherein the first negative electrolyte is an electrolyte that provides ion running for the negative electrode, wherein the first negative electrolyte is selected from the group consisting of:
an alkaline electrolyte selected from the group consisting of one or more from caustic soda, caustic potash, lithium hydroxide, sodium Bicarbonate, calcium hydroxide, aluminum hydroxide, zinc hydroxide, sodium methoxide, and potassium methoxide, and one or more organic solutions from ethanol, methanol, acetonitrile, dimethyl sulfoxide, carbonic ester;
an acid electrolyte selected from the group consisting of organic weak acid, inorganic weak acid and one or more organic solutions from ethanol, methanol, acetonitrile, dimethyl sulfoxide, and carbonic ester; and
a neutral electrolyte selected from the group consisting of
  (i) one or more salts selected from the group consisting of sodium chloride, sodium fluoride, sodium iodide, potassium chloride, potassium fluoride, and potassium iodide,
  (ii) one or more organic solvents selected from the group consisting of ethanol, methanol, acetonitrile, acetone, tetrahydrofuran, isopropanol, dimethyl sulfoxide, and carbonic ester, and
  (iii) a metal halide ionic liquid that is made by a metal halide and one from hyamine or phosphonium salts or sulfur salt.

40. The metal air fuel cell of claim 1, wherein the positive electrolyte is an electrolyte that provides ion channel for the positive and negative electrodes, and provides ion running for the positive electrode, wherein the positive electrolyte is selected from the group consisting of:
an alkaline electrolyte selected from the group consisting of one or more from caustic soda, caustic potash, lithium hydroxide, sodium Bicarbonate, calcium hydroxide, aluminum hydroxide, sodium methoxide, potassium methoxide, and one or more organic solutions from ethanol, methanol, acetonitrile, dimethyl sulfoxide, carbonic ester and water;
an acid electrolyte selected from the group consisting of organic weak acid, inorganic weak acid and one or more organic solutions from ethanol, methanol, acetonitrile, dimethyl sulfoxide, carbonic ester and water; and
a neutral electrolyte selected from the group consisting of one or more salts selected from the group consisting of sodium chloride, sodium fluoride, sodium iodide, potassium chloride, potassium fluoride and potassium iodide, and one or more organic solvents selected from the group consisting of ethanol, methanol, acetonitrile, dimethyl sulfoxide, carbonic ester and water.

41. The metal air fuel cell of claim 1, further comprising a rotation device connected with the metal fuel, wherein the rotation device drives a rotation of the metal fuel.

42. The metal air fuel cell of claim 41, wherein the rotation device contains an electrical motor and a connector that connects the electrical motor and the metal fuel.

43. The metal air fuel cell of claim 1, further comprising a shockproof buffer structure, which has resilience, wherein the resilience from the shockproof buffer structure strongly and closely connects the components in the cell.

44. The metal air fuel cell of claim 1, further comprising a cell shell and a stationary support unit, wherein the cell shell and the stationary support unit firmly secure the cell components.

45. The metal air fuel cell of claim 44, wherein the metal air fuel cell is in tabular shape, wherein both of the positive unit and the negative unit are in tabular shape respectively and fit each other tightly and closely.

46. The metal air fuel cell of claim 44, wherein the metal air fuel cell is in cylinder shape, negative unit centered, wherein the negative unit is surrounded by the positive unit closely fit each other.

47. The metal air fuel cell of claim 1, wherein the metal air fuel cell contains two or more than two positive units.

48. The metal air fuel cell of claim 1, wherein the metal air fuel cell contains two or more than two negative units.

49. The metal air fuel cell of claim 1, further comprising a shell around the metal air fuel cell.

50. The metal air fuel cell of claim 49, wherein the shell is equipped with a ventilation device that is closed.

51. The metal air fuel cell of claim 49, wherein the metal air fuel cell is included in a pack.

52. The metal air fuel cell of claim 49, further comprising an oxygen supply device, wherein the oxygen supply device is connected with the shell and provides oxygen to the metal air fuel cell.

53. The metal air fuel cell of claim 52, further comprising an oxygen concentration sensor equipped inside the shell, wherein the oxygen supply device adjusts oxygen density inside the shell according to data from the oxygen concentration sensor.

54. The metal air fuel cell of claim 49, wherein the shell is equipped with an oxygen selective passing-through membrane, which allows oxygen to pass selectively.

55. The metal air fuel cell of claim 49, wherein the shell is equipped with a prevention membrane for preventing carbon dioxide from passing through.

56. The metal air fuel cell of claim 49, wherein the shell is equipped with an air filter device.

* * * * *